US00RE44566E

(19) United States
(12) Reissued Patent
Goldberg et al.

(10) Patent Number: US RE44,566 E
(45) Date of Reissued Patent: Oct. 29, 2013

(54) ADVERTISING SYSTEM FOR THE INTERNET AND LOCAL AREA NETWORKS

(75) Inventors: Sheldon F. Goldberg, Las Vegas, NV (US); John Van Antwerp, Pittsfield, IL (US)

(73) Assignee: Beneficial Innovations, Inc., Las Vegas, NV (US)

(21) Appl. No.: 12/754,573

(22) Filed: Apr. 5, 2010

Related U.S. Patent Documents

Reissue of:

(64) Patent No.: 6,183,366
Issued: Feb. 6, 2001
Appl. No.: 09/105,401
Filed: Jun. 26, 1998

U.S. Applications:

(63) Continuation of application No. 08/759,895, filed on Dec. 3, 1996, now Pat. No. 5,823,879.

(60) Provisional application No. 60/010,703, filed on Jan. 26, 1996, provisional application No. 60/010,361, filed on Jan. 19, 1996.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ..... 463/42; 463/25; 463/40; 463/16; 725/116; 715/718; 715/719

(58) Field of Classification Search
None
See application file for complete search history.

(56) References Cited

U.S. PATENT DOCUMENTS 3,796,433 A 3/1974 Fraley et al.

(Continued)

FOREIGN PATENT DOCUMENTS

DE 733983 4/1943

(Continued)

OTHER PUBLICATIONS

The Dallas Morning News, Inc.'s Answer and Counterclaims to Beneficial Innovations, Inc.'s Complaint for Patent Infringement filed in United States District Court, Eastern District of Texas Marshall Division, Case No. 2:07-CV-00555-TJW-CE, on Feb. 8, 2008.

(Continued)

*Primary Examiner* — Paul A. D'Agostino

(74) *Attorney, Agent, or Firm* — StrategemIP Ltd.; Dennis J. Dupray

(57) ABSTRACT

The present invention is an information service and advertising providing system for presenting interactive information services together with interactive advertising on a communications network such as the Internet and LANs. The information service may be a game played interactively on the network while advertising is communicated between users and an advertising network node. However, other interactive services, such as are available on the Internet, are also accessible for concurrent use with advertising presentations. Advertising or promotionals may be selectively presented to users by comparing archived user profiles with demographic profiles of desired users. User responses to advertising may be used for evaluating advertising effectiveness such as for test or microtarget marketing. Compensation to users for viewing advertising may also be provided. For instance, users may be provided with subsidized Internet access for receiving advertising while concurrently interacting with an Internet service. Users may also be provided with various games and/or game tournaments via interactive network communications. Thus, users may respond to advertising while being entertained (e.g., via games), or while interacting with another network service.

REEXAMINATION RESULTS

The questions raised in reexamination proceeding No. 90/011,117, filed Jul. 27, 2010, have been considered, and the results thereof are reflected in this reissue patent which constitutes the reexamination certificate required by 35 U.S.C. 307 as provided in 37 CFR 1.570(e) for *ex parte* reexaminations, or the reexamination certificate required by 35 U.S.C. 316 as provided in 37 CFR 1.997(e) for *inter partes* reexaminations.

134 Claims, 14 Drawing Sheets

(56) References Cited

U.S. PATENT DOCUMENTS 3,848,193 A 11/1974 Martin et al.
3,987,398 A 10/1976 Fung
4,170,782 A 10/1979 Miller
4,186,413 A 1/1980 Mortimer
4,224,644 A 9/1980 Lewis et al.
4,283,709 A 8/1981 Lucero et al.
4,287,592 A 9/1981 Paulish et al.
4,288,809 A 9/1981 Yabe
4,305,101 A 12/1981 Yarbrough et al.
4,307,446 A 12/1981 Barton et al.
4,338,644 A 7/1982 Staar
4,339,798 A 7/1982 Hedges et al.
4,347,498 A 8/1982 Lee et al.
4,355,806 A 10/1982 Buck et al.
4,381,522 A 4/1983 Lambert
4,405,946 A 9/1983 Knight
4,429,385 A 1/1984 Cichelli et al.
4,455,025 A 6/1984 Itkis
4,467,424 A 8/1984 Hedges et al.
4,476,488 A 10/1984 Merrell
4,488,179 A 12/1984 Kürger et al.
4,494,197 A 1/1985 Troy et al.
4,528,643 A 7/1985 Freeny, Jr.
4,531,187 A 7/1985 Uhland
4,536,791 A 8/1985 Campbell et al.
4,575,579 A 3/1986 Simon et al.
4,602,279 A 7/1986 Freeman
4,614,342 A 9/1986 Takashima
4,636,951 A 1/1987 Harlick
4,641,205 A 2/1987 Beyers, Jr.
4,677,466 A 6/1987 Lert, Jr. et al.
4,691,351 A 9/1987 Hayashi et al.
4,691,354 A 9/1987 Palminteri
4,701,794 A 10/1987 Froling et al.
4,706,121 A 11/1987 Young
4,745,468 A 5/1988 Von Kohorn
4,751,578 A 6/1988 Reiter et al.
4,751,669 A 6/1988 Sturgis et al.
4,760,527 A 7/1988 Sidley
4,768,110 A 8/1988 Dunlap et al.
4,775,935 A 10/1988 Yourick
4,815,030 A 3/1989 Cross et al.
4,821,102 A 4/1989 Ichikawa et al.
4,823,122 A 4/1989 Mann et al.
4,829,569 A 5/1989 Seth-Smith et al.
4,842,275 A 6/1989 Tsatskin
4,845,739 A 7/1989 Katz
4,856,787 A 8/1989 Itkis
4,866,700 A 9/1989 Berry et al.
4,868,866 A 9/1989 Williams, Jr.
4,873,662 A 10/1989 Sargent
4,875,164 A 10/1989 Monfort
4,876,592 A 10/1989 Von Kohorn
4,890,321 A 12/1989 Seth-Smith et al.
4,902,020 A 2/1990 Auxier
4,908,707 A 3/1990 Kinghorn
4,908,713 A 3/1990 Levine
4,926,255 A 5/1990 Von Kohorn
4,926,327 A 5/1990 Sidley
4,974,149 A 11/1990 Valenti
4,975,904 A 12/1990 Mann et al.
4,975,905 A 12/1990 Mann et al.
4,977,455 A 12/1990 Young
4,987,486 A 1/1991 Johnson et al.
4,991,011 A 2/1991 Johnson et al.
4,992,940 A 2/1991 Dworkin
4,994,908 A 2/1991 Kuban et al.
5,001,554 A 3/1991 Johnson et al.
5,008,853 A 4/1991 Bly et al.
5,009,429 A 4/1991 Auxier
5,034,807 A 7/1991 Von Kohorn
5,038,022 A 8/1991 Lucero
5,053,889 A 10/1991 Nakano et al.
5,057,915 A 10/1991 Von Kohorn
5,058,108 A 10/1991 Mann et al.
5,073,931 A 12/1991 Audebert et al.
5,075,771 A 12/1991 Hashimoto
5,077,607 A 12/1991 Johnson et al.
5,083,271 A 1/1992 Thacher et al.
5,093,918 A 3/1992 Heyen et al.
5,099,319 A 3/1992 Esch et al.
5,105,184 A 4/1992 Pirani et al.
5,133,075 A 7/1992 Risch
5,141,234 A 8/1992 Boylan et al.
5,151,789 A 9/1992 Young
5,159,549 A 10/1992 Hallman, Jr. et al.
5,177,680 A 1/1993 Tsukino et al.
5,182,640 A 1/1993 Takano
5,187,787 A 2/1993 Skeen et al.
5,200,823 A 4/1993 Yoneda et al.
5,220,420 A 6/1993 Hoarty et al.
5,220,501 A 6/1993 Lawlor et al.
5,220,657 A 6/1993 Bly et al.
5,224,706 A 7/1993 Bridgeman et al.
5,227,874 A 7/1993 Von Kohorn
5,230,048 A 7/1993 Moy
5,231,493 A 7/1993 Apitz
5,231,568 A 7/1993 Cohen et al.
5,233,533 A 8/1993 Edstrom et al.
5,235,509 A 8/1993 Mueller et al.
5,241,465 A 8/1993 Oba et al.
5,257,789 A 11/1993 LeVasseur
5,257,810 A 11/1993 Schorr et al.
5,261,042 A 11/1993 Brandt
5,265,033 A 11/1993 Vajk et al.
5,283,639 A 2/1994 Esch et al.
5,283,731 A 2/1994 Lalonde et al.
5,283,734 A 2/1994 Von Kohorn
5,283,856 A 2/1994 Gross et al.
5,285,272 A 2/1994 Bradley et al.
5,301,028 A 4/1994 Banker et al.
5,305,195 A 4/1994 Murphy
5,319,455 A 6/1994 Hoarty et al.
5,319,707 A 6/1994 Wasilewski et al.
5,320,356 A 6/1994 Cauda
5,321,241 A 6/1994 Craine
5,326,104 A 7/1994 Pease et al.
5,337,155 A 8/1994 Cornelis
5,339,239 A 8/1994 Manabe et al.
5,343,239 A 8/1994 Lappington et al.
5,343,300 A 8/1994 Hennig
5,345,594 A 9/1994 Tsuda
5,347,632 A 9/1994 Filepp et al.
5,351,970 A 10/1994 Fioretti
5,353,218 A 10/1994 De Lapa et al.
5,355,480 A 10/1994 Smith et al.
5,357,276 A 10/1994 Banker et al.
5,361,393 A 11/1994 Rossillo
5,377,354 A 12/1994 Scannell et al.
5,393,067 A 2/1995 Paulsen et al.
5,398,932 A 3/1995 Eberhardt et al.
5,401,946 A 3/1995 Weinblatt
5,403,015 A 4/1995 Forte et al.
5,404,505 A 4/1995 Levinson
5,414,773 A 5/1995 Handelman
5,426,594 A 6/1995 Wright et al.
5,428,606 A 6/1995 Moskowitz
5,429,361 A 7/1995 Raven et al.
5,431,407 A 7/1995 Hofberg et al.
5,434,978 A 7/1995 Dockter et al.
5,437,462 A 8/1995 Breeding
5,440,262 A 8/1995 Lum et al.
5,442,771 A 8/1995 Filepp et al.
5,446,919 A 8/1995 Wilkins
5,469,371 A 11/1995 Bass
5,471,629 A 11/1995 Risch
5,483,466 A 1/1996 Kawahara et al.
5,491,517 A 2/1996 Kreitman et al.
5,498,003 A 3/1996 Gechter
5,504,675 A 4/1996 Cragun et al.
5,505,449 A 4/1996 Eberhardt et al.
5,507,491 A 4/1996 Gatto et al.
5,508,731 A 4/1996 Kohorn
5,511,160 A 4/1996 Robson

(56) References Cited

U.S. PATENT DOCUMENTS 5,513,254 A 4/1996 Markowitz
5,515,098 A 5/1996 Carles
5,526,035 A 6/1996 Lappington et al.
5,526,427 A 6/1996 Thomas et al.
5,528,490 A 6/1996 Hill
5,532,923 A 7/1996 Sone
5,537,586 A 7/1996 Amram et al.
5,539,450 A 7/1996 Handelman
5,539,822 A 7/1996 Lett
5,544,892 A 8/1996 Breeding
5,549,300 A 8/1996 Sardarian
5,557,658 A 9/1996 Gregorek et al.
5,557,721 A 9/1996 Fite et al.
5,559,312 A 9/1996 Lucero
5,561,707 A 10/1996 Katz
5,569,082 A 10/1996 Kaye
5,572,643 A * 11/1996 Judson ..... 709/218
5,576,951 A 11/1996 Lockwood
5,577,266 A 11/1996 Takahisa et al.
5,579,537 A 11/1996 Takahisa
5,581,479 A 12/1996 McLaughlin et al.
5,583,563 A 12/1996 Wanderscheid et al.
5,585,866 A 12/1996 Miller et al.
5,586,257 A 12/1996 Perlman
5,586,766 A 12/1996 Forte et al.
5,586,936 A 12/1996 Bennett et al.
5,586,937 A 12/1996 Menashe
5,588,650 A 12/1996 Eman et al.
5,589,892 A 12/1996 Knee et al.
5,592,212 A 1/1997 Handelman
5,593,349 A 1/1997 Miguel et al.
5,597,162 A 1/1997 Franklin
5,597,307 A 1/1997 Redford et al.
5,600,364 A 2/1997 Hendricks et al.
5,600,366 A 2/1997 Schulman
5,603,502 A 2/1997 Nakagawa
5,605,334 A 2/1997 McCrea, Jr.
5,610,653 A 3/1997 Abecassis
5,611,730 A 3/1997 Weiss
5,613,190 A 3/1997 Hylton
5,613,191 A 3/1997 Hylton et al.
5,613,912 A 3/1997 Slater
5,617,565 A 4/1997 Augenbraun et al.
5,624,265 A 4/1997 Redford et al.
5,624,316 A 4/1997 Roskowski et al.
5,630,204 A 5/1997 Hylton et al.
5,634,051 A 5/1997 Thomson
5,635,979 A 6/1997 Kostreski et al.
5,638,426 A 6/1997 Lewis
5,640,193 A 6/1997 Wellner
5,643,088 A 7/1997 Vaughn et al.
5,655,966 A 8/1997 Werdin, Jr. et al.
5,659,350 A 8/1997 Hendricks et al.
5,659,793 A 8/1997 Escobar et al.
5,660,391 A 8/1997 Klasee
5,664,948 A 9/1997 Dimitriadis et al.
5,669,817 A 9/1997 Tarantino
5,675,507 A 10/1997 Bobo, II
5,675,752 A 10/1997 Scott et al.
5,679,077 A 10/1997 Pocock et al.
5,683,082 A 11/1997 Takemoto et al.
5,684,863 A 11/1997 Katz
5,684,918 A 11/1997 Abecassis
5,687,331 A 11/1997 Volk et al.
5,687,971 A 11/1997 Khaladkar
5,688,174 A 11/1997 Kennedy
5,689,431 A 11/1997 Rudow et al.
5,689,648 A 11/1997 Diaz et al.
5,696,965 A 12/1997 Dedrick
5,697,844 A 12/1997 Von Kohorn
5,702,104 A 12/1997 Malek et al.
5,702,305 A 12/1997 Norman et al.
5,707,287 A 1/1998 McCrea, Jr.
5,708,780 A 1/1998 Levergood et al.
5,708,845 A 1/1998 Wistendahl et al.
5,709,603 A 1/1998 Kaye
5,710,918 A 1/1998 Lagarde et al.
5,711,715 A 1/1998 Ringo et al.
5,713,574 A 2/1998 Hughes
5,713,795 A 2/1998 Kohorn
5,717,860 A 2/1998 Graber et al.
5,718,431 A 2/1998 Ornstein
5,722,418 A 3/1998 Bro
5,724,091 A 3/1998 Freeman et al.
5,724,106 A 3/1998 Autry et al.
5,724,424 A 3/1998 Gifford
5,724,425 A 3/1998 Chang et al.
5,729,212 A 3/1998 Martin
5,729,279 A 3/1998 Fuller
5,732,338 A 3/1998 Schwob
5,732,949 A 3/1998 Josephs
5,734,589 A 3/1998 Kostreski et al.
5,734,853 A 3/1998 Hendricks et al.
5,735,525 A 4/1998 McCrea, Jr.
5,735,742 A 4/1998 French
5,737,533 A 4/1998 de Hond
5,737,619 A 4/1998 Judson
5,740,252 A 4/1998 Minor et al.
5,740,369 A 4/1998 Yokozawa et al.
5,740,549 A 4/1998 Reilly et al.
5,742,762 A 4/1998 Scholl et al.
5,746,656 A 5/1998 Bezick et al.
5,748,742 A 5/1998 Tisdale et al.
5,749,075 A * 5/1998 Toader et al. ..... 705/14.19
5,749,735 A 5/1998 Redford et al.
5,749,785 A 5/1998 Rossides
5,751,338 A 5/1998 Ludwig, Jr.
5,752,160 A 5/1998 Dunn
5,754,938 A 5/1998 Herz et al.
5,754,939 A 5/1998 Herz et al.
5,755,621 A 5/1998 Marks et al.
5,758,257 A * 5/1998 Herz et al. ..... 725/116
5,759,101 A 6/1998 Von Kohorn
5,767,894 A 6/1998 Fuller et al.
5,768,382 A 6/1998 Schneier et al.
5,770,533 A 6/1998 Franchi
5,774,591 A 6/1998 Black et al.
5,774,664 A 6/1998 Hidary et al.
5,774,670 A 6/1998 Montulli
5,774,869 A 6/1998 Toader
5,779,242 A 7/1998 Kaufmann
5,779,549 A 7/1998 Walker et al.
5,781,245 A 7/1998 Van Der Weij et al.
5,781,246 A 7/1998 Alten et al.
5,787,156 A 7/1998 Katz
5,788,507 A 8/1998 Redford et al.
5,788,574 A 8/1998 Ornstein et al.
5,789,892 A 8/1998 Takei
5,791,991 A 8/1998 Small
5,793,413 A 8/1998 Hylton et al.
5,794,210 A 8/1998 Goldhaber et al.
5,795,156 A 8/1998 Redford et al.
5,796,945 A 8/1998 Tarabella
5,798,785 A 8/1998 Hendricks et al.
5,799,267 A 8/1998 Siegel
5,800,268 A 9/1998 Molnick
5,802,220 A 9/1998 Black et al.
5,805,154 A 9/1998 Brown
5,805,815 A 9/1998 Hill
5,809,481 A 9/1998 Baron et al.
5,809,482 A 9/1998 Strisower
5,812,769 A 9/1998 Graber et al.
5,812,776 A 9/1998 Gifford
5,815,551 A 9/1998 Katz
5,816,918 A 10/1998 Kelly et al.
5,818,438 A * 10/1998 Howe et al. ..... 715/718
5,823,879 A 10/1998 Goldberg et al.
5,828,734 A 10/1998 Katz
5,830,067 A 11/1998 Graves et al.
5,830,068 A 11/1998 Brenner et al.
5,831,527 A 11/1998 Jones, II et al.
5,835,126 A 11/1998 Lewis
5,836,817 A 11/1998 Acres et al.
5,839,725 A 11/1998 Conway

(56) References Cited

U.S. PATENT DOCUMENTS

| | | | | |
|---|---|---|---|---|
| 5,839,905 | A | 11/1998 | Redford et al. | |
| 5,848,396 | A | 12/1998 | Gerace | |
| 5,848,397 | A | 12/1998 | Marsh et al. | |
| 5,851,149 | A | 12/1998 | Xidos et al. | |
| 5,855,007 | A | 12/1998 | Jovicic et al. | |
| 5,857,911 | A | 1/1999 | Fioretti | |
| 5,871,398 | A | 2/1999 | Schneier et al. | |
| 5,875,108 | A | 2/1999 | Hoffberg et al. | |
| 5,879,233 | A | 3/1999 | Stupero | |
| 5,880,769 | A | 3/1999 | Nemirofsky et al. | |
| 5,885,158 | A | 3/1999 | Torango et al. | |
| 5,898,762 | A | 4/1999 | Katz | |
| 5,901,246 | A | 5/1999 | Hoffberg et al. | |
| 5,901,287 | A | 5/1999 | Bull et al. | |
| 5,903,317 | A | 5/1999 | Sharir et al. | |
| 5,911,582 | A | 6/1999 | Redford et al. | |
| 5,913,040 | A | 6/1999 | Rakavy et al. | |
| 5,916,024 | A | 6/1999 | Von Kohorn | |
| 5,917,725 | A | 6/1999 | Thacher et al. | |
| 5,917,893 | A | 6/1999 | Katz | |
| 5,918,014 | A | 6/1999 | Robinson | |
| 5,918,213 | A | 6/1999 | Bernard et al. | |
| 5,929,850 | A | 7/1999 | Broadwin et al. | |
| 5,933,811 | A | 8/1999 | Angles et al. | |
| 5,935,004 | A | 8/1999 | Tarr et al. | |
| 5,937,163 | A | 8/1999 | Lee et al. | |
| 5,937,392 | A | 8/1999 | Alberts | |
| 5,946,664 | A | 8/1999 | Ebisawa | |
| 5,948,061 | A | 9/1999 | Merriman et al. | |
| 5,957,695 | A | 9/1999 | Redford et al. | |
| 5,959,623 | A * | 9/1999 | van Hoff et al. | 715/719 |
| 5,960,409 | A | 9/1999 | Wexler | |
| 5,964,463 | A | 10/1999 | Moore, Jr. | |
| 5,971,397 | A | 10/1999 | Miguel et al. | |
| 5,987,498 | A | 11/1999 | Athing et al. | |
| 5,990,927 | A | 11/1999 | Hendricks et al. | |
| 5,996,006 | A | 11/1999 | Speicher | |
| 5,999,808 | A | 12/1999 | LaDue | |
| 6,002,393 | A | 12/1999 | Hite et al. | |
| 6,005,561 | A | 12/1999 | Hawkins et al. | |
| 6,006,257 | A | 12/1999 | Slezak | |
| 6,025,837 | A | 2/2000 | Matthews, III et al. | |
| 6,035,021 | A | 3/2000 | Katz | |
| 6,038,554 | A | 3/2000 | Vig | |
| 6,081,750 | A | 6/2000 | Hoffberg et al. | |
| 6,085,256 | A | 7/2000 | Kitano et al. | |
| 6,154,207 | A | 11/2000 | Farris et al. | |
| 6,183,366 | B1 | 2/2001 | Goldberg et al. | |
| 6,185,586 | B1 | 2/2001 | Judson | |
| 6,208,805 | B1 | 3/2001 | Abecassis | |
| 6,236,360 | B1 | 5/2001 | Rudow et al. | |
| 6,240,555 | B1 | 5/2001 | Shoff et al. | |
| 6,263,501 | B1 | 7/2001 | Schein et al. | |
| 6,264,560 | B1 | 7/2001 | Goldberg et al. | |
| 6,287,201 | B1 | 9/2001 | Hightower | |
| 6,289,319 | B1 | 9/2001 | Lockwood | |
| 6,295,530 | B1 | 9/2001 | Ritchie et al. | |
| 6,323,894 | B1 | 11/2001 | Katz | |
| 6,330,021 | B1 | 12/2001 | Devaux | |
| 6,335,965 | B1 | 1/2002 | Katz | |
| 6,349,134 | B1 | 2/2002 | Katz | |
| 6,425,828 | B2 | 7/2002 | Walker et al. | |
| 6,457,025 | B2 | 9/2002 | Judson | |
| 6,553,178 | B2 | 4/2003 | Abecassis | |
| 6,625,578 | B2 | 9/2003 | Spaur et al. | |
| 6,684,250 | B2 | 1/2004 | Anderson | |
| 6,712,702 | B2 | 3/2004 | Goldberg et al. | |
| 7,024,552 | B1 | 4/2006 | Caswell et al. | |
| 7,072,849 | B1 * | 7/2006 | Filepp et al. | 705/14.66 |
| 7,072,963 | B2 | 7/2006 | Anderson et al. | |
| 7,162,433 | B1 | 1/2007 | Foroutan | |
| 7,181,488 | B2 | 2/2007 | Martin et al. | |
| 7,191,447 | B1 | 3/2007 | Ellis et al. | |
| 7,496,943 | B1 | 2/2009 | Goldberg | |
| 2001/0003099 | A1 | 6/2001 | Von Kohorn | |
| 2002/0113815 | A1 | 8/2002 | DeGross | |
| 2003/0032476 | A1 | 2/2003 | Walker et al. | |
| 2004/0220858 | A1 | 11/2004 | Maggio | |
| 2005/0148377 | A1 | 7/2005 | Goldberg et al. | |
| 2006/0085408 | A1 | 4/2006 | Morsa | |
| 2006/0111970 | A1 | 5/2006 | Hill et al. | |
| 2007/0167226 | A1 | 7/2007 | Kelly et al. | |
| 2008/0091528 | A1 | 4/2008 | Rampell et al. | |
| 2008/0114642 | A1 | 5/2008 | Goldberg | |
| 2008/0153564 | A1 | 6/2008 | Baerlocher et al. | |
| 2009/0186704 | A1 | 7/2009 | Goldberg et al. | |
| 2010/0224457 | A1 | 9/2010 | Goldberg et al. | |
| 2010/0228619 | A1 | 9/2010 | Goldberg et al. | |
| 2010/0228620 | A1 | 9/2010 | Goldberg et al. | |
| 2010/0235233 | A1 | 9/2010 | Goldberg et al. | |
| 2012/0078729 | A1 | 3/2012 | Goldberg et al. | |

FOREIGN PATENT DOCUMENTS

| | | |
|---|---|---|
| DE | 2918846 | 11/1980 |
| DE | 3325810 | 11/1984 |
| DE | 3621263 | 1/1988 |
| EP | 0113022 | 7/1984 |
| EP | 279297 | 8/1988 |
| EP | 290207 | 11/1988 |
| EP | 307925 | 3/1989 |
| EP | 370146 | 5/1990 |
| EP | 566454 | 10/1993 |
| EP | 680173 | 11/1995 |
| EP | 680179 | 11/1995 |
| EP | 680235 | 11/1995 |
| EP | 688489 | 12/1995 |
| EP | 697613 | 2/1996 |
| EP | 0747843 | 12/1996 |
| EP | 0747844 | 12/1996 |
| EP | 0814419 | 12/1997 |
| EP | 843272 | 5/1998 |
| EP | 871132 | 10/1998 |
| EP | 0875843 | 11/1998 |
| EP | 1126715 | 8/2001 |
| GB | 2034995 | 6/1980 |
| GB | 2121569 | 12/1983 |
| GB | 2141907 | 1/1985 |
| GB | 2183882 | 6/1987 |
| GB | 2185670 | 7/1987 |
| GB | 2205188 | 11/1988 |
| GB | 2207314 | 1/1989 |
| GB | 2256549 | 12/1992 |
| GB | 2281434 | 3/1995 |
| JP | 6418380 | 1/1989 |
| JP | 03-204259 | 5/1991 |
| JP | 6314184 | 11/1994 |
| WO | WO 88/04507 | 6/1988 |
| WO | WO 90/07844 | 7/1990 |
| WO | WO 92/12488 | 7/1992 |
| WO | WO 93/09631 | 5/1993 |
| WO | WO 93/15466 | 8/1993 |
| WO | WO 93/19427 | 9/1993 |
| WO | WO 94/14281 | 6/1994 |
| WO | WO 95/31069 | 11/1995 |
| WO | WO 96/24213 | 8/1996 |
| WO | WO 96/30846 | 10/1996 |
| WO | WO 96/30864 | 10/1996 |
| WO | WO 96/34466 | 10/1996 |
| WO | WO 96/36141 | 11/1996 |
| WO | WO 97/07656 | 3/1997 |
| WO | WO 97/21183 | 6/1997 |
| WO | WO 97/26061 | 7/1997 |
| WO | WO 99/23568 | 5/1999 |
| WO | WO 99/39281 | 8/1999 |
| WO | WO 00/24484 | 5/2000 |
| WO | WO 2007/079395 | 7/2007 |

OTHER PUBLICATIONS

Defendants Google Inc.'s and YouTube, LLC's Answer and Counterclaims filed in United States District Court, Eastern District of Texas Marshall Division, Case No. 2:07-CV-00555, on Feb. 11, 2008. Defendant Morris Communications Company, LLC's Answer and

(56) References Cited

OTHER PUBLICATIONS

Counterclaims to Plaintiff Beneficial Innovations, Inc.'s Complaint filed in United States District Court, Eastern District of Texas Marshall Division, Case No. 2:07-CV-00555, on Mar. 3, 2008.
Defendant Tribune Interactive, Inc.'s Answer, Affirmative Defenses, and Counterclaims filed in United States District Court, Eastern District of Texas Marshall Division, Case No. 2:07-CV-00555, on Mar. 12, 2008.
The Dallas Morning News, Inc.' First Amended Answer and Counterclaims to Beneficial Innovations, Inc.'s Complaint for Patent Infringement filed in United States District Court, Eastern District of Texas Marshall Division, Case No. 2:07-CV-00555, on Oct. 8, 2008.
Defendant Yahoo!'s Answer and Counterclaims to Plaintiff's Complaint for Patent Infringement filed in United States District Court, Eastern District of Texas Marshall Division, Case No. 2:07-CV-00555, on Dec. 1, 2008.
Answer and Affirmative Defenses of Defendant Blockdot, Inc. to Plaintiff's First Amended Complaint filed in United States District Court, Eastern District of Texas Marshall Division, Case No. 2:07-CV-263, on Jul. 25, 2007.
Answer and Affirmative Defenses of Defendant E'Baums World, Inc. to Plaintiff's First Amended Complaint filed in United States District Court, Eastern District of Texas Marshall Division, Case No. 2:07-CV-263, on Aug. 13, 2007.
Digg Inc.'s Answer and Counterclaims to Beneficial Innovation, Inc.'s First Amended Complaint for Patent Infringement filed in United States District Court, Eastern District of Texas Marshall Division, Case No. 2:07-CV-263, on Aug. 31, 2007.
CNet Networks, Inc.'s Original Answer and Counterclaims to Plaintiff's First Amended Complaint for Patent Infringement filed in United States District Court, Eastern District of Texas Marshall Division, Case No. 2:07-CV-263, on Sep. 4, 2007.
CNet Networks, Inc.'s Rule 7.1 Statement titled "Original Answer and Counterclaims to Plaintiff's First Amended Complaint for Patent Infringement," filed in United States District Court, Eastern District of Texas Marshall Division, Case No. 2:07-CV-263, on Sep. 4, 2007.
Jabez Networks, Inc.'s Original Answer and Counterclaims to Plaintiff's First Amended Complaint for Patent Infringement filed in United States District Court, Eastern District of Texas Marshall Division, Case No. 2:07-CV-263, on Sep. 4, 2007.
Careerbuilder, LLC's Answer, Affirmative Defenses, and Demand for Jury Trial filed in United States District Court, Eastern District of Texas Marshall Division, Case No. 2:07-CV-263, on Sep. 25, 2007.
Defendant Washingtonpost.Newsweek Interactive Company's Answer to Second Amended Complaint filed in United States District Court, Eastern District of Texas Marshall Division, Case No. 2:07-CV-263, on Sep. 25, 2007.
CNet Networks, Inc.'s Original Answer and Counterclaims to Plaintiff's Second Amended Complaint for Patent Infringement filed in United States District Court, Eastern District of Texas Marshall Division, Case No. 2:07-CV-263, on Sep. 25, 2007.
Jabez Networks, Inc.'s Original Answer and Counterclaims to Plaintiff's Second Amended Complaint for Patent Infringement filed in United States District Court, Eastern District of Texas Marshall Division, Case No. 2:07-CV-263, on Sep. 25, 2007.
Digg Inc.'s Answer and Counterclaims to Beneficial Innovation, Inc.'s Second Amended Complaint for Patent Infringement filed in United States District Court, Eastern District of Texas Marshall Division, Case No. 2:07-CV-263, on Sep. 25, 2007.
Answer and Affirmative Defenses of Defendant E'Baums World, Inc. to Plaintiff's Second Amended Complaint filed in United States District Court, Eastern District of Texas Marshall Division, Case No. 2:07-CV-263, on Sep. 26, 2007.
Answer and Counterclaims of The New York Times Company to the Second Amended Complaint of Beneficial Innovations, Inc. filed in United States District Court, Eastern District of Texas Marshall Division, Case No. 2:07-CV-263, on Sep. 28, 2007.
Defendant The Weather Channel Interactive, Inc.'s Answer to the Second Amended Complaint filed in United States District Court, Eastern District of Texas Marshall Division, Case No. 2:07-CV-263, on Sep. 28, 2007.
Amended Answer and Affirmative Defenses of Defendant E'Baums World, Inc. to Plaintiff's Second Amended Complaint filed in United States District Court, Eastern District of Texas Marshall Division, Case No. 2:07-CV-263, on Oct. 9, 2007.
The Dallas Morning News, Inc.'s Answer and Counterclaims to Beneficial Innovations, Inc.'s Amended Complaint for Patent Infringement filed in United States District Court, Eastern District of Texas Marshall Division, Case No. 2:09-CV-00175, on Oct. 5, 2009.
Defendant Morris Communications Company, LLC's Answer and Counterclaims to Plaintiff Beneficial Innovations, Inc.'s Amended Complaint filed in United States District Court, Eastern District of Texas Marshall Division, Case No. 2:09-CV-175, on Oct. 5, 2009.
The New York Times Company's Answer and Counterclaims to Beneficial Innovations, Inc.'s Amended Complaint filed in United States District Court, Eastern District of Texas Marshall Division, Case No. 2:09-CV-175, on Nov. 4, 2009.
Defendants Google Inc.'s and Youtube, LLC's Answer and Counterclaims to Beneficial Innovations, Inc.'s Amended Complaint for Patent Infringement filed in United States District Court, Eastern District of Texas Marshall Division, Case No. 2:09-CV-175, on Nov. 4, 2009.
Disney Online's Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
NBC Universal, Inc.'s Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
IAC Search & Media Inc.'s Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
Facebook, Inc.'s Answer and Counterclaims to Beneficial Innovations, Inc.'s Amended Complaint for Patent Infringement filed in United States District Court, Eastern District of Texas Marshall Division, Case No. 2:09-CV-175, on Dec. 4, 2009.
Comcast's Answer and Counterclaims to Beneficial Innovations, Inc.'s Amended Complaint filed in United States District Court, Eastern District of Texas Marshall Division, Case No. 2:09-CV-175, on Dec. 4, 2009.
Expert Report of Dr. Michael D. Dahlin Regarding Invalidity of U.S. Patent Nos. 6,183,366 and 6,712,702, including Exhibits 1-31, dated Sep. 1, 2010.
Official Action for U.S. Ex Parte Reexamination Control No. 90/011,117, mailed Aug. 31, 2010.
Official Action for U.S. Appl. No. 12/391,199, mailed Dec. 8, 2010.
Notice of Allowance for U.S. Appl. No. 12/391,199, mailed Aug. 4, 2011.
Official Action for U.S. Appl. No. 10/994,054, mailed Dec. 2, 2010.
Official Action for U.S. Appl. Nos. 12/138,357 and 90/010,093, mailed Sep. 6, 2011.
Official Action for U.S. Appl. No. 12/167,244, mailed Dec. 22, 2010.
Official Action for U.S. Appl. No. 12/167,244, mailed Sep. 12, 2011.
Official Action for U.S. Appl. No. 12/357,623, mailed Dec. 15, 2010.
Official Action for U.S. Appl. No. 12/357,623, mailed Jul. 21, 2011.
U.S. Appl. No. 10/753,513, filed Jan. 8, 2004.
U.S. Appl. No. 12/016,123, filed Jan. 17, 2008.
U.S. Appl. No. 12/391,199, filed Feb. 23, 2009.
U.S. Appl. No. 10/994,054, filed Nov. 18, 2004.
U.S. Appl. No. 12/785,336, filed May 21, 2010.
U.S. Appl. No. 12/785,209, filed May 21, 2010.
U.S. Appl. No. 12/785,389, filed May 21, 2010.
U.S. Appl. No. 09/427,454, filed Oct. 26, 1999.
U.S. Appl. No. 09/830,593, filed Aug. 27, 2001.
U.S. Appl. No. 11/940,971, filed Nov. 15, 2007.
U.S. Appl. No. 10/857,565, filed May 28, 2004.

(56) References Cited

OTHER PUBLICATIONS

U.S. Appl. No. 90/010,093, filed Jan. 13, 2008.
U.S. Appl. No. 13/310,572, filed Dec. 2, 2012.
U.S. Appl. No. 60/009,286, filed Dec. 27, 1995, Robinson.
U.S. Appl. No. 60/012,517, filed Feb. 29, 1996, Robinson.
U.S. Appl. No. 08/569,639, filed Jun. 12, 1997, Naqvi.
"Accipiter Announces Accipiter AdManager, a Breakthrough in Internet Advertising and Marketing," Business Wire, Sep. 9, 1996, 2 pages.
"Accipiter Launches AdManager 2.0, the Most Powerful Ad Management System Available," Business Wire, Jun. 2, 1997, 3 pages.
"Bellcore Licenses Advertiser Software To Visual Radio; Visual Radio to Support Network of Radio Station Web Sites," Business Wire, Oct. 29, 1997, 2 pages.
"Digital Planet Announces Creation of 'NetCount'," Jun. 1, 1995, 2 pages.
"First Advertising Server Launched On Internet," Business Wire, Feb. 5, 1996, 3 pages.
"Focalink Launches New Web Site Evaluation Tool for Advertisers," Business Wire, May 20, 1996, 2 pages.
"Free e-mail available if you don't mind the ads," Knight-Ridder/Tribune News Service, Sep. 6, 1995, 2 pages.
"Juno Offers Free E-mail With Advertising," Newsbytes PM, Jul. 18, 1995, 2 pages.
"NetGravity Announces AdServer 2.0, Raises the Standard in Online Advertising Management Software," Oct. 14, 1996, available at http://web.archive.org/web/19961112042934/www3.netgravity.com/news/pressrel/as20launch.html, 3 pages.
"NetGravity Launches AdServer, the Premier Advertising Management System Software for World Wide Web Publishers," Jan. 31, 1996, available at http://web.archive.org/web/19961112043013/www3.netgravity.com/news/pressrel/launch.html, 2 pages.
"Netscape and Bellcore team to deliver interactive advertising management system," M2 Presswire, Jan. 24, 1997, 2 pages.
"New software solution for the web delivers profitable, measurable, truly interactive advertising," Business Wire, Jun. 11, 1996, 2 pages.
"Online Advertising," Jupiter Communications, May 1, 1996, 5 pages.
"Prodigy System Architecture," Prodigy, dated Sep. 18, 1989; Mar. 19, 1990; Jan. 17, 1991; Mar. 4, 1991, 17 pages.
"Prodigy's 'Access Atlanta' a Success," Prodigy, Aug. 15, 1994, 2 pages.
"Web Advertising/Tracking Comes of Age," Interactive Content, Jan. 1, 1996, Issue 21, 4 pages.
Berners-Lee et al., "Hypertext Transfer Protocol—HTTP/1.0 RFC," Request for Comments 1945, May 1996, available at http://www.ietf.org/rfc/rfc1945.txt, 55 pages.
Borup, C., Posting of Christian Borup to comp.infosystems.www.servers.unix available at http://groups.google.com/group/comp.infosystems.www.servers.unix/msg/da65c193474c6f28, Jul. 16, 1995, 1 page.
Bray, H., "Firm Offers Free E-mail with Ads Juno Online Systems to Start Service Monday," Boston Globe, Apr. 19, 1996, 2 pages.
Burkowski et al., Delivery of Electronic News: A Broadband Application, Proceedings of the 1994 Conference of the Centre for Advanced Studies on Collaborative Research, Toronto, Ontario, CA, Oct. 31-Nov. 3, 1994, 3 pages.
C/Net: The Computer Network Unveils Revolutionary Internet Advertising Tools that Allow Custom Banner Ad Delivery Based on Demographic Information; Internet Shopping Network, Insight and MicroXperts First to Use Proprietary Software to Deliver Custom Ad Banners to Specific Target Audiences, PR Newswire, Dec. 6, 1995, 3 pages.
Cailliau, R., First International World-Wide Conference, Advance Proceedings, Geneva, May 1994, 469 pages.
Carter et al., eds., "Novel Approach boosts author's Internet profile," Hamilton Spectator, Jan. 18, 1996, Thursday Final Edition, 2 pages.
CDNow, Inc., RTB Team Project, Executive Summary, Apr. 1998, 15 pages.
Chesnais, P., "The Fishwrap Personalized News System," Proceedings of the 1995 2nd International Workshop on Community Networking, Princeton, NJ, Jun. 1995, pp. 275-282.
Cleland, K., "Hotwired Gets Gold Star from Nielsen," Advertising Age, Jun. 19, 1995, 2 pages.
Cortese, A., "This E-mail is brought to you by . . ." BusinessWeek, Jul. 31, 1995, 2 pages.
Dedrick, "Interactive Electronic Advertising," IEEE, 1994, pp. 55-56.
Duberman, D., "NetGravity Launches AdServer Web Advertising Management System," Daily Spectrum: Interactive Media & Online Developer News, Feb. 2, 1996, available at http://web.archive.org/web/19961112042732/www3.netgravity.com/news/dailyspectrum/dailyspectrum020296.html, 2 pages.
Eager, B., "Using the World Wide Web and Mosaic (Special Edition)," Que Corp., Mar. 24, 1995, 51 pages.
Elliott, "The Media Business: Advertising; Juno would be delighted to handle your E-mail free, but she would like something in return," N.Y. Times, Apr. 22, 1996, 3 pages.
Franks et al., "An Extension to HTTP : Digest Access Authentication," Request for Comments 2069, Jan. 1997, available at http://www.ietf.org/rfc/rfc2069.txt, 17 pages.
Freeman-Benson, B., Using the Web to Provide Private Information -or- A short paper about password protection without client modifications, First International Conference on the World-Wide Web, Geneva, Switzerland, pp. 63-67.
Fromartz, S., "Firms are offering ads for free E-mail service," St. Louis Post-Dispatch, May 6, 1996, 3 pages.
Google Newsgroup, Newsgroup Thread posted to comp.infosystems.www.misc, entitled "Best Way to retain State in WWW session," Mar. 12, 1995-Apr. 1, 1995, available at http://groups.google.com/group/comp.infosystems.www.misc/browse_thread/thread/1195f209692cda24/bd5d0b46fd091c79, Mar. 12, 1995-Apr. 1, 1995, 8 pages.
Herring, Accipiter Client Library (LIBAAM) (unpublished Accipiter, Inc. Technical Specifications document on file with CNET), Dec. 14, 1996, revised Aug. 14, 1997, 20 pages.
Hodges, J., "C/Net Offers Web Traffic Tracking; Custom Software Trial Free to Cable, 'Net Charter Advertisers," Advertising Age, Sep. 4, 1995, 2 pages.
InfoSeek Service, 1995, 9 pages.
InfoSeek Service, 1996, 19 pages.
Jones, R., "Digital's world-wide web server: a case study," Digital Equipment Corp., First International Conference on the World-Wide Web, Geneva, Switzerland, May 1994, pp. 413-422.
Kamba et al., "Anatagonomy: A Personalized Newspaper on the World Wide Web," Int. J. Human-Computer Studies, 1997, vol. 47, pp. 789-803.
Kim, J., "E-mail soon to become free-mail," USA Today, Apr. 22, 1996, 2 pages.
Koen, D., "Automated Restructuring of an Electronic Newspaper," S.B. thesis, electrical engineering and computer science, MIT, Cambridge, MA, May 1994, 34 pages.
Liss, K., Posting of Kenneth Liss to bit.listserv.buslib-1, Nov. 22, 1994, 6 pages.
Little, T., "Commerce on the Internet," IEEE MultiMedia, Dec. 1994, vol. 1(4), pp. 74-78.
Maddox et al., "Making Money on the Web," InformationWeek, Sep. 4, 1995, vol. 543, p. 31 (with correction of Jan. 8, 1996, 6 pages).
Mandese, J., "'Clickstreams'" in Cyberspace, Advertising Age, Mar. 20, 1995, 2 pages.
Mannes, "E-Mail Delivered Free & E-Asy 20M Internet Gamble," New York Daily News, May 8, 1996, 3 pages.
Marshall, M., "Company Extends App Testing Tools to Web," InternetWeek, Jan. 15, 1996, 1 page.
McManus, N., "Down Home Online: Access Atlanta More Than an Online Newspaper," Atlanta Journal-Constitution's Online Edition on Prodigy, Nov. 7, 1994, 3 pages.
Mogensen, C. (mogens@CS.Stanford.EDU), Re: Automatic Page Updates, Jan. 10, 1995, Message posted to www-talk electronic mailing list archived at http://1997.webhistory.org/www.lists/ www-talk.1995q1/0105.html, 1 page.

(56) References Cited

OTHER PUBLICATIONS

Mossberg, W., "Some Companies Offer Free E-Mail—At A Price," Contra Costa Times, Aug. 6, 1996, 3 pages.
Neelakantan, S., "Freemail," Forbes, Aug. 12, 1996, 3 pages.
NetCloak User's Guide, 1995, 32 pages.
NetGravity AdServer AdMaster's Guide—Getting Started, version 2.0, Understanding AdServer, 1 page.
NetGravity AdServer System Help Manual, Version 2.0, 1996, 203 pages.
Netscape Cookies, Persistent Client State HTTP Cookies available at http://curl.haxx.se/rfc/cookie_spec.html, 1995, 5 pages.
O'Connell, "A New Pitch—Advertising on the World-Wide Web is a whole new ball game," Internet World, May 1995, pp. 54-59.
On-Line Recommender, Product Rationale, Apr. 7, 1997, 10 pages.
Pike, M., "Using the Internet (second edition)," Que, Jan. 15, 1995, 948 pages.
Posting of Jiri Muselik to comp.infosystems.www.providers available at http://groups.google.com/group/comp.infosystems.www.providers/msg/0167 4bf01146dd86, Feb. 5, 1995, 1 page.
Press Release, "Bellcore Delivers Enhanced Ad Management Software: Adapt/X Advertiser™ 3.0 Features," Business Wire, Aug. 12, 1997, 3 pages.
Press Release, "Bellcore Launches Adapt/X Advertiser 2.0; New Features Improve Ad Campaign Management, Inventory Control and Real-Time Reporting," May 21, 1997, 4 pages.
Quint, B., "An Internet "virtual library" builder: Steve Kirsch, president, CEO Infoseek Corporation (Interview)," Searcher, Jul.-Aug. 1995, vol. 3(7) p. 46.
Rasmussen, B., "WDB—A Web Interface to Sybase," Astronomical Data Analysis Software and Systems IV ASP Conference Series, vol. 77, 1995, 4 pages.
Reuter Rafter, M., "What would you do to get free electronic mail?" Denver Rocky Mountain News, Jul. 23, 1995, 2 pages.
Savage, S., "Free E-mail if you don't mind the ads," Bradenton Herald, Aug. 24, 1995, 3 pages.
Schwabach, B., "Advertising subsidizes new 'free' e-mail services," Kansas City Star, Aug. 1, 1995, 4 pages.
Schwartz, E., "Advertising Webonomics 101," Wired, Feb. 1996, pp. 74-82.
Silverman, E., "New Route to E-mail? Two companies planning to offer free software," Newsday, Jul. 6, 1995, 2 pages.
Sponsorship Opportunities, ClNet, 1995, 3 pages.
Stambler, S., "Free E-Mail with Advertising," Techprose, Inc., Aug. 25, 1995, 2 pages.
Sterne, J., World Wide Web Marketing: Integrating the Internet into Your Marketing Strategy, John Wiley & Sons, Oct. 1995, 343 pages.
Swett, C., "Technology Talk Column," Sacremento Bee, Jun. 12, 1996, 4 pages.
Tadjer, R., "Two services change E-mail to free mail; ex-Delphi exec's ad-based E-mail debuts," Computer Shopper, Sep. 1995, 3 pages.
Tittel, E., "Foundations of World Wide Web Programming with HTML & CGI," IDG Books Worldwide, Inc., Aug. 1995.
Various HotWired source code and screen shots, 1995, 43 pages.
Various HotWired source code and screen shots, 1996, 44 pages.
Various HotWired source code and screen shots, 1997, 44 pages.
Viescas, J., The Official Guide to the Prodigy Service, Prodigyy Interactive Personal Service, 1991, 396 pages.
Williamson, D., "Digital Planet's Plan to Track Eyeballs," Advertising Age, Apr. 24, 1995, 2 pages.
Wylie, M., "Free Email! Marketers trade online time for captive audiences," Digital Media, May 14, 1996, 5 pages.
Zeff et al., Advertising on the Internet, John Wiley & Sons, 1997, 302 pages.
First Amended Complaint filed in United States District Court, Eastern District of Texas Marshall Division, Case No. 2:07-CV-263, on Jun 27, 2007, 8 pages.
Complaint filed in United States District Court, Eastern District of Texas Marshall Division, Case No. 2:11-CV-229, on Apr. 20, 2011, 111 pages.
Civil Cover Sheet filed in United States District Court, Eastern District of Texas Marshall Division, Case No. 2:11-CV-229, on Apr. 20, 2011, 1 page.
Corporate Disclosure Statement filed in United States District Court, Eastern District of Texas Marshall Division, Case No. 2:11-CV-229, on Apr. 20, 2011, 2 pages.
Report on the Filing or Determination of an Action Regarding Patent or Trademark filed in United States District Court, Eastern District of Texas Marshall Division, Case No. 2:11-CV-229, on Apr. 20, 2011, 1 page.
First Amended Complaint for Infringement filed in the United States District Court, Eastern District of Texas Marshall Division, Case No. 2:11-CV-229, on Apr. 21, 2011, 11 pages.
Notice of Appearance for Julien Adams filed in the United States District Court, Eastern District of Texas Marshall Division, Case No. 2:11-CV-229, on Apr. 22, 2011, 3 pages.
Motion to Dismiss filed in the United States District Court, Eastern District of Texas Marshall Division, Case No. 2:11-CV-229, on Apr. 25, 2011, 4 pages.
Additional Attachment to Motion to Dismiss filed in the United States District Court, Eastern District of Texas Marshall Division, Case No. 2:11-CV-229, on Apr. 26, 2011, 3 pages.
Order Granting Motion to Dismiss filed in the United States District Court, Eastern District of Texas Marshall Division, Case No. 2:11-CV-229, on Apr. 26, 2011, 2 pages.
Notice of Attorney Appearance filed in the United States District Court, Eastern District of Texas Marshall Division, Case No. 2:11-CV-229, on May 3, 2011, 3 pages.
Amazon.com, Inc.'s Unopposed Application for Extension of Time to Answer Complaint filed in the United States District Court, Eastern District of Texas Marshall Division, Case No. 2:11-CV-229, On May 5, 2011, 1 page.
Dell Inc.'s Unopposed Application for Extension of Time to Answer Complaint filed in the United States District Court, Eastern District of Texas Marshall Division, Case No. 2:11-CV-229, on May 5, 2011, 1 page.
Expedia, Inc.'s Unopposed Application for Extension of Time to Answer Complaint filed in the United States District Court, Eastern District of Texas Marshall Division, Case No. 2:11-CV-229, on May 5, 2011, 1 page.
Scripps Networks, LLC's Unopposed Application for Extension of Time to Answer Complaint filed in the United States District Court, Eastern District of Texas Marshall Division, Case No. 2:11-CV-229, on May 5, 2011, 1 page.
Viacom, Inc.'s Unopposed Application for Extension of Time to Answer Complaint filed in the United States District Court, Eastern District of Texas Marshall Division, Case No. 2:11-CV-229, on May 5, 2011, 1 page.
Rodale, Inc.'s Unopposed Application for Extension of Time to Answer Complaint filed in the United States District Court, Eastern District of Texas Marshall Division, Case No. 2:11-CV-229, on May 10, 2011, 1 page.
Autotrader.com's Unopposed Application for Extension of Time to Answer Complaint filed in the United States District Court, Eastern District of Texas Marshall Division, Case No. 2:11-CV-229, on May 17, 2011, 1 page.
Advance Publications, Inc.'s Unopposed Application for Extension of Time to Answer Complaint filed in the United States District Court, Eastern District of Texas Marshall Division, Case No. 2:11-CV-229, on May 17, 2011, 1 page.
ALM Media Properties, LLC's Unopposed Application for Extension of Time to Answer Complaint filed in the United States District Court, Eastern District of Texas Marshall Division, Case No. 2:11-CV-229, on May 17, 2011, 1 page.
Village Voice Media Holdings, LLC's Unopposed Application for Extension of Time to Answer Complaint filed in the United States District Court, Eastern District of Texas Marshall Division, Case No. 2:11-CV-229, on May 17, 2011, 1 page.
Demand Media, Inc.'s Answer, Defenses, and Counterclaims to Beneficial Innovations, Inc.'s First Amended Complaint for Patent Infringement filed in the United States District Court, Eastern District of Texas Marshall Division, Case No. 2:11-CV-229, on May 19, 2011, 14 pages.

(56) References Cited

OTHER PUBLICATIONS

Application to Appear Pro Hac Vice filed in the United States District Court, Eastern District of Texas Marshall Division, Case No. 2:11-CV-229, on Jun. 2, 2011, 3 pages.
Application to Appear Pro Hac Vice filed in the United States District Court, Eastern District of Texas Marshall Division, Case No. 2:11-CV-229, on Jun. 9, 2011, 4 pages.
Advance Publications, Inc. Unopposed Application for Extension of Time to Answer Complaint filed in the United States District Court, Eastern District of Texas Marshall Division, Case No. 2:11-CV-229, on Jun. 9, 2011, 1 page.
Autotrader.com's Unopposed Application for Extension of Time to Answer Complaint filed in the United States District Court, Eastern District of Texas Marshall Division, Case No. 2:11-CV-229, on Jun. 9, 2011, 1 page.
ALM Media's Unopposed Application for Extension of Time to Answer Complaint filed in the United States District Court, Eastern District of Texas Marshall Division, Case No. 2:11-CV-229, on Jun. 9, 2011, 1 page.
Plaintiff and Counterdefendant Beneficial Innovations, Inc's Reply to Counterclaims of Demand Media, Inc. filed in the United States District Court, Eastern District of Texas Marshall Division, Case No. 2:11-CV-229, on Jun. 13, 2011, 7 pages.
Rodale, Inc.'s Answer and Counterclaims to First Amended Complaint filed in the United States District Court, Eastern District of Texas Marshall Division, Case No. 2:11-CV-229, on Jun. 16, 2011, 11 pages.
Notice of Appearance filed in the United States District Court, Eastern District of Texas Marshall Division, Case No. 2:11-CV-229, on Jun. 17, 2011, 2 pages.
Defendant Amazon.com, Inc.'s Answer and Counterclaims to First Amended Complaint filed in the United States District Court, Eastern District of Texas Marshall Division, Case No. 2:11-CV-229, on Jun. 17, 2011, 15 pages.
Defendant Expedia, Inc.'s Answer and Counterclaims to First Amended Complaint filed in the United States District Court, Eastern District of Texas Marshall Division, Case No. 2:11-CV-229, on Jun. 17, 2011, 15 pages.
Defendant Scripps Networks, LLC's Answer and Counterclaims to First Amended Complaint filed in the United States District Court, Eastern District of Texas Marshall Division, Case No. 2:11-CV-229, on Jun. 17, 2011, 15 pages.
Defendant Viacom Inc.'s Answer and Counterclaims to First Amended Complaint filed in the United States District Court, Eastern District of Texas Marshall Division, Case No. 2:11-CV-229, on Jun. 17, 2011, 15 pages.
Defendant Viacom Inc.'s Corporate Disclosure Statement filed in the United States District Court, Eastern District of Texas Marshall Division, Case No. 2:11-CV-229, on Jun. 17, 2011, 3 pages.
Defendant Amazon.com, Inc.'s Corporate Disclosure Statement filed in the United States District Court, Eastern District of Texas Marshall Division, Case No. 2:11-CV-229, on Jun. 17, 2011, 3 pages.
Defendant Expedia, Inc.'s Corporate Disclosure Statement filed in the United States District Court, Eastern District of Texas Marshall Division, Case No. 2:11-CV-229, on Jun. 17, 2011, 3 pages.
Defendant Scripps Networks, LLC's Corporate Disclosure Statement filed in the United States District Court, Eastern District of Texas Marshall Division, Case No. 2:11-CV-229, on Jun. 17, 2011, 3 pages.
Rodale, Inc.'s Corporate Disclosure Statement Pursuant to Federal Rules of Civil Procedure 7.1 filed in the United States District Court, Eastern District of Texas Marshall Division, Case No. 2:11-CV-229, on Jun. 19, 2011, 3 pages.
Defendant Dell Inc.'s Answer and Counterclaims to Beneficial Innovations, Inc.'s First Amended Complaint for Patent Infringement filed in the United States District Court, Eastern District of Texas Marshall Division, Case No. 2:11-CV-229, on Jun. 20, 2011, 13 pages.
Defendant Dell Inc.'s Corporate Disclosure Statement Pursuant to F.R.C.P. 7.1 filed in the United States District Court, Eastern District of Texas Marshall Division, Case No. 2:11-CV-229, on Jun. 20, 2011, 2 pages.
Notice of Appearance of Roger Fulghum on Behalf of Defendant Dell Inc. filed in the United States District Court, Eastern District of Texas Marshall Division, Case No. 2:11-CV-229, on Jun. 20, 2011, 2 pages.
Notice of Appearance of Paula D. Heyman on Behalf of Defendant Dell Inc. filed in the United States District Court, Eastern District of Texas Marshall Division, Case No. 2:11-CV-229, on Jun. 20, 2011, 2 pages.
Notice of Appearance of Nicholas Schuneman on Behalf of Defendant Dell Inc. filed in the United States District Court, Eastern District of Texas Marshall Division, Case No. 2:11-CV-229, on Jun. 20, 2011, 2 pages.
Application to Appear Pro Hac Vice filed in the United States District Court, Eastern District of Texas Marshall Division, Case No. 2:11-CV-229, on Jun. 22, 2011, 3 pages.
Application to Appear Pro Hac Vice filed in the United States District Court, Eastern District of Texas Marshall Division, Case No. 2:11-CV-229, on Jun. 22, 2011, 4 pages.
Notice of Appearance of Counsel for Defendant Demand Media filed in the United States District Court, Eastern District of Texas Marshall Division, Case No. 2:11-CV-229, on Jun. 23, 2011, 2 pages.
Plaintiff and Counterdefendant Beneficial Innovations, Inc's Reply to Counterclaims of Rodale, Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Amazon.com, Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Expedia, Inc. filed in the United States-District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Scripps Networks, LLC filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Viacom Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Dell Inc. filed in the United States District Court, Eastern District of Texas Marshall Division, Case No. 2:11-CV-229, on Jul. 11, 2011, 5 pages.
Notice of Attorney Appearance filed in the United States District Court, Eastern District of Texas Marshall Division, Case No. 2:11-CV-229, on Jul. 12, 2011, 2 pages.
Advance Publications, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Autotrader.com, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 13 pages.
ALM Media Properties, LLC's Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Motion of Defendants Advance Publications, Inc., ALM Media Properties, LLC, American Media, Inc., and Autotrader.com, Inc. to Dismiss the Willfulness Infringement Claim for Failure to State a Claim filed in the United States District Court, Eastern District of Texas Marshall Division, Case No. 2:11-CV-229, on Jul. 13, 2011, 7 pages.
Order Granting Motion of Defendants Advance Publibations, Inc., ALM Media Properties, LLC, American Media, Inc., and Autotrader.com, Inc. to Dismiss the Willfulness Infringement Claim for Failure

(56) References Cited

OTHER PUBLICATIONS to State a Claim filed in the United States District Court, Eastern District of Texas Marshall Division, Case No. 2:11-CV-229, on Jul. 13, 2011, 1 page.
American Media, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Notice of Appearance filed in the United States District Court, Eastern District of Texas Marshall Division, Case No. 2:11-CV-229, on Jul. 15, 2011, 2 pages.
Defendant Village Voice Media Holdings, LLC's Notice of Joinder in Motion to Dismiss the Willfulness Infringement Claim for Failure to State a Claim filed in the United States District Court, Eastern District of Texas Marshall Division, Case No. 2:11-CV-229, on Jul. 15, 2011, 2 pages.
Defendant Village Voice Media Holdings, LLC's Answer and Counterclaims to First Amended Complaint filed in the United States District Court, Eastern District of Texas Marshall Division, Case No. 2:11-CV-229, on Jul. 15, 2011, 12 pages.
Defendant Village Voice Media Holdings, LLC's Corporate Disclosure Statement filed in the United States District Court, Eastern District of Texas Marshall Division, Case No. 2:11-CV-229, on Jul. 15, 2011, 2 pages.
Defendant Dell Inc.'s Notice of Joinder in Motion to Dismiss the Willfulness Infringement Claim for Failure to State a Claim filed in the United States District Court, Eastern District of Texas Marshall Division, Case No. 2:11-CV-229, on Jul. 18, 2011, 3 pages.
Plaintiff Beneficial Innovations, Inc.'s Unopposed Motion for Extension of Time to Respond to the Motion to Dismiss the Willfulness Infringement Claim for Failure to State a Claim Filed by Defendants Advance Publications, Inc., ALM Media Properties, LLC, American Media, Inc., Autotrader.com, Inc., Village Voice Media Holdings, LLC, and Dell Inc. filed in the United States District Court, Eastern District of Texas Marshall Division, Case No. 2:11-CV-229, on Jul. 25, 2011, 6 pages.
Defendant Amazon.com Inc., Expedia, Inc., Scripps Networks, LLC, and Viacom Inc.'s Notice of Joinder in Motion to Dismiss the Willfulness Infringement Claim for Failure to State a Claim filed in the United States District Court, Eastern District of Texas Marshall Division, Case No. 2:11-CV-229, on Jul. 26, 2011, 3 pages.
Order Granting Plaintiff Beneficial Innovations, Inc.'s Unopposed Motion for Extension of Time to Respond to the Motion to Dismiss the Willfulness Infringement Claim for Failure to State a Claim filed in the United States District Court, Eastern District of Texas Marshall Division, Case No. 2:11-CV-229, on Jul. 26, 2011, 2 pages.
Plaintiff and Counterdefendant Beneficial Innovations, Inc's Reply to Counterclaims of Advance Publications, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of Autotrader.com, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of ALM Media Properties, LLC filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of American Media, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of Village Voice Media Holdings, LLC filed in the United States District Court, Eastern District of Texas Marshall Division, Case No. 2:11-CV-229, on Aug. 5, 2011, 5 pages.
Stipulation to Dismiss Willfulness Claims, Without Prejudice, and to Amend Complaint filed in the United States District Court, Eastern District of Texas Marshall Division, Case No. 2:11-CV-229, on Aug. 8, 2011, 20 pages.
Order on Stipulation to Dismiss Willfulness Claims, Without Prejudice, and to Amend Complaint filed in the United States District Court, Eastern District of Texas Marshall Division, Case No. 2:11-CV-229, on Aug. 11, 2011, 2 pages.
Second Amended Complaint for Infringement filed in the United States District Court, Eastern District of Texas Marshall Division, Case No. 2:11-CV-229, Aug. 11, 2011, 12 pages.
Unopposed Motion to Withdraw as Counsel of Record filed in the United States District Court, Eastern District of Texas Marshall Division, Case No. 2:11-CV-229, on Sep. 9, 2011, 3 pages.
Order filed in the United States District Court, Eastern District of Texas Marshall Division, Case No. 2:11-CV-229, on Oct. 5, 2011, 1 page.
Notice of Appearance of Counsel for Defendant/Counterclaimant Demand Media, Inc. filed in the United States District Court, Eastern District of Texas Marshall Division, Case No. 2:11-CV-229, on Nov. 9, 2011, 3 pages.
Notice of Appearance of Counsel filed in the United States District Court, Eastern District of Texas Marshall Division, Case No. 2:11-CV-229, on Nov. 14, 2011, 2 pages.
Defendants' Joint Motion to Transfer under 28 U.S.C. § 1404(a) to the Southern District of New York filed in the United States District Court, Eastern District of Texas Marshall Division, Case No. 2:11-CV-229, on Nov. 17, 2012, 21 pages.
Declaration of Sharon L. Davis, Esq. In Support of Defendants' Motion to Transfer Venue filed in the United States District Court, Eastern District of Texas Marshall Division, Case No. 2:11-CV-229, on Nov. 17, 2011, 23 pages.
Declaration of Bobby Chowdhury in Support of Defendants' Motion to Transfer Venue filed in the United States District Court, Eastern District of Texas Marshall Division, Case No. 2:11-CV-229, on Nov. 17, 2011, 3 pages.
Declaration of Angela M. Niemann in Support of Defendants' Motion to Transfer Venue filed in the United States District Court, Eastern District of Texas Marshall Division, Case No. 2:11-CV-229, on Nov. 17, 2011, 2 pages.
Declaration of Robert Madden, Jr. In Support of Defendants' Motion to Transfer Venue filed in the United States District Court, Eastern District of Texas Marshall Division, Case No. 2:11-CV-229, on Nov. 17, 2011, 3 pages.
Declaration of Autotrader.com in Support of Defendants' Motion to Transfer Venue filed in the United States District Court, Eastern District of Texas Marshall Division, Case No. 2:11-CV-229, on Nov. 17, 2011, 2 pages.
Declaration of Jed Brunst in Support of Defendants' Joint Motion to Transfer under 28 U.S.C. § 1404(a) to the Southern District of New York filed in the United States District Court, Eastern District of Texas Marshall Division, Case No. 2:11-CV-229, on Nov. 17, 2011, 2 pages.
Declaration of Jill Windwer in Support of Defendants' Motion to Transfer Venue filed in the United States District Court, Eastern District of Texas Marshall Division, Case No. 2:11-CV-229, on Nov. 17, 2011, 3 pages.
Declaration of Paul McGinley in Support of Defendants' Motion to Transfer Venue filed in the United States District Court, Eastern District of Texas Marshall Division, Case No. 2:11-CV-229, on Nov. 17, 2011, 3 pages.
Declaration of Robin Keller in Support of Defendants' Motion to Transfer Venue filed in the United States District Court, Eastern District of Texas Marshall Division, Case No. 2:11-CV-229, on Nov. 17, 2011, 2 pages.
Declaration of Stephen Westenhiser in Support of Defendants' Motion to Transfer Venue filed in the United States District Court, Eastern District of Texas Marshall Division, Case No. 2:11-CV-229, on Nov. 17, 2011, 3 pages.
Declaration of Warren Solow in Support of Defendants' Motion to Transfer Venue filed in the United States District Court, Eastern District of Texas Marshall Division, Case No. 2:11-CV-229, on Nov. 17, 2011, 3 pages.
Declaration of Wedge Abels in Support of Defendants' Motion to Transfer Venue filed in the United States District Court, Eastern District of Texas Marshall Division, Case No. 2:11-CV-229, on Nov. 17, 2011, 2 pages.

(56) References Cited

OTHER PUBLICATIONS

Declaration of Dell Inc. in Support of Defendants' Motion to Transfer Venue filed in the United States District Court, Eastern District of Texas Marshall Division, Case No. 2:11-CV-229, on Nov. 23, 2011, 4 pages.
Stipulation re Discovery and Briefing Schedule for Defendants' Joint Motion to Transfer under 28 U.S.C. § 1404(a) filed in the United States District Court, Eastern District of Texas Marshall Division, Case No. 2:11-CV-229, on Dec. 2, 2011, 9 pages.
Order on Stipulation re Discovery and Briefing Schedule for Defendants' Joint Motion to Transfer under 28 U.S.C. § 1404(a) filed in the United States District Court, Eastern District of Texas Marshall Division, Case No. 2:11-CV-229, on Dec. 6, 2011, 3 pages.
Order of Recusal filed in the United States District Court, Eastern District of Texas Marshall Division, Case No. 2:11-CV-229, on Jan. 4, 2012, 1 page.
Amended Declaration of Paul McGinley in Support of Defendants' Motion to Transfer Venue filed in the United States District Court, Eastern District of Texas Marshall Division, Case No. 2:11-CV-229, on Jan. 19, 2012, 4 pages.
Amended Declaration of Paul McGinley in Support of Defendants' Motion to Transfer Venue filed in the United States District Court, Eastern District of Texas Marshall Division, Case No. 2:11-CV-229, on Jan. 20, 2012, 4 pages.
Order Denying Defendants' Motion to Dismiss the Willful Infringement Claim as Moot filed in the United States District Court, Eastern District of Texas Marshall Division, Case No. 2:11-CV-229, on Feb. 1, 2012, 1 page.
Notice of Change of Address filed in the United States District Court, Eastern District of Texas Marshall Division, Case No. 2:11-CV-229, on Feb. 3, 2012, 2 pages.
Plaintiff Beneficial Innovations, Inc.'s Opposition to Defendants' Joint Motion to Transfer under 28 U.S.C. § 1404(a) to the Southern District of New York filed in the United States District Court, Eastern District of Texas Marshall Division, Case No. 2:11-CV-229, on Feb. 3, 2012, 21 pages.
Declaration of David E. Rosen in Support of Plaintiff's Opposition to Defendants' Joint Motion to Transfer under 28 U.S.C. § 1404(a) to the Southern District of New York filed in the United States District Court, Eastern District of Texas Marshall Division, Case No. 2:11-CV-229, on Feb. 3, 2012, 126 pages.
Unopposed Motion of Defendants to Extend Its Time to File Reply Brief in Support of Defendants' Motion to Transfer filed in the United States District Court, Eastern District of Texas Marshall Division, Case No. 2:11-CV-229, on Feb. 15, 2012, 5 pages.
Order Granting Unopposed Motion of Defendants to Extend Its Time to File Reply Brief in Support of Defendants' Motion to Transfer filed in the United States District Court, Eastern District of Texas Marshall Division, Case No. 2:11-CV-229, on Feb. 16, 2012, 2 pages.
Notice of Appearance of Counsel for Defendant/Counterclaimant Demand Media filed in the United States District Court, Eastern District of Texas Marshall Division, Case No. 2:11-CV-229, on Feb. 22, 2012, 3 pages.
Defendants' Reply in Support of their Joint Motion to Transfer under 28 U.S.C. § 1404(a) to the Southern District of New York filed in the United States District Court, Eastern District of Texas Marshall Division, Case No. 2:11-CV-229, on Feb. 29, 2012, 9 pages.
Supplemental Declaration of Sharon L. Davis, Esq. In Support of Defendants' Joint Motion to Transfer filed in the United States District Court, Eastern District of Texas Marshall Division, Case No. 2:11-CV-229, on Feb. 29, 2012, 68 pages.
Plaintiff Beneficial Innovations, Inc.'s Sur-reply to Defendants' Joint Motion to Transfer under 28 U.S.C. § 1404(a) to the Southern District of New York filed in the United States District Court, Eastern District of Texas Marshall Division, Case No. 2:11-CV-229, on Mar. 12, 2012, 5 pages.
Notice of Change of Address of Counsel for Defendant/Counterclaimant Demand Media filed in the United States District Court, Eastern District of Texas Marshall Division, Case No. 2:11-CV-229, on Mar. 27, 2012, 3 pages.
Order to Meet, Report, and Appear at Scheduling Conference filed in the United States District Court, Eastern District of Texas Marshall Division, Case No. 2:11-CV-229, on Apr. 11, 2012, 9 pages.
Standard Protective Order filed in the United States District Court, Eastern District of Texas Marshall Division, Case No. 2:11-CV-229, on Apr. 11, 2012, 4 pages.
Order Regarding E-Discovery in Patent Cases filed in the United States District Court, Eastern District of Texas Marshall Division, Case No. 2:11-CV-229, on Apr. 11, 2012, 5 pages.
Motion Practice Order filed in the United States District Court, Eastern District of Texas Marshall Division, Case No. 2:11-CV-229, on Apr. 11, 2012, 3 pages.
Plaintiff Beneficial Innovations, Inc.'s Supplemental Corporate Disclosure Statement filed in the United States District Court, Eastern District of Texas Marshall Division, Case No. 2:11-CV-229, on Apr. 25, 2012, 3 pages.
Defendant/Counterclaimant Demand Media, Inc.'s Corporate Disclosure Statement filed in the United States District Court, Eastern District of Texas Marshall Division, Case No. 2:11-CV-229, on Apr. 26, 2012, 3 pages.
Defendant Amazon.com, Inc.'s Certificate of Financially Interested Persons filed in the United States District Court, Eastern District of Texas Marshall Division, Case No. 2:11-CV-229, on Apr. 26, 2012, 3 pages.
Defendant Expedia, Inc.'s Certificate of Financially Interested Persons filed in the United States District Court, Eastern District of Texas Marshall Division, Case No. 2:11-CV-229, on Apr. 26, 2012, 3 pages.
Defendant Scripps Network, LLC's Certificate of Financially Interested Persons filed in the United States District Court, Eastern District of Texas Marshall Division, Case No. 2:11-CV-229, on Apr. 26, 2012, 3 pages.
Defendant Viacom Inc.'s Certificate of Interested Parties filed in the United States District Court, Eastern District of Texas Marshall Division, Case No. 2:11-CV-229, on Apr. 26, 2012, 3 pages.
Rodale, Inc.'s Certificate of Interested Parties filed in the United States District Court, Eastern District of Texas Marshall Division, Case No. 2:11-CV-229, on Apr. 26, 2012, 3 pages.
Defendant Amazon.com, Inc.'s Amended Certificate of Financially Interested Persons filed in the United States District Court, Eastern District of Texas Marshall Division, Case No. 2:11-CV-229, on Apr. 26, 2012, 3 pages.
Defendant Expedia, Inc.'s Amended Certificate of Financially Interested Persons filed in the United States District Court, Eastern District of Texas Marshall Division, Case No. 2:11-CV-229, on Apr. 26, 2012, 3 pages.
Defendant Viacom Inc.'s Amended Certificate of Financially Interested Persons filed in the United States District Court, Eastern District of Texas Marshall Division, Case No. 2:11-CV-229, on Apr. 26, 2012, 3 pages.
Defendant Scripps Network, LLC's Amended Certificate of Financially Interested Persons filed in the United States District Court, Eastern District of Texas Marshall Division, Case No. 2:11-CV-229, on Apr. 26, 2012, 3 pages.
Rodale, Inc.'s Certificate of Interested Parties filed in the United States District Court, Eastern District of Texas Marshall Division, Case No. 2:11-CV-229, on Apr. 27, 2012, 3 pages.
Defendant/Counterclaimant Advance Publications, Inc. Certificate of Financially Interested Persons filed in the United States District Court, Eastern District of Texas Marshall Division, Case No. 2:11-CV-229, on Apr. 27, 2012, 3 pages.
Notice of Appearance filed in the United States District Court, Eastern District of Texas Marshall Division, Case No. 2:11-CV-229, on Apr. 27, 2012, 2 pages.
Defendant Village Voice Media Holdings, LLC's Certificate of Financially Interested Persons filed in the United States District Court, Eastern District of Texas Marshall Division, Case No. 2:11-CV-229, on Apr. 30, 2012, 3 pages.
Defendant/Counterclaimant ALM Medial Properties, LLC Certificate of Financially Interested Persons filed in the United States District Court, Eastern District of Texas Marshall Division, Case No. 2:11-CV-229, on Apr. 30, 2012, 3 pages.
Defendant/Counterclaimant American Media, Inc.'s Certificate of Financially Interested Persons filed in the United States District

(56) References Cited

OTHER PUBLICATIONS

Court, Eastern District of Texas Marshall Division, Case No. 2:11-CV-229, on May 1, 2012, 3 pages.
Joinder by Defendant/Counterclaimant Demand Media, Inc. in Defendants' Joint Motion to Transfer under 28 U.S.C. § 1404(a) to the Southern District of New York filed in the United States District Court, Eastern District of Texas Marshall Division, Case No. 2:11-CV-229, on May 1, 2012, 3 pages.
Defendant/Counterclaimant Autotrader.com, Inc.'s Certificate of Financially Interested Persons filed in the United States District Court, Eastern District of Texas Marshall Division, Case No. 2:11-CV-229, on May 3, 2012, 3 pages.
Joint Discovery/Case Management Plan filed in the United States District Court, Eastern District of Texas Marshall Division, Case No. 2:11-CV-229, on May 8, 2012, 22 pages.
Google Inc.'s Unopposed Motion for Leave to File Under Seal Its Motion to Intervene filed in the United States District Court, Eastern District of Texas Marshall Division, Case No. 2:11-CV-229, on May 18, 2012, 5 pages.
Order Granting Google Inc.'s Unopposed Motion for Leave to File Under Seal Its Motion to Intervene filed in the United States District Court, Eastern District of Texas Marshall Division, Case No. 2:11-CV-229, on May 21, 2012, 1 page.
Application to Appear Pro Hac Vice filed in the United States District Court, Eastern District of Texas Marshall Division, Case No. 2:11-CV-229, on May 21, 2012, 2 pages.
Plaintiff's Notice of P.R. 3-1 and P.R. 3-2 Disclosures filed in the United States District Court, Eastern District of Texas Marshall Division, Case No. 2:11-CV-229, on May 29, 2012, 3 pages.
Motion for Leave to File Supplemental Brief of Amazon.Com, Inc. And Expedia, Inc. Regarding Defendants' Motion to Transfer Venue filed in the United States District Court, Eastern District of Texas Marshall Division, Case No. 2:11-CV-229, on May 31, 2012, 4 pages.
Supplemental Brief of Amazon.Com, Inc. And Expedia, Inc. Regarding Defendants' Motion to Transfer Venue filed in the United States District Court, Eastern District of Texas Marshall Division, Case No. 2:11-CV-229, on May 31, 2012, 6 pages.
Intervenor Google Inc.'s Notice of Appearance as Counsel filed in the United States District Court, Eastern District of Texas Marshall Division, Case No. 2:11-CV-229, on Jun. 1, 2012, 2 pages.
Beneficial Innovations, Inc.'s Unopposed Motion For Leave To File Under Seal Its Opposition To Motion To Intervene filed in the United States District Court, Eastern District of Texas Marshall Division, Case No. 2:11-CV-229, on Jun. 4, 2012, 4 pages.
Order Granting Motion for Leave to File Supplemental Brief of Amazon.com, Inc. and Expedita, Inc. Regarding Defendants' Motion to Transfer Venue filed in the United States District Court, Eastern District of Texas Marshall Division, Case No. 2:11-CV-229, on Jun. 4, 2012, 1 page.
Dell's Motion for Leave to File Supplemental Brief of Dell Inc. Regarding Defendants' Motion to Transfer Venue filed in the United States District Court, Eastern District of Texas Marshall Division, Case No. 2:11-CV-229, on Jun. 4, 2012, 4 pages.
Supplemental Brief of Dell Inc. Regarding Defendants' Motion to Transfer Venue filed in the United States District Court, Eastern District of Texas Marshall Division, Case No. 2:11-CV-229, on Jun. 4, 2012, 14 pages.
Order Granting Dell's Motion for Leave to File Supplemental Brief of Dell Inc. Regarding Defendants' Motion to Transfer Venue filed in the United States District Court, Eastern District of Texas Marshall Division, Case No. 2:11-CV-229, on Jun. 5, 2012, 1 page.
Order Granting Beneficial Innovations, Inc.'s Unopposed Motion For leave to File Under Seal Its Opposition to Google's Motion to Intervene filed in the United States District Court, Eastern District of Texas Marshall Division, Case No. 2:11-CV-229, on Jun. 5, 2012, 1 page.
Notice of Appearance of Counsel filed in the United States District Court, Eastern District of Texas Marshall Division, Case No. 2:11-CV-229, on Jun. 5, 2012, 2 pages.
Plaintiff Beneficial Innovations, Inc.'s Expedited Response to Supplemental Briefs of Amazon.com, Inc., Expedia, Inc. And Dell Inc. Regarding Defendants' Joint Motion to Transfer Venue filed in the United States District Court, Eastern District of Texas Marshall Division, Case No. 2:11-CV-229, on Jun. 6, 2012, 10 pages.
Minute Order filed in the United States District Court, Eastern District of Texas Marshall Division, Case No. 2:11-CV-229, on Jun. 7, 2012, 3 pages.
Notice of Appearance of Counsel filed in the United States District Court, Eastern District of Texas Marshall Division, Case No. 2:11-CV-229, on Jun. 12, 2012, 3 pages.
Google Inc.'s Reply in Support of Its Motion to Intervene filed in the United States District Court, Eastern District of Texas Marshall Division, Case No. 2:11-CV-229, on Jun. 14, 2012, 7 pages.
Order Denying Motion to Transfer filed in the United States District Court, Eastern District of Texas Marshall Division, Case No. 2:11-CV-229, on Jun. 19, 2012, 14 pages.
Plaintiff Beneficial Innovations, Inc.'s Sur-reply Brief in Opposition to Google, Inc.'s Motion to Intervene filed in the United States District Court, Eastern District of Texas Marshall Division, Case No. 2:11-CV-229, on Jun. 25, 2012, 8 pages.
Joint Motion to Dismiss filed in the United States District Court, Eastern District of Texas Marshall Division, Case No. 2:11-CV-229, on Jun. 25, 2012, 5 pages.
Order of Dismissal filed in the United States District Court, Eastern District of Texas Marshall Division, Case No. 2:11-CV-229, on Jul. 2, 2012, 1 pages.
Proposed Scheduling and Discovery Order filed in the United States District Court, Eastern District of Texas Marshall Division, Case No. 2:11-CV-229, on Jul. 3, 2012, 18 pages.
Agreed to Protective Order filed in the United States District Court, Eastern District of Texas Marshall Division, Case No. 2:11-CV-229, on Jul. 3, 2012, 23 pages.
Order Regarding Electronic Discovery filed in the United States District Court, Eastern District of Texas Marshall Division, Case No. 2:11-CV-229, on Jul. 3, 2012, 18 pages.
Scheduling and Discovery Order filed in the United States District Court, Eastern District of Texas Marshall Division, Case No. 2:11-CV-229, on Jul. 5, 2012, 18 pages.
Order Regarding Electronic Discovery filed in the United States District Court, Eastern District of Texas Marshall Division, Case No. 2:11-CV-229, on Jul. 5, 2012, 8 pages.
Agreed to Protective Order filed in the United States District Court, Eastern District of Texas Marshall Division, Case No. 2:11-CV-229, on Jul. 5, 2012, 23 pages.
Defendant Amazon.com, Inc.'s First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Viacom Inc.'s First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Scripps Networks, LLC's First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Expedia, Inc.'s First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Dell Inc.'s First Amended Answer and Counterclaims to Beneficial Innovations, Inc.'s Second Amended Complaint for Patent Infringement filed in the United States District Court, Eastern District of Texas Marshall Division, Case No. 2:11-CV-229, on Jul. 5, 2012, 13 pages.
Agreed Motion for Extension of Time to Identify E-Mail Custodians filed in the United States District Court, Eastern District of Texas Marshall Division, Case No. 2:11-CV-229, on Jul. 13, 2012, 4 pages.
Order Granting Agreed Motion for Extension of Time to Identify E-Mail Custodians filed in the United States District Court, Eastern District of Texas Marshall Division, Case No. 2:11-CV-229, on Jul. 16, 2012, 1 pages.

(56) References Cited

OTHER PUBLICATIONS

Agreed Motion for Extension of Time to Identify E-Mail Custodians filed in the United States District Court, Eastern District of Texas Marshall Division, Case No. 2:11-CV-229, on Jul. 18, 2012, 5 pages.
Agreed Motion for Extension of Time to Identify E-Mail Custodians filed in the United States District Court, Eastern District of Texas Marshall Division, Case No. 2:11-CV-229, on Jul. 18, 2012, 4 pages.
Plaintiff Beneficial Innovations, Inc.'s Notice of Disclosure filed in the United States District Court, Eastern District of Texas Marshall Division, Case No. 2:11-CV-229, on Jul. 19, 2012, 3 pages.
Order Granting Defendant Dell Inc.'s Agreed Motion for Extension of Time to Identify E-Mail Custodians filed in the United States District Court, Eastern District of Texas Marshall Division, Case No. 2:11-CV-229, on Jul. 19, 2012, 1 pages.
Order Granting Defendant Village Voice Media Holdings, LLC's Agreed Motion for Extension of Time to Identify E-Mail Custodians filed in the United States District Court, Eastern District of Texas Marshall Division, Case No. 2:11-CV-229, on Jul. 19, 2012, 1 pages.
Demand Media, Inc.'s Notice Of Compliance filed in the United States District Court, Eastern District of Texas Marshall Division, Case No. 2:11-CV-229, on Jul. 19, 2012, 3 pages.
Plaintiff and Counterdefendant Beneficial Innovations, Inc's Reply to Amended Counterclaims of Amazon.com, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Viacom, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Counterclaims of Scripps Networks, LLC filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Expedia, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Dell Inc. filed in the United States District Court, Eastern District of Texas Marshall Division, Case No. 2:11-CV-229, on Jul. 23, 2012, 5 pages.
Defendant Village Voice Media Holdings, LLC's Notice of Compliance filed in the United States District Court, Eastern District of Texas Marshall Division, Case No. 2:11-CV-229, on Jul. 23, 2012, 2 pages.
Intervening Plaintiff Google Inc.'s Complaint for Intervention filed in the United States District Court, Eastern District of Texas Marshall Division, Case No. 2:11-CV-229, on Jul. 23, 2012, 32 pages.
Dell Inc.'s Notice of Compliance filed in the United States District Court, Eastern District of Texas Marshall Division, Case No. 2:11-CV-229, on Jul. 23, 2012, 3 pages.
Notice of Compliance filed in the United States District Court, Eastern District of Texas Marshall Division, Case No. 2:11-CV-229, on Jul. 23, 2012, 2 pages.
Plaintiff's Notice of Supplemental P.R. 3-1 Disclosures filed in the United States District Court, Eastern District of Texas Marshall Division, Case No. 2:11-CV-229, on Aug. 9, 2012, 3 pages.
Notice of Disclosure filed in the United States District Court, Eastern District of Texas Marshall Division, Case No. 2:11-CV-229, on Aug. 10, 2012, 3 pages.
Plaintiff's Notice of Initial Disclosure Statement filed in the United States District Court, Eastern District of Texas Marshall Division, Case No. 2:11-CV-229, on Aug. 10, 2012, 3 pages.
Defendant Village Voice Media Holdings, LLC's Notice of Disclosure filed in the United States District Court, Eastern District of Texas Marshall Division, Case No. 2:11-CV-229, on Aug. 13, 2012, 2 pages.
Demand Media, Inc.'s Notice of Disclosure filed in the United States District Court, Eastern District of Texas Marshall Division, Case No. 2:11-CV-229, on Aug. 13, 2012, 3 pages.
Defendant Village Voice Media Holdings, LLC's Answer and Counterclaims to Second Amended Complaint filed in the United States District Court, Eastern District of Texas Marshall Division, Case No. 2:11-CV-229, on Aug. 15, 2012, 12 pages.
Agreed Motion for Extension of Time to Serve Invalidity Contentions filed in the United States District Court, Eastern District of Texas Marshall Division, Case No. 2:11-CV-229, on Aug. 16, 2012, 6 pages.
Beneficial Innovations, Inc's Answer to Google, Inc.'s Complaint for Intervention filed in the United States District Court, Eastern District of Texas Marshall Division, Case No. 2:11-CV-229, on Aug. 16, 2012, 9 pages.
Order Granting Agreed Motion for Extension of Time to Serve Invalidity Contentions filed in the United States District Court, Eastern District of Texas Marshall Division, Case No. 2:11-CV-229, on Aug. 17, 2012, 1 pages.
Notice of Compliance filed in the United States District Court, Eastern District of Texas Marshall Division, Case No. 2:11-CV-229, on Aug. 24, 2012, 4 pages.
Defendants' Invalidity Contentions filed in the United States District Court, Eastern District of Texas Marshall Division, Case No. 2:11-CV-229, Aug. 31, 2012, 66 pages.
Defendant Dell Inc.'s Motion to Sever and Transfer filed in the United States District Court, Eastern District of Texas Marshall Division, Case No. 2:11-CV-229, on Sep. 4, 2012, 24 pages.
Declaration of Nicholas A. Schuneman in Support of Dell's Motion to Sever and Transfer Venue filed in the United States District Court, Eastern District of Texas Marshall Division, Case No. 2:11-CV-229, on Sep. 4, 2012, 369 pages.
Plaintiff and Counterdefendant Beneficial Innovations, Inc's Reply to Counterclaims of Village Voice Media Holdings, LLC filed in the United States District Court, Eastern District of Texas Marshall Division, Case No. 2:11-CV-229, on Sep. 10, 2012, 5 pages.
Plaintiff Beneficial Innovations, Inc.'s Opposition to Defendant Dell's Motion to Sever and Transfer filed in the United States District Court, Eastern District of Texas Marshall Division, Case No. 2:11-CV-229, on Sep. 21, 2012, 21 pages.
Declaration of David E. Rosen in Opposition to Dell, Inc.'s Motion to Sever and Transfer filed in the United States District Court, Eastern District of Texas Marshall Division, Case No. 2:11-CV-229, on Sep. 21, 2012, 6 pages.
Plaintiff's Notice of Proposed Terms and Claim Elements for Construction Pursuant to P.R. 4-1 filed in the United States District Court, Eastern District of Texas Marshall Division, Case No. 2:11-CV-229, on Sep. 25, 2012, 3 pages.
Defendant Dell Inc.'s Reply in Support of its Motion to Sever and Transfer filed in the United States District Court, Eastern District of Texas Marshall Division, Case No. 2:11-CV-229, on Oct. 1, 2012, 8 pages.
Declaration of Nicholas A. Schuneman in Support of Dell's Reply in Support of its Motion to Sever and Transfer Venue filed in the United States District Court, Eastern District of Texas Marshall Division, Case No. 2:11-CV-229, on Oct. 1, 2012, 44 pages.
Plaintiff's Notice of Preliminary Claim Constructions and Identification of Extrinsic Evidence Pursuant to P.R. 4-2 filed in the United States District Court, Eastern District of Texas Marshall Division, Case No. 2:11-CV-229, on Oct. 3, 2012, 3 pages.
Defendant Village Voice Media Holdings, LLC's Notice of Disclosure filed in the United States District Court, Eastern District of Texas Marshall Division, Case No. 2:11-CV-229, on Oct. 3, 2012, 2 pages.
Defendants Advance Publications, Inc.; ALM Media Properties, LLC; American Media, Inc. and Autotrader.com Notice of Disclosure filed in the United States District Court, Eastern District of Texas Marshall Division, Case No. 2:11-CV-229, on Oct. 5, 2012, 3 pages.
Joint Claim Construction and Prehearing Statement filed in the United States District Court, Eastern District of Texas Marshall Division, Case No. 2:11-CV-229, on Oct. 10, 2012, 41 pages.
Agreed Motion for Extension of Time to File Letter Brief Requesting Permission to File Defendants' Motion for Summary Judgment of Indefiniteness File Defendants' Motion for Summary Judgment of Indefiniteness filed in the United States District Court, Eastern District of Texas Marshall Division, Case No. 2:11-CV-229, on Oct. 10, 2012, 6 pages.

(56) References Cited

OTHER PUBLICATIONS

Order Granting Agreed Motion for Extension of Time to File Letter Brief Requesting Permission to File Defendants' Motion for Summary Jjudgment of Indefiniteness filed in the United States District Court, Eastern District of Texas Marshall Division, Case No. 2:11-CV-229, on Oct. 11, 2012, 1 page.
Defendants Amazon.com, Inc., Expedia, Inc., Scripps Networks, LLC, and Viacom Inc. Agreed Motion to Extend Document Production Due Date filed in the United States District Court, Eastern District of Texas Marshall Division, Case No. 2:11-CV-229, on Oct. 11, 2012, 4 pages.
Defendants Advance Publications, Inc.; ALM Media Properties, LLC; American Media, Inc.; and Autotrader.com, Inc. Agreed Motion to Extend Document Production Due Date filed in the United States District Court, Eastern District of Texas Marshall Division, Case No. 2:11-CV-229, on Oct. 11, 2012, 4 pages.
Plaintiff Beneficial Innovations, Inc.'s Sur-reply to Defendant Dell's Motion to Sever and Transfer filed in the United States District Court, Eastern District of Texas Marshall Division, Case No. 2:11-CV-229, on Oct. 11, 2012, 8 pages.
Motion for Judgment on the Pleadings or in the Alternative Summary Adjudication That Beneficial Innovations, Inc. Is In Breach of Its Settlement Agreement With Google Inc. and Memorandum in Support Thereof filed in the United States District Court, Eastern District of Texas Marshall Division, Case No. 2:11-CV-229, on Oct. 11, 2012, 308 pages.
Order Granting Agreed Motion to Extend Document Production Due Date filed in the United States District Court, Eastern District of Texas Marshall Division, Case No. 2:11-CV-229, on Oct. 12, 2012, 1 page.
Notice of Compliance with the Court's Motion Practice Order filed in the United States District Court, Eastern District of Texas Marshall Division, Case No. 2:11-CV-229, on Oct. 17, 2012, 10 pages.
Emergency Motion of Plaintiff Beneficial Innovations, Inc. (1) to Strike Google's Motion for Judgment on the Pleadings and Summary Adjudication for Failure to Comply With the Court's Motion Practice Order, and (2) Alternatively, for a 45-Day Extension of Time to Oppose the Motion filed in the United States District Court, Eastern District of Texas Marshall Division, Case No. 2:11-CV-229, on Oct. 17, 2012, 40 pages.
Order Granting Request for Expedited Response filed in the United States District Court, Eastern District of Texas Marshall Division, Case No. 2:11-CV-229, on Oct. 18, 2012, 2 pages.
Notice of Appearance of Additional Counsel for Third-Party Plaintiff Google Inc. filed in the United States District Court, Eastern District of Texas Marshall Division, Case No. 2:11-CV-229, on Oct. 19, 2012, 2 pages.
Opposition of Google Inc. to Plaintiff's Motion to Strike filed in the United States District Court, Eastern District of Texas Marshall Division, Case No. 2:11-CV-229, on Oct. 19, 2012, 12 pages.
Reply Brief in Support of Emergency Motion (1) to Strike Google's Motion for Judgment on the Pleadings and Summary Adjudication for Failure to Comply with the Court's Motion Practice Order, and (2) Alternatively, For A 45-Day Extension of Time to Oppose the Motion filed in the United States District Court, Eastern District of Texas Marshall Division, Case No. 2:11-CV-229, on Oct. 22, 2012, 8 pages.
Order Granting Motion to Strike filed in the United States District Court, Eastern District of Texas Marshall Division, Case No. 2:11-CV-229, on Oct. 23, 2012, 3 pages.
Notice of Compliance with the Court's Motion Practice Order filed in the United States District Court, Eastern District of Texas Marshall Division, Case No. 2:11-CV-229, on Nov. 1, 2012, 9 pages.
Order Granting Agreed Motion to Extend Privilege Log Deadline filed in the United States District Court, Eastern District of Texas Marshall Division, Case No. 2:11-CV-229, on Nov. 2, 2012, 1 page.
Plaintiff's Notice of Privilege Log filed in the United States District Court, Eastern District of Texas Marshall Division, Case No. 2:11-CV-229, on Nov. 5, 2012, 3 pages.
Notice of Compliance with the Court's Motion Practice Order filed in the United States District Court, Eastern District of Texas Marshall Division, Case No. 2:11-CV-229, on Nov. 6, 2012, 10 pages.
Notice of Compliance with the Court's Motion Practice Order filed in the United States District Court, Eastern District of Texas Marshall Division, Case No. 2:11-CV-229, on Nov. 7, 2012, 10 pages.
Notice of Compliance with the Court's Motion Practice Order filed in the United States District Court, Eastern District of Texas Marshall Division, Case No. 2:11-CV-229, on Nov. 9, 2012, 9 pages.
Application to Appear Pro Hac Vice filed in the United States District Court, Eastern District of Texas Marshall Division, Case No. 2:11-CV-229, on Nov. 9, 2012, 2 pages.
Plaintiff Beneficial Innovations, Inc.'s Claim Construction Brief filed in the United States District Court, Eastern District of Texas Marshall Division, Case No. 2:11-CV-229, on Nov. 10, 2012, 247 pages.
Affidavit of Kevin Almeroth Regarding Claim Construction of U.S. Patent Nos. 7,496,943 and 6,712,702 filed in the United States District Court, Eastern District of Texas Marshall Division, Case No. 2:11-CV-229, on Nov. 10, 2012, 54 pages.
Notice of Compliance with the Court's Motion Practice Order filed in the United States District Court, Eastern District of Texas Marshall Division, Case No. 2:11-CV-229, on Nov. 12, 2012, 8 pages.
Notice of Allowance for U.S. Appl. Nos. 12/138,357 and 90/010,093, mailed Aug. 16, 2012.
Official Action for U.S. Appl. No. 12/167,244, mailed Mar. 7, 2012.
Official Action for U.S. Appl. No. 12/357,623, mailed Mar. 9, 2012.
Official Action for U.S. Appl. No. 12/357,623, mailed Aug. 23, 2012.
Official Action for U.S. Appl. No. 13/310,572, mailed Jun. 6, 2012.
Defendants' Responsive Claim Construction, filed in the United States District Court, Eastern District of Texas, Marshall Division, Case Nos. 2:11-CV-299 (MHS/CMC), on Dec. 10, 2012, 38 pages.
Deposition of Sheldon F. Goldberg, Feb. 6, 2013, 96 pages.
Official Action for U.S. Appl. No. 13/707,561, mailed Mar. 19, 2013.
U.S. Appl. No. 90/010,093, filed Jan. 31, 2008.
U.S. Appl. No. 12/138,357, filed Jun. 12, 2008.
U.S. Appl. No. 11/147,501, filed Jun. 6, 2005.
U.S. Appl. No. 13/429,487, filed Mar. 26, 2012.
U.S. Appl. No. 13/561,846, filed Jul. 30, 2012.
U.S. Appl. No. 12/167,244, filed Jul. 2, 2008.
U.S. Appl. No. 12/357,623, filed Jan. 22, 2009.
U.S. Appl. No. 13/310,572, filed Dec. 2, 2011.
U.S. Appl. No. 13/707,561, filed Dec. 6, 2012.
U.S. Appl. No. 09/830,593, filed Aug. 27, 2001, Goldberg.
U.S. Appl. No. 10/753,513, filed Jan. 8, 2004, Goldberg.
Author unknown, memo subject: "3 Topics", Doc. Page Identifier(s):PRGY 2030-2033, 3/4/?.
Author unknown , memo subject: "Notes for the Month of August", Doc. Page Identifier(s):PRGY 2045-2046, date unknown.
Author unknown, "API Cordiation/support Group", Doc. Page Identifier(s):PRGY 2055-2060, date unknown.
Author unknown, "Discussion Draft/Notes", Doc. Page Identifier(s):PRGY 2098-2099, May 29, 1986.
Author unknown, "Look/Zip Design Considerations", Doc. Page Identifier(s):PRGY 1647-1654, Feb. 3, 1987.
Author unknown, "Product Design Panels", Doc. Page Identifier(s):PRGY 2087-2097, Jun. 16, 1986.
Author unknown, "Product Design System Flow", Doc. Page Identifier(s):PRGY 2084-2086,date unknown.
Author unknown, "Standard Form application Documentation", Doc. Page Identifier(s):PRGY 2061-2083, date unknown.
Author unknown, memo subject: "APi Planning Session", Doc. Page Identifier(s):PRGY 2047-2048, Mar. 19, 1986.
"Ad-Free" Information Week, n.614, pp. 68, 70, Jan. 20, 1997, Dialog Accession No. 5498711 in Dialog® File 2.
"Adobe Systems and PicturWeb form alliance . . . provide consumers with unique digital photo offering" Business Wire Jan. 4, 1996, Diaglog Accession No. 00561903 in Dialog® File 621.
"ADR introduces electronic meeting scheduler—new ADR/email facility crosses time zones and data lines" News Release May 31, 1988, Dialog Accession No. 00192162 in Dialog® File 621.
"AOL Virtual Museum 10,000 Free Hours"; Dec. 19, 2001; 4 pages.
"AOL Virtual Museum Other Online Services"; Aug. 17, 2001; 5 pages.

(56) References Cited

OTHER PUBLICATIONS

"Aurum Software delivers next phase in internet push technology for sales forces" PR Newswire Mar. 11, 1997, Dialog Accession No. 00744816 in Dialog® File 621.
"BackWeb to provide push technology for Microsoft Internet Explorer 4.0" PR Newswire Mar. 12, 1997, Dialog Accession No. 00746003 in Dialog® File 621.
"Captain lacks popularity", Japan Economic Journal, Doc. Page Identifier(s): PRGY 1253, Mar. 29, 1986.
"ClariNet & Interest!Alert announce push technology . . . to ClariNet's 200 ISPs and 1.5 million users" Business Wire Mar. 10, 1997, Dialog Accession No. 00744113 in Dialog® File 621.
"'Clickshare' one-bill, universal-password access . . . early next year" PR Newswire Sep. 15, 1995, Dialog Accession No. 00544269 in Dailog® File 621.
"CNET and inCommon announce delivery of news.com . . . for desktop deliver of CNET's popular news.com content" Business Wire Mar. 10, 1997, Dialog Accession No. 00744544 in Dialog® File 621.
"Command & Conquer The First Decade for PC Review," available at http://www.gamespot.com/pc/strategy/commandconquerthefirstdecade/review.html, 1995, 2 pages.
"CompasSearch web server search . . . add-on search server adds value to WWW sites" Business Wire Jan. 3, 1996, Dialog Accession No. 00560996 in Dialog® File 621.
"Comprehensive software directory now available on Newsnet" Aug. 29, 1985, Dialog Accession No. 00115864 in Dialog® File 621.
"CoolWebSearch", Wikipedia Website, as early as May 9, 2004, available at http://en.wikipedia.org/wiki/CoolWebSearch, pp. 1-4.
"Cover Story: Free mail, part two; two companies announce free internet e-mail services," Multimedia & Videodisc Monitor, Aug. 1, 1995.
"Database Aids", Computers & Electronics, Doc. Page Identifier(s): PRGY 1295, Feb. 1985.
"Despite summer doldrums, online audience claims 5.6% to 5.52 million" Information & Interactive Services Report, Oct. 7, 1994 v.15, Dialog Accession No. 02541536 in Dialog® File 636.
"Dial-up electronic media director® at low cost introduced by PR Data Systems" News Release Feb. 10, 1989, p. 1, Dialog Accession No. 02140932 in Dialog® File 16.
"Diamond Multimedia ships its first 56,000 . . . now available at retail" Business Wire Mar. 24, 1997, Dialog Accession No. 00755527 in Dialog® File 621.
"Diamond Multimedia ships the first K56FLEX modems for Macintosh computers" Business Wire Apr. 8, 1997, Dialog Accession No. 00757610 in Dialog® File 621.
E-mail and voicemail systems. (Evolution of the Paperless Office: Legal Issues Arising out of Technology in the Workplace, part 1), Employee Relations Law Journal, Winter 1995, 21, n.3, 5-36, Dialog Accession No. 08361735 in Dialog® File 148.
"E-Mail Vendors", O'Dwyer's PR Services Report, Doc. Page Identifier(s): PRGY 1250-1251, Jun. 1988.
"EveryWare and WebGenesis join forces with tools for the Web," Business Wire, Dec. 6, 1995.
"eWorks! Inc. announces eWatch WebAlert—powerful, comprehensive, efficient web site monitoring designed for the corporate user" PR Newswire Aug. 20, 1996, Dialog Accession No. 00655743 in Dialog® File 621.
"Federal Reserve Board and Consumer Credit Intelligence from Business Publishers, Inc. enhances Newsnet database" Jun. 10, 1985, Dialog Accession No. 00116869 in Dialog® File 621.
"Final Report Prodigy Kroger Grocery Shopping Service", Elrick and Lavidge, inc., Doc. Page Identifier(s): PRGY 1331-1356, Sep. 1988.
"Firm to offer free net mail," Cornputerworld, 1995, 1 page.
"FirstFloor software brings 'push' technology to both businesses and consumers through deals with Microsoft and America Online" PR Newswire Mar. 13, 1997, Dialog Accession No. 00746694 in Dialog® File 621.
"Florida business news service named among "World's Best" internet newspaper publishers by editor & publisher" Business Wire Apr. 1, 1997, Dialog Accession No. 00753847 in Dialog® File 621.
"ForeFront launches WebWhacker 3.0—. . . just got better" PR Newswire Mar. 24, 1997, Dialog Accession No. 00750722 in Dialog® File 621.
"Free Internet Access From AT&T—Have They Lost Their Minds?!!?"; Discount Long Distance Digest News; Feb. 27, 1996; 2 pages.
"FreeMark Communications and SportsTicker enter online sports information distribution agreemen; Popular sports content first of a series of innovative content offerings to be delivered free to email users," Business Wire, 1996, 1 page.
"French firm unveils first Lotus add-in . . . and unattended electronic mail" News Release Nov. 19, 1987, Dialog Accession No. 00175902 in Dialog® File 621.
"Gartner Group announces internet-based ovantage service" Business Wire Jan. 2, 1996, Dialog Accession No. 00563106 in Dialog® File 621.
"Getting A Connection," Online Access, Apr. 1994, pp. 66-68.
"Guide To Online Information Services", Computers & Electronics, Doc. Page Identifier(s): PRGY 1292-1294, Feb. 1985.
"HFS Incorporated, Century 21 Real Estate Corporation . . . consumer real-estate information service" Business Wire Jan. 10, 1996, Dialog Accession No. 00564626 in Dialog® File 621.
"Home information videotex services are expected to be widely available . . . for the use of the new services" News Release Jul. 27, 1981, pp. 1-61, Dialog Accession No. 00659126 in Dialog® File 16.
"Home information videotex services will cost subscribers $78/mo by 1990, according to Ininl Resource Development" VideoPrint, Aug. 10, 1981, p. 7, Dialog Accession No. 00679106 in Dialog® File 16.
"HotWired Goes Live", available at http://www.hotwired.com/, Oct. 1994, 4 pages.
"How far back does Google's Usenet archive go?", available at http://groups.google.com/support/bin/answer.py?answer=46439&topic=9246, 2007, 3 pages.
"IDG books Worldwide, Inc. and Mecklermedia Corporation sign agreement to publish ten new internet/virtual reality books" PR Newswire Apr. 17, 1995, Dialog Accession No. 00514153 in Dialog® File 621.
"IFN announces instant news service; . . . ILX to become first distributor" Business Wire Mar. 18, 1997, Dialog Accession No. 00749159 in Dialog® File 621.
"Individual Inc. named breakout company of the year by the Information Industry Association" Business Wire Oct. 23, 1995, p. 10231026, Diolog Accession No. 05782514 in Dialog® File 16.
"Individual Launches Newspage Direct," PR Newswire, 1996, pp. 1-2.
"Individual, Inc.—company report" Investext, May 1, 1996, pp. 1-16, Dialog Accession No. 06289588 in Dialog® File 16.
"Individual, Inc. elects Michael E. Kolowich as new CEO" News Release, Sep. 3, 1996, Dialog Accession No. 06570702 in Dialog® File 16.
Individual, Inc., announces agreement to acquire FreeLoader, Inc., News Release Jun. 2, 1996, Dialog Accession No. 06306172 in Dialog® File 16.
"Information Access Company's 10 online databases to be offered through Mead Data Central services" May 1, 1985, Dialog Accession No. 00117313 in Dialog® File 621.
"Information Gateways—New Life For Videotex?", Institute For The Future, Doc. Page Identifier(s): PRGY 1249, May 1988, 1 page.
"Infoseek delivers personalized, current news via e-mail" PR Newswire Feb. 13, 1997, Dialog Accession No. 00731890 in Dialog® File 621.
"Interest!Alert provides push technology to Island's web site visitors" Business Wire Feb. 4, 1997, Dialog Accession No. 00733654 in Dialog® File 621.
"Internet Access Pricing in the OECD"; 45 pages; date unknown.
"Internet Chess Club" From Wikipedia, the free encyclopedia.; Jun. 29, 2005; 2 pages.

(56) References Cited

OTHER PUBLICATIONS

"Internet Current Awareness Service" Searcher: Magazine/Database Prof., v.3 n.10 p. 8(1) Nov./Dec. 1995, Dialog Accession No. 00086120 in Dialog® File 256.
"Internet study shows push technology takes up significant bandwidth . . . Sixth International World Wide Web Conference" Business Wire Apr. 7, 1997, Dialog Accession No. 00757278 in Dialog® File 621.
"Joe Anonini Shakes Up Kmart", Gallagher Report, Doc. Page Identifier(s): PRGY 1577; Aug. 8, 1988.
"Journalist User Guide" PED Software Corportation,1994, 150 pp.
"LaserCard™ enables quiet, high quality printing on IBM system/36 and system/38 midrange computers" News Release, Mar. 6, 1988.
"Leading Newspapers Ramp up Interactive Advertising Developments," Electronic Marketplace Reports, vol. 9; No. 4, Feb. 21, 1995, p. 4.
"List of files in BRMH-1.7.tar.gz", Oct. 15, 1993, 3 pages.
"List of files in Server2.5p14.tar.gz", Aug. 9, 1994, 5 pages.
"Macromedia's Shockwave brings animation and entertainment to Internet push technology" PR Newswire Feb. 25, 1997, Dialog Accession No. 00744301 in Dialog® File 621.
"ManifestDestiny Marketing, Inc. Business Plan"; ManifestDestiny Marketing Inc.; 1994; 35 pages.
"McAfee announces PC Medic 97 and NetMedic 97; . . . by proactively preventing cmomon Windows 95 problems" Business Wire Mar. 18, 1997, Dialog Accession No. 00747856 in Dialog® File 621.
"McAfee launces enterprise SecureCast; first to deliver . . . ; McAfee and BackWeb pioneer new software distribution channel" Business Wire Feb. 28, 1997, Dialog Accession No. 00740253 Dialog® File 62.
"McAfee launches VirusScan 3.0; . . . detects 100% of viruses in latest secure computing magazine review" Business Wire Mar. 3, 1997, Dialog Accession No. 00741540 in Dialog® File 621.
"McGraw-Hill news available on Dialcom" News Release Jul. 27, 1988, Dialog Accession No. 00199385 in Dialog® File 621.
"MCI acquires Equifax's stake in FYI Online" Electronic Information Report, Oct. 21, 1994 v.15, n.38, Dialog Accession No. 02592239 in Dialog® File 636.
"Mead Data Central adds Trinet databases to Exchange™" Jan. 17, 1986, Dialog Accession No. 00120619 in Dialog® File 621.
"Media tracking service watches cyberspace: RTV offers ewatch to monitor internet" PR Newswire Feb. 20, 1996, Dialog Accession No. 005811154 in Dialog® File 621.
"Microsoft products now available through online interactive's atOnce software" Business Wire Jan. 15, 1996, Dialog Accession No. 00565507 in Dialog® File 621.
"MovieFone announces MovieLink," Business Wire, Jul. 25, 1995, 2 pages.
"MPG-NET Presents Empire Builder," 1993, 2 pages.
"MPG-NET Presents Star Cruiser," 1993, 2 pages.
"N.Y. Times Mon. unveiled World Wide Web site, The New York Times on the Web. (Comm Daily Notebook)" Communications Daily, Jan. 23, 1996, v.16, n. 15, p. 6(2), Dialog Accession No. 08418048 in Dialog® File 148.
"NETdelivery and iCat announce strategic partnership" PR Newswire Feb. 11, 1997, Dialog Accession No. 00733524 in Dialog® File 621.
"NETdelivery announces release of 1.1—a unique push product for the Internet" PR Newswire Mar. 1997, Dialog Accession No. 00744055 in Dialog® File 621.
"Netrek Software Archive", available at http://ftp.netrek.org/pub/netrek/mirrors/ftp.csua.berkely.edu.old/netrek/old, Apr. 16, 1999, 3 pages.
"Netrek Software Archive", available at http://ftp.netrek.org/pub/netrek/mirrors/ftp.solace.mh.se/netrek/servers/vanilla, Jan. 5, 2000, 1 page.
"New classified Central Bank houses rates for over 5,000 U.S. publications" PR Newswire Jan. 17, 1996, Dialog No. 01336756 in Dialog® File 621, (full text) pp. 1-2.
"New custom file capability for Nexis" May 1, 1985, Dialog Accession No. 0017314 in Dialog® File 621.
"New Newsletter: Tradewinds—Trade magazine coverage of the Net", Tradewinds, Kenneth Liss (Editor), vol. 1, No. 2, Nov. 1994, 9 pages.
"New subject group files, pricing for Nexis®" May 1, 1985, Dialog Accession No. 00117288 in Dialog® File 621.
"News Alert to Introduce Real-Time" Information Today, v.12 n.6 p. 14(1), Jun. 1995, Dialog Accession No. 00078844 in Dialog® File 256.
"Newsday direct available to Prodigy subscribers at no additional fee" Business Wire Oct. 26, 1995, Dialog Accession No. 00543429 in Dialog® File 621.
"Newsnet and American Business Information present business America—online" News Release Mar. 18, 1993, Dialog Accession No. 00350155 in Dialog® File 621.
"Newsnet offers an electronic news clipping service called NewsFlash" Marketing News, Nov. 25, 1983, p. 23, Dialog Accession No. 00969003.
"Newsnet to convert online system to PLS search software" PR Newswire Nov. 15, 1994, Dialog Accession No. 00502206 in Dialog® File 621.
"Newsnet unveils major new enhancements" PR Newswire May 3, 1995, Dialog Accession No. 00516785 in Dialog® File 621.
"Nexis® adds radio transcripts of Dougherty Daily ad broadcasts" Mar. 11, 1986, Dialog Accession No. 00126985 in Dialog® File 621.
"No shortage of online choices," Mill Hollow Corporation, DM News, 1995, 3 pages.
"Online clipping services deliver" PC Today, v.9 n.3 p. 20(4), Mar. 1995, Dialog Accession No. 00075350 in Dialog® File 256.
"Online data push" InformationWEEK n. 619, pp. 61-2, 66, 68, Feb. 24, 1997, Dialog Accession No. 5529660 in Dialog® File 2.
Online services growing fast; 32.5% increase in subscribers; Jupiter projects 5 million online by end of 1994' PR Newswire Mar. 9, 1994, Dialog Accession No. 00471819 in Dialog® File 621.
"On-line software maps DB2 direction" News Release Mar. 27, 1991, Dialog Accession No. 00294253 in Dialog® File 621.
"Paley opens communications consulting firm" PR Newswire Sep. 30, 1983, Dialog Accession No. 01906440 in Dialog® File 148.
"PAPA 5"; Feb. 1995; Feb. 1, 1995; http://www.ece.umd.edu/~dstewart/pinball/PAPA5/guide.txt.
"PAPA 6, 1998 World Pinball Championships"; Feb. 1998; http://www.glue.umd.edu/~dstewart/pinball/PAPA 6/.
"Patterns of use, exposure in paper's audiotex system" Newspaper Research Journal (INRS), 16(1):48-59 1995, Dialog Accession No. 02586508, in Dialog® File 484.
"PC World Online chooses Lanacom to deliver next generation "push" software to mor than half a million monthly online users" Business Wire, Apr. 9, 1997, Dialog Accession No. 00758089 in Dialog® File 621.
"Personalized Marketing and Selling on the Internet Unleashed by BroadVision; One-To-One Application System Helps Marketers Build Long-Term Relationships Through Personalized Content, Services and Promotions," Business Wire, Jan. 22, 1996, 3 pages.
"Pressing E-mail's Mass-Market Advantage; Printable coupons attached to elec. messages make 1-1 marketing a possibility" Mill Hollow Corporation, DM News 1995.
"Productview interactive to launch free email service this year" IAC (SM) Newsletter Database (TM) M2 Communications, M2 Presswire 1995, 2 pages.
"San Jose Mercury News Now Publishing on the World Wide Web," All Mega News, Jan. 18, 1995, 2 pages.
"Scala's new CEO brings Madison Avenue and Hollywood perspective to multimedia computer television" PR Newswire Mar. 17, 1997, Dialog Accession No. 00748917 in Dialog® File 621.
"Simware announces alliance with Intermind to push enterprise data to users' desktops" Business Wire Mar. 12, 1997, Dialog Accession No. 00748045 in Dialog® File 621.
"Sky Computers chosen as compute processor for Broadcast Data Systems, Inc." News Release Aug. 24, 1992, Dialog Accession No. 00335658 in Dialog® File 621.
"Spyware", Wikipedia website, as early as Jan. 27, 2004, available at http://en.wikipedia.org/wiki/Spyware, pp. 1-20.

(56) References Cited

OTHER PUBLICATIONS

"StarBurst Communications to bring true "push" technology to the Internet" Business Wire Mar. 3, 1997, Dialog Accession No. 00743147 in Dialog® File 621.
"Starfish Software announces corporate 10-user paks . . . now available in new money-saving 10-packs" Business Wire Feb. 6, 1996, Dialog Accession No. 00574412 in Dialog® File 621.
"Starfish Software first to leverage Sun's Java . . . Sun's HotJava and Netscape's Navigator 2.0 . . . " Business Wire Nov. 13, 1995, Dialog Accession No. 00545472 in Dialog® File 621.
"Starfish Software Inc. introduces "EarthTime"; . . . for online preview and download" Business Wire Jan. 22, 1996, Dialog No. 01338030 in Dialog® File 621, (full text) pp. 1-4.
"Suddenly, Videotex is finding an audience: Boston CitiNet . . . free videotex svcs & charging for advertising" Business Week, Oct. 19, 1987, pp. 92, 94 Dialog Accession No. 01784027 in Dialog® File 16.
"Targeting Consumer Influentials", The Public Pulse, Doc. Page Identifier(s): PRGY 1245-1248, Mar. 1988, 4 pages.
"Technology industry & corporate customers push Marimba to the top" PR Newswire Feb. 24, 1997, Dialog Accession No. 00737499 in Dialog® File 621.
"TechWeb's breaking news and information now "pushed" . . . techWeb channel keeps . . . " Business Wire Feb. 12, 1997, Dialog Accession No. 00730658 in Dialog® File 621.
"Tektronix brings embedded-software engineers more tools for decreasing time to market" News Release Apr. 7, 1995, Dialog Accession No. 00516600 in Dialog® File 621.
"Telebase launches electronic clipping services" PR Newswire May 7, 1991, Dialog Accession No. 00295190 in Dialog® File 621.
"Telecommunications information from Phillips Publishing available online through Newsnet" Jun. 12, 1985, Dialog Accession No. 00117476 in Dialog® File 621.
"The marketers are on-lining up for you; interaction ads, other gimmicks kick off the internet's new era," The Washington Post, 1995.
"The Prodigy Approach To The Mass Market", The Seelinger Letter, Doc. Page Identifier(s): PRGY 1562-1574, Aug. 25, 1988.
"The Reuters Business Report" Asia-Pacific Business Report Mar. 4, 1996, Dialog Accession No. 2819020 in Dialog® File 611.
"The world's most useful online business library adds full-text archives of The New York Times" Business Wire Oct. 31, 1995, Dialog Accession No. 00543679 in Dialog® File 621.
"TMS and Mercury mail to develop personalized internet e-mail products" PR Newswire Jun. 14, 1996, Dialog Accession No. 00628917 in Dialog® File 621.
"Unlawful Internet Gambling Enforcement Act of 2006", 31 USC § 5361-5367, available at http://www.rules.house.gov/109_2nd/text/hr4954cr/hr49543_portscr.pdf, pp. 213-244, 2006.
"Virus fears stalk companies" USA Today, Doc. Page Identifier(s): PRGY 1560-1561, Nov. 10, 1988.
"W3.Com Introduces First Visitor-Tracking Software for Web Sites: Software Increases Interactivity, Provides Powerful Tracking and Customization Features while Simplifying Web Site Development," Business Wire, Aug. 15, 1995, 3 pages.
"Washington, DC History"; Last modified Mar. 12, 2003; Copyright 1995-2005 Hagen Software; 5 pages.
"Web-Based Search Services," Online & CDRom Review, 1995, vol. 19, No. 4, pp. 223-227.
"World's First Banner Ad"; undated; 2 pages.
"A Newspaper with a Difference On The Internet"; Direct Marketing Magazine; Mar. 1995; 57(11); p. 11.
"America Online Acquires ImagiNation Network from AT&T"; AT&T New Release; Aug. 6, 1996, pp. 1-2.
"Archive of Pervious Versions of My Home Page"; Free Software Humor & Jokes Personal; Version 3. mid, Oct. 1996 to present; 2 pgs.
"Ariel Resources first quarter results, revenue increases 109 percent of comparable period last year," Business Wire, Feb. 13, 1997, Dialog Accession No. 00736050, in Dialog® File 621.
"Boeing projects continued airline profitability, traffic growth, rational airline orders," PR Newswire, Mar. 6, 1996, Dialog Accession No. 00586684, in Dialog® File 621.
"Brave New Medium"; Economist; Jun. 29, 1996; 339(7972); pp. 15-16; UK 17-18.
"Case's Ladder: The World's Largest Gaming League!"; http://www.igl.net, 1 pg., (printed on Mar. 2, 2005).
"Cash is the Riddler's Draw"; Jun. 8, 1995; 1 pg.
"DataTimes Announces Major New Search Features, Price Cuts, Search Services & Gateways"; Database Searcher, Jun. 1, 1990, 6(5), pp. 27-28; Dialog File 233: Microcomputer Abstracts; 0219825.
"Dateline: Princeton, NJ: Financial Times and The Wall Street Journal Together On Dow Jones News/Retrieval"; Information Today; Apr. 1, 1995, 12(4); p. 1, Dialog File 233: Microcomputer Abstracts; 0382372.
"ELO Rating System"; http://en.wikipedia.org/wiki/ELO_rating_system, 5 pgs., (printed on Mar. 2, 2005).
"For People New to IGS Pandanet"; http://www.pandanet.co.jp/English/guide/intro.htm, 2 pgs., (printed on Mar. 2, 2005).
"Free Software & Tips"; Free Software Humor & Jokes Personal; date unknown; 4 pgs.
"Game Credits: Published Games"; International hobo; (date unknown); 7 pp.
"Game TV dedicated to the game player in all of us . . . new half-hour show," PR Newswire, Feb. 19, 1997, Dialog Accession No. 00735308, in Dialog® File 621.
"GE Debuts GEnie in Europe, Introduces Corporate Clipping Service"; Link-Up; Jun. 1, 2990, 7(3); pp. 1, 12, Dialog File 233: Microcomputer Abstracts; 0219292.
"Harbinger Corporation Announces TrustedLink INP; The most comprehensive solution for easily building and maintaining a corporate Web site," Business Wire, Mar. 25, 1996, Dialog Accession No. 00594210 in Dialog® File 621.
"HFS and Century 21 announce major initiatives . . . in providing one-stop shopping for consumers," Business Wire, Mar. 12, 1996, Dialog Accession No. 00589418, in Dialog® File 621.
"HP Internet Advisor Enhanced to Make Internetwork Testing Quicker and Easier; Windows 95 Interface Helps to Isolate Network Problems," Business Wire, Mar. 15, 1996, Dialog Accession No. 00590687, in Dialog® File 621.
"ICC Help: FIDErating"; http://www.chessclub.com/help/FIDErating, 3 pgs., (printed on Mar. 2, 2005).
"ICC Help: Ratings"; http://www.chessclub.com/help/ratings, 2 pgs., (printed on Mar. 2, 2005).
"IDG to launch Javaworld on World Wide Web," PR Newswire, Feb. 2, 1996, Dialog Accession No. 00576930, in Dialog® File 621.
"Implementing On-Line Couponing"; Merchandising/Marketing; 1996 News clipping.
"Individual, Inc. Files for U.S. Patent"; PR Newswire; Jul. 9, 1992.
"Individual, Inc. Sees Strong Sales, Subscriber Growth"; Electronic Information Report; Feb. 24, 1994; 16(8).
"Intermind 'pushes' 140 New Web Channels, Thre Times That of Marimba, Backweb and Ifusion Combined"; SchwabOnline; Feb. 6, 1997; 2 pgs.
"Internet Chess Club"; http://en.wikipedia.org/wiki/Internet_Chess_Club, 2 pgs., (printed on Mar. 2, 2005).
"IRG acquires Intertect," PR Newswire, Dec. 2, 1996, Dialog Accession No. 00703704, in Diailog® Fiie 621.
"Journalist Delivers Your Own Personalized Newspaper"; IAC News; 1997; 1 pg.
"Journalist: A New Prodigy Add-On"; DB Svcs.; 1994; 1 pg.
"License for Ronald A. Katz Technology Licensing L.P. Patents Obtained by HP"; PR News; Mar. 18, 2002; 4 pgs.
"List of Some of Rajiv's Technology Related Work"; Home Free Software Humor & Jokes Personal; date unknown; 5 pgs.
"Madison Avenue's OnLine Leaps" Newspaper Article, 1 page.
"Marketing: Ads Delivered in Real Time"; Business Communications Company, Inc.; Jan. 1996; 2 pgs.
"Mech Warrior 2: 31st Century Combat"; http://www.mechreg.com, 1 pg., (printed on Mar. 2, 2005).
"Mercury Center Intros NewsHound Clipping Service"; Newsbytes Ness Network; pg. N/A.
"New Site Design & Features"; http://www.igl.net/wwwstaff/messages/66.shtml, 4 pgs., (printed on Mar. 2, 2005).

(56) References Cited

OTHER PUBLICATIONS

"News Alert to Introduce Real-Time Electronic Clipping Service"; Information Today; Jun. 1, 1995, 12(6); p. 14; Dialog File 233: Microcomputer Abstracts; 0387603.
"News for Nerds. Stuff that Matters"; Slashdot; 1997-2002, pp. 1-115.
"NewsHound Sniffs Out Stories"; Open Systems Today; Nov. 28, 1994; No. 164; pg. 36.
"NewsNet Newly Enhanced NewsFlash"; Information Today; Apr. 1, 1990, 7(4); p. 4, Dialog File 233: Microcomputer Abstracts; 0254449.
"Online Interactive's FreeShop Online achieves one million electronic orders . . . ," Business Wire, Feb. 7, 1996, Dialog Accession No. 00575091, in Dialog® File 621.
"Online—Time, Inc." Report on Electronic Commerce; Nov. 12, 1996; 3(23).
"Patent Office May Hinder Hopping of Bunny Across Computerscreens"; Washington Times; 1997; 2 pgs.
"PED Delivers Personalized Newspapers To Users Desktops"; IAC News; 1997; 2 pgs.
"PED Software Introduced Journalist, Software That Allows Users to Retrieve and Print Data From the Prodigy Online Service"; Newsbytes News Network; Apr. 5, 1994; Dialog 01014310.
"Search Services & Gateways"; Database Searcher, Jun. 1, 1991, 7(5); pp. 31-33; Dialog File 233: MicroComputer Abstracts; 0242553.
"Starfish Software ships Earthtime 2.0; The essential world clock . . . as a Netscape Navigator 2.0 plug-in," Business Wire, Mar. 12, 1996, Dialog Accession No. 00589215, in Dialog® File 621.
"Sun-Sentinel Launches Interactive Real Estate Service on the Internet," PR Newswire, Apr. 11, 1996, Dialog Accession No. 00600800 in Dialog® File 621.
"The History of the Mech warrior 2: Registry"; http://www.mechreg.com/history.htm, 2 pgs., (printed on Mar. 2, 2005).
"The Hook Is The Look Of The Journal"; Business Week; Aug. 16, 1993; No. 3332; gs. 102A.
"The Mech Warrior: Registry, Level 2 Ladder, Top 25"; http://www.mechreg.com/ladder2.htm, 2 pgs., (printed on Mar. 2, 2005).
"The World Wide Web as a Universal Interface to Government Services"; Center for Technology in Government, University at Albany/SUNY; 1996; 136 pgs.
"Their E-mail Could Become Free Mail"; Bacon's; Jul. 7, 1995; News clipping.
"Time Warner's Pathfinder, Compuserve Inc. and Open Market Inc. Announce a Breakthrough for the Internet," PR Newswire, Apr. 11, 1996, Dialog Accession No. 00601438 in Dialog® File 621.
"UCA&L announces new Internet division . . . to help clients reach, communicate with, and market to customers online," Business Wire, Mar. 5, 1996, Dialog Accession No. 00586617, in Dialog® File 621.
"UK: Home Computer From Your Own Correspondent"; Reuters Info Svcs.; 1996; 2 pgs.
"Virtual Dorm tops [sic] into real life of students; fully wired dorm suite puts students' live on the Web for all to see," PR Newswire, Oct. 31, 1995, Dialog Accession No. 00543165, in Dialog® File 61.
"Web News With A Personal Touch: Individual, Inc. Offers Ad-Backed, Customized Information Source"; Advertising Age; Apr. 3, 1995; 66(14); p. 25.
"Yahoo! BackWeb Channel Guide!"; Yahoo Channel Guide: What's Going On?; 2 pgs.
"ZD Net celebrates first year of web advertising program as top-grossing content provider with 63 April advertisers," PR Newswire, Apr. 15, 1996, Dialog Accession No. 00602035, in Dialog® File 621.
24/7 Media Prospectus, Aug. 13, 1998, pp. 1-123.
Abate; "Advertising Sponsorship Is Growing on the Internet"; Bacon's; Jul. 1, 1995, News clipping.
Abate; "Major Deal to Map Internet Future"; San Francisco Examiner; Dec. 12, 1996; 1 pg.
Abrahams, memo subject: "Filter and Memory Problems", Doc. Page Identifier(s):PRGY 0783-0785, May 26, 1987.
Abstracts from files in info-mac/comm/inet/web Aug. 18, 1996, pp. 1-45.
Adams; "Game Credits"; available at http://www.designersnotebook.com/Game_Credits/game_credits.htm; undated; 8 pages.
ADMedium Newsletter, Dec. 1, 1996, pp. 1-19.
Advertising brochhure for "Trak-21", by Digital Biometics, Inc., Gaming Division, 5600 Rowland Road, Minnetonka MN 55343.
Advertising page for "Tracker-Plus TP-700 Player Tracking Equipment for Table Games", by Open Technologies, 6520 Platt Ave., Suite 672, West Hill, CA 91307.
Advertising pp. (15-16 and Order Form) for QQP games, in eStrategy Plus, believed to be from 1994.
Ahn "Help getting res-rsa working with server . . . " available at http://groups.google.com/group/rec.games.netrek/browse_frm/thread/4da4c5af59745a61/fde76eab98a25b8a, dated Nov. 15, 1994, 3 pages.
Ahn "Re: www.netrek.org—no longer the game?", available at http://groups.google.com/group/rec.games.netrek/msg/ee9a7af9f7a39305, Oct. 23, 1998, 2 pages.
Alsop; "PointCast and Its Wannabes"; Fortune; Nov. 25, 1996; 2 pgs.
Amparano et al., "Phone Firms Battle Cable-TV Operators Over Providing Fiber-Optic Home Links", The Wall Street Journal, Doc. Page Identifier(s): PRGY 1575-1576, Sep. 9, 1988.
Andrews, "Uses Grow for Video Alterations", The New York Times, Doc. Page Identifier(s):PRGY 2632-2633, Dec. 15, 1988.
Andrews; "User Friendly: PointCast's 'Push' Method Could Be The Next Wave"; Personal Technology; Dec. 1, 1996; 1 pg.
Appleman, "Appl.Core", Doc. Page Identifier(s):PRGY 0863-0899, Mar. 18, 1988.
Appleman, memo subject: "A Discussion of the State of the Trintex", Doc. Page Identifier(s):PRGY 0786-0791, May 28, 1987.
Appleman, memo subject: "Issues and Actions", Doc. Page Identifier(s):PRGY 0781-0782, Jan. 21, 1987.
Arcadehistory, [Video Game] Lunar Lander © Atari, Inc. [Sunnyvale, CA, USA] (1979), Description, Last Edition Apr. 4, 2008, 8 pages.
Ashkennas et al., memo subject: "Producer System", Doc. Page Identifier(s):PRGY 0382-0394, Sep. 17, 1986.
Ashkennas, et al., memo subject: "Producer System Interim Plan", Doc. Page Identifier(s):PRGY 0440-0478, Sep. 17, 1986.
Ashkennas, et al., memo subject: "Producer Systems/Applications Development Interim Transition Plan", Doc. Page Identifier(s):PRGY 0479-0502, Aug. 21, 1986.
Ashkennas, memo subject: "Interface Task Force Minutes", Doc. Page Identifier(s):PRGY 0399-0401, May 29, 1986.
Ashkennas, memo subject: "Interface Task Force Minutes", Doc. Page Identifier(s):PRGY 0432-0435, Jun. 2, 1986.
Ashkennas, memo subject: "Producer 2 Batch Code", Doc. Page Identifier(s):PRGY 0402-0431, May 15, 1986.
Askoy; "News You've Asked To Use"; Mediaweek; Jun. 12, 1995; 5(24); p. 20.
Aumente "The New Wave Of Computer Information Services", Washington Journalism Review, Doc. Page Identifier(s):PRGY 1555-1558, Nov. 1988.
Author unknown , memo subject: "API Planning Session", Doc. Page Identifier(s):PRGY 1965-1980, Aug. 26, 1987.
Author unknown , memo subject: "API Planning Session", Doc. Page Identifier(s):PRGY 1981-1985, Aug. 27, 1987.
Author unknown , memo subject: "API Support Group Notes", Doc. Page Identifier(s):PRGY 1955-1964, Apr. 7, 1987.
Author unknown , memo subject: "Assumptions about objects + traffic", Doc. Page Identifier(s):PRGY 1991-1997 Apr. 18/?.
Author unknown , memo subject: "Current Stocks", Doc. Page Identifier(s):PRGY 1946-1952 Mar. 30, 1988.
Author unknown , memo subject: "Delivery Plan Highlights", Doc. Page Identifier(s):PRGY 2119-2120, Jan. 17, 1985.
Author unknown , memo subject: "Harford Development Plan", Doc. Page Identifier(s):PRGY 1900-1902, Date unknown.
Author unknown , memo subject: "Notes on Dow Jones", Doc. Page Identifier(s):PRGY 1953 Mar. 15, 1988.
Author unknown , memo subject: "Notes to Norm", Doc. Page Identifier(s):PRGY 2009-2010, Sep. 1985.

(56) References Cited

OTHER PUBLICATIONS

Author unknown , memo subject: "Notes", Doc. Page Identifier(s):PRGY 1910, Date unknown.
Author unknown , memo subject: "Notes", Doc. Page Identifier(s):PRGY 1930, Date unknown.
Author unknown , memo subject: "PCS2—Network Simulator", Doc. Page Identifier(s):PRGY 1936, Mar. 29, 1988.
Author unknown , memo subject: "Prod. System-Host Design", Doc. Page Identifier(s):PRGY 2328-2349, Jan. 12, 1987.
Author unknown , memo subject: "Proposal for Richard Merritt", Doc. Page Identifier(s):PRGY 1928-1929, Date unknown.
Author unknown , memo subject: "Quick Quotes", Doc. Page Identifier(s):PRGY 1937-1941, Mar. 30, 1988.
Author unknown , memo subject: "Quick Quotes", Doc. Page Identifier(s):PRGY 1942-1945, Mar. 22, 1988.
Author unknown , memo subject: "Screen Description", Doc. Page Identifier(s):PRGY 1918-1926, Date unknown.
Author unknown , memo subject: "Trintex Background", Doc. Page Identifier(s):PRGY 2323-2326, date unknown.
Author unknown , memo subject: "Trintex Launch Level", Doc. Page Identifier(s):PRGY 2153-2312, Jan. 27, 1986.
Author unknown , memo subject: "Trintex Launch Level", Doc. Page Identifier(s):PRGY 2121-2150, Jan. 27, 1986.
Author unknown ,"Charts", Doc. Page Identifier(s):PRGY 1633-1637, Apr. 4, 1986.
Author unknown, "EPAPO Project Status Update", Doc. Page Identifier(s):PRGY 2528-2530, May 18, 1988.
Author unknown, memo subject "Jumpwords", Doc. Page Identifier(s): PRGY 1775-1779, date unknown.
Author unknown, memo subject: "Trintex Code Promotion", Doc. Page Identifier(s):PRGY 1792-1793, Apr. 15, 1987.
Author unknown, API Support Group Weekly Bulletin, Doc. Page Identifier(s):PRGY 1954, Apr. 10, 1987.
Author unknown, "Appl. Dev. Reference Manual", Doc. Page Identifier(s):PRGY 2745-3027, Dec. 2, 1987 to Mar. 28, 1988.
Author unknown, "Consolidated Functional Requirements", Doc. Page Identifier(s):PRGY 2402-2459, Apr. 5, 1985.
Author unknown, "Dialogue with Hewitt", Doc. Page Identifier(s):PRGY 1988, Nov. 1985.
Author unknown, "Memo", Doc. Page Identifier(s):PRGY 1690, date unknown.
Author unknown, "Menu", Doc. Page Identifier(s)PRGY 1742, date unknown.
Author unknown, "Notes", Doc. Page Identifier(s):PRGY 1660-1662, Feb. 10, 1987.
Author unknown, "Out of Plan in Order of Priority", Doc. Page Identifier(s):PRGY 1748, Oct. 7, 1987.
Author unknown, "Prodigy We're Bringing The Future Home", Doc. Page Identifier(s):PRGY 2313-2322, date unknown.
Author unknown, "Producer A Object ID Assignment", Doc. Page Identifier(s):PRGY 2396-2401, Apr. 8, 1987.
Author unknown, "TPW System overview", Doc. Page Identifier(s):PRGY 2391-2395, Feb. 19, 1987.
Author unknown, "Trintex Assist.", Doc. Page Identifier(s):PRGY 1844-1851, Apr. 27, 1987.
Author unknown, "Trintex Assistant Status", Doc. Page Identifier(s):PRGY 1718-1727, Jan. 13, 1987.
Author unknown, "TTX Assistant", Doc. Page Identifier(s):PRGY 1747, Oct. 10, 1987.
Author unknown, "Viewpath Programs(Driver 5)", Doc. Page Identifier(s):PRGY 1754, Jul. 16, 1986.
Author unknown, "Viewpath, PS Development", Doc. Page Identifier(s):PRGY 1664-1682, date unknown.
Author unknown, "Where Questions", Doc. Page Identifier(s):PRGY 1697-1699, date unknown.
Author unknown, "4.0 Functional Additions", Doc. Page Identifier(s):PRGY 2200-2299, date unknown.
Author unknown, "Banking from signup to sign on", Sunday Capital, Annapolis, MO, Doc. Page Identifier(s):PRGY 2624, Nov. 20, 1988.
Author unknown, "Bell Atlantic, IBM Get Directory System Pact for New Zealand", Wall Street Journal, Doc. Page Identifier(s):PRGY 2627, Dec. 15, 1988.
Author unknown, "BellSouth A New Service For Cable TV", The Wall Street Journal, Doc. Page Identifier(s):PRGY 2664, Dec. 7. 1988.
Author unknown, "Chart", Doc. Page Identifier(s):PRGY 0957, Apr. 12, 1985.
Author unknown, "CPEP looking to Prodigy for the Latest Informaiton", Science Museum of Connecticut, Doc. Page Identifier(s):PRGY 2616, Nov./Dec. 1988.
Author unknown, "Fewer Tots Expected by the Year 2000", Wall Street Journal, Doc. Page Identifier(s):PRGY 2627, Dec. 15, 1988.
Author unknown, "General Ground Rules Notes", Doc. Page Identifier(s):PRGY 0976-0988, date unknown.
Author unknown, "Groceries Delivered by Computer", the Alpharetta Revue, Doc. Page Identifier(s):PRGY 2664, Dec. 1, 1988.
Author unknown, "GTE Corp. Makes Waves in Videotext Market", Gallagher Report, NY, NY, Doc. Page Identifier(s):PRGY 2624, Nov. 21, 1988.
Author unknown, "Industry firms join computer listing service", Photo Marketing, Jackson, MI, Doc. Page Identifier(s):PRGY 2663, Nov. 1988.
Author unknown, "Membership Marketing Agenda", Doc. Page Identifier(s):PRGY 1468-1516, 1988.
Author unknown, "Notes", Doc. Page Identifier(s):PRGY 0956, Mar. 29, 1985.
Author unknown, "Notes", Doc. Page Identifier(s):PRGY 0958-0960, Mar. 29, 1985.
Author unknown, "Notes", Doc. Page Identifier(s):PRGY 0967-0968, Apr. 4, 1985.
Author unknown, "Prodigy Advertisement", Women's Wear Daily, Doc. Page Identifier(s):PRGY 2661-2662, Dec. 5, 1988.
Author unknown, "Prodigy making another attempt at videotext services", Knight-Ridder Newspaper Service, Doc. Page Identifier(s):PRGY 2619-2620, Nov. 20, 1988.
Author unknown, "Prodigy Services Company", Doc. Page Identifier(s):PRGY 2642, date unknown.
Author unknown, "Prodigy Services Company", Doc. Page Identifier(s):PRGY 2531-2567, Jun. 15, 1989.
Author unknown, "Prodigy", Doc. Page Identifier(s):PRGY 2672-2744, Jan. 1988.
Author unknown, "Reception System Functional Objectives", Doc. Page Identifier(s):PRGY 0240-0310, Jan. 15, 1986.
Author unknown, "Reception System Technical Review", Doc. Page Identifier(s):PRGY 1433-1441, date unknown.
Author unknown, "Reception System", Doc. Page Identifier(s):PRGY 1442-1466, Jun. 18, 1986.
Author unknown, "Reception Systems Functional Specifications", Doc. Page Identifier(s):PRGY 0311-0356, Feb. 20, 1986.
Author unknown, "Retail Sales Training Kit", Doc. Page Identifier(s):PRGY 1582-1599, date unknown.
Author unknown, "Table of Contents", Doc. Page Identifier(s):PRGY 0901-0953, date unknown.
Author unknown, "Task Force Notes", Doc. Page Identifier(s):PRGY 0954-0955, Apr. 9, year unknown.
Author unknown, "Task Force Notes", Doc. Page Identifier(s):PRGY 0961, Apr. 2, 1985.
Author unknown, "Task Force Notes", Doc. Page Identifier(s):PRGY 0962, Apr. 3, 1985.
Author unknown, "Task Force Notes", Doc. Page Identifier(s):PRGY 0963, Apr. 8, 1985.
Author unknown, "Task Force Notes", Doc. Page Identifier(s):PRGY 0964-0966, Apr. 3, 1985.
Author unknown, "Task Force Notes", Doc. Page Identifier(s):PRGY 0969, Apr. 8, 1985.
Author unknown, "Task Force Notes", Doc. Page Identifier(s):PRGY 0970, Apr. 3, 1985.
Author unknown, "The Bulletin", Doc. Page Identifier(s):PRGY 2517, date unknown.
Author unknown, "The CPC Newsletter", Doc. Page Identifier(s):PRGY 2634-2641, Dec. 1988.

(56) References Cited

OTHER PUBLICATIONS

Author unknown, "The Prodigy Service Background", Doc. Page Identifier(s):PRGY 1327-1329, date unknown.
Author unknown, "Trintex Architecture", Doc. Page Identifier(s):PRGY 0971-0975, Mar. 31, 1985.
Author unknown, "Trintex Assistant Design Document", Doc. Page Identifier(s):PRGY 1602-1604, date unknown.
Author unknown, "U.S. computer firms counting on Europe", USA Today, Doc. Page Identifier(s):PRGY 2660, Dec. 9, 1988.
Author unknown, "Vanguard draws investors", USA Today, Doc. Page Identifier(s):PRGY 2648, Dec. 6, 1988.
Author unknown, "Who's Who in Video Banking Nationwide", Doc. Page Identifier(s):PRGY 2670, Dec. 7, 1988.
Author unknown, memo subject: "Browse-D7.Hold.Tbolo", Doc. Page Identifier(s):PRGY 1794, Jun. 5, 1987.
Author unknown, memo subject: "API Planning Session", Doc. Page Identifier(s):PRGY 0793-0800, Aug. 27, 1986.
Author unknown, memo subject: "Application Layer Notes", Doc. Page Identifier(s):PRGY 1089-1091, date unknown.
Author unknown, memo subject: "Application Program Interface", Doc. Page Identifier(s):PRGY 1100, date unknown.
Author unknown, memo subject: "Arch Overview Notes", Doc. Page Identifier(s):PRGY 1077-1078, Mar. 19, 1985.
Author unknown, memo subject: "Arch Overview Notes", Doc. Page Identifier(s):PRGY 1080-1081, Mar. 19, 1985.
Author unknown, memo subject: "Arch Overview Notes", Doc. Page Identifier(s):PRGY 1083, Mar. 19, 1985.
Author unknown, memo subject: "Arch Overview Notes", Doc. Page Identifier(s):PRGY 1087, Mar. 15, 1985.
Author unknown, memo subject: "Arch Overview Notes", Doc. Page Identifier(s):PRGY 1088, Mar. 14, 1985.
Author unknown, memo subject: "Arch Overview Notes", Doc. Page Identifier(s):PRGY 1092-1094, date unknown.
Author unknown, memo subject: "Arch Overview Notes", Doc. Page Identifier(s):PRGY 1098, Mar. 14, 1985.
Author unknown, memo subject: "Arch. Group Notes", Doc. Page Identifier(s):PRGY 1096-1097, Mar. 20, 1985.
Author unknown, memo subject: "Business System Interface Notes", Doc. Page Identifier(s):PRGY 0991, Mar. 15, 1985.
Author unknown, memo subject: "Chart", Doc. Page Identifier(s):PRGY 0742-0744, date unknown.
Author unknown, memo subject: "Data collection Requirements Notes", Doc. Page Identifier(s):PRGY 0990, date unknown.
Author unknown, memo subject: "Driver 1,", Doc. Page Identifier(s):PRGY 0852, Jun. 30, 1985.
Author unknown, memo subject: "External Provider Environment", Doc. Page Identifier(s):PRGY 2527, May 1988.
Author unknown, memo subject: "Founding and Charter Member Satisfaction Survey", Doc. Page Identifier(s):PRGY 1171-1211, Sep. 1988.
Author unknown, memo subject: "Function Placement Notes", Doc. Page Identifier(s):PRGY 1095, date unknown.
Author unknown, memo subject: "Heading ID's", Doc. Page Identifier(s):PRGY 0395, date unknown.
Author unknown, memo subject: "High Level Function Placement", Doc. Page Identifier(s):PRGY 1040-1047, Mar. 26, 1985.
Author unknown, memo subject: "High Level Function Placement", Doc. Page Identifier(s):PRGY 1060-1076, Mar. 26, 1985.
Author unknown, memo subject: "Initial Product Req.", Doc. Page Identifier(s):PRGY 0848-0849, Jan. 8, 1986.
Author unknown, memo subject: "Keywords Notes", Doc. Page Identifier(s):PRGY 1049-1052, Mar. 22, 1985.
Author unknown, memo subject: "Matrix", Doc. Page Identifier(s):PRGY 1053-1067, date unknown.
Author unknown, memo subject: "Meeting Today", Doc. Page Identifier(s):PRGY 1082, Mar. 25, 1985.
Author unknown, memo subject: "Mission Notes", Doc. Page Identifier(s):PRGY 1001-1014, date unknown.
Author unknown, memo subject: "Network Naming Standards", Doc. Page Identifier(s):PRGY 0396-0398, date unknown.
Author unknown, memo subject: "Notes", Doc. Page Identifier(s):PRGY 1102, date unknown.
Author unknown, memo subject: "Notes", Doc. Page Identifier(s):PRGY 2500-2508, date unknown.
Author unknown, memo subject: "Object for TTS_MNU01", Doc. Page Identifier(s):PRGY 1101, Feb. 17, 1986.
Author unknown, memo subject: "Objectives of the Task Force", Doc. Page Identifier(s):PRGY 0710-0728, date unknown.
Author unknown, memo subject: "Prodigy Services Company", Doc. Page Identifier(s):PRGY 1330, date unknown.
Author unknown, memo subject: "Producer System", Doc. Page Identifier(s):PRGY 0438-0439, date unknown.
Author unknown, memo subject: "Producer Tools", Doc. Page Identifier(s):PRGY 0436-0437, Sep. 22, 1986.
Author unknown, memo subject: "Publishing—Early Launch Work Plan", Doc. Page Identifier(s):PRGY 0733-0739, Nov. 20, 1985.
Author unknown, memo subject: "Qualitative Analysis: Prodigy Interactive Personal Service: "The Market" Focus Groups", Elrick and Lavidge, inc., Doc. Page Identifier(s):PRGY 1220-1241, Oct. 1988.
Author unknown, memo subject: "Question and Answer Models", Doc. Page Identifier(s):PRGY 0691-0709, Nov. 1, 1985.
Author unknown, memo subject: "Reception Subsystems Notes", Doc. Page Identifier(s):PRGY 1039, Apr. 2, 1985.
Author unknown, memo subject: "Reception Subsystems Notes", Doc. Page Identifier(s):PRGY 1048, Apr. 2, 1985.
Author unknown, memo subject: "Reception System Issues", Doc. Page Identifier(s):PRGY 0745-0779, Aug. 8, 1986.
Author unknown, memo subject: "Reception System Technical Review", Doc. Page Identifier(s):PRGY 1372-1427, date unknown.
Author unknown, memo subject: "Reception System/APi Team Reorganization", Doc. Page Identifier(s):PRGY 0730, date unknown.
Author unknown, memo subject: "Retail Dependencies", Doc. Page Identifier(s):PRGY 0780, date unknown.
Author unknown, memo subject: "Strategy Conference", Doc. Page Identifier(s):PRGY 1212-1217, 1993.
Author unknown, memo subject: "Study Group Objectives", Doc. Page Identifier(s):PRGY 0850, date unknown.
Author unknown, memo subject: "TaskDesc. Notes", Doc. Page Identifier(s):PRGY 1086, Mar. 22, year unknown.
Author unknown, memo subject: "The Producer—App. Interfarce", Doc. Page Identifier(s):PRGY 0590-0592, date unknown.
Author unknown, memo subject: "The Trintex Producer Workstation", Doc. Page Identifier(s):PRGY 2514-2516, Jan. 21, 1987.
Author unknown, memo subject: "TPF2 Functions", Doc. Page Identifier(s):PRGY 0992-1000, Mar. 26, 1985.
Author unknown, memo subject: "Trintex Application Model Dev. Proposal", Doc. Page Identifier(s):PRGY 0655-0690, Aug. 1985.
Author unknown, memo subject: "Trintex Architecture Group Work Plan", Doc. Page Identifier(s):PRGY 1084-1085, date unknown.
Author unknown, memo subject: "Trintex External Provider Activities", Doc. Page Identifier(s):PRGY 2520-2526, Feb. 8, 1988.
Author unknown, memo subject: "Trintex Questions and Answers", Doc. Page Identifier(s):PRGY 1357-1371, date unknown.
Author unknown, memo subject: "Trintex System Architecture", Doc. Page Identifier(s):PRGY 0823-0847, May 15, 1985.
Author unknown, memo subject: "Trintex", Doc. Page Identifier(s):PRGY 1103-1113, date unknown.
Author unknown, memo subject: "Applications", Doc. Page Identifier(s):PRGY 2002-2005, Apr. 18/?.
Author unknown, memo subject: "Guide", Doc. Page Identifier(s):PRGY 1852-1893, Feb. 19, 1987.
Author unknown, memo subject: "Incompletely determined objects", Doc. Page Identifier(s):PRGY 1998-1999 Apr. 19, ?.
Author unknown, memo subject: "ParmScript Specification", Doc. Page Identifier(s):PRGY 2472-2480, May 1, 1987.
Author unknown, memo subject: "Producer Object assembly", Doc. Page Identifier(s):PRGY 2350-2380, Jan. 29, 1987.
Author unknown, memo subject: "Producer System Data Flow", Doc. Page Identifier(s):PRGY 2492, Jan. 27, 1987.
Author unknown, memo subject: "Producer Workstation", Doc. Page Identifier(s):PRGY 2381-2390, Feb. 17, 1987.

(56) References Cited

OTHER PUBLICATIONS

Author unknown, memo subject: "QC Requirements (Linkage)", Doc. Page Identifier(s):PRGY 2463-2471, Mar. 6, 1987.
Author unknown, memo subject: "Quick Quotes", Doc. Page Identifier(s):PRGY 1935 Mar. 22, 1988.
Author unknown, memo subject: "TPW—Producer A", Doc. Page Identifier(s):PRGY 2460-2462, Mar. 4, 1987.
Author Unknown, memo subject: "Trintex Assistant Capabilities", Doc. Page Identifier(s):PRGY 1709-1711, Aug. 15, 1987.
Author unknown, memo subject: "Unique Keys", Doc. Page Identifier(s):PRGY 2000-2001, Apr. 19/?.
Bailey, "Sears Offers Added Credit To Boost Holiday Volume", The Wall Street Journal, Doc. Page Identifier(s):PRGY 2667, Dec. 7, 1988.
Bailey, Steve et al., "A Cautionary Tale In The News", Boston Globe, Aug. 13, 1996, p. D1.
Bank; "Inverted Web: How Net is Becoming More Like Television To Draw Advertisers"; Wall Street Journal; Dec. 13, 1996; 3 pgs.
Bank; "Microsoft Picks On-Line News From PointCast"; Wall Street Journal; Dec. 12, 1996; 1 pg.
Barmash "No Major Cuts Expected in Advertising by Sears", New York Times, Doc. Page Identifier(s): PRGY 1559, Nov. 10, 1988.
Barna, Ed., "Make Money on the Internet, Maybe", Vermont Business Magazine, vol. 24, No. 7, Jul. 1996, p. 50.
Barrie et al.; "The World Wide Web As An Instructional Tool"; Science; Oct. 18, 1996; 274; pp. 371-372.
Basch; "Interchange Online Network—The Elements for Its Success Are Already in Place"; Link-Up; May 1, 1995, 12(3), pp. 8-9; Dialog File 233: Microcomputer Abstracts; 0385575.
Bates; "Electronic Clipping Service. A New Life for SDIs"; Online, Jul. 3, 1994, 18(4); pp. 43-47. 49-5; Dialog File 202: Information Science Abs.; 00184574.
Beall, memo subject: "Trintex Assist.", Doc. Page Identifier(s):PRGY 1898-1899 Feb. 2, 1987.
Beattie, memo subject: "PODB Definitions", Doc. Page Identifier(s):PRGY 0358-0381, Sep. 26, 1986.
Bell; "NETstuff: Free Personalized Internet news"; PointCast; Feb. 14, 1996; http://www.monitor.ca/monitor/issues/vol3iss7/netstuff.html; 1 p.
Bell; The Electronic Scholar's Assistant; Computer in Libraries; Oct. 1990; pp. 15-16; Dialog File 61:LISA; 02087937.
Bellar et al., memo subject: "TPF Driver System", Doc. Page Identifier(s):PRGY 0814-0822, Apr. 12, 1985.
Bellar, "TPF Driver System", Doc. Page Identifier(s):PRGY 0169-0178, Apr. 17, 1985.
Bellar, memo subject: "Establishing a reliable and effective procedure", Doc. Page Identifier(s):PRGY 0853-0862, Aug. 28, 1985.
Berst; "'Push' Products Redefine Internet"; PC Week; Nov. 25, 1996; p. 63.
Bibliografia Utilizzata per la stesura della tesi, http://digilander.iol.it/Imassaron/biblio.html, date unknown, pp. 1-9.
Birman et al., "Exploiting Virtual Synchrony in Distributed Systems" pp. 123-138 1987.
Birman et al., Sun Technology, pp. 90-104 1989.
Black, K., "Chapter 32: A Graphical Web Page Counter," in HTML & CGI Unleashed, Sams.net Publishing, 1st Edition 1995, pp. 725-749.
Borenstein; "Multimedia Electronic Mail: Will the Dream Become a Reality?"; Communications of the ACM; Apr. 1991, 34(4), pp. 117-119.
Bracken, memo subject: "Producer Host Envir. Spec.", Doc. Page Identifier(s):PRGY 0503-0589, Aug. 27, 1986.
Brian; "Cookies (Client-Side Persistent Information) and Their Use"; Netscape; 1995; 2 pp.
Briney, memo subject: "Generic Copy Approach", Doc. Page Identifier(s):PRGY 1797-1799, Feb. 22, 1987.
Briney, memo subject: "Trintex Assistant Feedback", Doc. Page. Identifier(s):PRGY 1663, Feb. 22, 1987.
Briney, memo subject: "Generic Copy Approach", Doc. Page Identifier(s):PRGY 1907-1909, Feb. 22, 1987.
Brisbin; "AppleSearch: The Latest Version of Apple's Information-Retrieval Tool Makes a Great Internet Clipping Service"; MacUser; Jun. 1, 1995, 11(6), p. 46, Dialog File 233: Microcomputer Abstracts; 0387029.
Brown; "LapLink Keeps in Touch"; PC Magazine; Jan. 7, 1997; p. 60.
Bulterman et al., A Structure for Transportable, Dynamic Multimedia Documents, USENIX, pp. 137-154, 1991.
Carney, memo subject: "Guide Maps", Doc. Page Identifier(s):PRGY 1911, Feb. 26, 1987.
Carrig et al.; "Ziff-Davis Electronic Information Acquires SandPoint"; PR Newswire San Francisco; Mar. 1, 1994; 3 pgs.
Carroll "IBM Unveils Midrange Computer Line in Bid to Reverse Slide in Market Share", The Wall Street Journal, Doc. Page Identifier(s): PRGY 1252, Jun. 22, 1988.
Carroll, "IBM'S Telecommunications Effort With Rolm Unit Has Turned Sour", The Wall Street Journal, Doc. Page Identifier(s):PRGY 2671, Dec. 12, 1988.
Chan; "Globalization of Internet Access"; Proceedings of the IEEE International Conference on Industrial Technology, 1996; pp. 485-488.
Clarke; "Cookies"; Xamax Consultancy Pty Ltd.; 1996-2001; pp. 1-10.
Cleland; "A Gaggle of Web Guides Vies For Ads"; Advertising Age; Apr. 17, 1995; News clipping.
Conhaim; "The Year In Review"; Link-Up; Nov./Dec. 1996; 13(6); pp. 5, 34+.
Continua Reports—Sep. 1995, pp. 1-27.
Cooperstock et al.; "Why Use a Fishing Line When You Have a Net? An Adaptive Multicast Data Distribution Protocol"; USENIX Technical Conference; Jan. 22-26, 1996; pp. 343-352.
Dawley, "GD/VADW Dawley Presentation", Doc. Page Identifier(s):PRGY 2103-2116, Jun. 27, 1986.
Dawley, memo subject: "App. Group Model (AGM)", Doc. Page Identifier(s):PRGY 0740, Feb. 6, 1986.
Dawley, memo subject: "Producer System Format", Doc. Page Identifier(s):PRGY 2493-2499, Apr. 24, 1987.
Dawley, memo subject: "Richard Merritt's Promotion", Doc. Page Identifier(s):PRGY 0729, Oct. 16, 1986.
Dawley, memo subject: "Routing Slip", Doc. Page Identifier(s):PRGY 0741, Jan. 25, year unknown.
Dawley, memo subject: "Survey of keyword lengths", Doc. Page Identifier(s):PRGY 0792, Feb. 18, 1987.
Dawley, memo subject: "Your memo of Feb. 3, 1986", Doc. Page Identifier(s):PRGY 0801-0805, Feb. 10, 1986.
Day, memo subject: "September Executive Measurements Package", Doc. Page Identifier(s):PRGY 1242-1244, Oct. 21, 1988.
Day, W., "Unofficial Mechwarrier II FAQ—Part 1 (of 2): What is the game like???" Oct. 7, 1996, 37 pages.
December, J., "Chapter 11: Design and Implementation Style and Techniques," in HTML & CGI Unleashed, Sams.net Publishing, 1st Edition 1995, pp. 221-250.
December, J., "Chapter 12: Basic HTML," in HTML & CGI Unleashed, Sams.net Publishing, 1st Edition 1995, pp. 251-278.
December, J., "Chapter 13: Advanced HTML," in HTML & CGI Unleashed, Sams.net Publishing, 1st Edition 1995, pp. 279-302.
December, J., "Chapter 17: Implementation Tools," in HTML & CGI Unleashed, Sams.net Publishing, 1st Edition 1995, pp. 341-359.
Declaration of David Ahn (including Exhibit A-S), Dec. 14, 2007, 134 pages.
Declaration of Kevin Smith, Dec. 17, 2007, 6 pages.
Dedrick, memo subject: "A Language for Describing TBOL", Doc. Page Identifier(s):PRGY 2509-2513, Feb. 24, 1987.
Dedrick, R., "A Consumption Model for Targeted Electronic Advertising," IEEE Multimedia, Jun. 1995; vol. 2, Issue 2, pp. 41-49.
Derringer; "Freemark Delays Release of Free E-Mail Until April"; Bacon's; Feb. 19, 1996; pp. 1, 20.
Dieberger; "Browsing the WWW by Interacting With a Textual Virtual Envrinment—A Framework for Experimenting With Navigational Metaphors"; Hypertext '96; 1996; pp. 170-179.
Digital Espresso for Aug. 27, 1996, http://www.mentorsoft.com/DE/jn960827.html.
Dorst, memo subject: "Service Date", Doc. Page Identifier(s):PRGY 1927, Dec. 8, 1988.

(56) References Cited

OTHER PUBLICATIONS

Dultz, "Even Generals QQP'S 'Quality Over Quantity' Production," Computer Games Strategy Plus, Dec. 1993, Issue 37, p. 14.
EC2@USC—Digital Commerce Center—Internet Advertising, 1997-2001, EC2@USC, pp. 1-7.
Edelhart "Ten Commandments, Revisited", PC Week, Doc. Page Identifier(s): PRGY 1218-1219, May 30, 1988.
Edelman, "Where does Spyware Come From? 'Why' Spyware Revenue Resources", May 2006, available at http://www.benedelman.org/presentations/asc-2006.pdf, pp. 1-16.
Egan; "Online Clipping Services Deliver: Electronic Tools Retrieve News You Can Use"; PC Today; Mar. 1, 1995, 9(3), pp. 20-24, Dialog File 233: Microcomputer Abstracts; 0379524.
Eliezer, "Navigating Main Street: a user's experience with interactive TV; GTE Main Street", 9 The Seybold Report on Desktop Publishing No. 5, 3 (Jan. 15, 1995), 9 pages.
Eng; "Bits & Bytes"; Business Week; Jul. 29, 1996; No. 3486; p. 68A(1).
Esposito, memo subject: "TPF Task Force Results", Doc. Page Identifier(s):PRGY 2011-2012, Mar. 27, 1985.
Essex, "Prodigy: An On-Line Service for the Masses", PC Resource, Doc. Page Identifier(s):PRGY 2657-2658, Jan. 1989.
Estavanick, "Designing On-Line, Multiplayer Games", in Game Developer, pp. 14-21-, Premeir 1994.
E-Tailer's Digest in Gifts & Decorative Accessories, www.etailersdigest.com Aug. 1998.
Farrow; "A Route to the Internet" Open Computing, Jun. 1, 1994, 11(6), pp. 105-107, Dialog File 233: Microcomputer Abstracts; 0351749.
Feinberg, "Bust or Boom?", Adweek's Marketing Week\, Doc. Page Identifier(s):PRGY 2651-2656, Dec. 5, 1988.
Finnie; "Free News You Can Use"; pccomputing.com; 1 pg.
Finnie; "Look, Ma! No Brower"; PC Magazine; Jan. 7, 1997; p. 60.
Fisher, "Deeper Into the Well", Microtimes, Doc. Page Identifier(s):PRGY 2628-2630, Mid-Dec. 1988.
Flaherty, Francis, "Cyberspace Swindles: Old Scams, New Twists," The New York Times, Jul. 16, 1994, p. 25.
Flynn et al.; "The Daily Me: Laying Out Tomorrow's (Electronic) News"; PC Magazine; Sep. 14, 1993; 12(15); p. 29(1).
Flynn, "In Search of Nielsens for the Internet", The New York Times website, May 29, 1995, available at http://www.nytimes.com/1995/05/29/business/in-search-of-nielsens-for-the-internet.html, pp. 1-3, printed on Mar. 18, 2009.
Forsdick at al., "Initial Experience with Multimedia Documents in Diamond" pp. 99-113 (ed. H.T. Smith) 1984.
Frank, Howard, "Telcos and Newspapers Must Cooperate to Win," Networking Management, vol. 10, No. 7 Jun. 1992, p. 46.
Fried; "NewsNet: An Offering of Current and Specialized Information"; Online; Jul. 1985; 9(4); pp. 99-105.
Frook, CommunicationsWeek, Interactive Age, News to the desktop: Vendors deliver personalized news to users via the Net, 3 pgs. 1996.
Frook, J., "Search Engine Advertising: Web Marketing Push," Communications Week, Oct. 9; 1995, pp. IA11, IA15 (4 pages).
Frook; "PointCast Gets Personal"; PointCast; Feb. 22, 1996; 1 p.
Fryxell; "NewsNet Stands Alone—If This Service's 800-Pluss Full-Text Industry Newsletters Can't Fill Your Research Needs, Then Nothing Can"; Link-Up; Nov. 1, 1994, 11(6), pp. 8-9; Dialog File 233: Microcomputer Abstracts; 0366803.
Galambos, memo subject: "Jumpwords and Architecture", Doc. Page Identifier(s):PRGY 1915, Feb. 5, 1987.
Galambos, memo subject: "13 byte jumpwords", Doc. Page Identifier(s):PRGY 1800, Feb. 25, 1987.
Galambos, memo subject: "Copy/File for Hartford", Doc. Page Identifier(s):PRGY 1795-1796, Jan. 26, 1987.
Galambos, memo subject: "Copy/File for Hartford", Doc. Page Identifier(s):PRGY 1914, Feb. 23, 1987.
Galambos, memo subject: "Decoder Macros for Physical Key Names", Doc. Page Identifier(s):PRGY 1744-1745, May 6, 1987.
Galambos, memo subject: "Guide", Doc. Page Identifier(s):PRGY 1687-1689, Feb. 19, 1987.
Galambos, memo subject: "Your Trintex Assistant Memo of Feb. 2, 1987", Doc. Page Identifier(s):PRGY 1749-1750, Feb. 19, 1987.
Galambos, memo subject: "Human Factors Driver 7.1 Report", Doc. Page Identifier(s):PRGY 1605-1630, Jun. 26, 1987.
Galambos, memo subject: "Copy/File for Hartford", Doc. Page Identifier(s):PRGY 1714-1715, Jan. 26, 1987.
Galambos, memo subject: "Decoder Macros for Phys. Key names", Doc. Page Identifier(s):PRGY 1842-1843, May 6, 1987.
Galambos, memo subject: "File", Doc. Page Identifier(s):PRGY 1913, Feb. 23, 1987.
Galambos, memo subject: "User Profiles", Doc. Page Identifier(s):PRGY 1806-1812, Feb. 6, 1987.
Galambos, memo subject: "Your Trinex Assit memo of Feb. 2, 1987", Doc. Page Identifier(s):PRGY 1896-1897, Feb. 19, 1987.
Galambos, memo subject:, "Trintex Assistant Application Coding", Doc. Page Identifier(s):PRGY 1708,Jan. 20, 1987.
Geocrawler, The Knowledge Archive, from Tim Maffett Sep. 4, 1996, re: Chime script—[and other Chime news], pp. 1-3.
Gibson; Skills Count At Network Startup—INS Features Design, Operations Specialists for Hire; PC Week; Jan. 23, 1995, 12(3); p. 100; Dialog File 233: Mocrocomputer Abstract; 0373166.
Gifford et al.; "Boston Community Information System 1987-1988"; Massachusetts Inst. of Tech., Cambridge. Lab for Computer Science; May 1989, p. 250; Dialog File 6: NTIS; 1415753.
Gifford et al.; "Clipping Service User's Manual (Version 1.2)"; Massachusetts Inst. of Tech.; Cambridge. Lab. for Computer Science; Sep. 1987, p. 28, Dialog File 6: NTIS; 1326877.
Ginsburg, M. "Chapter 19: Principles of Gateway Programming," in HTML & CGI Unleashed, Sams.net Publishing, 1st Edition 1995, pp. 373-390.
Gitlitz, memo subject: Holding Frame, Doc. Page Identifier(s):PRGY 1912, Feb. 20, 1987.
Gitlitz, memo subject: "Content Architecture", Doc. Page Identifier(s):PRGY 1655-1659, Mar. 9, 1987.
Gitlitz, memo subject: Content Architecture, Doc. Page Identifier(s):PRGY 1903-1905, Feb. 27, 1987.
Goff, Leslie, "Wash Away Those Job-Hunting Jitters. The Opportunities are Endless on the Web," .Computerworld, Oct. 31, 1996, p. 12.
Goldberg: "The History of Computer Gaming Part 5—PLATO Ain't Just Greek"; (date unknown); 3 pp.
Goldes, memo subject: "Design Spec: Help Hub", Doc. Page Identifier(s):PRGY 1780-1791, Apr. 22, 9187.
Goldes, memo subject: "Single Key Help Access", Doc. Page Identifier(s):PRGY 1691-1692, Feb. 3, 1987.
Goldes, memo subject: "Help Guidelines", Doc. Page Identifier(s):PRGY 1813-1841, Apr. 7, 1987.
Gomes; "Cookies"; Feb. 13, 1996; 8 pp.
Google groups Rec.games.netrek, Search for dave ahn, available at http://groups.google.com/group/rec.games.netrek/earch?q=dave+ahn&start=0&scoring=d&, date unknown, 1 page.
Google Groups, Posting of hotwired-info to Alt.wired available at http://groups.google.com/group/alt.wired/msg/f851950bd8cc0d15 (Oct. 29, 1994, 13:05:19 EST), 4 pages.
Graetz; "The Origin of Spacewar"; Creative Computing, 39 E> Hanover Avenue, Morris Plains, NJ 07950; 1981; 15 pp.
Graham, I., A Complete Guide to HTML (Chapters 1, 5, 9), John Wiley & Sons, Inc. (Paul Farrell, ed., 1995), pp. 1-70, 231-278, 349-382.
Gray "Internet Growth Summary", available at http://www.mit.edu/people/mkgray/net/internet-growth-summary.html, last visited Dec. 17, 2007, 2 pages.
Green, T., "Newspage: The Web Way to Pay for News," Database, Dec. 1995, pp. 42-45.
Gutman, "News You Need to Succeed: Electronic Newspapers' Boost Your Effectiveness"; Success, Mar. 1991, 38(2), p. 12; Dialog File 2: INSPEC; 03905093.
Haar; "Young Turks Point The Way Offline"; CyerMedia; Oct. 14, 1996; 2 pgs.
Hadley "BRMH-1.7 available", available at http://groups.google.com/group/rec.games.netrek/msg/00b0aa5dfdb1ba99, Oct. 15, 1993, 2 pages.

(56) References Cited

OTHER PUBLICATIONS

Haglund, "Detroiters will get new buying power in their PCs next year", Sunday Chronicle, Muskegon, Michigan, Doc. Page Identifier(s):PRGY 2618, Nov. 27, 1988.
Haglund, "IBM, Sears gamble on videotex system", Nationally Syndicated Article, Doc. Page Identifier(s):PRGY 2663, Nov. 30, 1988.
Harler; "Distribute Coupons Via E-mail" Bacon's; Jan. 1996; News clipping.
Harmse, memo subject: "PS Development", Doc. Page Identifier(s):PRGY 2117-2118, Feb. 2, 1986.
Hassett et al.; "Technical Excellence Online Winner: The PointCast Network"; PC Magazine Online; 1996; 1 pg.
Hauss; "Technology Gives Early Warning Of News Breaks"; Public Relations Journal, May 1995; pp. 18-22.
Hauswirth et al. "A component and communication model for push systems1", presented at ESEC/FSE 00-Joint 7th European Software Engineering Conference 7th ACM SIGSOFT International Symposium on the Foundations of So, Sep. 6-10, 1999, Toulouse, France, pp. 1-20.
Hawkins, "Electronic Advertising On Online Information Systems"; Online; Mar. 1994, 18(2); pp. 26-39; Dialog File 15: ABI/INFORM; 00836506.
Hayes, M., "Customized Web Marketing—BroadVision's One-to-One software allows personalized sales pitches," Information Week, Dec. 18, 1995, 1 page.
Hecht, "What You Can Get Online", Computers & Electronics, Doc. Page Identifier(s): PRGY 1284-1297, Feb. 1985.
Heckhari, Christine et al., "Your High-Speed Data Services Buy Comes Down to Deciding If One Service Can Do It All or If You'll Need the Best of Breed," Network World, Jun. 12, 1995, p. 47.
Heilbrunn memo subject: "Production Description", Doc. Page Identifier(s):PRGY 1114-1169, Mar. 31, 1986.
Heilbrunn, memo subject: "Comments", Doc. Page Identifier(s):PRGY 1746, Oct. 28, 1987.
Heilbrunn, memo subject: "Trintex Assistant Versioning", Doc. Page Identifier(s):PRGY 1743, Nov. 23, 1987.
Heilbrunn, memo subject: "Trintex Product Descriptor", Doc. Page Identifier(s):PRGY 2568-2614, Feb. 23, 1987.
Heilbrunn, memo subject: "Image Capture", Doc. Page Identifier(s): PRGY 1700-1702, Mar. 5, 1987.
Henderson, "Funds offer strong, safe asset growth", USA Today, Doc. Page Identifier(s):PRGY 2649, Dec. 6, 1988.
Hewitt, "Letter to United Airlines (Kotar)", Doc. Page Identifier(s):PRGY 2017-2018, Dec. 18, 1985.
Heyman, memo subject: "Keywords, Jumpwords", Doc. Page Identifier(s):PRGY 1801-1805, Mar. 5, 1987.
Heywood, "Users Get a Closer Look at Virtual Private Networks—The Lates Monitoring Tools From Service Providers Make Sure Customers Are In The Know About Their Virtual Private Networks"; Data Communications; Jun. 1, 1994, 23(9), pp. 85-90, Dialog File 233: Microcomputer Abstracts; 0351803.
Hollis et al.; "Addressing Customers' Wireless Data Service Needs"; Telesis; Oct. 1995; No. 100; pp. 56-57.
Holub "Netrek FTP list", available at http://groups.google.com/group/rec.answers/msg/ebcb9a14c0d4de78, last-updated Dec. 14, 1994, 11 pages.
Holub "Netrek FTP list", available at http://groups.google.com/group/rec.games.netrek/msg/ac03262b6ac8c4c1, last-updated Jul. 21, 1994, 10 pages.
Holub "Netrek Server List", available at http://groups.google.com/group/rec.games.netrek/msg/8dbc01d4abee5ace, Last-Updated Debember 21, 1993, 8 pages.
Holub "rec.games.netrek FAQ List", available at http://groups.google.com/group/rec.games.netrek/browse_frm/thread/35a284ea78ce38bdb/9bbd5514020d51fa, last-updated Jul. 21, 1994, 28 pages.
Holub "rec.games.netrek FAQ List", available at http://groups.google.com/group/rec.games.netrek/msg/9bbd5514020d51fa, last-updated Jul. 21, 1994, 9 pages.
Horowitz, "TLCP0040", Doc. Page Identifier(s):PRGY 1431, Apr. 16, 1986.
Horowitz, "TLCR0000.DEF", Doc. Page Identifier(s):PRGY 1429, Apr. 16, 1986.
Horowitz, "TLCR0040", Doc. Page Identifier(s):PRGY 1432, Jun. 17, 1986.
Horowitz, "TLPEO4010", Doc. Page Identifier(s):PRGY 1428, Jun. 9, 1986.
Horowitz, "TLPH4010", Doc. Page Identifier(s):PRGY 1430, Jun. 17, 1986.
Horton, "The Power of ImaginNation", in Advertising Age, Mar. 7 1994.
Horwitt, "Freed Bells ready network services", Computerworld, Doc. Page Identifier(s):PRGY 2626, Dec. 12, 1988.
Huang et al., Software-Practice and Experience, 24(9):785-800 1994.
Hudson et al., "IBM to extend antitrust accord with EC commission Beyond '90", The Wall Street Journal, Doc. Page Identifier(s):PRGY 2631, Dec. 15, 1988.
Hyland, IAB Advertising ABC's, "Why Internet Advertising?", http://www.iab.net/advertise/content/adcontent.htm.
Information sheet for "Action Tracker Electronic Voucher System".
Internet Marketing Discussion list archive: Re: Fees for Web pages etc, Nov. 29, 1995, pp. 1-2.
Internet Marketing Discussion list archive: Re: Rotating sponsor banners?, Dec. 5, 1995, pp. 1-2.
Internet Marketing Discussion list archive: Rotating sponsor banners?, Dec. 2, 1995, pp. 1-2.
Internet Marketing Discussion list archive: Rotating sponsor banners?, Nov. 30, 1995, pp. 1-2.
Ito "Captain Commercial Service Starts Now", JTR, Doc. Page Identifier(s): PRGY 1268-1276, Jan. 1985, pp. 17-25.
Ivey "Re: AGRI poppage (was Re: Bombing a planet—is it an art?)", available at http://groups.google.com/group/rec.games.netrek/msg/df66eac4e839bc59, Aug. 17, 1994, 3 pages.
Jackson et al.; "InterMail: A Prototype Hypermedia Mail System"; Hypertext '91 Proceedings; Dec. 1991, pp. 405-409.
Joel Klecker posting "Subject: Re: Cookies?" to comp.sys.mac.comm available at http://groups.google.com/group/comp.sys.mac.comm/msg/dd88bf29992d3c84, Jul. 12, 1996, 2 pages.
Kantrow et al., "Chemical's Exit Not Fatal Blow to Home Banking", American Banker, Doc. Page Identifier(s):PRGY 2668-2669, Dec. 7, 1988.
Killette, "French Minitel Services Coming to America", Communications Week, Doc. Page Identifier(s):PRGY 2625, Nov. 7, 1988.
Kirkpatrick; "What's Selling on the Internet"; Kirkpatrick Enterprises; Inc.; 1996-2000; pp. 1-36.
Kleiner, "Prodigy: The Future on Line?", The San Francisco Guardian Doc. Page Identifier(s):PRGY 2643-2647, Nov. 30, 1988.
Kobayashi et al., "Videotex Terminals for the INS Model System", Review of the Electrical Communication Laboratories, vol. 33, No. 2, 1985, p. 277-283, Doc. Page Identifier(s): PRGY 1277-1283.
Koch "Maxim Sponsors blackjack on 'Net", Las Vegas Sun, Oct. 2, 1996, 1 page.
Kohda et al., "Ubiquitous Advertising on the WWW: Merging Advertisement on the Browser," Fifth International World Wide Web Conference, May 6-10, 1996, Paris France, 8 pages.
Koster; "Raph's Page Online World Timeline"; Ralph's Website, gaming section; created Mar. 4, 2000, last updated Feb. 20, 2002; 37 pp.
Kramer; "Remote Possibilities: Gateways Let Remote Users Exchange Mail Via Web Browsers"; PC Week; Apr. 15, 1996, 13(15); 3 pages; Dialog File 233: Microcomputer Abstracts; 0420777.
Kuester "Web Ad Revenue Climbed 42.6 Percent in Third Quarter", Jupiter Communications, Nov. 20, 1996, available at http://web.archive.org/web/19961228211028/http://www.jup.com/jupiter/release/nov96/adspend/adspend.shtml, 6 pages.
Langer, memo subject: "Client Development", Doc. Page Identifier(s):PRGY 0813, Mar. 5, 1986.
Lanier, "Jaron's World: Sex, Drugs and the internet", Discover Magazine, electronically published Mar. 14, 2007,available at http://discovermagazine.com/2007/mar/jarons-world-internet-and-the-war-on-drugs, pp. 1-5.

(56) References Cited

OTHER PUBLICATIONS

LaRosa, "Marketing Slays the Downsizing Dragon"; Information Today; Mar. 1, 1992, 9(3), pp. 58-59, Dialog File 233: Microcomputer Abstracts; 0271126.
Ledbetter et al. "Gambling Online? You Bet!", May 3, 1999, pp. 1-9.
Leibman, memo subject: "memo (title unknown)", Doc. Page Identifier(s):PRGY 1774, date unknown.
Leichtman, "Making Online Databases Useful", Computers & Electronics, Doc. Page Identifier(s): PRGY 1289-1291, Feb. 1985.
Lemay, Laura, Teach Yourself Web Publishing in HTML in a Week, 1st Ed., Howard W. Sams & Company, Dec. 28, 1994.
Lester, "Yahoo! Profile of a Web Database," Database, Dec. 1995, pp. 46-50.
Levine; "Knowing Where You Browse?"; comp.society.privacy; Sep. 21, 1995; pp. 1-6.
Levitz; "Tallahassee Free-Net: The Keystone of a Florida Network of Community Information Systems"; Journal of Educational Media and Library Science; Summer 1994; 31(4); pp. 364-373.
Lewis "Microsoft Seeks Internet Market; Netscape Slides", NY Times, Dec. 8, 1995, available at http://query.nytimes.com/gst/fullpage.html?res=9E00EEDE1F39F93BA35751C1A96395 8260&sec=&spon=&pagewanted=all, 4 pages.
Lewis, Peter H., "The New York Times Introduces a Web Site", The New York Times, Jan. 22, 1996, p. C7.
Lexis database, "Getting Wired With ST"; Times Newspapers Limited; Jan. 22, 1995; 1 pg.
Lexis database; "FreeLoader, Inc. Announces the First Service to Deliver the Internet Offline"; PR Newswire Association, Inc.; Jan. 19, 1996; 3 pgs.
Lexis database; "On-Line Mortgage Service Will Operate Over Internet"; National Thrift News, Inc.; Oct. 31, 1994; 3 pgs.
Lockwood, "All the News That's Fit to Telecommunicate"; A+: The Independent Guide for Apple Computing; Jun. 1986, 4(6), pp. 93-96; Dialog File 233: Microcomputer Abstracts; 0123714.
Lu; "Computers Making Inroads in Crossword Market," Crossword Tournament, New York Times, Aug. 19, 1996.
Lyons, memo subject: "API Support Group Notes", Doc. Page Identifier(s):PRGY 2518-2519, date unknown.
Macary, memo subject: "Perf. Plan for Richard Merritt", Doc. Page Identifier(s):PRGY 1693-1694, Jan. 28, 1987.
Macary, memo subject: "AVT Storyboard Issues", Doc. Page Identifier(s):PRGY 0810-0812, Feb. 17, 1986.
Maddox; "More Hits for Your Web Sites"; Net Access; Feb. 26, 1996; News clipping.
Maggie, memo subject: "System Dev. Training Program", Doc. Page Identifier(s):PRGY 2013-2014, Mar. 11, 1986.
Makulowich; "A Net Explorer's Log"; Online; Nov. 1, 1996, 20(6), pp. 40-42; Dialog file 233: Microcomputer Abstracts; 0441925.
Mandel "Interactive Consumer Information Services", SRI International, Doc. Page Identifier(s):PRGY 1517-1554, 1988.
Mangum "Business cable to launch show on PCs", Gannett Westchester Newspapers, Doc. Page Identifier(s): PRGY 1578, Sep. 5, 1988.
Manual "Manny" Raposa, "BJ Tourney at the IP", rec.gambling Usenet Newsgroup, available at http://groups.google.com/group/rec.gambling/msg/eabdbc28789394b0, posted Feb. 24, 1992, 3 pages.
Markham, "From fantasy to fact at the end of a fingertip", Times, London, England, Doc. Page Identifier(s):PRGY 2617, Nov. 22, 1988.
Markoff, "IBM to Sell Rolm to Siemens", The New York Times, Doc. Page Identifier(s):PRGY 2622-2623, Dec. 14, 1988.
Markowitz; "War Decwar Mega Wars: Multiplayer Online Tactical Combat"; Sep. 1, 2000; 6 pp.
Matyckas, "Simplified Process Flow of the Keyboard Mgr.", Doc. Page Identifier(s):PRGY 1732-1741, Mar. 20, 1987.
Matyckas, "Trintex Assistant Reception System Implementation Issues", Doc. Page Identifier(s):PRGY 1728-1731, Mar. 20, 1987.
Matyjewicz; "The E-Tailer's Digest: Discussing Retailing Online"; Gifts & Dec. 1997; pp. 1-5.
Maurer et al., "Frequently Asked Questions About Poker", rec.gambling Usenet Newsgroup, available at http://groups.google.com/group/rec.answers/msg/9f0812cdfdd732e82, posted Feb. 28, 1995, 40 pages.
McFadden, "The History of Netrek, through Jan. 1, 1994", rec.games.netrek Usenet Newsgroup, available at http://groups.google.com/group/rec.games.netrek/msg/66264d6b5a4b1470, (posted May 1, 1994), 17 pages.
memo subject: "Trintex System Proposal", Doc. Page Identifier(s):PRGY 0989, date unknown.
Memon; "Free E-mail Is Here, But With Ads Aplenty"; Bacon's; Jul. 27, 1995; News clipping.
Menninger, "Pioneering on-line service hangs on", Greater Sacramento Business Journal, Sacramento, CA, Doc. Page Identifier(s):PRGY 2666, Nov. 14, 1988.
Merritt (Notes from Richard), memo subject: "For the API Support Group", Doc. Page Identifier(s):PRGY 2028-2029, date unknown.
Merritt, memo subject: "API Support Group Status", Doc. Page Identifier(s):PRGY 2038-2044, Jul. 23, 1986.
Merritt, memo subject: "Application Development", Doc. Page Identifier(s):PRGY 2026-2027, Mar. 14, 1986.
Merritt, memo subject: "Application programmers reference manual", Doc. Page Identifier(s):PRGY 2034-2037, Jul. 23, 1986.
Merritt, memo subject: "Tasks for the API coordination Group", Doc. Page Identifier(s):PRGY 2049-2054, Mar. 25, 1986.
Merritt, memo subject: "Trintex Assistant Functions", Doc. Page Identifier(s):PRGY 1712-1713, Aug. 15, 1987.
Merritt, "Quick Quotes", Doc. Page Identifier(s):PRGY 1931-1934, Mar. 30, 1988.
Merritt, "Trintex Keyword Architecture," Doc. Page Identifier(s):PRGY 0180-0226, Aug. 11, 1986.
Merritt, memo subject: "Achievement Ward", Doc. Page Identifier(s):PRGY 2019-2025, Feb. 27, 1986.
Merritt, memo subject: "Enhancements", Doc. Page Identifier(s):PRGY 1767-1768, Sep. 9, 1987.
Merritt, memo subject: "Trintex assistant Project Plan", Doc. Page Identifier(s):PRGY 1683-1686, Feb. 18, 1987.
Merritt, memo subject: "Trintex Assistant Project Plan", Doc. Page Identifier(s):PRGY 1769-1773, Feb. 18, 1987.
Merritt, memo subject: "Your Memo dated Feb. 26", Doc. Page Identifier(s):PRGY 1631-1632, date unknown.
Merritt, memo subject: "Application Development", Doc. Page Identifier(s):PRGY 1986-1987, Mar. 14, 1986.
Merritt, memo subject: "Notes on TPF Classes", Doc. Page Identifier(s):PRGY 2006-2008, May 10, 1985.
Merritt, memo subject: "Trintex Assistant Project Plan", Doc. Page Identifier(s):PRGY 1704-1707, Feb. 18, 1987.
Merritt, memo subject: "UAL Next Week", Doc. Page Identifier(s):PRGY 2015-2016, Mar. 26, 1986.
Microsoft Explorer Web page, 1995 Microsoft Corporation.
Miller et al., "New Big Blue Akers's Drive to Mend IBM Is Shaking Up Its Vaunted Traditions", The Wall Street Journal, Doc. Page Identifier(s): PRGY 1579-1581, Nov. 11, 1988.
Miller et al., "IBM to Sell Part Of Rolm's Line, Investors Told", The Wall street Journal, Doc. Page Identifier(s):PRGY 2660, Dec. 9, 1988.
Miller, "IBM Signals New PC-Mainframe Strategy", The Wall Street Journal, Doc. Page Identifier(s):PRGY 2665, Dec. 7, 1988.
Miller, "IBM's PC Chief, William Low, Moves to Xerox", The Wall Street Journal, Doc. Page Identifier(s):PRGY 2650, Dec. 6, 1988.
Miller; "News On-Demand for Multimedia Networks"; ACM Multimedia; 1993; pp. 383-392.
Millison, "Games People Play"; Daily Spectrum, Jun. 9, 1995; 7 pgs.
Mitchell, PC World, "Two Free Programs Deliver News to Your PC" 1996, 1 page.
Mochizuki et al., "Digital Videotex System", Review of the Electrical Communication Laboratories, vol. 32, No. 6, 1984, 1044-1050, Doc. Page Identifier(s): PRGY 1254-1260.
Mohan, S., "'Free mail' on the 'Net Forces Users to Trade Off Privacy," Computerworld, Nov. 27, 1995.
Mueller, memo subject: "Trintex Assistant Harford", Doc. Page Identifier(s):PRGY 1703, Feb. 9, 1987.

(56) References Cited

OTHER PUBLICATIONS

Murase "Re: Windows Client", available at http://groups.google.com/group/rec.games.netrek/browse_frm/thread/d6ecc5c095bf8a38, Sep. 30, 1994, 6 pages.
Murase "Re: Windows Client", available at http://groups.google.com/group/rec.games.netrek/msg/20da2a42b64333a8, Oct. 1, 1994, 2 pages.
Nakano et al., "Digital Videotex Communication Processing Equipment", Review of the Electrical Communication Laboratories, vol. 32, No. 6, 1984, 1051-1057, Doc. Page Identifier(s): PRGY 1261-1267.
Nathan, "Trintex Completive Analysis", Robert R. Nathan Associates, Inc., Doc. Page Identifier(s):PRGY 0002-0166,Winter 87/88.
Nelson; "Information Distribution System: PointCast I-Server Pleases All"; Info World; Nov. 18, 1996; pp. IW/3 and IW/8.
Net Results: Web Marketing That Works—. . . Media: The Many Faces of Web Advertising, pp. 1-31, printed Mar. 31, 2003.
Netrek BRMH-1.7 Client Source Code, http://ftp.netrek.org/pub/netrek/mirrors/ftp.csua.berkely.edu.old/netrek/old/BRMH-1.7.tar.gz (last modified Oct. 16, 1993), 783 pages.
Netrek Server2.5p14 Server Source Code, http://ftp.netrek.org/pub/netrek/mirrors/ftp.solace.mh.se/netrek/servers/vanilla/Server2.5p14.tar.gz (last Modified Dec. 15, 1994), 1300 pages.
Newsletter, The Intelligent Gambler, May 1993, No. 3, pp. 1-7.
Nieuwenhuysen et al.; "Document+program Hybrids in the Internet, and Their Impact on Information Transfer in Science and Technology"; University Library, Vrije Universiteit Brussel, Pleinlaan 2, B-1050 Brussels-Belgium; http://educate1.lib.chalmers.se/iaul/proceedcontents/fullpaper/nieuw.html; 2 pp.
O'Connell, "Advertisers Get Benched", Promo, The International Magazine for Promotion Marketing, p. 96, Mar. 1994.
O'Connell; "Turning On To Screen Savers"; IAC News; 1997; 2 pgs.
O'Connor, "Free E-mail Service Launched by FreeMark"; Bacon's; Oct. 1995; News clipping.
O'Connor; "Ads to Pay for Free E-Mail Service"; Bacon's; Jun. 29, 1995; News clipping.
O'Connor; "Free E-mail Service Slated for the Fall; Limited Urban Areas To Try Out Advertiser-Supported Messaging Service"; Jul. 1, 1995; The Austin-American-Statesman; 2 pages.
Ojala, "Staying Alert Via Online Clipping Services"; Online; Sep. 1991; 15(5), pp. 80-82.
Online Interactive, Inc., miscellaneous advertising, Seattle, WA.
Oskoboiny, G., "Chapter 31: A Hypertext News Interface," in HTML & CGI Unleashed, Sams.net Publishing, 1st Edition 1995, pp. 711-724.
Overton, PC World, "PointCast 1.1: More Content for News Junkies" 1997.
Papes, memo subject: "Shopping Application", Doc. Page Identifier(s):PRGY 0168, Nov. 16, 1988.
PCN, PointCast, Inc., PointCast 1.0, "we created a splash screen explaining the software," Feb. 1996.
Pero, C. "Chapter 29: A Web Coloring Book," in HTML & CGI Unleashed, Sams.net Publishing, 1st Edition 1995, pp. 680-690.
Phillips, Communications of the ACM, 34(7):75-83 1991.
Phillips; "An Interpersonal Multimedia Visualization System"; IEEE Computer Graphics & Applications;1991, pp. 20-27.
Pinella et al.; "Individual, Inc. Announced Today Shipment Of A New Release Of Its Flagship"; Businesswire; Sep. 18, 1995; 2 pgs.
PointCast unveils free news service—Tech News—CNET.com, Feb. 13, 1996, pp. 1-2.
Pooth, memo subject: "TPF Driver Demo Project", Doc. Page Identifier(s):PRGY 0606-0658, Jul. 9, 1985.
Postel et al., Information Sciences Institute, ISI Research Report, "The ISI Experimental Multimedia Mail System" pp. 1-27 1986.
Prodigy promotion, Read all about the Prodigy interactive personal service, the only service of its kind that lets each member of your family personalize it to his or her interests and priorities, 6 pgs.
QuickTrack Brochure, Jun. 1995, 6 pages.
Rafter, M., "The Web Is Becoming the Place to Advertise," The Washington Times, Dec. 17, 1995, 4 pages.
Ragusa, "Commercial Analysis Report", Doc. Page Identifier(s):PRGY 0227-0239, Dec. 1988.
Ragusa, memo subject: "Commercial Analysis Report", Doc. Page Identifier(s):PRGY 0593-0605, Dec. 1988.
Ramanathan et al., Computer Networks and ISDN Systems, 26:1305-1322 1994 ("Towards Personalized Multimedia Dial-Up Services").
Ramanathan et al.; "Architectures for Personalized Multimedia"; IEEE; 1994; pp. 37-46.
Rapoza; "I-Server: Gotta Have It"; PC Week; Oct. 28, 1996; 12(43); 1 pg.
Raymond; "Newsflash: Or One Cybrarian's Quest for Electronic News Delivery"; Special Libraries; Fall 1994; vol. 85; Issue 4; pp. 270-273.
Rebello, "Super chip puts mainframe on desktop", USA Today, Doc. Page Identifier(s):PRGY 2659, Dec. 9, 1988.
Reinheimer; "Information on Demand's Multi-File Electronic Clipping Service"; National Online Meeting; New York, NY; May 5-7, 1987.
Resnick; "WWW> Rotating Sponsorship Banner on WWW Pages"; Net-Happenings Moderator; Oct. 28, 1995; 2 pgs.
Rodriquez; "Real-Time Group Conferencing to Ship"; News/Networking; Oct. 10, 1994; p. 49.
Rosenbloom, "Letter to Julien A. Adams", Dec. 6, 2007, 43 pages.
Rothman, memo subject: "Zip", Doc. Page Identifier(s):PRGY 1695-1696, Jan. 29, 1987.
Rowland; "Internet at a crossroads"; originally published in the Toronto Star newspaper on Jun. 13, 1996; 7 pages.
Roybal et al.; "Large-Scale Demonstration Test Plan for Digface Data Acquisition System"; Lockhead Idaho Technologies, Co.; Nov. 1994, p. 40; Dialog File 6: NTIS; 1852842.
Rudich, "How Customizable News Services Can Help You Reduce Clutter (and Guilt)"; Link-Up; Sep. 1, 1996, 13(5); pp. 8-9; Dialog File 233: Microcomputer Abstract; 0435810.
Rumsey Re: Beta testers for port of BRM 3.0 to Win 3.1/NT wanted, rec.games.netrek Usenet Newsgroup, available at http://groups.google.com/group/rec.games.netreek/browse_frm/thread/9400abb64afd9810/2ba31d76f61174d0, (posted Feb. 12, 1994), 11 pages.
Russell et al.; "Spacewar"; Maury Markowitz; 2000; 12 pp.
Sanders, Business Week, PC Meets the TV: The Plot Thickens, pp. 94-95, 1996.
Scharf, D., HTML Visual Quick Reference, Que Corporation, 1995, pp. 1-41.
Schoenfeld; "Developers Plan Free E-mail"; Online Marketplace; Jun. 1995; 2 pgs.
Schroeder et al., ACM Transactions on Computer Systems, 2(1):3-23 1984.
Schwartz, memo subject: "Delivery System Launch Obj.", Doc. Page Identifier(s):PRGY 1015-1038, Mar. 6, 1985.
Sederholm, memo subject: "Design Review", Doc. Page Identifier(s):PRGY 0731-0732, Feb. 21, 1986.
Sederholm, memo subject: "TBOL Ref.", Doc. Page Identifier(s):PRGY 0806-0809, Feb. 3, 1986.
Seidman's Online Insider for the Week Ending May 3, 1996, vol. 3, No. 18, http:/www.onlineinsider.com/html/archives/050396.html, pp. 1-8.
Seno; "MultiMedia Information Broadcasting Service "Present""; IEEE, 1994, pp. 117-120.
Shel@blackjacktime.com, e-mail re: Advertising article about CNET, Jan. 17, 2002, pp. 1-3.
Sherman, "The Executive's NewsStand NewsNet Can Help Track Your Company's Image Your Company, Your Clients and Your Industry"; Link-Up, Mar. 1, 1990, 7(2), pp. 20-21; Dialog File 233: Microcomputer Abstracts; 0256018.
Sherwood, K. Chapter 30: A Campus-Wide Information System, in HTML & CGI Unleashed, Sams.net Publishing, 1st Edition 1995, pp. 691-710.
Sims, "New Atlantic Cable Makes More Calls Possible", The New York Times, Doc. Page Identifier(s):PRGY 2620-2621, Dec. 14, 1988.
Skov; "An Electronic SDI Service For The Danish Chemical Industry and Research"; Libri; 1968; 18(3-4), pp. 204-215; Dialog File 61: LISA; 02017349.

(56) References Cited

OTHER PUBLICATIONS

Slaby; "SandPoint Unveils Hoover NewsAlert for Windows: Powerful Intelligent-Agent Based Software Monitor Provides Real-Time News for Critical Decision Making"; Businesswire; Oct. 30, 1995; 2 pgs.
Smith, David; "Re: More on AT&T Internet"; Nov. 8, 1995; 1 page.
Smith, The World-Wide-Web, Dec. 11, 1995, pp. 1-9.
Soltes; "Catch The Wave"; Bacon's; Aug. 16, 1995, News clipping.
Sponsor of the Day Newsletter, Nov. 1995, http://www.cris.com/~raydaly/spon11nw.html, pp. 1-4.
Starr Software Inc., "Invoice to Computer City", Doc. Page Identifier(s):PRGY 1716-1717, Jan. 30, 1987.
Steinwascher "Expert Report of Dr. Kurt Steinwascher", dated Jun. 6, 2006, 555 pages.
Stewart, "Notes", Doc. Page Identifier(s):PRGY 1989-1990 Apr. 19, 1985.
Still; "An Agency's View of Electronic Monitoring"; Journal of the Society of Motion Picture and Television Engineers; Mar. 1975; 84(3); p. 172-173; Dialog File 2: INSPEC; 00782712.
Story et al.; "The RightPages Image-Based Electronic Library for Alerting and Browsing"; IEEE, Sep. 1992; pp. 17-25.
Sweeney, memo subject: "Notes", Doc. Page Identifier(s):PRGY 1079, Mar. 19, year unknown.
Tannenbaum; "Patent Approved, Patent Pending"; Wall Street Journal Interactive Edition; 1999, pp. 1-8.
Targeted ads soon to pop up—Tech News—CNET.com, Feb. 19, 1997, pp. 1-3.
The Journal of American Underground Computer, ISSN 1074-3111, vol. 1, issue 8, Apr. 21, 1995, 44 pages.
The Scout Report—Apr. 5, 1996, A Publication of Internet Scout Computer Science Department, University of Wisconsin, http://scout.cs.wisc.edu/reoprt/sr/1996/scout-960405.html, 8 pages.
The Scout Report—May 3, 1996, A Publication of Internet Scout Computer Science Department, University of Wisconsin, 8 pages.
Thimm; "A Multimedia Enhanced CSCW Teleservice for Wide Area Cooperative Authoring of Multimedia Documents"; SIGOIS Bulletin; Dec. 1994, 15(2); pp. 49-57.
TreasureHunt.com—Related Websites, Copyright 1995-2001; Bruce Bates Enterprises, pp. 1-10.
Trown "New Server Release", available at http://groups.google.com/group/rec.games.netrek/msg/d7fb4451975e6fb2, Aug. 9, 1994, 1 page.
Trown "Re: Netrek server help !", available at http://groups.google.com/group/rec.games.netrek/browe_frm/thread/e728557051dc0c13/4f1af10b05d68ac8, Nov. 19, 1994, 4 pages.
Tummolo, "Viewcopy", Doc. Page Identifier(s):PRGY 1755, Jul. 16, 1986.
Tummolo, "ViewP1", Doc. Page Identifier(s):PRGY 1756, Jul. 15, 1986.
Tummolo, "ViewP2", Doc. Page Identifier(s):PRGY 1757-1759, Jul. 14, 1986.
Tummolo, "ViewP3", Doc. Page Identifier(s):PRGY 1760, Jul. 14, 1986.
Tummolo, "ViewP4", Doc. Page Identifier(s):PRGY 1761, Jul. 15, 1986.
Tummolo, "ViewP5", Doc. Page Identifier(s):PRGY 1762-1763, Jul. 16, 1986.
Tummolo, "ViewP6", Doc. Page Identifier(s):PRGY 1764-1765, Jul. 16, 1986.
Tummolo, "ViewP8", Doc. Page Identifier(s):PRGY 1766, Jul. 16, 1986.
Tummolo, memo subject: "leave zip Phase I Implementation Design", Doc. Page Identifier(s):PRGY 1638-1640, Feb. 23, 1987.
Tummolo, memo subject: "leave/zip Phase I Detail Design", Doc. Page Identifier(s):PRGY 1645-1646, Feb. 23, 1987.
Tummolo, memo subject: "TTX Assist", Doc. Page Identifier(s):PRGY 1917, Feb. 17, 1987.
Tummolo, memo subject: "TTX Assist.", Doc. Page Identifier(s): PRGY 1916, Feb. 17, 1987.
Tummolo, memo subject: "leave zip Phase I Implementation Design", Doc. Page Identifier(s):PRGY 1641-1643, Feb. 23, 1987.
Tummolo, memo subject: "Leave/zip external dependencies", Doc. Page Identifier(s):PRGY 1894-1895, Apr. 2, 1987.
Tummolo, memo subject: "Menu Issues", Doc. Page Identifier(s):PRGY 1906, Oct. 16, 1986.
U.S. Patent Application: Auxier et al., "Interactive Information Super Highway Prize Network", Sep. 2, 1994.
Ubois; "New Shades of Blue: IBM's John Patrick Sees Opportunity For Big Blue All Over The Internet"; internet World; Mar. 1, 1995, 6(3); pp. 62-66, Dialog File 233: Microcomputer Abstracts; 0378521.
Urbanski, memo subject: "Nonprogramming environment for application development", Doc. Page Identifier(s):PRGY 2100-2102, Jun. 27, 1986.
Urbanski, memo subject: "Formalization of the development of Trintex", Doc. Page Identifier(s):PRGY 0851, Mar. 18, 1986.
Van Kirk; "Lotus Notes Tied to Internet"; News/Networking; Oct. 10, 1994, p. 49.
Vblue International—Web Projects, file:///J|/3367/-2/references/reference... International—Web Projects(96-98).htm; 6 pages.
Volokh; "Cheap Speech and What It Will Do"; Yale Law Journal; May 1995; 104(7); pp. 1805-1850.
von Klitzing; "Seven Mile-Boots"; Internet News; From OEM 6 OneEurope Magazine No. 6 available at http://www.karl.aegee.org/oem-pub.nsf/0871f09451d3ee53c1256322004f795b/44473cd7408db6224125659r0040908a?OpenDocument ; Feb. 24, 1995; 3 pages.
Ward, T., "Monopoly (1995) for PC Review," GameSpot, available at http://www.gamespot.com/pc/puzzle/monopoly95/review.html, 1995, 1 page.
Waxweb v.2.0, Apr. 3, 1995, file:///J|/3367/-2/references/references(general)/WAXWEB v2__0.htm.
Web Programming Unleashed, Copyright 1996 by Sams.net Publishing, First Edition.
Webb; "Telebase Launches Clipping Service ECS May Now Be Accessed by Users Directly Through Telebase"; Link-Up, May 1, 1991, 8(3); pp. 1 and 39, Dialog File No. 233: Microcomputer Abstracts; 0240805.
Weis, memo subject: "Prodigy Services Company Jun. 6 comments", Doc. Page Identifier(s):PRGY 1298-1326, Jun. 7, 1988.
White; "Hand-held gambling devices may be in a casino near you"; Las Vegas Sun; May 26, 2005; 3 pages.
Whited et al., "Up/Download Supporting New Naming Conventions", Doc. Page Identifier(s):PRGY 2481-2491, May 12, 1987.
Wilder; "Get News While Your PC Sleeps"; Net Access; Feb. 26, 1996: p. 77; http://techweb.amp.com.
Wilder; "Free E-mail—For A Price"; Bacon's; Nov. 27, 1995; News clipping.
Williamson; "This E-mail Message is Brought to You by . . ."; Advertising Age; Apr. 17, 1995, newclipping.
Wilson, S., World Wide Web Design Guide (Chapters 1, 3, 4, 7, 10), Hayden Books, 1995, pp. 9-28, 81-106, 107-152, 201-246, 297-316.
Winer; "DaveNet"; 1994-2000; pp. 1-5.
Wingfield; "Juno offers Free E-mail Service To End-Users"; Bacon's' Jul. 10, 1995; News clipping.
Winograd, T., "The Proxy is where it's at!" Stanford Digital Library Project Working Project, Jun. 24, 1995, 6 pages.
Wireless: Wireless Advertising Gets Support From Consumers, file:///J|/3367/-2/references/references(general)/advertising.html.
Wolf, memo subject: "Notes", Doc. Page Identifier(s):PRGY 1068, Mar. 26, 1985.
Wood, B., "C/Net's New Banner Ad Tool," Newsbytes, Dec. 6, 1995, 1 page.
Yan et al.; "Sift: A Tool for Wide-Area Information Dissemination"; USENIX Technical Conference; Jan. 16-20, 1995; pp. 177-186.
Yoshida; "Group Formed to Oversee 1394 Patent Licensing"; Systems & Software News; Nov. 23, 1999; pp. 1-3.
Zuckerman; "Microsoft and Pointcast in Broadcast Alliance"; New York Times; Dec. 12, 1996; 1 pg.
Zuckermann; "Pushing the Envelope on Delivery of Customized Internet"; New York Times; Dec. 9, 1996; 2 pgs.
Schatz, "Validity Study of U.S. Patent No. 6,712,702," dated Mar. 14, 2006, 61 pages.

(56) References Cited

OTHER PUBLICATIONS

"Benificial Innovation's Response to Electronic Arts' and Pogo Corporation's First Set of Interrogatories", Case No. CV 05-5803 JFW (JWJx), Nov. 2005, 37 pages.
United States District Court for the Eastern District of Texas, Marshall Division, Case Nos. 2-07-CV-555 (TJW/CE) and 2-07-CV-263 (TJW/CE), Defendants' Invalidity Contentions with Exhibits A-F, filed Oct. 20, 2008, 1577 pages.
Affidavit of Michael D. Dahlin Regarding Claim Construction of U.S. Patent Nos. 6,183,366 and 6,712,702, dated Sep. 25, 2009, 125 pages.
Memorandum Opinion and Order for U.S. District Court for the Eastern District of Texas, Marshall Division, Case Nos. 2:07-CV-263-TJW-CE and 2:07-CV-555-TJW-CE, dated Apr. 12, 2010, 31 pages.
Memorandum Opinion and Order for U.S. District Court for the Eastern District of Texas, Marshall Division, Case Nos. 2:07-CV-263-TJW-CE and 2:07-CV-555-TJW-CE, dated Jun. 3, 2010, 7 pages.
United States District Court for the Eastern District of Texas, Marshall Division, Case No. 2-07-CV-555 (TJW/CE), Defendants' First Supplemental Invalidity Contentions, filed Jun. 1, 2010; 79 pages.
United States District Court for the Eastern District of Texas, Marshall Division, Case Nos. 2-07-CV-263, New York Time Company's Amended Invalidity Contentions with Exhibits A-F, filed May 3, 2010.
Waugh, "Request for Ex Parte Reexamination of Patent No. 6,264,560", dated Jan. 31, 2008, 2542 pages.
Request for Ex Parte Reexam for U.S. Ex Parte Reexamination Control No. 90/009,593, dated Oct. 6, 2009, with Appendixes A-G.
Official Action for Ex Parte Reexamination Control No. 90/009,593, mailed Dec. 1, 2009.
Official Action for U.S. Ex Parte Reexamination Control No. 90/009,593, mailed Feb. 10, 2010.
Official Action for U.S. Ex Parte Reexamination Control No. 90/009,593, mailed May 14, 2010.
Request for Ex Parte Reexamination for Reexamination Control No. 90/011,117, filed Jul. 27, 2010.
Official Action for U.S. Appl. No. 12/016,123, mailed Mar. 24, 2009.
Official Action for U.S. Appl. No. 12/016,123, mailed Feb. 3, 2010.
Official Action for U.S. Appl. No. 10/994,054, mailed Oct. 5, 2009.
Official Action for U.S. Appl. No. 10/994,054, mailed May 14, 2010.
Internet Week, "Net Ad Revenues May Top $37 Million," Phillips Business Information, Inc., vol. I, No. 18; Aug. 7, 1995, pp. 1-3.
Kamba et al., "The Krakatoa Chronicle—An Interactive Personalized Newspaper on the Web;" World Wide Web Journal, Issue One: Conf. Proceedings, 4th Annual WWW Conf., Nov. 1995, p. 159-169.
Putz, "Interactive Information Services Using World-Wide Web Hypertext," Computer Networks and ISDN Systems 27, (1994), pp. 273-280.
Sandberg et al., "Design and Implementation or the Sun Network Filesystem," USENIX Conference Proceedings, Summer 1985, pp. 119-131.
Bouvier, "The State of HTML," ACM SIGICE Bulletin, Oct. 1995, vol. 21(2), pp. 8-13.
Stevens, UNIX Network Programming, Copyright 1990 by Prentice Hall, Inc., pp. 1-5, 171.
Kurose et al., Computer Networking: A Top-Down Approach Featuring the Internet, Copyright 2001 by Addison Wesley Longman, Inc., pp. 467-471.
ANSI/IEEE Standard 802.1G, 1998 Edition, p. 4.
The American College Dictionary, Third Edition, 1993, p. 1535.
International Preliminary Examination Report for International (PCT) Patent Application No. PCT/US99/25131, dated Jan. 25, 2001.
Written Opinion for International (PCT) Patent Application No. PCT/US99/25131, dated Aug. 16, 2000.
International Search Report for International (PCT) Patent Application No. PCT/US99/25131, dated Jan. 31, 2000.
International Preliminary Examination Report for International (PCT) Patent Application No. PCT/US97/00872, dated Jan. 12, 1998.
International Search Report for International (PCT) Patent Application No. PCT/US97/00872, dated May 12, 1997.
Beneficial Innovations, Inc., Electronic Arts, Inc., and POGO Corporation's Stipulation and Proposed Order Regarding Claim Construction, filed in the U.S. District Court, Central District of California, Western Division, Case No. CV 05-5803, Apr. 24, 2006, 4 pages.
Defendants' Responsive Claim Construction Brief Pursuant to Patent Rule 4-5(b), filed in the United States District Court, Eastern District of Texas, Marshall Division, Case Nos. 2-07-CV-555 (TJW/CE) and 2-07-CV-263 (TJW-CE), on Nov. 20, 2009, 40 pages.
Deposition of Michael Dahlin, Ph.D., Oct. 7, 2009, pp. 334-337, 340-342.
Deposition of Kevin C. Almeroth, Ph.D., Nov. 4, 2009, pp. 65-67, 74-84, 86-88, 90-92, 106-108, 124-133, 154-156, 158-165, 197-208, 240-242, 253-256, 260-262, 275-277.
Deposition of Sheldon F. Goldberg, Aug. 4, 2009, pp. 315-318, 414-416, 432-434.
Deposition of John van Antwerp, Sep. 9, 2009, pp. 28-31, 63-68, 80-87, 103-105, 141-144.
Deposition of Dan Reifsnyder, Aug. 27, 2009, pp. 81-83.
Official Action for U.S. Appl. No. 12/785,389, mailed Aug. 18, 2010.
Official Action for U.S. Appl. No. 12/785,209, mailed Sep. 9, 2010.
Official Action for U.S. Appl. Nos. 12/138,357 and 90/010,093, mailed Sep. 17, 2010.
Defendant Dell Inc.'s Certificate of Financially Interested Entities filed in the United States District Court, Eastern District of Texas Marshall Division, Case No. 2:11-CV-229, on Apr. 27, 2012, 2 pages.
Declaration of Nicholas A. Schuneman Regarding Travel in Support of Dell's Motion to Sever and Transfer Venue filed in the United States District Court, Eastern District of Texas Marshall Division, Case No. 2:11-CV-229, on Sep. 4, 2012, 38 pages.
Notice of Appearance of Counsel for Defendant Demand Media filed in the Eastern District of Texas Marshall Division, Case No. 2:11-CV-229, on Nov. 13, 2012, 3 pages.
Defendants' Motion to Strike Plaintiff's Initial and Supplemental Disclosures of Asserted Claims and Infringement Contentions Under Local Rule 3-1 filed in the Eastern District of Texas Marshall Division, Case No. 2:11-CV-229, on Nov. 16, 2012, 23 pages.
Declaration of Stuart M. Rosenberg in Support of Defendants' Motion to Strike Plaintiff's Initial and Supplemental Disclosures of Asserted Claims and Infringement Contentions Under Local Rule 3-1, Eastern District of Texas Marshall Division, Case No. 2:11-CV-229, on Nov. 16, 2012, 589 pages.
Notice of Compliance with the Court's Motion Practice Order filed in the Eastern District of Texas Marshall Division, Case No. 2:11-CV-229, on Nov. 26, 2012, 9 pages.
Order Proposing Technical Advisor entered in the Eastern District of Texas Marshall Division, Case No. 2:11-CV-229, on Nov. 28, 2012, 1 page.
Notice of Letter in Support of Google's Request for Permission to File a Motion for Summary Adjudication filed in the Eastern District of Texas Marshall Division, Case No. 2:11-CV-229, on Nov. 28, 2012, 5 pages.
Plaintiff Beneficial Innovations, Inc.'s Agreed Motion to Modify Briefing Scheduel re: Defendants' Motion to Strike Plaintiff's Initial and Supplemental Disclosures of Asserted Claims and Infringement Contentions Under Location Patent Rule 3-1 filed in the Eastern District of Texas Marshall Division, Case No. 2:11-CV-229, on Nov. 28, 2012, 5 pages.
Plaintiff Beneficial Innovations, Inc.'s Agreed Motion to Modify Briefing Scheduel re: Defendants' Motion to Strike Plaintiff's Initial and Supplemental Disclosures of Asserted Claims and Infringement Contentions Under Location Patent Rule 3-1 filed in the Eastern District of Texas Marshall Division, Case No. 2:11-CV-229, on Nov. 29, 2012, 5 pages.
Unopposed Motion for Extension of Time to File a Reply Letter Brief filed in the Eastern District of Texas Marshall Division, Case No. 2:11-CV-229, on Dec. 3, 2012, 4 pages.

(56) References Cited

OTHER PUBLICATIONS

Order Granting Unopposed Motion for Extension of Time to File a Reply Letter Brief entered in the United States District Court, Eastern District of Texas Marshall Division, Case No. 2:11-CV-229, on Dec. 4, 2012, 1 page.
Notice of Compliance with Court's Motion Practice Order filed in the Eastern District of Texas Marshall Division, Case No. 2:11-CV-229, on Dec. 7, 2012, 8 pages.
Order Appointing Technical Advisor entered in the Eastern District of Texas Marshall Division, Case No. 2:11-CV-229, on Dec. 10, 2012, 2 pages.
Plaintiff Beneficial Innovations, Inc.'s Opposition to Defendants' Motion to Strike Plaintiff's Initial and Supplemental Disclosures of Asserted Claims and Infringement Contentions under Local Rule 3-1 filed in the Eastern District of Texas Marshall Division, Case No. 2:11-CV-229, on Dec. 10, 2012, 21 pages.
Declaration of David E. Rosen in Opposition to Defendants' Motion to Strike Plaintiff's Initial and Supplemental Disclosures of Asserted Claims and Infringement Contentions under Local Rule 3-1 filed in the Eastern District of Texas Marshall Division, Case No. 2:11-CV-229, on Dec. 10, 2012, 58 pages.
Amended Order Appointing Technical Advisor entered in the Eastern District of Texas Marshall Division, Case No. 2:11-CV-229, on Dec. 10, 2012, 2 pages.
Notice of Compliance with the Court's Motion Practice Order filed in the Eastern District of Texas Marshall Division, Case No. 2:11-CV-229, on Dec. 10, 2012, 8 pages.
Defendants' Responsive Claim Construction filed in the United States District Court, Eastern District of Texas, Marshall Division, Case Nos. 2:11-CV-299 (MHS/CMC), on Dec. 10, 2012, 311 pages.
Affidavit of Engagement filed in the United States District Court, Eastern District of Texas Marshall Division, Case No. 2:11-CV-229, on Dec. 11, 2012, 2 pages.
Plaintiff's Notice of Compliance with the Court's Motion Practice Order filed in the United States District Court, Eastern District of Texas Marshall Division, Case No. 2:11-CV-229, on Dec. 12, 2012, 7 pages.
Google Inc.'s Notice of Compliance with the Court's Motion Practice Order filed in the United States District Court, Eastern District of Texas Marshall Division, Case No. 2:11-CV-229, on Dec. 17, 2012, 7 pages.
Defendants' Reply in Support of Motion to Strike Plaintiff's Initial and Supplemental Disclosures of Asserted Claims and Infringement Contentions under Local Patent Rule 3-1 filed in the United States District Court, Eastern District of Texas Marshall Division, Case No. 2:11-CV-229, on Dec. 21, 2012, 11 pages.
Plaintiff Beneficial Innovations, Inc.'s Reply to Defendant's Claim Construction Brief filed in the United States District Court, Eastern District of Texas Marshall Division, Case No. 2:11-CV-229, on Dec. 21, 2012, 19 pages.
Plaintiff's Notice of Compliance with the Court's Motion Practice Order filed in the United States District Court, Eastern District of Texas Marshall Division, Case No. 2:11-CV-229, on Dec. 21, 2012, 6 pages.
Plaintiff Beneficial Innovations, Inc.'s Sur-Reply in Response to Defendants' Motion to Strike Plaintiff's Initial and Supplemental Disclosures of Asserted Claims and Infringement Contentions Under Local Rule 3-1 filed in the United States District Court, Eastern District of Texas Marshall Division, Case No. 2:11-CV-229, on Dec. 31, 2012, 7 pages.
Order entered in the Eastern District of Texas Marshall Division, Case No. 2:11-CV-229, on Jan. 2, 2013, 1 page.
Joint Claim Construction Chart filed in the United States District Court, Eastern District of Texas Marshall Division, Case No. 2:11-CV-229, on Jan. 7, 2013, 38 pages.
Joint Motion to Dismiss Dell Inc. filed in the United States District Court, Eastern District of Texas Marshall Division, Case No. 2:11-CV-229, on Jan. 10, 2013, 5 pages.
Order of Dismissal entered in the Eastern District of Texas Marshall Division, Case No. 2:11-CV-229, on Jan. 11, 2013, 1 page.
General Order Regarding Pending Case Transfers entered in the Eastern District of Texas Marshall Division, Case No. 2:11-CV-229, on Jan. 14, 2013, 20 pages.
Joint and Unopposed Motion for a New Trial in a Reassigned Case filed in the United States District Court, Eastern District of Texas Marshall Division, Case No. 2:11-CV-229, on Jan. 28, 2013, 9 pages.
Joint and Unopposed Motion for Entry of a Discovery Order filed in the United States District Court, Eastern District of Texas Marshall Division, Case No. 2:11-CV-229, on Jan. 28, 2013, 16 pages.
Agreed to Motion to Set Briefing Schedule on Cross-Motions for Summary Judgment on Google Inc.'s Complaint for Intervention filed in the United States District Court, Eastern District of Texas Marshall Division, Case No. 2:11-CV-229, on Mar. 1, 2013, 6 pages.
Motion for Summary Judgment that Beneficial Innovations, Inc. is in Breach of its Settlement Agreement with Google Inc. and Memorandum in Support Thereof filed in the United States District Court, Eastern District of Texas Marshall Division, Case No. 2:11-CV-229, on Mar. 1, 2013, 361 pages.
Order Granting Agreed to Motion to Set Briefing Schedule on Cross-Motions for Summary Judgment on Google Inc.'s Complaint for Intervention entered in the Eastern District of Texas Marshall Division, Case No. 2:11-CV-229, on Mar. 5, 2013, 2 pages.
Order re Scheduling Conference entered in the Eastern District of Texas Marshall Division, Case No. 2:11-CV-229, on Mar. 15, 2013, 2 pages.
Order granting Joint Motion for a New Trial Date entered in the Eastern District of Texas Marshall Division, Case No. 2:11-CV-229, on Mar. 15, 2013, 1 page.
Motion to Strike Declaration of Dr. Almeroth and Memorandum in Support Thereof by Google Inc. filed in the United States District Court, Eastern District of Texas Marshall Division, Case No. 2:11-CV-229, on Mar. 21, 2013, 18 pages.
Declaration of D. Clay Holloway filed in the United States District Court, Eastern District of Texas Marshall Division, Case No. 2:11-CV-229, on Mar. 21, 2013, 58 pages.
Notice of Firm Name Change filed in the United States District Court, Eastern District of Texas Marshall Division, Case No. 2:11-CV-229, on Mar. 22, 2013, 3 pages.
Response and Opposition of Google Inc. to the Motion for Summary Judgment filed by Beneficial Innovations Inc. filed in the United States District Court, Eastern District of Texas Marshall Division, Case No. 2:11-CV-229, on Mar. 22, 2013, 309 pages.
Defendants Amazon.com Inc., Expedia, Inc., Scripps Networks, LLC, and Viacom Inc.'s Notice Regarding Cross-Motions for Summary Judgment by Google and Beneficial Innovations filed in the United States District Court, Eastern District of Texas Marshall Division, Case No. 2:11-CV-229, on Mar. 25, 2013, 4 pages.
Agreed Submission of Docket Control Order filed in the United States District Court, Eastern District of Texas Marshall Division, Case No. 2:11-CV-229, on Mar. 29, 2013, 8 pages.
Notice of Firm Name Change filed in the United States District Court, Eastern District of Texas Marshall Division, Case No. 2:11-CV-229, on Mar. 29, 2013, 2 pages.
Amended Joint and Unopposed Motion for Entry of a Discovery Order filed in the United States District Court, Eastern District of Texas Marshall Division, Case No. 2:11-CV-229, on Mar. 29, 2013, 14 pages.
Notice re: Mediator filed in the United States District Court, Eastern District of Texas Marshall Division, Case No. 2:11-CV-229, on Mar. 29, 2013, 3 pages.
Discovery Order entered in the United States District Court, Eastern District of Texas Marshall Division, Case No. 2:11-CV-229, on Apr. 2, 2013, 8 pages.
Docket Control Order entered in the United States District Court, Eastern District of Texas Marshall Division, Case No. 2:11-CV-229, on Apr. 2, 2013, 5 pages.
Amended Notice re: Mediator filed in the United States District Court, Eastern District of Texas Marshall Division, Case No. 2:11-CV-229, on Apr. 2, 2013, 3 pages.
Order Appointing Mediator entered in the United States District Court, Eastern District of Texas Marshall Division, Case No. 2:11-CV-229, on Apr. 3, 2013, 1 page.

(56) References Cited

OTHER PUBLICATIONS

Sur-Reply of Google Inc. In Opposition to Beneficial Innovations Inc.'s Motion for Summary Judgment filed in the United States District Court, Eastern District of Texas Marshall Division, Case No. 2:11-CV-229, on Apr. 15, 2013, 8 pages.
Reply of Google Inc. in Support of its Motion to Strike Declaration filed in the United States District Court, Eastern District of Texas Marshall Division, Case No. 2:11-CV-229, on Apr. 18, 2013, 8 pages.
Joint Motion to Dismiss Demand Media, Inc. filed in the United States District Court, Eastern District of Texas Marshall Division, Case No. 2:11-CV-229, on Apr. 24, 2013, 5 pages.
Order of Dismissal entered in the United States District Court, Eastern District of Texas Marshall Division, Case No. 2:11-CV-229, on Apr. 26, 2013, 1 page.
Beneficial Innovations, Inc.'s Sur-Reply to Google's Motion to Strike the Declaration of Dr. Almeroth filed in the United States District Court, Eastern District of Texas Marshall Division, Case No. 2:11-CV-229, on Apr. 29, 2013, 10 pages.
Declaration of David Rosen in Opposition to Google's Motion to Strike the Declaration of Dr. Almeroth filed in the United States District Court, Eastern District of Texas Marshall Division, Case No. 2:11-CV-229, on Apr. 29, 2013, 4 pages.
Notice of Technology Tutorial filed in the United States District Court, Eastern District of Texas Marshall Division, Case No. 2:11-CV-229, on May 14, 2013, 24 pages.
Jury Demand of Third-Party Plaintiff Google Inc. filed in the United States District Court, Eastern District of Texas Marshall Division, Case No. 2:11-CV-229, on May 16, 2013, 2 pages.
Plaintiff Beneficial Innovations, Inc.'s Jury Demand filed in the United States District Court, Eastern District of Texas Marshall Division, Case No. 2:11-CV-229, on May 16, 2013, 2 pages.
Order re: Markman hearing entered in the United States District Court, Eastern District of Texas Marshall Division, Case No. 2:11-CV-229, on May 21, 2013, 2 pages.
Order on Letter Briefs entered in the United States District Court, Eastern District of Texas Marshall Division, Case No. 2:11-CV-229, on May 21, 2013, 1 page.
Joint Statement Regarding Claim Terms for Argment at Markman Hearing Pursuant to Court's May 21, 2013 Order filed in the United States District Court, Eastern District of Texas Marshall Division, Case No. 2:11-CV-229, on May 29, 2013, 10 pages.
Defendants' Motion for Summary Judgment of Indefiniteness filed in the United States District Court, Eastern District of Texas Marshall Division, Case No. 2:11-CV-229, on May 30, 2013, 17 pages.
Declaration of Stuart M. Rosenberg in Support of Defendants' Motion for Summary Judgment of Indefiniteness filed in the United States District Court, Eastern District of Texas Marshall Division, Case No. 2:11-CV-229, on May 30, 2013, 147 pages.
Unopposed Motion for Oral Argument on Pending Motions Regarding Alleged Breach of Settlement Agreement filed in the United States District Court, Eastern District of Texas Marshall Division, Case No. 2:11-CV-229, on Jun. 5, 2013, 17 pages.
Advertising brochure for "Trak-21", by Digital Biometics, Inc., Gaming Division, 5600 Rowland Road, Minnetonka, MN 55343.
Advertising page for "Tracker-Plus TP-700 Player Tracking Equipment for Table Games", by Open Technologies, 6520 Platt Ave., Suite 672, West Hills, CA 91307.
Estavanik, "Designing On-Line, Multiplayer Games", in Game Developer, pp. 14-21, Premier 1994.
Horton, "The Power of ImaginNation", in Advertising Age, Mar. 7, 1994.
Marketing Plan for Manifest Destiny, Inc., 1994.

* cited by examiner

604

| | VALUES OF CARDS FROM CARD SEQUENCE OUPUT BY THE CARD DEALER MODULE 38 → | 3 | 5 | 7 | 2 | 9 | 8 | 10 | 10 |
|---|---|---|---|---|---|---|---|---|---|
| BLACK JACK GAME 610 | PLAYER HAND EVALUATION | 3 | | 10 | — | 19 | | | |
| | HOUSE HAND EVALUATION | | 5 | | | | 13 | 23 | |
| BLACK JACK GAME 614 | PLAYER HAND EVALUATION | | 5 | | | — | 13 | — | 23 |
| | HOUSE HAND EVALUATION | | | — | 2 | | | | |
| BLACK JACK GAME 620 | PLAYER HAND EVALUATION | | | 7 | | 16 | | | |
| | HOUSE HAND EVALUATION | | | | 2 | | 10 | 20 | |
| BLACK JACK GAME 626 | PLAYER HAND EVALUATION | | | | | 9 | | 19 | |
| | HOUSE HAND EVALUATION | | | | | | 8 | | 18 |

606

FIG. 5

ADVERTISING SYSTEM FOR THE INTERNET AND LOCAL AREA NETWORKS

Matter enclosed in heavy brackets [ ] appears in the original patent but forms no part of this reissue specification; matter printed in italics indicates the additions made by reissue.

RELATED APPLICATION

This is a Continuation application of prior application Ser. No. 08/759,895 filed Dec. 3, 1996 (now U.S. Pat. No. 5,823,879) which claims the benefit of U.S. Provisional Application No. 60/010,361 filed Jan. 19, 1996, and U.S. Provisional Application Ser. No. 60/010,703 filed Jan. 26, 1996. The entire disclosure of the prior application 08/759,895, from which a copy of the oath or declaration is supplied, is considered to be part of the disclosure of the accompanying application and is hereby incorporated by reference.

FIELD OF THE INVENTION

The present invention is related to a method and apparatus for automating the playing games such as blackjack so that they can be played continuously and asynchronously by a potentially large plurality of players substantially, and wherein information related to goods and services for sale can be exchanged between players and sponsors of advertisements presented during the playing of a game.

BACKGROUND OF THE INVENTION

The cost effective automation of playing certain games, like blackjack, has been difficult due to the fact that these games typically require a dealer and only a relatively small number of players may play the game with a single dealer. However, with the popularity of local and wide-area data communication networks, it is desirable to have an automated gaming system for games such as blackjack wherein large numbers of players may cost-effectively and efficiently play such games.

Furthermore, it has been difficult to cost-effectively provide a network gaming system on such networks as the Internet in that gaming restrictions prohibit wagering and ante fees in most contexts except such situations as local area networks within a casino. However, since many players have an interest in playing casino-type games, it would also be desirable to have a way to benefit from interests in such games. Accordingly, it would be desirable to have a system that utilized a gaming context as a vehicle for delivering product and/or service information to users of a network such as the Internet. In particular, it would be desirable to have a data processing system that provided a large number of players with the ability to substantially asynchronously play casino-style games on the Internet for prizes at a reduced risk or at substantially no risk, wherein the data processing system coordinated the presentation of products and/or services from sponsors of the games so that there is a coordinated, interactive exchange of information between players and sponsors regarding advertisements, samples, prizes and questionnaires related to sponsor products and/or services.

Accordingly, since the present invention, as described in the sections hereinbelow, addresses the above-discussed problems within the context of playing blackjack, an overview of this particular game is provided so that the novelty and various related aspects of the present invention may be more fully appreciated.

DESCRIPTION OF BLACKJACK

The card game of blackjack is a game of chance played between a designated player known as a "dealer" and one or more other players. Basically, each player plays against the dealer in the sense that each player attempts to achieve a collection or hand of cards having a total score for the hand closer to the value 21 than the score of the hand of the dealer. However, if a player's card hand goes over 21, the player may lose any wagers bet on the hand regardless of the value of the card hand of the dealer.

In further detail, blackjack is typically played with one or more standard playing card decks wherein each card has a value. In particular, each of the face cards has the value of 10, and non-face card has a value identical to the numerical value as indicated on the card, except for aces. That is, for aces a value may be assigned of either 1 or 11, depending on which value a player deems most beneficial to his/her hand.

In one conventional method for playing blackjack, at the commencement of a blackjack hand, each player initially is provided with two cards and the dealer also receives two cards. Typically, one of the dealer's cards is dealt with the value of the card showing whereas the other card is dealt with the value of the card hidden. However, variations on when the dealer receives his/her cards may depend on the blackjack gaming rules where blackjack is being played but, in any case, one of the dealer's cards must be face-up before the players exercise various wagering options beyond an initial ante.

After a player has reviewed his/her cards, the player may request one or more additional cards in an attempt to get: (a) a value for a card hand that will be greater than the hand the dealer will have, and (b) a value for the card hand that is less than or equal to 21. Further, a player may under certain circumstances, as will be described below, simultaneously play more than one hand of cards against the dealer's cards. However, in requesting such additional cards, a player runs the risk of "busting" each hand played wherein the player loses his/her wager(s) on a card hand by adding cards to the hand until a value exceeding 21 occurs. Further note that such busting of a hand occurs regardless of whether or not the dealer has a card hand value of less than or equal to 21.

Note that after each player has ceased to request further cards (i.e., each player "stands" on his cards), the dealer either takes one or more further cards (i.e., "hits") according to predetermined blackjack rules as established, for example, by the gaming establishment where the blackjack game is being conducted. In general, the dealer must take additional cards if his/her current card count total is less than 17 and the dealer must decline further cards if the dealer's hand has a value of 17 or more. However, there are various rules regarding whether a dealer may stand or hit when the card count total is a "soft 17." That is, one of the dealer's cards is an ace (and therefore may have a value of 1 or 11) and one of the values for the dealer's hand is 17. For example, the dealer may be required to take a hit on a soft 17.

Since a hit(s) taken by the dealer is performed after all players have exercised their wagering options, the final numerical value of the dealer's hand is then compared to the final numerical value of each of the player's hand(s) to determine the winning and losing wagers. Note that if the dealer's hand exceeds the value of 21, then any player that has not busted wins the wagers for their hand(s) regardless of the hand's total value. Alternatively, if the dealer's card hand is less or equal to 21, then it is compared with each of the player's card hand(s) and in each comparison the card hand with the closest total value to 21 without exceeding 21 wins. Of course, ties are possible. In such cases (called a "push"), the player's wager(s) on his/her card hand are returned.

It is typical in blackjack to have at least three additional player options depending on the circumstances of play. A first such option is known as "doubling down" wherein if the player's first two cards have a value within a predetermined range (e.g., 10 or 11), then the player may double his or her wager and once dealt a single additional card, the total of the three card hand becomes the value for the player's hand. Alternatively, another option is that of "splitting pairs" wherein if the player's first two cards are identical with the exception of suit (i.e., a pair), then the pair may be split so that two card hands are created with one card of the pair in each hand. Thus, the player must wager on each of the hands at least the initial wagering or ante amount. Subsequently, a second card and any subsequent successive cards are dealt to each of the separate hands as the player requests and the results of both hands are compared to the dealer's hand, assuming neither the dealer nor either of the player's two hands busts.

In a third option, played immediately after each player has been dealt their first two cards and the dealer has been dealt at least a first card, a player may request "insurance" under the circumstances where the dealer's single face-up card is an ace. In this circumstance, the player is betting that the dealer has blackjack (i.e., a card value total of 21). If the dealer does not have blackjack, then the insurance bet is forfeited and the player plays his/her blackjack hand as if the insurance bet were never made. Note that the player can typically wager an insurance bet of one-half of the amount of his/her initial blackjack wager or ante and if the dealer has blackjack, then the dealer (or the gaming establishment) pays the player double or triple his/her insurance bet.

Further note that options for splitting pairs and doubling down may interact with one another according to certain pre-established gaming establishment rules wherein, for example, a player may double down on one or more of his/her split hands.

Additionally, there are blackjack tournaments having tournament entrants that compete against each other for tournament prizes. In such tournaments each entrant has a fixed initial number of points that can be wagered in a pre-established number of tournament blackjack games to be played. Accordingly, the player having the highest number of points at the end of the tournament wins the tournament. Note that in such tournaments, there may be specific guidelines established at the beginning of the tournament for varying the blackjack gaming rules between tournament games. For example, rules may vary on when a player may split pairs repeatedly during the same blackjack game. Also, double down rules may vary so that, for example, after a splitting of pairs, a player may be allowed to double down on any two cards or, alternatively, an additional wager of less than the initial wager may be acceptable when a player requests to double down.

However, in all known variations of blackjack, players are only allowed to enter a blackjack game at the completion of a previous game and, further, there is a relatively small number of players that can play blackjack at a dealer's station simultaneously. Accordingly, it is desirable to provide a system for playing blackjack wherein potentially a very large number of players can play blackjack simultaneously from a single dealer station and wherein players can commence playing blackjack at their own discretion without waiting for a previous blackjack game to complete.

SUMMARY OF THE INVENTION

The present invention is a computerized interactive advertising system (i.e., method and apparatus) for exchanging information regarding goods and/or services between a first population of users (hereinafter also known as "players" or "users") and a second population of users (hereinafter also known as "sponsors" or "advertisers"). In particular, the sponsors or advertisers may present information related to goods and/or services to the players using the present invention and the players may view this information while, for example, interacting with the present invention for playing a game such as blackjack, craps, roulette, poker, pai gow or the like. Moreover, a player may also interact with the present invention so that the player has the capability for responding to sponsor or advertiser presented questionnaires, as well as for purchasing or viewing sponsor goods and/or services. Thus, the present invention provides an information exchange service within a gaming context for enticing players to view and/or interact with sponsor presentations such as interactive advertisements.

It is also an aspect of the present invention that each player or user is presented with advertisements for products and/or services, wherein it is believed the player will be receptive to the advertisement. That is, the present invention selectively presents advertisements to each player, according to stored characteristics and preferences of the player that the present invention has determined from, for example, player supplied personal information, player responses to questions, and/or analysis of player interactions such as player requests for additional information related an advertisement. Thus, such a selective presentation of advertisements allows a sponsor or advertiser to provide information related to relatively extensive or expensive promotionals (e.g., demonstrations, samples, discounts, trial subscriptions, prizes, bonuses) to players most likely to subsequently purchase the advertised product or service. Consequently, such selectivity can greatly increase the cost effectiveness of advertising, wherein the term, advertising (or advertising presentation), as used herein is understood to include not only product or service presentations that are merely informational, but also more interactive advertising presentations such as promotionals wherein discounts, free samples or a trial usage may be offered.

Moreover, it is an aspect of the present invention that each player may interact with and play a game at a time and pace (i.e., tempo) substantially of the player's choosing. In particular, the player is not bound by a required order or sequence of play involving other players, even though the player may be in competition with other players. In fact, a player may cease play for an extended time while in the midst of a game and subsequently continue the game at the point where the player ceased to play. Thus, if the present invention is easily accessible, then players may interact with the present invention at their leisure.

Accordingly, in a related aspect of the present invention, it is intended that players (more generally, users) are able to interact with the present invention remotely, as for example, via the Internet and/or an interactive cable television network. Thus, using an Internet embodiment as an exemplary embodiment of the present invention, a gaming web site may be provided wherein players may access the interactive gaming capabilities of the present invention and substantially simultaneously also be presented with sponsor or advertiser provided information related to goods and/or services of the sponsor or advertiser (those two terms being used substantially interchangeably to denote e.g., those who provide advertising to users and/or subsidize game playing, product promotionals or network access). Moreover, the sponsor provided information may include, for example, hypertext links (also denoted hyperlinks) that allow players to activate, for example, network transfers for obtaining additional information regarding a sponsor's goods and/or services regardless of the status of any game in which a player may be currently involved at the gaming web site.

It is a further aspect in one embodiment of the present invention that a player is able to commence play of a game at substantially any time the player accesses the present invention. That is, it is not necessary for any previous game being played by other players to be completed for the player to commence play. In other words, games provided by the present invention may be continuously and asynchronously commenced or entered by players.

It is a further aspect of the present invention to require each player to use a distinct identification provided when the player "registers" with the present invention before playing any games so that a network site for the invention may be able to identify each player. Accordingly, it is an aspect of the present invention during registration, that each player provides personal information about him/herself both for gaming identification and for use as selection criteria by sponsors or advertisers for presenting particular presentations. For example, in the case of an Internet embodiment of the present invention, such registering can be performed via the Internet prior to play of any games at a gaming/advertising web site. Thus, players may be required to provide the present invention with information about themselves such as name, address, E-mail address, age, sex, and/or other player characteristics deemed pertinent to one or more sponsors or advertisers. Accordingly, the present invention provides a sponsor or advertiser with the capability to target its presentations substantially only to players or users having selected characteristics as, for example, determined from player information provided when registering with a network site for the present invention.

It is a further aspect of the present invention to have players compete against one another for prizes in one or more gaming tournaments. Using the Internet embodiment of the present invention as illustrative, a gaming/advertising web site for the present invention may partition the population of players into competitive groups wherein each group includes the players for a distinct tournament. Moreover, the present invention may determine a competitive group according to criteria such as: (a) the game(s) to be played in the tournament; (b) a skill level for the players (e.g., as determined by play in a previous tournament(s)); (c) particular player characteristics such as age, area of residence, home ownership, etc.; (d) particular player lifestyle traits such as traits exhibited by exercise enthusiasts or cruise ship enthusiasts; and (e) particular player preferences such as preferences related to jewelry, personal care products or particular sports.

It is a further aspect of the present invention to allow players to play games offered by the present invention without incurring financial risk or charges beyond those that are typical for the network being used in accessing the present invention.

It is a particular aspect of the present invention to provide blackjack and other casino-style games such as craps, roulette, poker, pai gow, or variations thereof, wherein such games may be played by a plurality of players continuously and asynchronously, and wherein each game is likely to be unique from all other games being played concurrently. Furthermore, in a related aspect of the present invention, such games may be automated so as to not require a manual dealer. Also, the present invention may be played, in one embodiment, in a gaming establishment (e.g., casino) using low cost gaming stations at which players may play such games entirely electronically. Alternatively, in another embodiment, the present invention may be used to play such casino style games as blackjack on the Internet. In this later embodiment, a blackjack game controller for the present invention communicates with blackjack players at Internet client nodes via a web site from which the blackjack game controller is accessed. Thus, blackjack players may play blackjack in the privacy of their own homes and at their leisure since the present invention does not require that a particular tempo of a blackjack game be maintained.

Additionally, the present invention utilizes novel varieties in such games, as blackjack, that make the games more enjoyable for users. For example, using variations of blackjack as illustrative, in one novel embodiment wherein the dealer functions are automated by a dealer module, this module can play blackjack with a plurality of players concurrently such that each player appears to be playing exclusively with the dealer module (e.g., "head-to-head"). Moreover, in one blackjack embodiment, each blackjack game is played asynchronously from other concurrent blackjack games with the dealer module. Furthermore, the dealer module may play a different dealer card hand with each player. In particular, the initial one (or two) cards (or card representations) dealt to the dealer for each game are unlikely to be the same for any two blackjack games being played with the dealer module; i.e., the probability of any two concurrently played blackjack games being identical is substantially equal to chance. Accordingly, this variation is particularly worthwhile when players are playing remotely through a network such as the Internet. Alternatively, in a different blackjack variation, the dealer module and each player concurrently playing blackjack with the dealer module may be provided with cards (or card representations) from the beginning of an identical sequence of card representations. Thus, each concurrently playing player receives an identical initial card hand and the dealer is also dealt an identical initial card hand. Subsequently, the card hands within each concurrent game will vary only if players request further cards differently. Accordingly, this variation of blackjack is particularly useful in tournament blackjack played within the confines of a casino, wherein the play of each player in the tournament is synchronized to start and stop within a predetermined interval. Note that this variation of blackjack is enjoyed by tournament players in that the tournament players may consider it a better or fairer way for demonstrating blackjack playing skill.

*The present disclosure teaches a method of presenting an Internet presentation, including the following steps:*

*Step 1: Providing one or more services available through an Internet connection on a first Internet accessible node;*

*Step 2: First transmitting an unrequested first presentation, via the Internet, to the user at a second Internet accessible node while the user is interacting with an activation of a first of the services at the second Internet accessible node, wherein said first presentation is presented between two user inputs to the activation and said first presentation is not presented in response to an Internet input by the user requesting said first presentation, via a presentation identifier, and wherein said first presentation identifies at least one of a purchasable product and a purchasable service;*

*Step 3: Receiving data, via a communication on the Internet, indicative of an action by the user in response to said step of first transmitting;*

*Step 4: Determining, without manual intervention, a second presentation for presenting to the user, wherein said second presentation is determined using said data and stored information indicative of previous user Internet responses, said second presentation also identifying one of a purchasable product and a purchasable service;*

*Step 5: Second transmitting to the user, via the Internet, said second presentation concurrently with the activation of the first service; and*

*Step 6: Generating a value determined using said data, wherein said value is provided to a party requesting said first presentation be presented to users accessing the Internet.*

Other features and benefits of the present invention will become apparent from the detailed description with the accompanying figures contained hereinafter.

BRIEF DESCRIPTION OF THE DRAWINGS

FIG. 5 provides a simple example of the operation of the present invention for playing a novel variation of blackjack wherein four blackjack games are shown being played asynchronously with the blackjack game controller;

FIGS. 8A and 8B is a block diagram of an alternative embodiment of the present invention wherein an advertisement sending daemon (i.e., TCP/IP daemon ad sender on the host computer 308) and an advertisement receiving daemon 806 (on the client end user machine 318) communicate for periodically displaying advertisements and other announcements to a user on the end user machine 318.*

DETAILED DESCRIPTION

Figure 1:
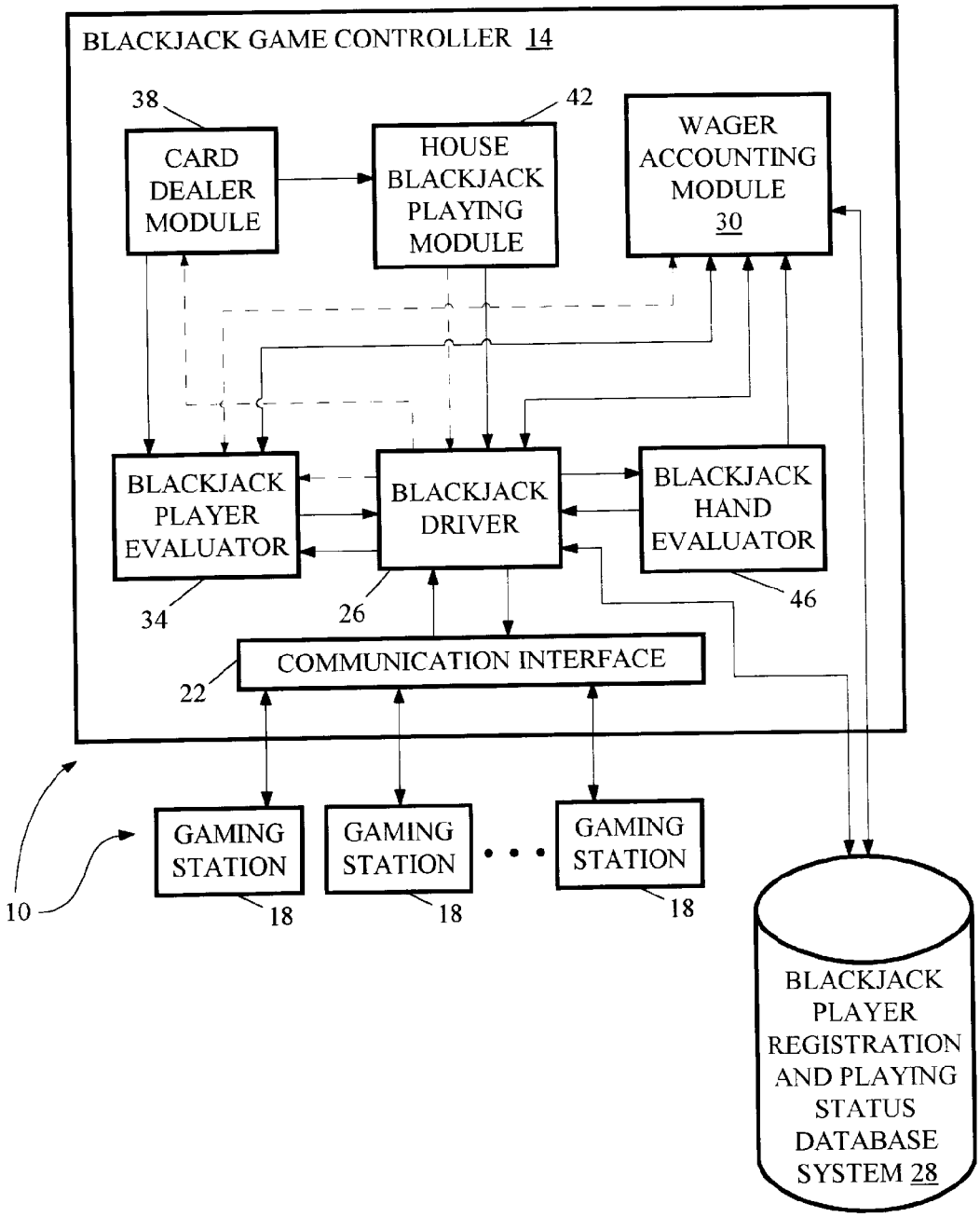
FIG. 1 is a block diagram of an embodiment of the present invention wherein this embodiment may be used within a blackjack gaming establishment such as a casino.

In FIG. 1, a block diagram is presented of a first embodiment of an electronic system 10 for the present invention for playing blackjack, wherein data flows are represented by solid arrows and control flows are represented by dashed arrows. In particular, the embodiment of FIG. 1 presents an architecture for the present invention for use on, for example, a local network within a casino, wherein low cost gaming stations may be utilized. Accordingly, the blackjack gaming system 10 includes a blackjack game controller 14 electronically connected to one or more potentially remote gaming stations 18 so that for each gaming station a player may play blackjack. In the blackjack gaming system 10, the blackjack game controller 14 functions substantially as a dealer would in a manually operated blackjack game and each gaming station 18 provides a blackjack player with an electronic representation of a blackjack game wherein it may appear that the player (i.e., user) at the gaming station 18 is the only player playing against the dealer (i.e., "head-to-head" against the blackjack game controller 14). Accordingly, each gaming station 18, as will be discussed with reference to FIG. 2 below, includes a display for displaying both the dealer's cards and the player's cards. Each gaming station 18 also includes player interaction capabilities for requesting additional cards, activating various blackjack player options at appropriate times, and potentially increasing various wagers at predetermined phases of a blackjack game. Further note that each gaming station 18, when in operation, may request a security code be provided by a player for identifying himself/herself or, alternatively, the gaming station may request the player to insert an electronic card (not shown) into the gaming station 18 so that information electronically encoded upon the card is read at the gaming station and transferred to the blackjack controller 14.

Referring now to the internal structure of the blackjack game controller 14, a gaming station interface 22 is provided for interfacing with each of the gaming stations 18. In particular, the gaming station interface 22 buffers data signals between the other components included within the blackjack game controller 14 and the gaming stations 18. For example, the gaming station interface 22 may have speed matching buffers in order to adjust for differences in speed between the blackjack game controller 14 and the gaming stations 18. A blackjack driver 26 exchanges data with the gaming station interface 22. The blackjack driver 26 substantially coordinates the operation of the blackjack game controller 14. In particular, the following capabilities are substantially provided by the blackjack driver 26:

(1.1) identifies each player requesting to play blackjack at one of the gaming stations 18;

(1.2) creates internal data structures for communication with other modules of the blackjack game controller 14 regarding each blackjack game being played; in particular, blackjack gaming data objects or records are (re) instantiated with each player request, such data objects providing sufficient information for the blackjack game controller 14 to properly respond to each received player request;

(1.3) determines the output of the blackjack game controller 14 to each of the active gaming stations 18;

(1.4) distributes blackjack gaming data between other modules of the blackjack game controller 14; and (1.5) provides card representations to gaming stations 18.

In performing the above tasks, the blackjack driver 26 communicates with a blackjack player registration and playing status database 28. The database system 28 maintains in persistent storage information regarding each blackjack player. In particular, the database system 28 maintains:

(2.1) information identifying each player; e.g., a unique player identification code;

(2.2) information regarding, for example, each blackjack player's financial status; in particular, a credit limit and a current amount of funds (either to be paid or received from the player);

(2.3) for each person registered to play blackjack, information regarding the status or context of any game the player is presently playing; that is, sufficient information is stored so that the blackjack game controller 14 can retrieve this information and continue a blackjack game in response to receiving a player's request;

(2.4) for each person registered to play blackjack, information regarding any blackjack tournament that the player is playing; in particular, since such a tournament typically requires a tournament player to complete a specified number of blackjack games in a predetermined amount of time and/or to complete a specified number of blackjack games out of a total number of blackjack games, the following types of information maybe stored: (a) information relating to the number of blackjack games completed by the player; (b) information related to the time and/or the number of games remaining in the tournament; and (c) information related to the amount of funds or points in the player's account for the tournament.

The blackjack driver 26 communicates with a wager accounting module 30 wherein the wager accounting module provides the following capabilities:

(3.1) determines various wagering limit parameters for the next one or more blackjack games to be played (e.g., the wagering limit per game and the total wagering limit per player); and (3.2) performs wagering accounting for each player's wins and losses.

Thus, the wager accounting module 30 is instrumental in initializing a new blackjack game in that this module receives and maintains financial information related to each currently active player at a gaming station 18. Thus, the wager accounting module 30 has a communication data channel with the blackjack player registration and playing status database 28 so that the wager accounting module 30 may retrieve information for determining whether the player has, for example, sufficient financial resources to cover potential wagering losses. Of course, to provide waging evaluation information to other controller 14 modules, the wager accounting module 30 receives identifying information from each such module requesting an evaluation.

The blackjack driver 26 also communicates with a blackjack player evaluator 34. The blackjack player evaluator 34 receives, from each player (via instantiations of blackjack gaming data objects from the blackjack driver 26), all blackjack player requests except the data from each player indicating an amount to be wagered. Thus, the blackjack player evaluator 34:

(4.1) determines each player's options during blackjack games; and (4.2) responds to player requests for hits or to, for example, split pairs.

Thus, the blackjack player evaluator 34 enforces the gaming establishment rules related to player options during a blackjack game. Note, however, that in responding to certain player requests, the blackjack player evaluator 34 communicates with the wager accounting module 30 to confirm that a proper wager accompanies the requested option and that the wager is acceptable to the wager accounting module 30.

The blackjack player evaluator 34 is supplied with data corresponding to blackjack card representations from a card generator module 38. The card generator module 38 generates, for example, an ordered collection or sequence of substantially random card representations and each such card representation is provided to the blackjack player evaluator 34, wherein the blackjack player evaluator responds to each player's valid hit request by outputting the most recent card representation received from the card generator module 38. That is, each player at a gaming station 18 receives a card representation according to when the player's request is received by the blackjack player evaluator 34.

Further, note that the card generator module 38 also supplies the same card representations as supplied to the blackjack player evaluator 34 to a house blackjack playing module 42, wherein this latter module plays the dealer's hand in each blackjack game. Thus, the house blackjack playing module 42 enforces the blackjack gaming rules on behalf of the gaming establishment. In particular, this module determines when and how insurance bets can be made related to the dealer's cards. Note, as with the blackjack player evaluator 34, the house blackjack playing module 42 outputs, when required to provide the dealer's hand with another card representation at a gaming station 18, the most recent card representation received from the card generator module 38. Further note that the house blackjack playing module 42 provides control information to the blackjack driver 26, particularly regarding activation of the blackjack insurance option. This information, in turn, is conveyed to the blackjack player evaluator 34 so that this latter evaluator may activate the insurance option for each player at an active gaming station 18.

A blackjack hand evaluator 46 is also in communication with the blackjack driver 26. The blackjack hand evaluator 46 evaluates each player's hand(s) in comparison to the dealer's blackjack hand for determining the win/loss/tie for each player's hand. Thus, the dealer's hand and the one or more hands played by each player at a gaming station 18 is supplied to the blackjack hand evaluator 46. Subsequently, this evaluator outputs win/loss/tie results to the gaming stations 18 via the blackjack driver 26 and the gaming station interface 22. Further, the blackjack hand evaluator 46 also outputs win/loss/tie results along with the identity of the player playing each hand to the wager accounting module 30 so that wager credits and debits for each player's account may be updated according to the last or most recent blackjack game results.

Figure 2:
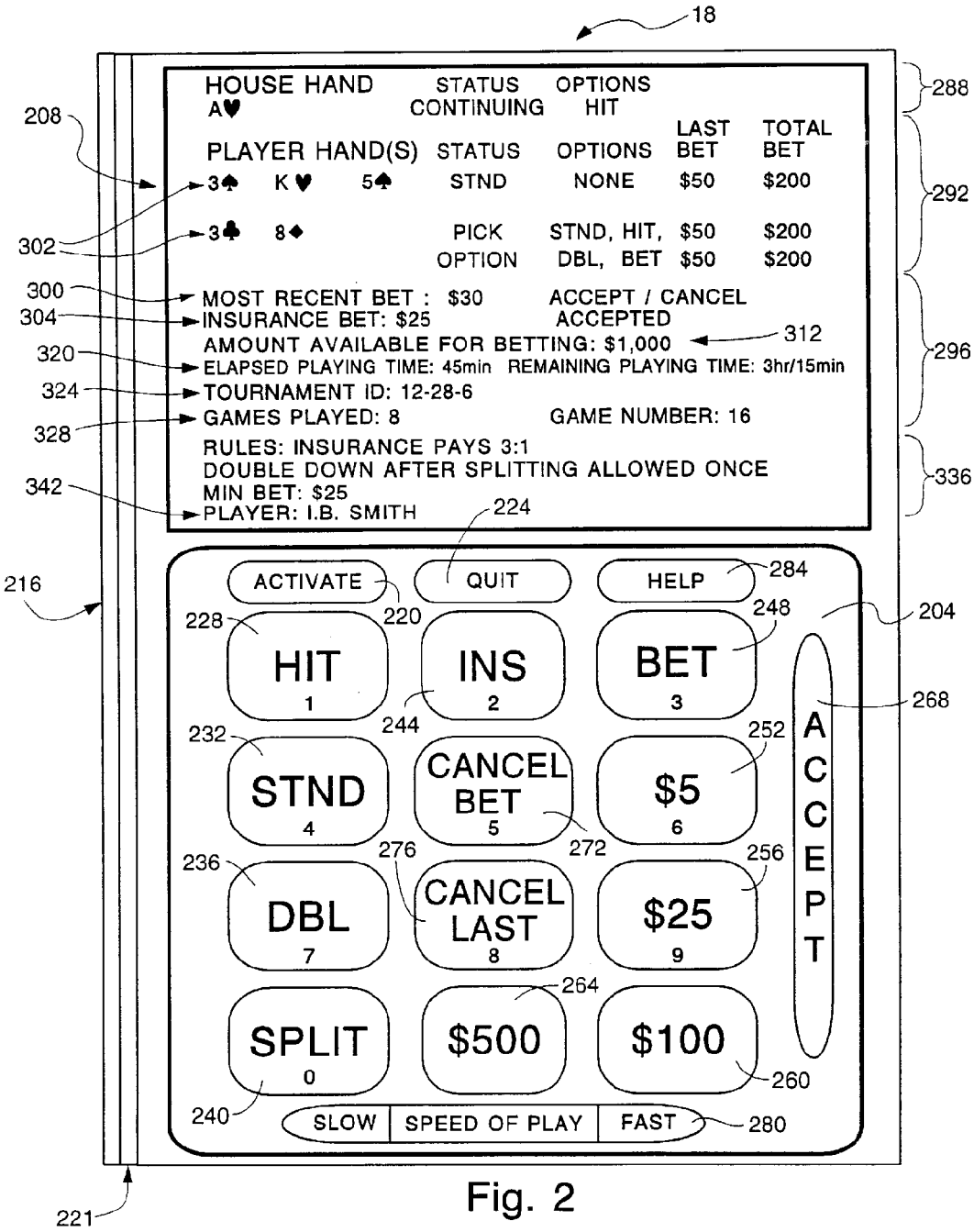
FIG. 2 provides a representation of the gaming stations 18 of FIG. 1 wherein these gaming stations are used in gaming establishments for playing blackjack.

In FIG. 2, an embodiment of a gaming station 18 is illustrated. The gaming station 18 includes a player input area 204 wherein a player may press touch-sensitive portions of a thin film laminated with blackjack player operations and requests. Immediately above the player input area is a player output display area 208 for displaying blackjack gaming information related to the player. Optionally, each gaming station 18 may include a player identification card reader 216 so that a blackjack player may identify him/herself at a gaming station 18 by swiping a magnetic identification portion of a player identification card (not shown) through the card slot 221 thereby allowing the card reader 216 to transmit the player's encoded identification upon his/her card to the blackjack game controller 14. However, it should be noted that other configurations of the gaming station 18 are also contemplated by the present invention. In particular, gaming station 18 may not have a card reader 216. Instead, a blackjack player may be required to register either manually or automatically at a site remote from the gaming station 18, or, alternatively personal identification numbers may be provided to players for identifying themselves via the player input area 204 wherein, for example, a numeric digit provided in the lower bottom portion of some of the touch-sensitive areas may be used by the player to input a personal identification number. Further, the arrangement of the touch-sensitive portions of the player input area 204 and the format of the display area 208 (both being discussed in detail below) may have other arrangements and still be within the scope of the present invention.

Describing in detail now the touch-sensitive portions of the player input area 204, an activate/enter next game button 220 is provided. This button is used to initially activate the gaming station 18 so that a "request to play" signal is transmitted to the blackjack driver 26. That is, assuming a player activates this button at a gaming station 18, the blackjack driver 26 responds by requesting that the player input his/her identification via, for example, placing an identification card in the card reader 216 and/or a personal identification number via the player input area 204. Additionally, note that the button 220 may be pressed at the end of a blackjack game for indicating that the player wishes to play another blackjack game. Note that in one embodiment of the present invention when consecutive games are played by a player, the player need only press the button 220 to commence a new game. That is, the player's identification need not be entered for each consecutive game played (assuming the button 220 is activated within a predetermined time after the last game has terminated).

The player input area 204 also includes a quit button 224 that a player may press to explicitly indicate the player's desire to terminate any further gaming at the gaming station 18.

Additionally, buttons 228 through 248 provide the player with the capabilities to request the following blackjack gaming requests:

(5.1) The "HIT" button 228 allows the player to request another card to be dealt to him/her.

(5.2) The "STND" button 232 allows the player to stand on a current blackjack hand.

(5.3) The "DBL" button 236 allows the player to double down under appropriate circumstances as determined by the blackjack player evaluator 34.

(5.4) The "SPLIT" button 240 allows the player to split the player's first two cards into two separate blackjack hands when these first two cards are identical.

(5.5) The "INS" button 244 allows the player to request insurance under the circumstances where the dealer's single face-up card is an ace.

(5.6) The "BET" button 248 allows the player to request that a bet or wager be entered during a blackjack game.

Note that subsequent to requesting a bet via the "BET" button 248, the buttons 252 through 264 are activated so that the player may input various betting amounts. In particular, buttons 252 through 264 provide the player with the option to bet $5.00 (button 252), $25.00 (button 256), $100.00 (button 260) and $500.00 (button 264). Moreover, a sequence of the buttons 252 through 264 may be pressed for obtaining a bet not provided by a single button. For example, to bet $130.00, the player presses consecutively each of the buttons 252, 256 and 260 (in any order) exactly once.

The player input area 204 also includes various confirm and cancel buttons 268 through 276. The accept button 268 allows the user to accept a last input. For example, it is an aspect in the present embodiment of the invention that after each user input, the input is accepted either by the player explicitly pressing the accept button 268 or by allowing a predetermined amount of time to expire after the last player input. The "CANCEL BET" button 272 allows the user to cancel an immediately preceding bet that was input. However, note that if a time limit is exceeded for placing a bet due to, for example, the player pressing the "CANCEL" button 272, then any minimum bet required will be automatically wagered on the player's behalf by the wager accounting module 30. Further, the "CANCEL LAST" button 276 may be used by the player to cancel the immediately preceding wager of one of the dollar amount buttons 252 through 264. Thus, if a player intended to bet $125.00 by pressing first the button 260 followed by the button 256 but instead pressed the button sequence 260 and 264, then the player may press the button 276 for canceling the $500.00 bet associated with button 264 and subsequently the player presses the button 256 to obtain the desired bet of $125.00. Note further that pressing the "CANCEL LAST" button twice in succession also cancels the entire bet.

A "SPEED OF PLAY" button 280 may be optionally provided on the player input area 204. This button allows the player to specify to the blackjack driver 26, for example, the predetermined amount of time after a player input to wait before each subsequent input is automatically accepted. In one embodiment of the present invention, the "SPEED OF PLAY" button 280 includes active areas at each end of the button, wherein if the user presses the "slower" end of the button 280, then the predetermined time(s) for automatically accepting a player input is lengthened. Alternatively, if the player presses the "faster" end of the button 280, then the predetermined default acceptance time(s) becomes shorter. However, it is important to note that the tempo of the blackjack game is, using the present invention, no longer as important as in typical blackjack gaming situations. That is, since each blackjack player using the present invention is not playing in sequence with other players, there is less concern about speedily playing so as not to delay other players.

Lastly, the player input area 204 includes a "HELP" button 284 for allowing the player to request assistance from, for example, the personnel of the gaming establishment providing the gaming station 18.

Referring now to display area 208, the screen display provided here is but one of a number of contemplated screen layouts for the present invention. In particular, the screen layout illustrated in display area 208 is a representative layout for use in playing tournament blackjack. Thus, when other modes of blackjack are played other than tournament blackjack, then it is within the scope of the present invention to modify the fields represented in the display area 208 according to the player needs for the type of blackjack being played. Further, it is important to note that in one embodiment, the display 208 is in color so that, for example, diamonds and hearts are in red and spades and clubs are in black, and various fields of the display area 208 may be highlighted for focusing a player's attention on the portion of the display providing information most relevant to the player's currently permissible options.

Describing now the fields currently presented in display 208, at the top of the display is the house hand area 288: (a) for providing a representation of the cards that have been dealt to the house; (b) for providing a status of the house hand (i.e. one of: "STND" for standing, "BUSTED", when the value of the house hand exceeds 21, and "CONTINUING" when the house may take additional hits. That is, this field provides an annotation "house hand" followed by a representation for at least one card that has been dealt to the house; i.e., an ace of hearts. In the player's hand area 292 of the display area 208, there are five columns providing information related to each blackjack hand the player is currently playing in the blackjack game. The columns provide the following information:

(6.1) The"PLAYER HAND(S)" column provides, in each row of this column, a different blackjack hand that is being played simultaneously by the player in the current blackjack game. Thus, two blackjack hands are presently represented as being played simultaneously by the player on the display area 208. That is, an upper or first hand having a three of spades, king of hearts, and a five of spades, and, a lower or second blackjack hand having a three of clubs and an eight of diamonds. (Note, when a player chooses to double down, card representations in common between two blackjack hands may be displayed in a row between the remaining card representations for both hands. Alternatively, card representations in common between blackjack hands may be duplicated in the blackjack hands to which the common cards representations apply.)

(6.2) A "STATUS" column for indicating the current status of each blackjack hand the player is playing. That is, for the first or upper hand that the player currently is playing the status is "STND" thereby indicating that the player has elected to stand on this hand. Alternatively, for the second or lower hand a status of "PICK OPTION" is provided thereby indicating that it is the player's turn to pick a blackjack playing option for this hand. Note that there are at least three possible values for the status field of each blackjack hand being played. That is, in addition to the two represented in FIG. 2, a "BUSTED" status value is output for indicating that the value of the related blackjack hand has exceeded 21.

(6.3) The "OPTIONS" column provides, for each blackjack hand being played, an indication of the permissible blackjack plays that the player currently may select from for the related blackjack hand in the same row. Thus, for the first hand illustrated in area 292, there are no options remaining for the player to play related to this hand. However, on the second hand, four permissible player inputs are displayed as options to the player. That is, the player may stand on the related hand (STND) by pressing button 232, the player may request a hit (HIT) by pressing button 228, the player may double down (DBL) by pressing button 236 and the player may bet an additional wager by pressing button 248 and subsequently putting a bet amount using buttons 252 through 264.

(6.4) The "LAST BET" column displays to the player his/her last bet for each blackjack hand the player is currently playing. In particular, for both the upper and lower hands shown in area 292, the player's last bet was $50.00.

(6.5) The "TOTAL BET" column displays to the player the total bet the player has wagered on the blackjack hand to which it relates. For example, in FIG. 2, in both the upper and lower player's blackjack hands displayed, the player has bet a total of $200.00.

Below the player hand area 292 is the player information area 296 wherein additional blackjack gaming information relating to the player is displayed. In particular, labeled line 300 displays the most recent bet amount that the player has requested along with a tag indicating the status (e.g., "ACCEPT/CANCEL") of the most recent bet. Note that the status may be: (a) "ACCEPTED" for explicitly or implicitly indicating the acceptance of a displayed wager (via the player pressing the accept button 268 or by default due to a time limit expiring); (b) "CANCELLED" for explicitly indicating the cancellation of the last entered wager (via the player pressing either of the cancel buttons 272 or 276); (c) "REJECTED", this status being displayed due to the wager accounting module 30 rejecting the player's most recent bet; and (d) "ACCEPT/CANCEL" for indicating that the present invention is waiting a predetermined amount of time for the player to explicitly accept or cancel the most recent bet. Thus, in the example of line 300 in FIG. 2, the player has indicated a most recent bet of $30.00 and the blackjack driver 26 has output a status of "ACCEPT/CANCEL" as in (d) above. Further note that the blackjack hand(s) to which this most recent bet applies may be designated in any of a number of ways such as, for example, highlighting the row(s) in the player hand area 292 of the blackjack hand(s) to which the most recent bet of line 300 applies. Alternately, an indicator such as arrows 302 may be used as in FIG. 2 to indicate to the player that the most recent bet is to be applied to both the upper and lower blackjack hand(s).

Additionally, note that line 304 displays the annotation "INSURANCE BET:" together with any insurance amount that has been bet by the player. Accordingly, the dollar amount on line 304 and the notation at the right end of the line pertain, respectively, to the amount that has been bet as insurance, and the status of this bet (i.e., one of "ACCEPTED", "CANCELLED", "REJECTED" or "ACCEPT/CANCEL" as in line 300).

In line 312 of the player information area 296, the total amount of funds available by the player for betting is displayed. For example, line 312 of FIG. 2 indicates that the player has a total amount for betting of $1,000.00. Note that the wager accounting module 30 maintains this total amount available for betting and updates it after each blackjack game.

The lower three lines 320, 324 and 328 of the player information area 296 provide blackjack player information that is particularly useful when playing in a blackjack tournament. Thus, the information in these three lines may not be displayed when the present invention is used by players not in a tournament. In line 320, two fields are provided for displaying playing time information. The leftmost field, annotated by the label "ELAPSED PLAYING TIME:", displays the total amount of time the player has played blackjack (which in this case is 45 minutes). Alternatively, the rightmost field, annotated by the label "REMAINING PLAYING TIME:", displays the time remaining in the tournament.

In line 324 an identifier for any tournament associated with the present blackjack game is displayed.

In line 328, up to two additional fields are provided that are useful in tournament blackjack. The leftmost field having an annotation of "GAMES PLAYED:" displays to the player the number of blackjack games he/she has completed within a tournament. Note that in some blackjack tournaments each player is required to complete a certain predetermined number of games within a predetermined allotted time period. For example, a blackjack tournament may require each player to play 50 games within a predetermined interval (such as four days). Relatedly, but optionally, in blackjack gaming contexts where the total number of blackjack games in the tournament is meaningful, the rightmost field of line 328, having the annotation "GAME NUMBER:", displays to the player the total number of tournament games that have been completed thus far in the tournament. Accordingly, using at least the leftmost annotated field in line 328 and "REMAINING PLAYING TIME:" annotated field of line 320, the player is able to determine the number of remaining games in the tournament that he/she must play.

Further note that other blackjack game values are contemplated by the present invention. For example, a field providing the number of games remaining that a player must play in the tournament may be added (or substituted for) in addition to the current values in the player information area 296.

In a next display 208 lower area, denoted the rules area 336, blackjack house rules are displayed. In particular, the house rules displayed in area 336 allow variations upon the typical blackjack rules that a player is likely to assume if not presented with information to the contrary. Note that by providing these additional rules on the display of gaming stations 18, successive blackjack games may be provided with different house blackjack rules thereby creating an increased interest in each game by the players and requiring additional blackjack playing skills from the players. Note that three house rules are provided in the present display area 336. That is, (a) insurance for the present blackjack game pays 3 to 1 odds (instead of the typical 2 to 1 odds); (b) the player may double down after splitting only once; and (c) the minimum bet is $25.00 for the current game.

Lastly, the display 208 includes a player identification area 342 for identifying the player currently playing blackjack at the gaming station 18. The present player area 342, includes a field having the current player's name (e.g., I. B. Smith). However, other fields identifying the player are also contemplated by the present invention including, for example, a player identification number such as the number that may be encoded upon a player identification card used in conjunction with the card reader 216 for identifying the player.

Figure 3:
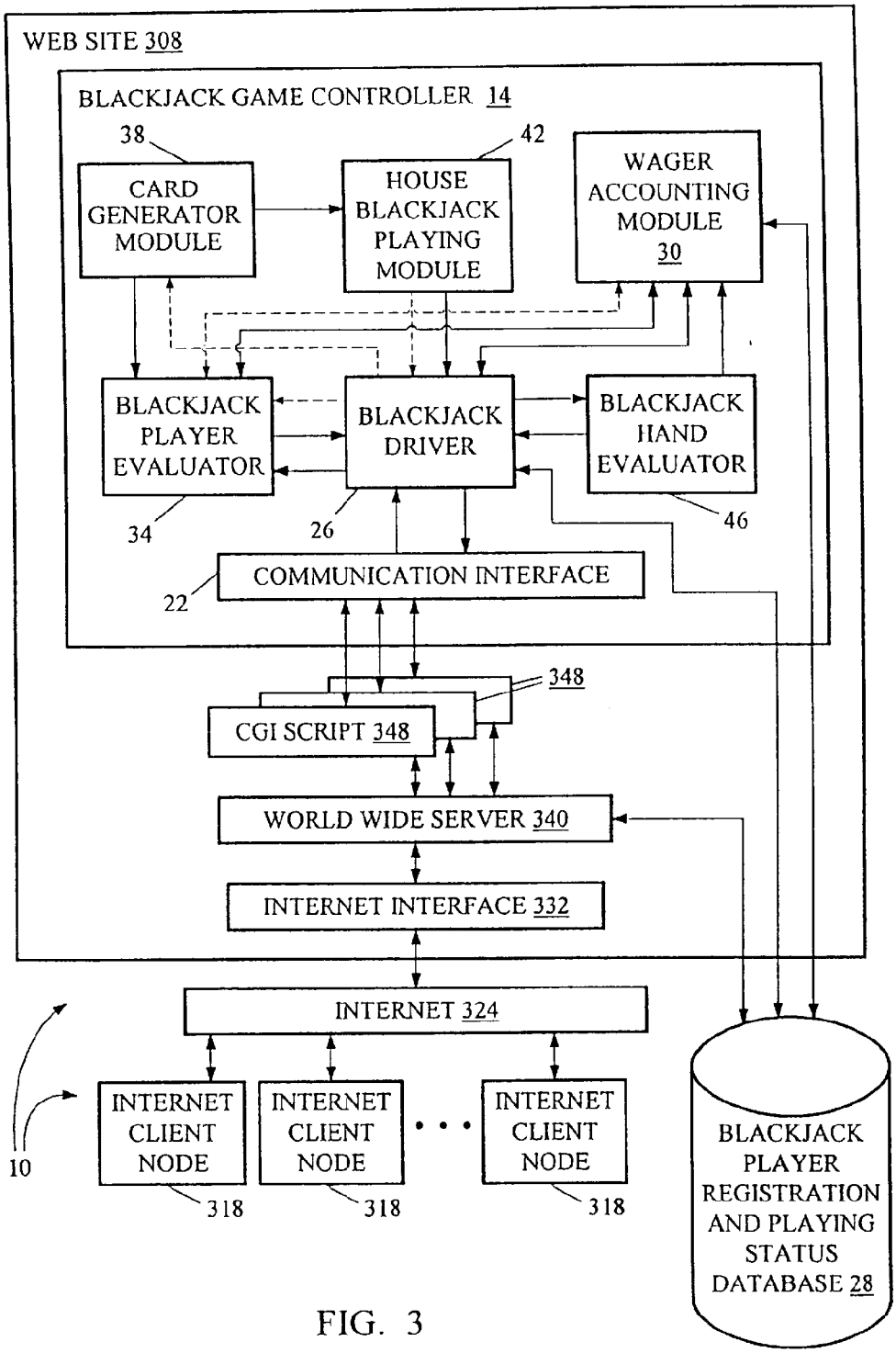
FIG. 3 is a block diagram of an alternative embodiment of the present invention wherein the present invention is used to play blackjack on the Internet.
Figure 4A:
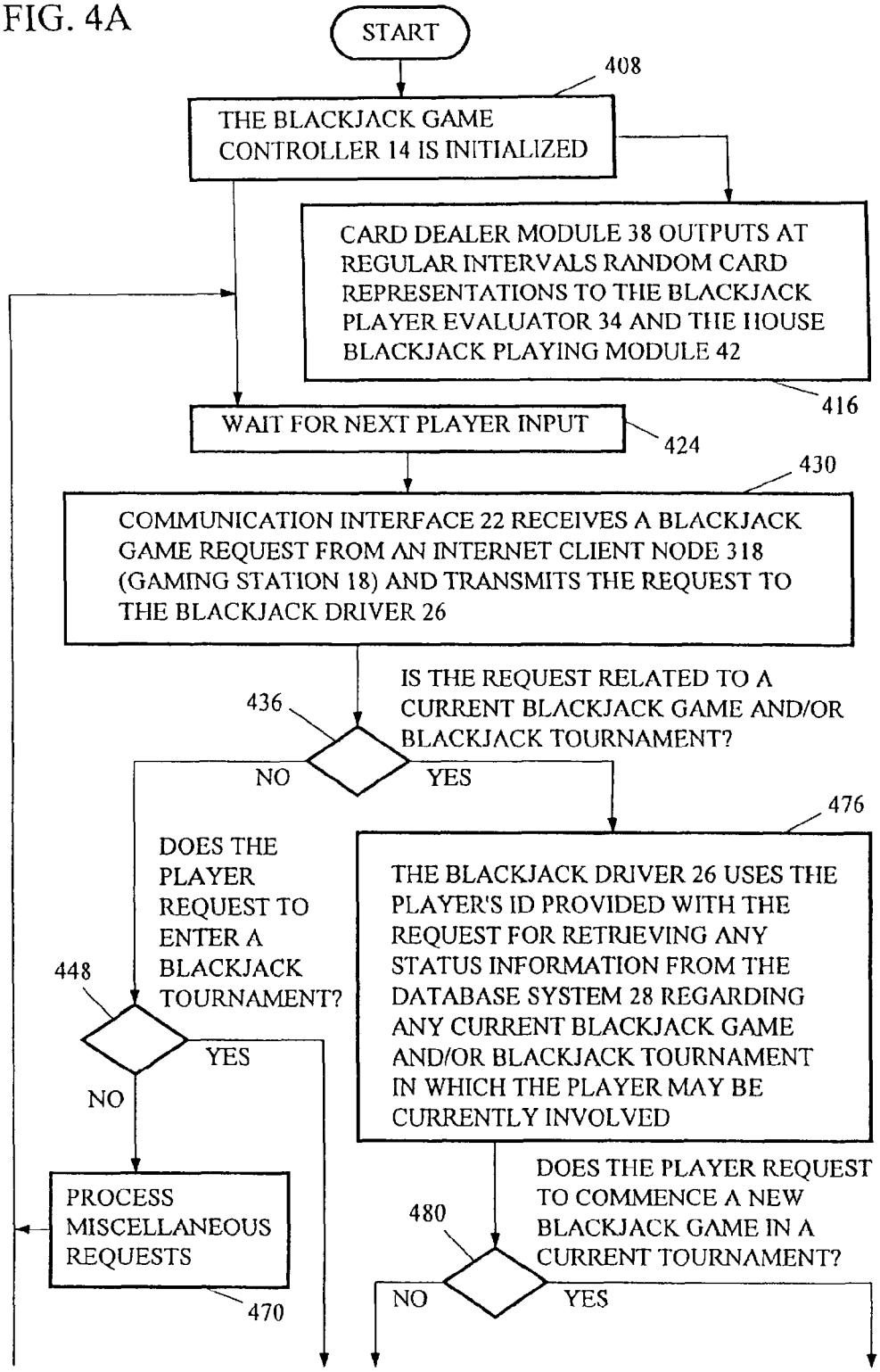
FIGS. 4A-4E represent a flowchart for the processing performed by the blackjack game controller 14 when processing blackjack requests from players in either of the embodiments of FIG. 1 or FIG. 3.
Figure 4B:
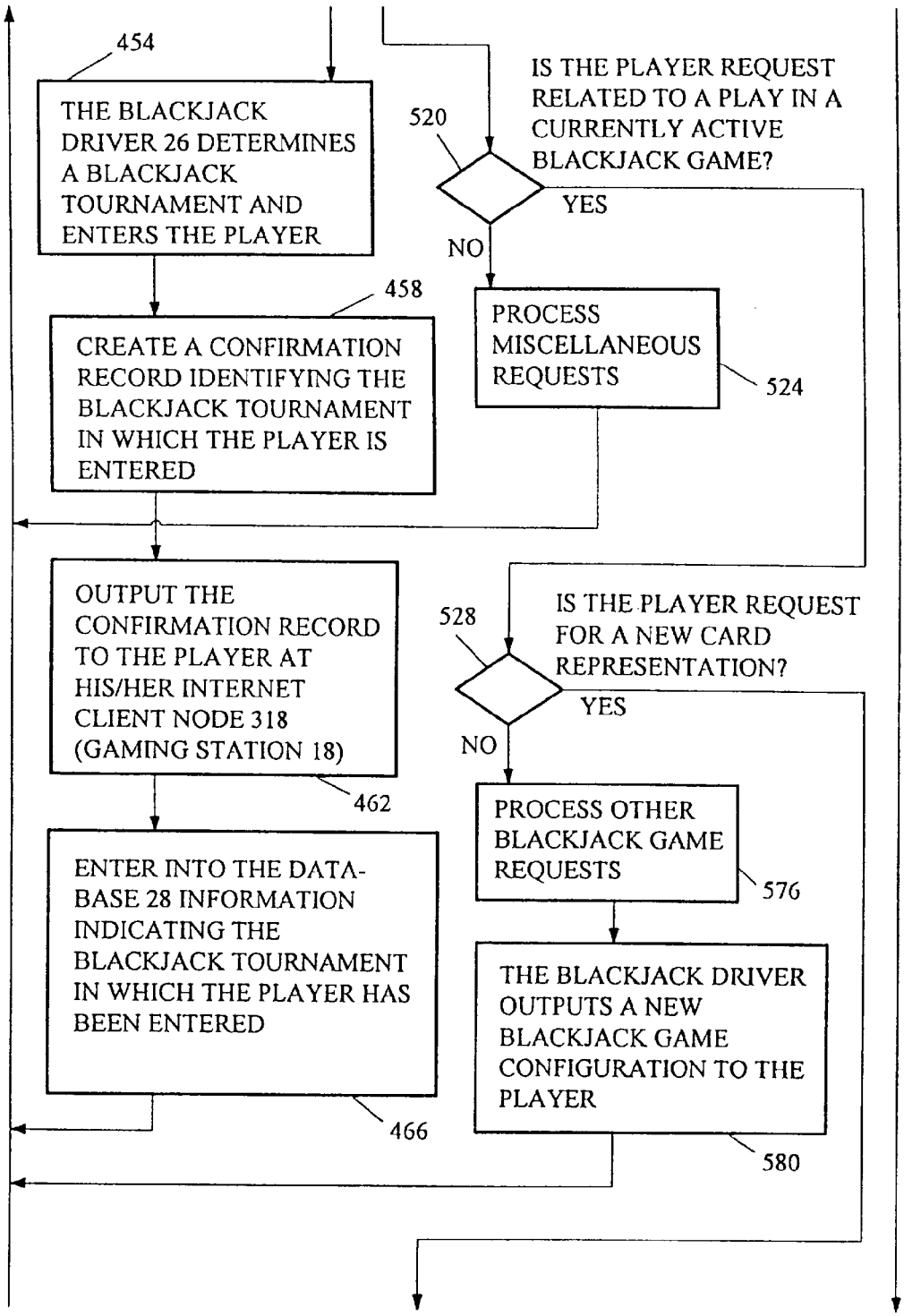
Figure 4C:
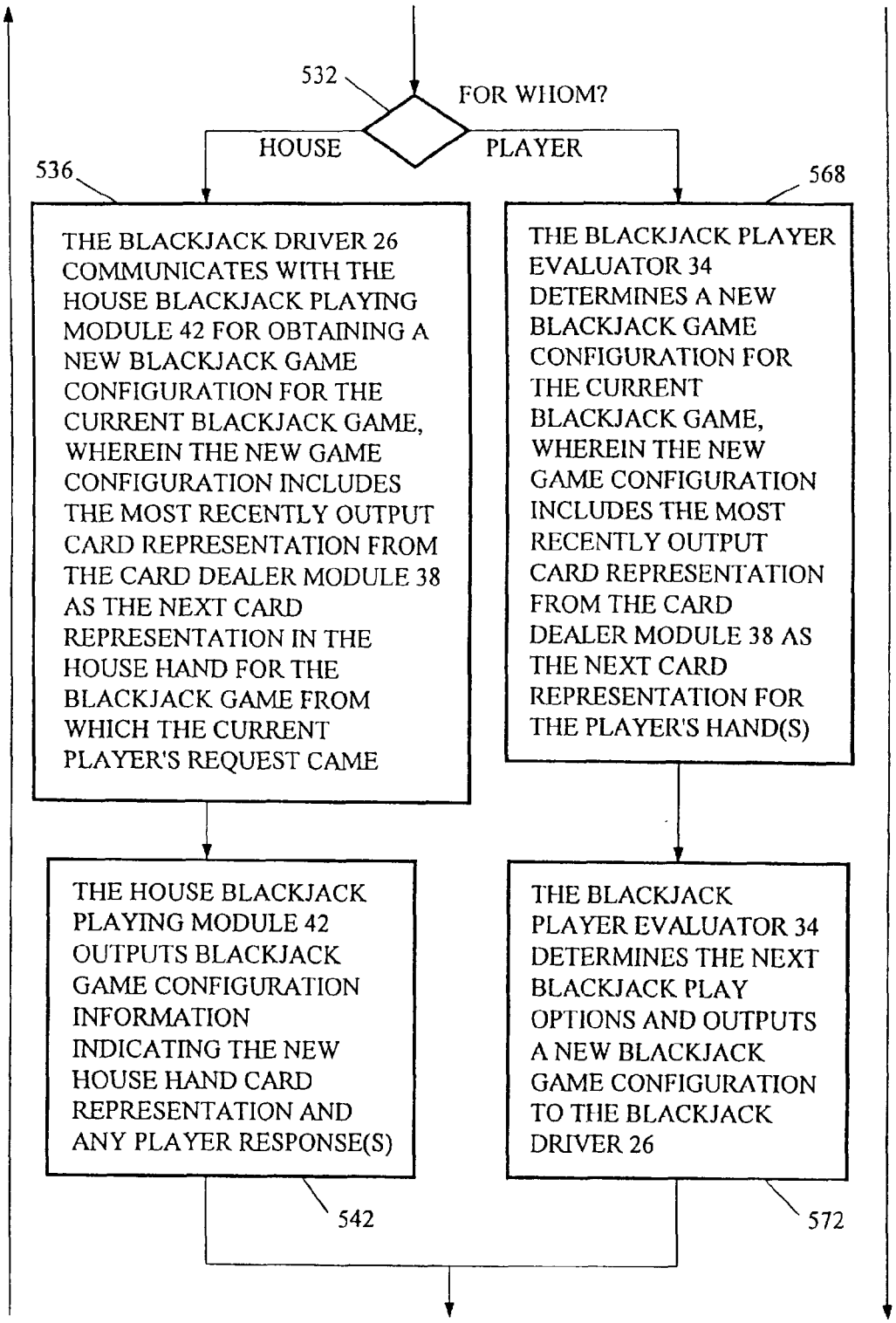
Figure 4D:
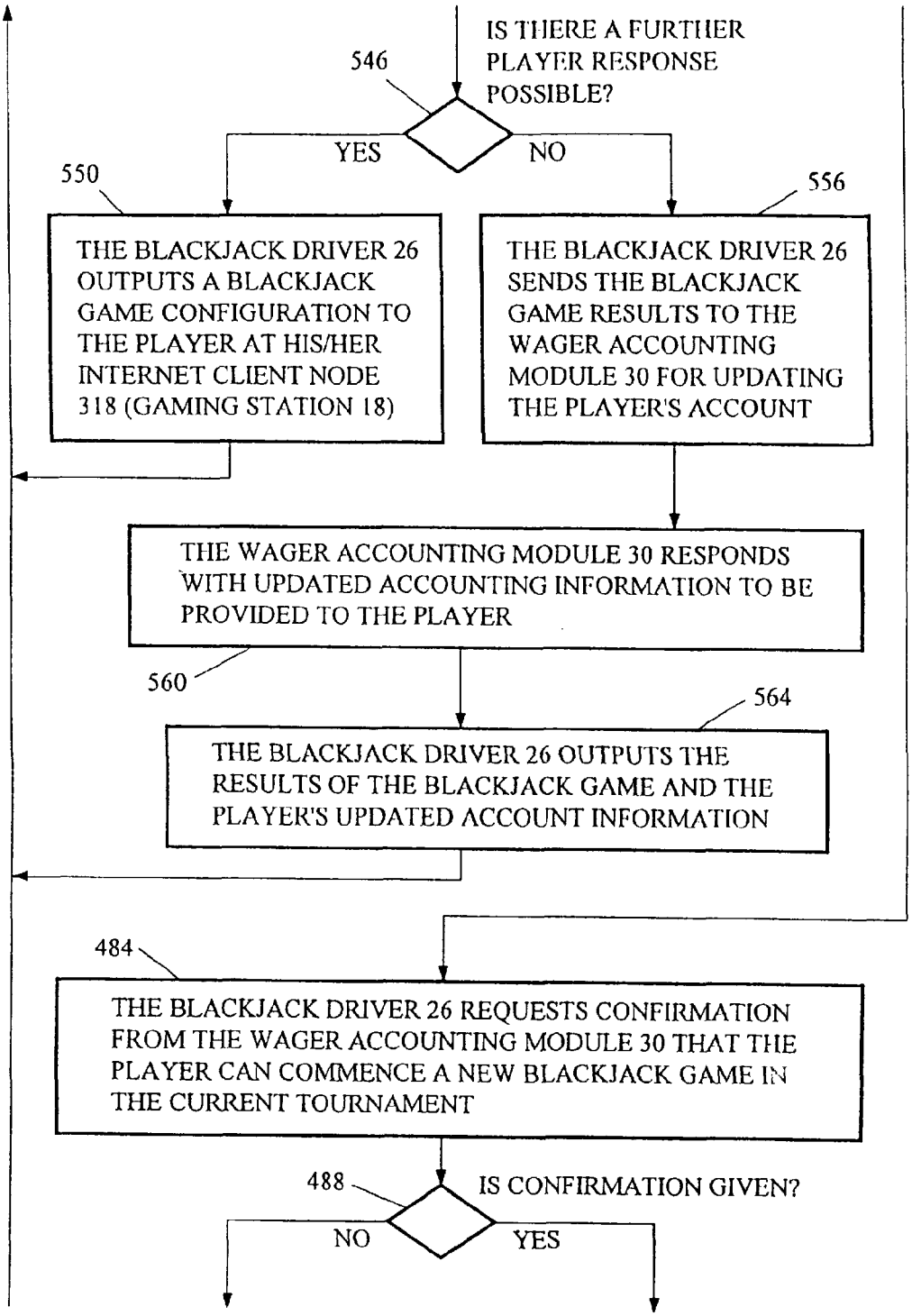
Figure 4E:
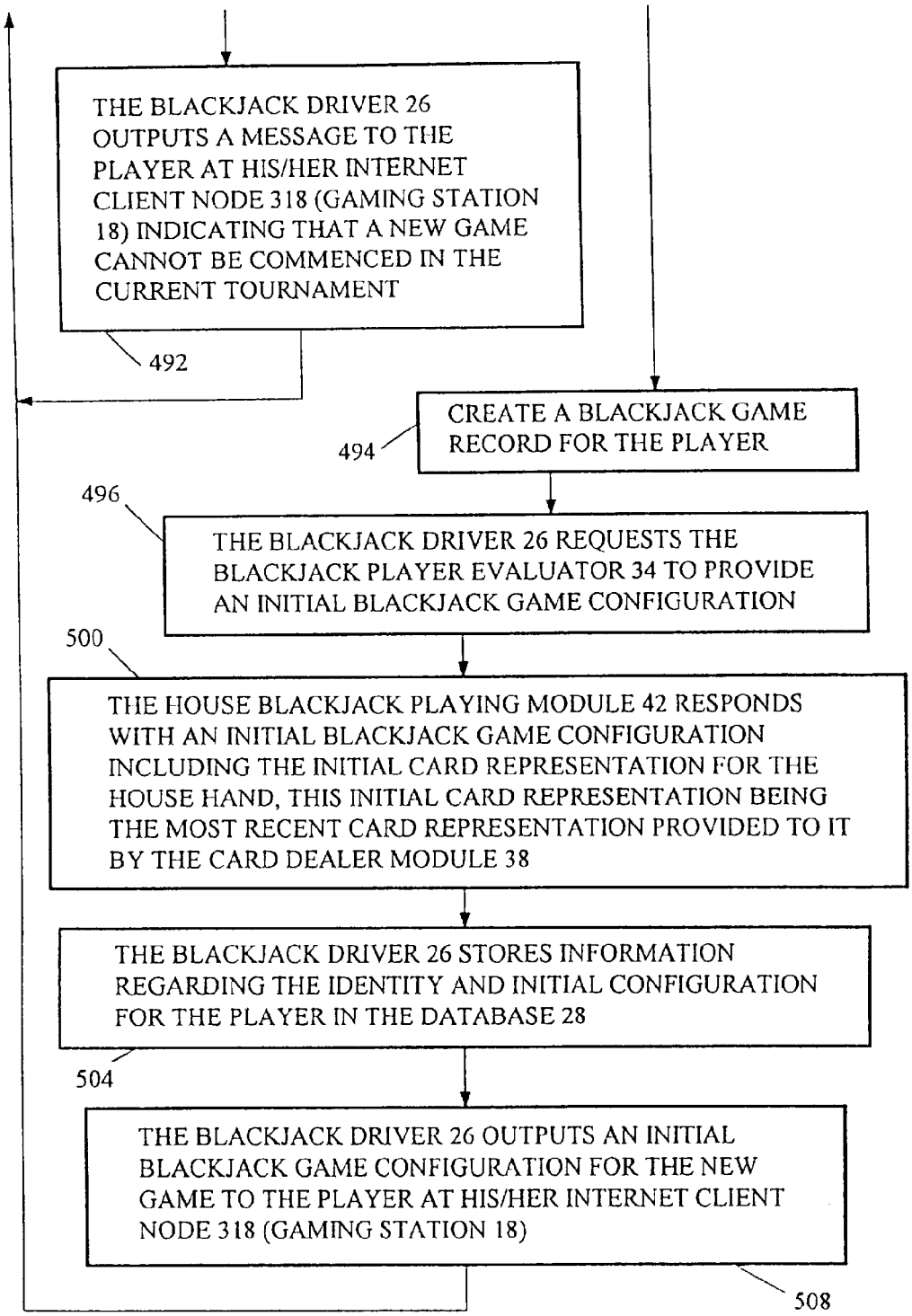

FIG. 3 presents a second embodiment of the blackjack gaming system of the present invention. In this embodiment, the blackjack game controller 14 is substantially the same as described hereinabove. However, this controller 14 is now accessible through an Internet web site 308 so that blackjack players at Internet client nodes 318 can play blackjack on the blackjack game controller 14 via the Internet 324 (or more particularly, via the World Wide Web).

Accordingly, describing the web site 308 in more detail, it includes an Internet interface 332 for receiving and supplying communications between the Internet 324 and the remainder of the web site 308. The Internet interface 332, in turn, communicates with World Wide Web server 340: (a) for validating and/or initiating registration of web site users (e.g., blackjack players) at web site 308; and (b) for interpreting Internet requests for routing and/or activating web site 308 modules that can fulfill such requests. Thus, the World Wide Web server 340 may access the database system 28 for determining the registration identity of, for example, a blackjack player. Additionally, upon receiving user registration confirmation regarding an Internet (e.g., World Wide Web) request, the World Wide Web server 340 activates instantiations of modules known as common gateway interface (CGI) scripts, each CGI script 348 instantiation (or, for simplicity, each such instantiation also being referred to as a CGI script 348) being: (a) for interpreting and processing Internet requests according to the semantics of a web site 308 application associated with the CGI script; and (b) for constructing Internet responses from output from the associated application. Thus, there are one or more common gateway interface modules provided wherein each CGI script 348 (instantiation) invokes the blackjack game controller 14 to process a single Internet blackjack request from an Internet client node 318 where a player is playing blackjack, and subsequently the CGI script 348 constructs an appropriate Internet response from the output received from the blackjack game controller 14.

Since the embodiment of the blackjack game controller 14 of FIG. 3 is substantially identical to that of FIG. 1, a description of its internal structure is not repeated here. However, it is worthwhile to note that the embodiment of FIG. 3 is particularly appropriate when the blackjack game controller 14 executes on a different or remote processor from that of, for instance, the processor performing the CGI script(s) 348. Further, note that if the blackjack game controller 14 executes on the same processor as the other web site 308 modules of FIG. 3, then the communication interface 22 may be unnecessary, and additionally, much of the functionality of the other components of the blackjack game controller 14 may be incorporated into one or more CGI scripts 348. Thus, for example, the blackjack player evaluator 34 functionality may be incorporated into one CGI script 348 while house blackjack playing module 42 functionality may be incorporated into another CGI script.

There are also noteworthy distinctions between the gaming stations 18 of FIGS. 1 and 2 and the Internet client nodes 318 of FIG. 3 as well as distinctions in blackjack play interactions. For example, the following distinctions may be provided:

(7.1) Due to the potentially lengthy delays that occur on the Internet, the embodiment of FIG. 3 does not provide for automatic acceptance of a blackjack play (e.g., acceptance of an input bet or a default to a minimum ante) due to a time period expiring. Thus, the speed of play is determined by the responsiveness of each player and the responsiveness of the Internet.

(7.2) Players may play blackjack in tournaments against one another on the Internet wherein, for each tournament entered by a player, he/she receives, without cost, a predetermined number of points to use for playing in the tournament. Note that prizes may be awarded to tournament winners as incentive to play in such blackjack tournaments. Further note that the time period to complete a tournament may be substantially more lengthy than the time periods for typical blackjack tournament play. For example, a tournament may extend for 90 days since players can play at their leisure.

(7.3) The input keys of gaming station 18 of FIG. 1 may be also presented on the display screens of Internet client nodes 318 wherein the input buttons of gaming station 18 now become active buttons on a blackjack web page generated by the web site 308 and presented to a player at an Internet client node 318. However, note that at least the speed of play key 280 is not necessary, as mentioned in reference to the embodiment of FIGS. 1 and 2 since the speed of play is of diminished importance.

(7.4) There may be other types of information output to an Internet client node 318 in addition to the information displayed in FIG. 3. In particular, advertising information may be provided with each web site 308 response to a player regarding, for example, blackjack tournament sponsors and prizes.

In FIGS. 4A-4E, a flowchart is presented of the high level steps performed by the blackjack game controller 14 when processing player requests in either of the embodiments of FIGS. 1 or 3 for playing a novel blackjack variation wherein new eligible card representations are generated periodically regardless of whether they are dealt in a blackjack game or not and wherein the blackjack players may play the game asynchronously from one another. In step 408, the blackjack game controller 14 is initialized so that it may process blackjack player requests and output appropriate responses to each player's request. Subsequently, in step 416, the card generator module 38 commences to output at regular intervals (e.g., less than two seconds such as every 0.5 seconds) random card representations to both the blackjack player evaluator 34 and the house blackjack playing module 42. Thus, for as long as the blackjack game controller 14 is properly responding to blackjack player requests, the card generator module 38 continuously and regularly outputs card representations. Concomitantly with the actions in step 416, the remaining steps of FIGS. 4A-4E are performed. Thus, in step 424, the controller 14 waits for a (next) blackjack player input, such inputs being, for example, requests to enter a new blackjack tournament, requests to commence a new blackjack game within a tournament, requests to process a blackjack game play request, a request for information regarding the players account, and a request for help information (such as how to play blackjack).

Upon receiving a blackjack player request, in step 430 the communication interface 22 queues the request and subsequently transmits the request to the blackjack driver 26. In step 436, a determination is made as to whether the player's request is related to a current blackjack game and/or current blackjack tournament. If not, then step 448 is encountered wherein an additional determination is made as to whether the player's request is to enter a new blackjack tournament. If so, then in step 454 the blackjack driver 26 determines a blackjack tournament and enters the player into the tournament. Note that in providing this function, the blackjack player 26 communicates with the wager accounting module 30 to confirm that the player is eligible to enter a new tournament. Thus, the blackjack driver 26 supplies the wager accounting module 30 with at least the player's identification and a specification of the tournament in which the player may be entered. Note that the tournament selection may be provided by the player in some embodiments of the present invention. Alternatively, the blackjack driver 26 may select a tournament for the player using tournament information stored in the database system 28. Assuming that the wager accounting module 30 responds with a confirmation that the player may be entered into the selected tournament, in step 458, the blackjack driver 26 creates a confirmation record identifying the blackjack tournament in which the player is entered. Subsequently, in step 462 the blackjack driver 26 outputs information in the confirmation record to the player at his/her Internet client node 318 (gaming station 18). Thus, in the embodiment of FIG. 3 of the present invention, the output of step 462 (and all subsequent such outputs to a blackjack player) are output from the blackjack driver 26 to the communication interface 22 for queuing until the output can be transmitted to the CGI script 348 that initiated the player request to which this output is a response. Subsequently, the output is transmitted to the World Wide Web server 340 and to the Internet interface 332 for transmitting on the Internet 324 and thereby being routed to the Internet client node 318 where the player is playing blackjack.

Following step 462, in step 466, the blackjack driver 26 enters, into the database system 28, information indicating the blackjack tournament in which the player has been entered. Note that the information entered here into the database system 28 is subsequently accessible both by the blackjack driver 26 and the wager accounting module 30 for determining the tournament(s) in which the player has been entered. Following this step, since the player's request has been processed, the flow of control loops back to step 424 to wait for the next player input from a player at an Internet client node 318 or alternatively a gaming station 18.

Returning now to step 448, if the player has not requested to enter a blackjack tournament then step 470 is encountered to process any miscellaneous blackjack player requests not related to a current blackjack game and/or blackjack tournament. For example, a player may request accounting information related to his/her blackjack gaming account. Assuming such requests are processed and responded to in this step, the flow of control again returns to step 424 to wait for a next player input.

Returning now to step 436, if the player request is related to a current blackjack and/or blackjack tournament, then step 476 is encountered wherein the blackjack driver 426 uses the player's identification (ID) provided with the request for retrieving any status information from the database system 28 regarding any current blackjack game and/or blackjack tournament in which the player may be currently involved. Subsequently, in step 480, a determination is made as to whether the player request is to commence a new blackjack game in a current tournament. If so, then in step 484 the blackjack driver 26 requests confirmation from the wager accounting module 30 that the player can commence with a new blackjack game in the current tournament. That is, the wager accounting module 30 determines whether the player has sufficient tournament credits to continue in the tournament. Following this, in step 488, the blackjack driver 26 determines whether a confirmation has been received from the wager accounting module 30. If no such confirmation is provided, then in step 492, the blackjack driver 26 outputs a message to the player at his/her Internet client node 318 (gaming station 18) indicating that no further blackjack games in the current tournament may be played by the player.

Alternatively, if in step 488 the blackjack driver 26 receives confirmation from the wager accounting module 30, then in step 494 the blackjack driver 26 creates a blackjack game record for fulfilling the player's request. Note that in creating the new blackjack game data record, the blackjack driver 26 communicates with the wager accounting module 30 to both debit the player's account for any initial ante corresponding to commencing the new blackjack game and also to output to the blackjack driver 26 data of this transaction for subsequently outputting to the player. Following this step, in step 496, the blackjack driver 26 requests the blackjack player evaluator 34 to provide an initial blackjack game configuration for the new blackjack game. Subsequently, in step 500, the blackjack player evaluator 34 responds with an initial blackjack game configuration, wherein this configuration includes the initial card representation for the player's hand (as shown, for example, in area 292 of FIG. 2). Note that this initial card representation is the most recent card representation provided to the blackjack player evaluator 34 by the card generator module 38. Thus, note that if two player requests to commence a new blackjack game were transmitted to the blackjack driver 26 in rapid succession, then step 500 may be performed for each of the requests before the dealer module 38 outputs a new random card representation to the blackjack player evaluator 34. Consequently, in such a case both players will be presented with an identical initial card representation for the player's hand. Subsequently, in step 504, the blackjack driver 26 stores information regarding the identity and initial configuration of the new blackjack game for the player in the database system 28. In particular, a blackjack game identifier for the new game is stored and associated with the identity of the blackjack player and the tournament to which the game is associated. Following step 500, in step 504, the blackjack driver 26 stores information regarding the new blackjack game for the player in the database system 28. In particular, the following information is stored regarding the initial configuration of the new blackjack game: the player's identity, the identity of the tournament for which the new game corresponds, and identifier identifying the new game, and an initial configuration for the new blackjack game including card representations and any initial required bets. Further, note that throughout the course of each blackjack game played by a player, the blackjack driver 26 and the wager accounting module 30 update information in the database system 28 as the game configuration changes due to interactions between the player and the blackjack game controller 14. Thus, for a blackjack game underway, each request from a player for continuing the game with a next play, need not provide the entire game configuration to the blackjack game controller 14. Instead, only sufficient information is required in the request for the blackjack driver 26 and/or the wager accounting module 30 to retrieve information related to the blackjack game configuration corresponding to the player's request. Following step 504, in step 508, the blackjack driver 26 outputs an initial blackjack game configuration for the new game to the player at his/her Internet client node 318 (gaming station 18). Subsequently, the flow of control once again returns to step 424 to await a next player input to the controller 14.

Returning now to step 480, if it is determined here that the player request is not to commence a new blackjack game in a current tournament, then step 520 is encountered wherein a determination is made as to whether the player request is related to a play in a currently active blackjack game. If not, then in step 524 the blackjack game controller 14 processes miscellaneous requests such as, for example, a request for special blackjack rules relating to a current game and/or tournament, the number of players remaining in the current tournament, the player's ranking in the current tournament, and the prizes for winners of the current tournament. Subsequently, assuming such miscellaneous requests are responded to, in step 524, the flow of control for the present flowchart returns to 424 to await a next player input.

Alternatively, if in step 520 the player request is related to a play in a currently active blackjack game, then in step 528 a further determination is made as to whether the player request is for a new card representation. If so, then in step 532, a determination is made as to whether the card request is for the house or for the player. If the card request is from the house, then in step 536 the blackjack driver 26 communicates with the house blackjack playing module 42 for obtaining a new blackjack game configuration for the current blackjack game, wherein the new game configuration includes the most recently output card representation from the card generator module 38 as the next card representation in the house hand for the blackjack game from which the current player's request came. Subsequently, in step 542 the house blackjack playing module 42 outputs blackjack game configuration information indicating the new house hand card representation and any player response(s) that the player may exercise in responding to the new blackjack game configuration.

Upon receiving the house blackjack playing module 42 output, in step 546, the blackjack driver 26 determines whether there is a further player response in the present game by invoking one or both of the blackjack player evaluator 34 and the blackjack hand evaluator 46. If there are additional possible player responses, then in step 550 the blackjack driver 26 outputs a blackjack game configuration to the player at his/her Internet client node 318 (gaming station 18) so that the player may exercise one of his/her available game options. Subsequently, having processed the player's request the flow of control again loops back to step 424 to await a next player input. Alternatively, if in step 546 the blackjack driver 26 determines that there are no further possible player responses, then the current blackjack game is complete and the blackjack driver 26 in step 556 activates the blackjack hand evaluator 46 for evaluating the blackjack game hands so that the blackjack hand evaluator can activate the wager accounting module 30 to update the player's account (according to the results of the blackjack game) in the database system 28. Following this step, in step 560 the wager accounting module 30 outputs to the blackjack driver 26 updated accounting information to be provided to the player. In step 564, the blackjack driver 26 outputs the results of the blackjack game and the players updated account information to the player. Also, note that the blackjack driver 26 updates the database system 28 regarding the completion of the present blackjack game as well as any further status information related to the player and the tournament to which the present blackjack game is associated. Subsequently, having processed the player's request, the flow of control again loops back to step 424 to await a next player input.

Alternatively, if in step 532 it is determined that the player's request is for a new card representation for the player, then in step 568 the blackjack driver 26 activates the blackjack player evaluator 34 for obtaining a new blackjack game configuration for the current blackjack game, wherein the new game configuration includes the most recently output card representation from the card generator module 38 as the next card representation for the player's hand(s). Subsequently, in step 572 the blackjack player evaluator 34 determines the next blackjack play options the player may exercise for the present game and then outputs the new blackjack configuration with these options to the blackjack driver 26. Following this, the steps 546 and subsequent steps are performed as described above.

Returning now to step 528, if the player request is not for a new card representation then step 576 is encountered wherein the blackjack game controller 14 processes other blackjack player game requests such as requests for additional bets, cancellations of bets, a request to stand on a particular player hand, a request to split a pair of card representations, or a request for insurance. Assuming, that such requests as described above are processed, in step 580 the blackjack driver 26 subsequently outputs a new blackjack game configuration to the player according to the processing performed in step 576. Also, note that the blackjack driver 26 updates the database system 28 with information relating to the new blackjack game configuration so that it may be retrieved upon a subsequent player request relating to the present game. Following this step, the flow of control for the present flowchart loops back to step 424 to again wait for another player input.

FIG. 5 presents a simple example of the operation of the present invention for playing blackjack wherein four blackjack games are shown being played asynchronously with the blackjack game controller 14. To describe FIG. 5 in detail, note first that the row of numbers 604 across the top of the figure represents a sequence of values of successive card representations output by the card generator module 38. That is, in a first time interval a card representation having a value of three is output, in a second time interval a card representation having a value of five is output, in a third time interval a card representation having a value of seven is output and so on across the row. Below row 604 are blackjack game rows 606, wherein each blackjack game row 606 represents a series of events that occur in each blackjack game 610 through 626 over the course of time corresponding to the series of card values 604. In particular, the numerical entries within each blackjack game row 606 correspond to the values of the player and house card hands as additional cards are added to the player and house hands of each blackjack game. For example, referring to blackjack game row 610, assuming this blackjack game commences with the player's hand obtaining the card representation for the leftmost card value of the sequences 604 (i.e. the value three), the player's hand has a corresponding value of three. Subsequently, if the house blackjack playing module 42 is activated for this game to output (i.e. deal) an initial card representation to the house during the second time interval (i.e. the card generator module 38 has output a card representation of five), then the house hand initially has a value of five. Subsequently, if in the third interval the player for blackjack game 610 provides a request for another card, then the card representation corresponding to the value of seven in sequence 604 is provided to the player and therefore the player's hand has a total value of ten. Following the incorporation of the seven into the player's hand, this blackjack game is delayed so that the next time interval corresponding to the value of two in [sequence] *sequences* 604 is not dealt to either the player or the house in blackjack game 610. Note that it is an important aspect of the present invention that card representations generated by the card generator module 38 are only incorporated into a particular blackjack game when a request for such a card representation is made during the time the card representation is the most recent output from the card generator module 38. Thus, one or more card representations output by the card generator module 38 during a blackjack game may not be used in the game. More precisely, it is typical (although not shown in the example of FIG. 5) that substantially any length or subsequence of consecutive card representations output by the card generator module 38 may be ignored within a given blackjack game due to time delays occurring in the game. Thus, in some circumstances such delays could be as long as a number of days if the player, for example, did not request another hit during such a time interval.

Continuing now with the remaining plays of blackjack game 610, note that in the fifth time interval the player requests a hit thereby obtaining a card representation having a value of nine and thus obtaining a player's hand value of nineteen. Subsequently, the house takes hits for the next two consecutive card representations having values eight and ten respectively. Thus, the house hand busted when the value of twenty-three was obtained for the house hand.

Blackjack game rows 606 for blackjack games 614 through 626 may be interpreted similarly to the description above for blackjack game 610. Note however that each of these games commence at a different time interval in that each game commences with a different card representation taken as the first hit for the player's hand. That is, the first card representation dealt in each of the blackjack games 610 through 626 is different and further each of the card representations requested corresponding to values of the sequence 604 is different for each blackjack game. Therefore, substantially every blackjack game, even if played concurrently with other blackjack games, will have unique player hands and house hands. Thus, not only can a large number of asynchronous blackjack games be played simultaneously head-to-head with the house, but also there may be a greater degree of confidence by the blackjack players that the house is not manipulating card representations in that blackjack players may substantially determine the timing for substantially all hits in a blackjack game (for both the player hand and the house hand) and thereby reduce any suspicions that the card representations are being manipulated. Moreover, in one embodiment, the players may request the sequence of card representations that were generated during the course of a game.

Note that the present invention also may include other blackjack variations as well. In particular, referring to step 416 (FIG. 4A) again, instead of generating card representations at regular intervals, this step may simply activate the card generator module 38 so that it generates a substantially random card representation on demand whenever a request for a new card representation is made (e.g., steps 536 and 568).

Additionally, in another blackjack variation, particularly suited for tournament blackjack where each player can be monitored, the players play each play of a blackjack game synchronously as blackjack is typically played with a human dealer in casinos. However, in the present variation, each player is provided with the identical card representations for their initial cards. Subsequently, each player hand and the house (i.e., dealer) hand varies between players only when players play their blackjack hands differently. That is, for each synchronously played blackjack game among a plurality of players, the same sequence of card representations is available to each player and the house blackjack playing module 42 so that, for example, the dealt card representations in each game between one of the players and the house blackjack playing module are identical for players playing the same sequence of plays throughout the game. Accordingly, as one skilled in the art will appreciate, for each blackjack game, it may be necessary for the card generator module 38 to maintain a predetermined sequence (or ordered collection) of card representations throughout the game so that players playing differently may be dealt an appropriately sequenced card representation. Moreover, it may also be necessary for the house blackjack dealer playing module 42 to provide sufficient control information to the card generator module 38 so that the card generator module can respond with the appropriate card representation from the predetermined sequence.

Figure 6A:
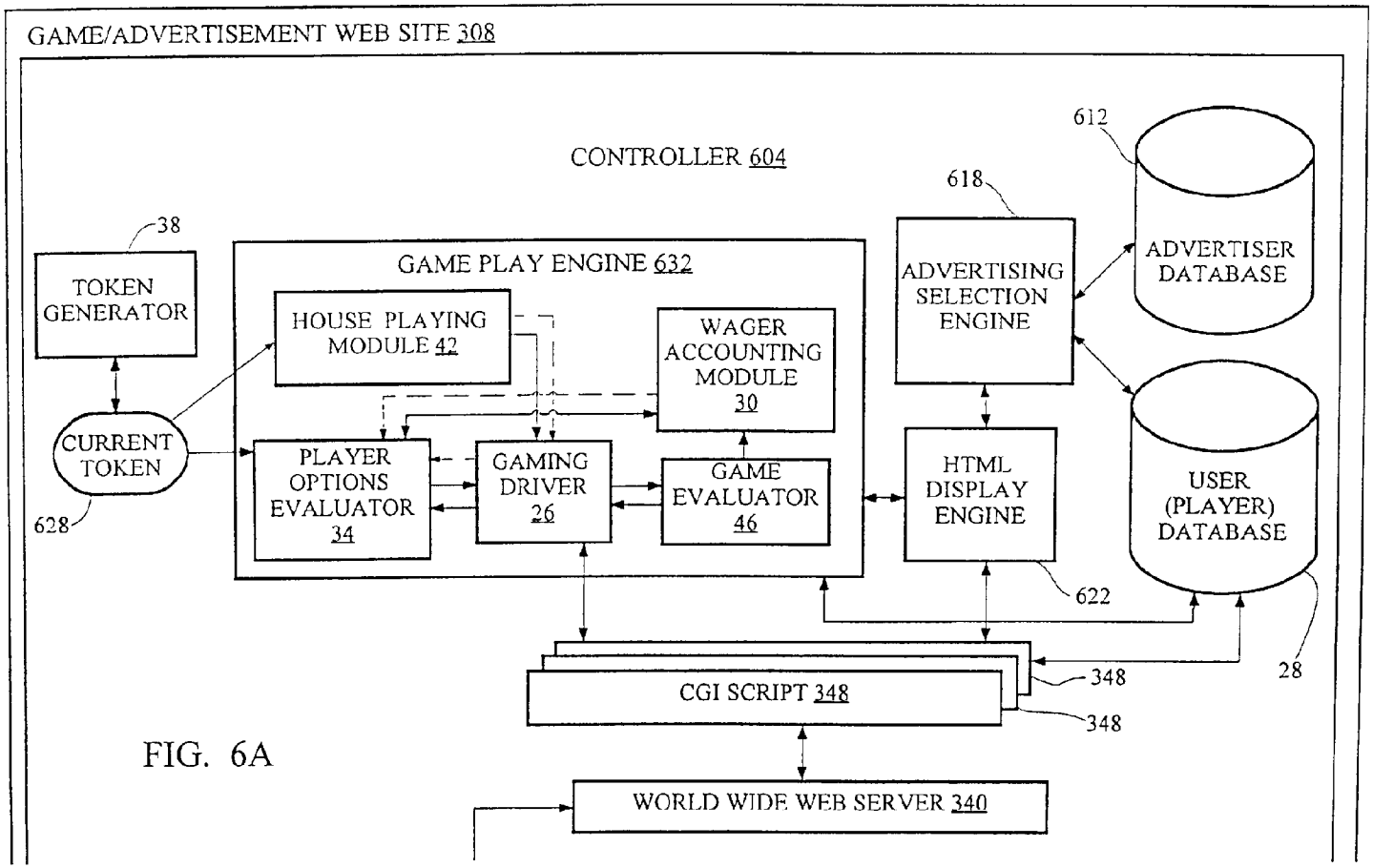
FIGS. 6A and 6B are a block diagram of an Internet embodiment of the present invention.
Figure 6B:
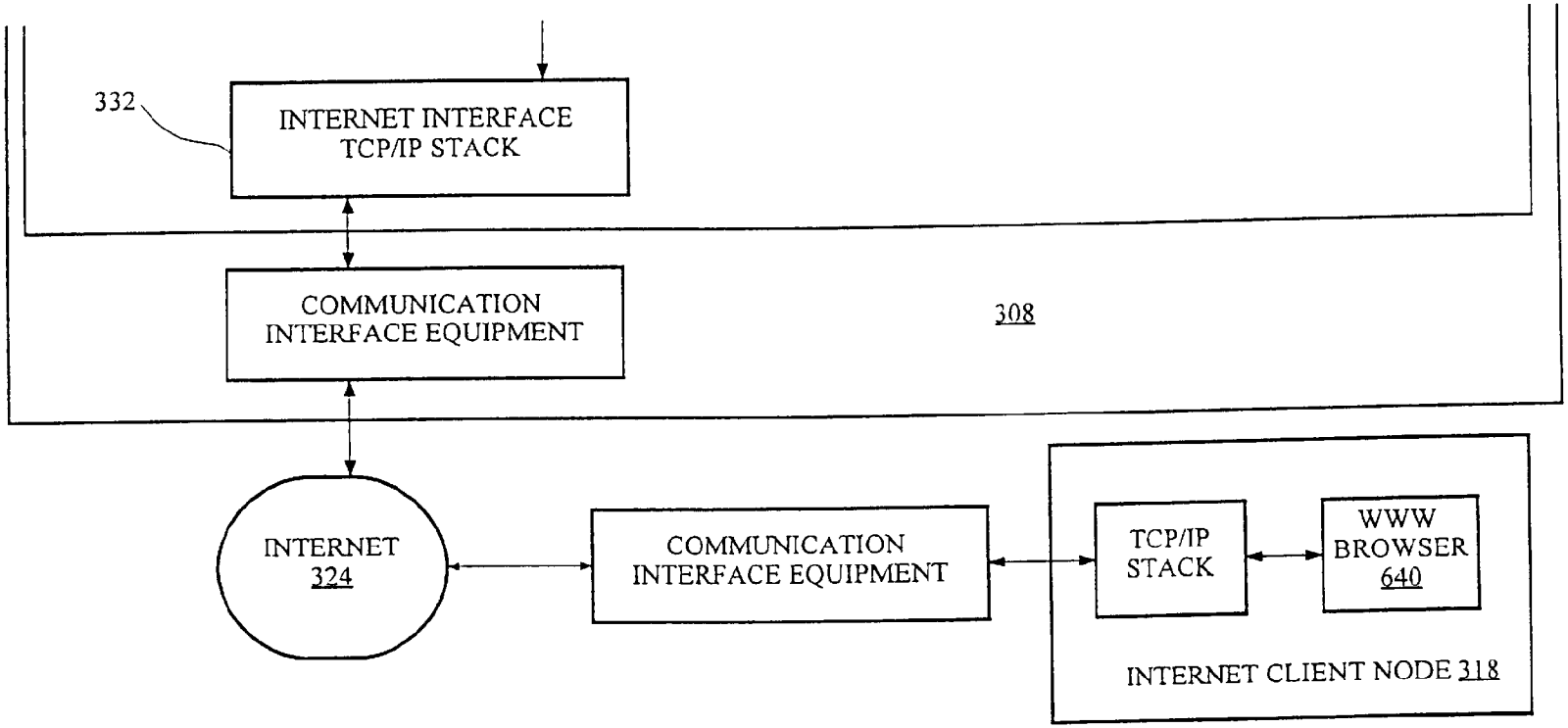

Another embodiment of the present invention is presented in FIGS. 6A and 6B, wherein this embodiment is enhanced for presenting sponsor or advertiser product and/or service advertising to qualified players that adequately match a predetermined player profile such as a demographic profile of a particular group of players. Accordingly, in FIGS. 6A and 6B, there is a game/advertisement controller 604 for providing substantially the same functionality as the blackjack game controller 14 (FIG. 3) except that games other than blackjack may also be played (such as poker, craps, pai gow and roulette). Additionally, the game/advertisement controller 604 also performs functions related to matching particular advertising with the users (i.e., players) playing the various games provided by the game/advertisement web site 308, wherein each user communicates with the web site 308 on a corresponding Internet client node 318 (alternatively interactive cable television node). That is, the present FIGS. 6A and 6B present the high level modules for matching players having desired user characteristics (e.g., profiles) with advertising from sponsors or advertisers requesting players with such user characteristics. In particular, only the players with such desired profiles qualify for receiving a particular advertisement and/or promotional (i.e., advertising) from a particular sponsor or advertiser. Accordingly, it is an aspect of the present invention that various criteria may be used to make such a determination as to which players (or, more generally, users) receive which advertising. For example, one or more of the following attributes may be used in matching users with advertising presentations:

(8.1) age,
(8.2) sex,
(8.3) financial status,
(8.4) location or residence,
(8.5) education,
(8.6) marital status,
(8.7) amount of recreational time,
(8.8) personal tastes and/or habits (e.g., smoker/non-smoker, preferences for sports, movies, liquor, foods, clothes, vacations, cars, etc.),
(8.9) size of household,
(8.10) number of children, and
(8.11) categorizations of users according to network interactions such as the type of web sites accessed, the type of advertising for which the user seeks additional information, the risk tolerance in playing games such as blackjack.

To provide (or, match) particular users with particular advertising, data (or user information items) on each user is maintained in the form of a user profile in the user (player) database 28 which is an enhanced version of the blackjack player registration and playing status database 28 of FIG. 3. The user profiles are populated with such user related information as in (8.1) through (8.11). This information is obtained when users register at the web site 308 when users respond to explicit questions subsequently asked of them, or by monitoring the network activities of users. Note that user profiles may vary in length, depending on the amount of information obtained on each user. Moreover, different types of information may be obtained for different types of users. For example, for users having assets of more than one million dollars, these users may be requested to enter their favorite vacation destination location since this may be important for certain advertisers. However, for users whose assets are less than forty thousand dollars, no such information may be obtained since the information would be likely irrelevant to any advertiser. Thus, in one embodiment of the user profiles, each user profile has a variable length section for storing user information items not uniform across all users. Moreover, in such an embodiment, each user information item stored in the variable length section may be considered as a pair, wherein the first component of each pair indicates or references a question, user attribute, or user classification to which the second component provides an answer or value related to the first component. Thus, for example, for a particular user, an information item may provide the pair: (4, "Madrid"), wherein "4" identifies the attribute: "favorite vacation destination location," and "Madrid" is the value for this attribute, as one skilled in the art will understand.

Alternatively, data related to the advertisers or sponsors may reside in a different database, the advertiser database 612. Accordingly, this database stores demographic profiles which, in one embodiment, have a data structure substantially identical to the user profile data structure. Such demographic profiles may have a variable length section for specifying requested values for user information items that may be provided in (potentially only a relatively small number of) user profiles. In some embodiments, a demographic profile includes a reference to the advertiser's or sponsor's identity, a reference to the advertising to be presented and a variable length section of demographic item pairs, wherein the first component of each pair has the same interpretation as the first component of a user information item pair and the second component of the pair specifies a desired value or range of values that the advertiser or sponsor prefers. Further, note that, in some embodiments, each demographic item pair may have additional information associated with it such as a perceived importance of the demographic item pair to the advertiser or sponsor. Thus, such additional information may be in the form of a normalized scalar value wherein a value of one indicates that the demographic item pair is of highest importance whereas a value of zero indicates that the demographic item is substantially irrelevant to the advertiser or sponsor. Accordingly, regardless of the particular embodiment of the demographic profiles, the users' demographic profiles are used to match (i.e., select) one or more corresponding advertising presentations with a particular target group of users that, presumably, are likely to purchase the product and/or service portrayed in such advertising presentations. Thus, since such advertising presentations may be provided to only users who are likely to be subsequent customers, advertisers and/or sponsors may provide to these users specifically targeted advertising having relatively expensive promotionals such as product or service discounts, free samples, or a trial usage.

Accordingly, to perform the selecting or matching of users with such demographic profiles, for each user, the user profiles stored in the user database 28 are compared with the demographic profiles by the advertising selection engine 618. Note that there are numerous techniques for performing such a comparison for selecting a group of users. In particular, a precise match may be required between each demographic item pair and a corresponding user information item pair so that the second component of the user information item pair is (within) a desired range as specified in the corresponding demographic item pair. Alternatively, various weighting statistical techniques may be used for determining a "similarity" measurement when not all demographic pairs are required to precisely match a demographic profile. In one embodiment, the similarity measurement may be provided by a statistical analysis module that determines the users that most closely match the corresponding demographic profile for an advertising presentation. Thus, in order for a user to be selected, the similarity measurement between the user's profile and a corresponding demographic profile may be required to be above a predetermined threshold. Additionally, note that the advertising selection engine 618 may perform the matching of users with advertising presentations as a background or non-real time process so that, for example, for each user profile in the user database 28, there is a related table identifying the advertising presentations that are candidates for presentation to the corresponding user when, for instance, this user communicates with the game/advertisement web site 308.

Moreover, it is important to note that at least in one embodiment of the present invention, the advertising selection engine 618 may, for a particular demographic profile, periodically re-evaluate user profiles in the user database 28 for reselecting the group of users to which an advertising presentation is to be presented. Thus, users previously selected may be requalified or disqualified and users previously disqualified may be now qualified for selection due to, for example, an enhanced user profile.

Accordingly, the present invention may commence or cease transmitting a category of advertising to a user whose user profile is enhanced with additional information. For example, if a user indicates that he/she is currently considering the purchase of a new car, then [adverting] *advertising* for purchasing a car may be transmitted to the user. Alternatively, once the present invention is notified that, for example, a car has been purchased or that no further car advertising is are desired, then a further enhancement of the user's profile may be performed so that no further advertising from the category of car advertising is transmitted to the user.

Note that the present invention provides for flexibly creating, deleting and modifying categories of advertisements by providing techniques for linking demographic item pairs that are similarly related to a category record or object. Thus, at least the following advertising categories may be provided by the present invention: sports categories (e.g., baseball, soccer, hockey, etc.), food related categories (e.g., restaurants, grocery stores, food items), exercise related advertising (e.g., bicycles, in-line skates, skiing), insurance related advertising (e.g., auto insurance, life insurance), political related advertising (e.g., for or against a particular political candidate), and geographical related advertising (e.g., for users living in a particular area such as the Denver metropolitan area). Thus, the advertising selection engine 618 supplies the selected advertising presentations to the HTML display engine 622 for translating this data so that it may subsequently be included in an HTML output to the user by the common gateway interface 348.

More precisely, the selected advertisement data is joined in the HTML display engine 622 (at least in one operation of the present invention) with a token 628 representing, for example, a gaming card (for a current user game) that has been issued by the token generator (module) 38, this generator being an enhanced version of the card generator module 38 of FIG. 3. The generated token is supplied initially to the game play engine 632 for processing user gaming requests according to the rules of the game being played. That is, the game play engine 632 determines, for each available game:

(a) how each token may be "played"; (b) who receives the token, for example, the user or the house playing module 42; and (c) the result of playing the token. Note that in one embodiment, the token generator 38 generates tokens on request by, for example, the house playing module 42 and/or the player options evaluators 34, wherein the tokens generated are appropriate to the game being played. Alternatively, in another embodiment, the token generator 38 may generate random tokens and the game play engine 632 transforms the tokens into appropriate randomized values for the game offered, as one skilled in the art will appreciate. Furthermore, other embodiments for supplying randomized tokens to a plurality of different games are within the scope of the present invention. Additionally, the game play engine 632 contacts the player database 28 to maintain the status of the user in relation to the particular game being played as well as the user's relationship to all of the other users (if, for example, the user is involved in a tournament offered at the game/advertisement web site 308). Note that, as one skilled in the art will appreciate, in one embodiment of the game play engine 632, its internal modules provide a similar architecture and functionality to the correspondingly labeled modules of FIG. 3, albeit additionally, for games other than blackjack (e.g., "head-to-head" poker, craps, roulette, and pai gow).

The common gateway interface or CGI scripts 348 transfer data between the HTML display engine 622 and the World Wide Web server 340 which, as one skilled in the art will understand, may be a plurality of high level executable programs as discussed in the description of CGI scripts 348 of FIG. 3. The World Wide Web server 340, in turn, transfers the data to the Internet TCP/IP stack 332 that interfaces with the Internet 324 for transferring the data to an intended Internet client node 318 having an appropriate World Wide Web browser 640.

The present embodiment maintains information on the status of games being played and user responses to advertising in the user database 28. Moreover, additional advertiser specific information (e.g., desired demographic profiles, advertisements, promotionals, and information related to user responses) is provided in the advertiser database 612. Accordingly, as discussed above, the demographic profiles in the advertiser database 612 may include schemas or templates having fields for designating one or more of the attributes (8.11) through (8.11). Moreover, the databases 28 and 612 may maintain records of various types of pertinent statistics such as: (a) the advertising presentations presented to each user; (b) the time, date and number of presentations of a particular advertising presentation; and (c) the detected user responses to the advertising. Thus, this information may provide advertisers or sponsors with enhanced feedback as to the efficacy of their products, services and presentations thereof. [For example] *Thus, by maintaining data regarding information are: (i) each game played, (ii) the users and (iii) the advertisers, the host computer 308 may maintain accurate records of every type of pertinent statistics such as: all advertisements seen by all users so that the time, date and number of views are available to the advertiser to confirm and verify e.g., (9.1) through (9.3) following, and additionally*, an advertiser may be able to query the user and advertiser databases 28 and 612 to obtain such feedback as:

(9.1) who has seen a particular advertisement;

(9.2) when it was seen;

(9.3) the number of times the advertisement was accessed:

(a) by any particular user;

(b) by all users; and (9.4) the number of favorable and/or unfavorable responses.

Figure 7:
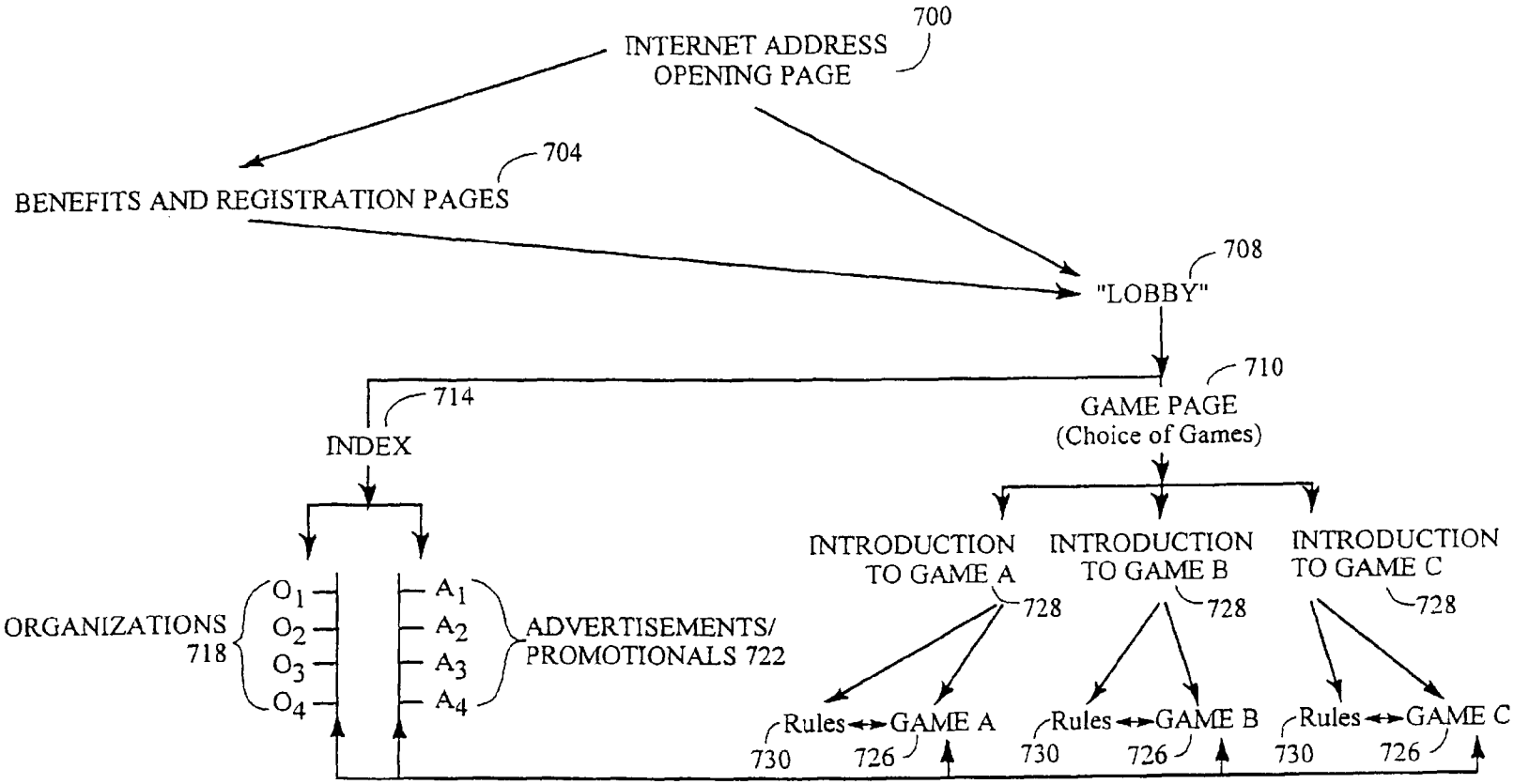
FIG. 7 is a diagram illustrating how a user navigates through web pages of the World Wide Web for accessing the game/advertisement web site 308 (FIG. 6) functionality.

Referring now to FIG. 7, a diagram is presented providing one embodiment of the access routes or paths users navigate in accessing the features of the game/advertisement web site 308. In particular, upon initiating Internet contact with the game/advertisement web site 308, a user is first presented with the opening page 700 identifying the web site 308. Subsequently, the user can access the benefits and registration pages 704 for viewing general information related to web site 308 and also for registering at the web site (as is discussed in further detail below). Alternatively, the user may access one or more "Lobby" pages 708 to view the gaming and information exchange capabilities as, for example, provided by advertisers. Assuming the user is registered at the game/advertisement web site 308, the user may proceed from the LOBBY 708 to the game page 710, wherein a game 726 or game rules 730 can be selected for playing, via the introduction to game pages 728. Alternatively, the user may instead access one or more index pages 714 having, for example, listings of organizations to which the user may be allowed to access depending on the affiliations of the user (e.g., a member of a particular membership discount store chain). Additionally, from the index page(s) 714 substantially any user may access an advertisement or promotional provided by an advertiser on an advertiser page(s) 722. However, it is an aspect of the present invention that information related to certain promotionals provided by advertisers or sponsors are restricted. That is, such promotionals may be only presented to users having a demographic profile that has been determined by the present invention to be sufficiently compatible with a desired user profile for the advertiser or sponsor to warrant providing such a promotional. Thus, the present invention provides access to certain advertiser promotionals only to "qualified" users who are, for example, considered likely subsequent purchasers of the advertiser's products and/or services. Additionally, such promotionals may also be presented to users who express an interest in a particular product or service advertised. For example, users who (a) request additional or supplemental information related to an advertised item, or (b) provide a favorable response to such advertising (by, for instance, indicating a preference for an advertised item), or (c) respond to a questionnaire related to personal information or marketing survey information may also be provided with information regarding promotionals. Thus, advertisers or sponsors may offer relatively substantial or expensive promotionals via the present invention to such users as well. Moreover, the present invention may also utilize such demographic profiles to prohibit a user not sufficiently matching such a demographic profile from gaining access to a corresponding promotional. Accordingly, in one embodiment of the present invention, when the user accesses an advertiser page 722, the user's profile (in the user database 28) is compared with the demographic profiles in the advertiser data base 612 for determining any promotionals that can be presented to the user.

Moreover, from the index page 714 the user may be provided with the ability to link into various web sites or web site pages. That is, the user may be provided with the ability to link into another web site or web page at any time a link is made available (typically a hypertext link). Additionally, note that similar links may be accessible by users while playing a game 726. However, these links may generally hyperlink the user to an advertiser page 722 within the game/advertisement web site 308 so that the user may be exposed to further information and/or presented with promotional options for an advertised item. For instance, certain advertising hyperlinks may be integrated into the presentation of plays of a game 726. Accordingly, since an aspect of the present invention is to repeatedly integrate different advertising presentations (and any related hyperlinks) into the play of a game 726, a user may repeatedly be enticed to seek out additional information about different products or services by activating the related hyperlinks. Moreover, it is also an aspect of the present invention that when such hyperlinks provide the user with access to a different web site, that at least a portion of the display of the user's Internet client node 318 maintains a graphical format associated with the game/advertisement web site 308, and that the user may leave and return to the web site 308 without the user being aware of accessing another web site. Moreover, by monitoring user input related to an advertising presentation, the present invention is able to provide feedback to an advertiser as to, for example, the number of times the advertising presentation is accessed by users for such additional information about products or services.

Also note that some advertisements (presented via advertiser pages 722 or as part of a game play presentation) may be interactive with the user wherein the user may perform a transaction such as making a reservation (e.g., an airline or hotel reservation). Further, a user may be given the opportunity to provide positive and negative opinions or responses on, for example, various advertisements, promotionals and other related matters by expressing such responses upon accessing advertisement related information. Thus, it is an aspect of the present invention to be able to conduct "test marketing" in that [satisfactory] *statistically* representative groups of users may be selected for determining:

(10.1) the efficacy or appeal of one advertisement in comparison to another advertisement for a particular advertised item;

(10.2) the profile of the users that are responsive to a particular advertising presentation; and/or (10.3) whether a particular group of users, for example, having similar user profiles favorably respond to a particular advertising presentation. For example, the present invention may determine such a response: (a) by detecting an activation of a hyperlink, (b) by detecting a response to questions presented, and/or (c) by determining the length of time the advertising presentation is displayed or visible.

Accordingly, input response data may be transmitted to the game/advertisement web site 308 and retained for subsequent statistical evaluation. Thus, resulting aggregate statistics can be made available to, for example, advertisers or sponsors, thereby preserving the privacy of the users. In particular, statistics may be made available for:

(11.1) providing information about, for example, the efficacy of certain advertising presentations (e.g., the number of positive responses to such presentations and/or the number of advertised items sold directly through the advertisements at the game/advertisement web site 308);

(11.2) providing information related to the number and profile of users accessing certain advertising presentations;

(11.3) determining measurements related to the number of different (groups of) users to which an advertising presentation has been presented;

(11.4) determining the total number of presentations of a particular advertisement;

(11.5) determining the cost of advertising presentations to the advertisers and billing the advertisers for such costs according to, for example, at least one of: (a) the number of users to which an advertisement is presented, (b) the number of promotionals requested or (c) the number of network user communications (i.e., hits) with the web site 308;

(11.6) determining if an advertising presentation should be discontinued because the advertiser's cost limits have been reached, such limits being, for example, related to a total number of presentations of an advertising presentation. Note that, in one embodiment, it is an aspect of the present invention to charge an advertiser for each presentation to a user; or (11.7) determining which of an advertising presentation and a different second advertising presentation (from the same advertiser) is most effective when both are provided to various selected (groups of) users, so that the advertiser or sponsor may then have a basis for choosing the most appropriate of the two advertising presentations in future advertising.

Additionally, it is an aspect of the present invention that it may also maintain statistics (and/or related information) for:

(12.1) providing "real time" game rankings of users (players) involved in a gaming tournament provided by the [game advertisement] *game/advertisement* web site 308. Note that such rankings may be provided to a user so that he/she may know his/her standing and the number of players remaining in the tournament; and (12.2)providing a"style of personality" of the game playing users so that, for example, a risk tolerance of such users may be estimated and used to determine if a particular user might be interested in a particular product or service. Thus, such "style of personality" statistics for a user may be stored in the user's profile. For example, the information captured here may include: average size of wager, average size of wager in comparison to the total amount that could be wagered, length of time playing in a single session, the ratio of the number of wagers on high risk plays presented, and the skill of the player.

Accordingly, the following aspects of the present invention are noteworthy:

(13.1) the user may be provided with free access or reduced cost access to other areas of the Internet 324 upon viewing the presentations of certain organizations and/or advertisers. Note that the ability to reduce the cost of accessing the Internet may act as a vehicle for attracting various users;

(13.2) the index page 714 gives a user the opportunity to access a particular organization (e.g., organizations 718) that the user may belong to or any particular advertiser (e.g., advertisers 722) without going through any games although the user may be required to go through the "LOBBY" page(s) 708 and thereby be exposed to advertising and/or the opportunity to join a game;

(13.3) a user may also be able to go from an initial organization page 718 to an introductory game page 728 (e.g., for a game 726) but, unless authorized, may not be provided with further access to the organization's web pages or the game;

(13.4) while playing a game 726, the user has the ability to access further information related to an advertisement or promotional being presented;

(13.5) during the playing of a game 726 (e.g., blackjack), the user may be allowed to review and/or stepwise replay a previous portion of a game 726 during a current gaming session;

(13.6) when in a particular organization page 718, the user may be required to return to the index page 714 before linking into an advertiser 722 unless a direct link has been provided for some reason on the particular organization web page. Moreover, the user may access the game page 710 from the index page 714 and vice versa;

(13.7) a user may either go directly into playing a particular game 726 (as authorized) or to a rules section 730 for reviewing the rules for the corresponding game 726. Note that a user may always access the rules section 730 during the corresponding game 726;

(13.8) there is a help feature for providing information such as:

a) how to do some particular action or the reason for some action or the reason an action is blocked. For example, the reason for an inability to access a certain web page, the reason for an inability to make a particular game play, such as a bet, stand or hit in the game of blackjack and/or the reason for a particular result of a certain bet, hit, stand or other user play in a game such as blackjack;

b) for contacting a gaming referee for resolving gaming conflicts. Such a referee will be available to resolve any dispute. Note that the user can notify the management operating the present invention of a problem via, for example, notification forms displayed when a notification button is activated.

Referring now to an alternative embodiment of the present invention presented in FIG. 8, wherein the game/advertisement web site 308 coordinates with a third party Internet access service provider 810 (or interactive cable television provider) for providing Internet 324 (cable television) access to users on a reduced cost or free basis once a user has registered with the web server 340 (cable television provider). That is, the game/advertisement web site 308 contacts the user's Internet service provider and arranges to subsidize the user's Internet service charges in return for the gaming advertisement web site 308 being able to repeatedly download to the user's [Interent] *Internet* client node 318 (or alternatively, interactive cable television node), unrequested information such as advertising for presentation to the user.

Accordingly, a prospective user of the present invention can sign up or register with the game/advertisement web site 308 for reduced Internet service fees by dialing into an Internet service provider 810 with normal serial dialing and after gaining Internet access, subsequently log on to the web site 308 as a user identified by the generic user identifier "NEW." Each user identified by "NEW" is forced into a connection with an enrollment or registration program so he/she can provide information requested by the present invention that can subsequently be used in determining which advertising to present to this user according to, for example, advertiser preferences. Thus, when registration is completed, the present embodiment of the invention downloads, for example, an ad viewer program 812 and a communications daemon (e.g., ad receiver daemon 806) to the user's Internet client node 318, wherein this daemon allows the game/advertisement web site 308 to download to the user's Internet client node 318 unrequested information such as advertising repeatedly. Accordingly, assuming the daemon 806 is installed, the user may access not only the gaming and advertisement services of the web site 308, but also access substantially the entire Internet through the web site 308 at a reduced cost. Thus, whenever the end user processor 318 connects with the Internet service provider 810, the game/advertisement web site 308 is alerted by the Internet service provider 810 and the DISPLAY ENGINE 622 starts up the downloaded daemon 806 via Internet communications with the user's Internet client node 318. Subsequently, the DISPLAY ENGINE 622 periodically sends selected advertising to the daemon 806. Accordingly, the daemon 806 utilizes the ad viewer program 812 to coordinate the display of the advertising presentation.

Note that various alternative embodiments related to the architecture and functionality of FIG. 8 are also within the scope of the present invention. For example, instead of communicating with a plurality of third-party Internet service providers 806 for determining when users registered with the present invention are accessing the Internet via subsidized Internet connections, the game/advertisement web site 308 may include or be related to a dedicated Internet service provider 806 so that when a user registers with the present invention, the user is provided with a new Internet access code for the dedicated Internet service provider 806 and the user's Internet access fees may be subsidized.

However, regardless of how the present invention subsidizes Internet access, the game/advertisement controller 604 is notified whenever each subsidized user connects to the Internet or disconnects from the Internet. Additionally, certain reliability features are included in the daemon 806 and ad view program 812 for assuring that advertising is indeed presented to the user. For example, there may be periodic transmissions from each subsidized user's Internet client node 318 to the web site 308 verifying that both the daemon 806 and the ad view program 812 are active. Note that whenever any advertising is received at the user's Internet client node 318, the daemon 806 transfers the advertising to the ad viewer program 812 which, in turn, converts the transmitted information to a displayable format and forces the display of the user's Internet client node 318 to present the advertising unobscured to the user.

Additionally, note that in certain contexts the DISPLAY ENGINE 622 may transmit a message to an Internet Service Provider 806 indicating that no further Internet access will be subsidized due to a predetermined number of advertising presentation display failures.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

Figure 8A:
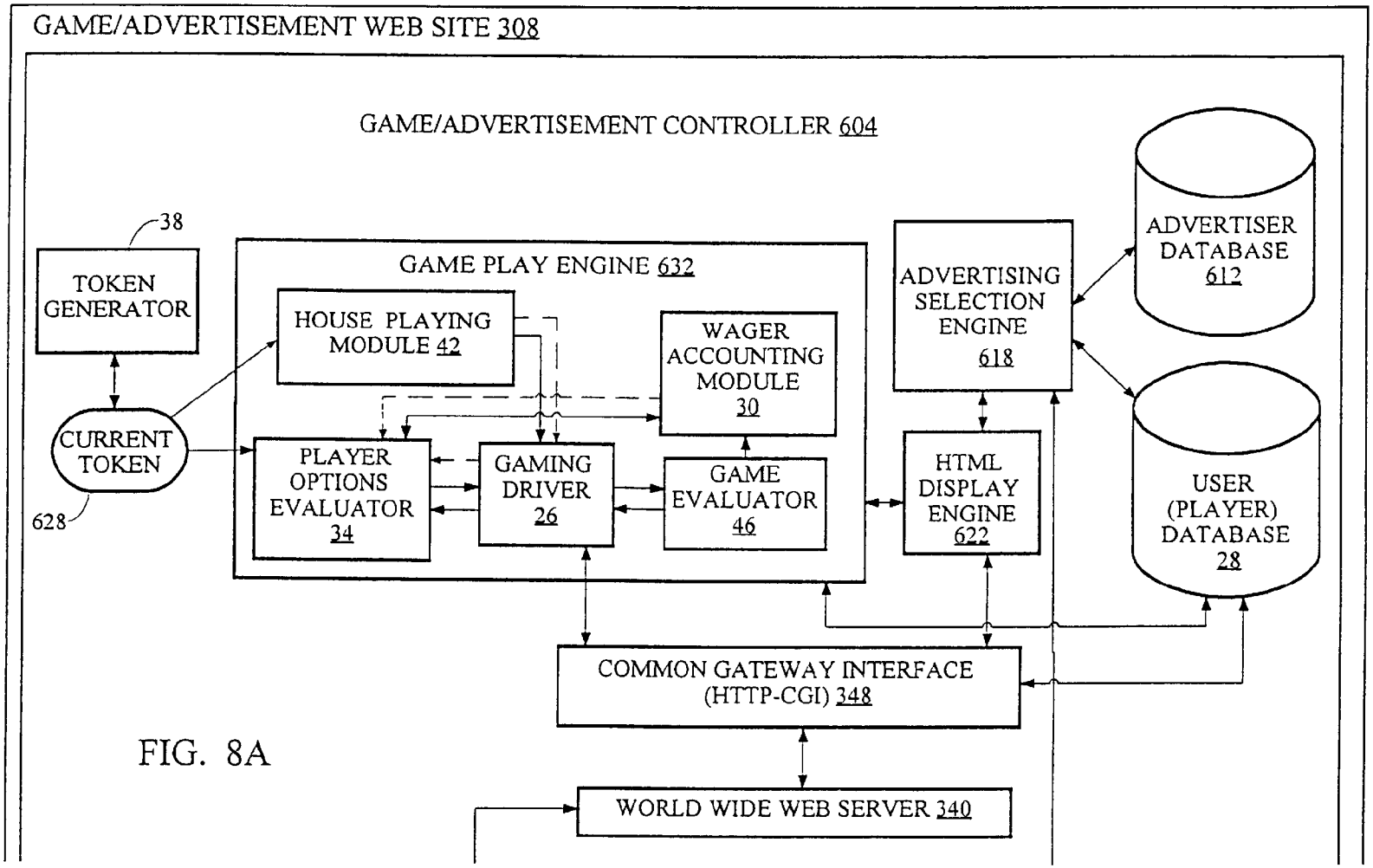
FIGS. 8A and 8B are an alternative embodiment of the game/advertisement web site 308. *In particular.
Figure 8B:
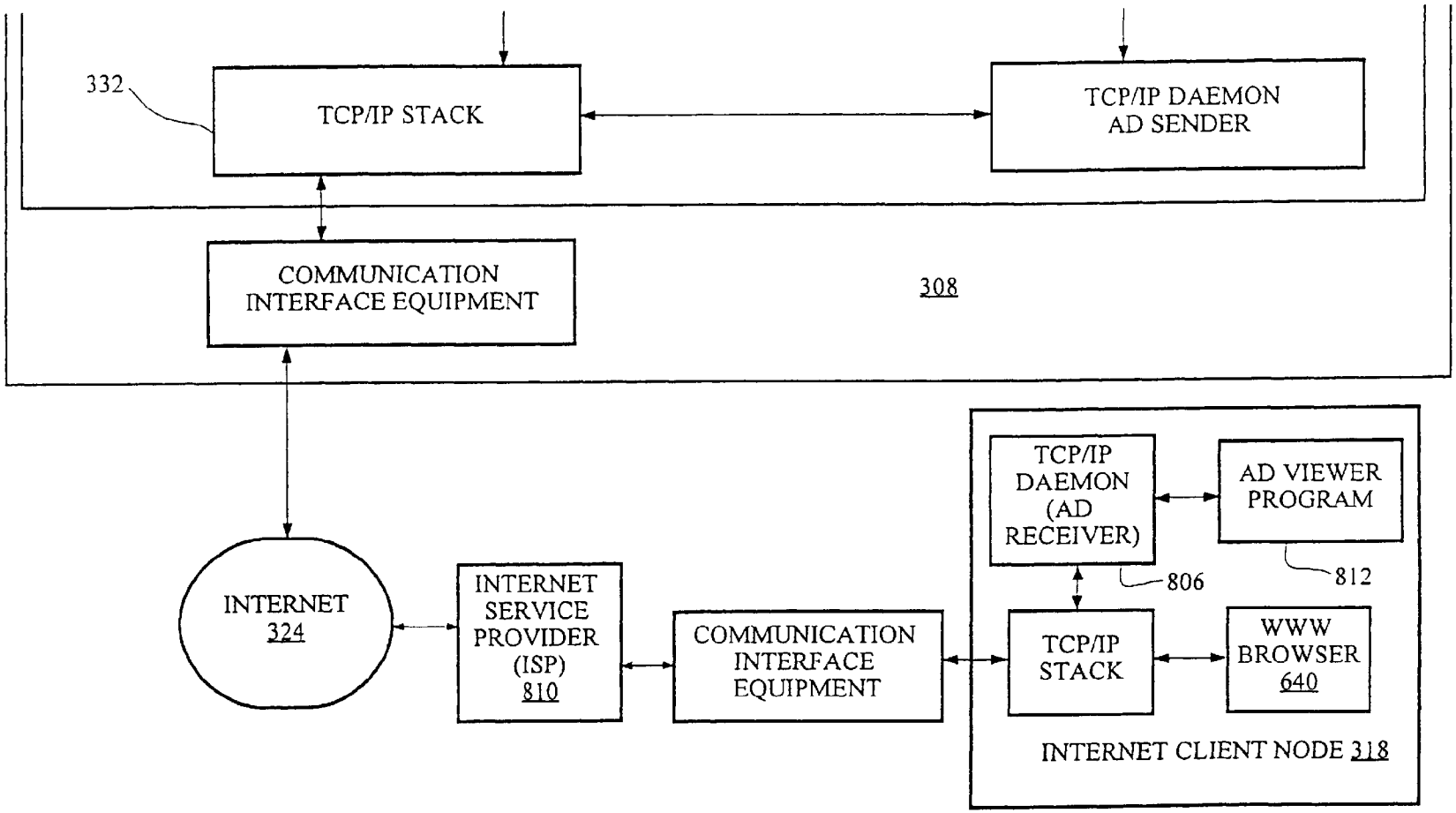

*An additional and/or alternative description of the embodiment of the present invention shown in FIGS. 8A and 8B is as follows: users may use the present invention to access the INTERNET 324 on a reduced cost or free basis, by using whatever TCP/IP SLIP/PPP package they desire and registering with the web server 308. That is, a user can sign up or register by dialing into a terminal server with normal serial dialing and log on as a user identified by the identifier "NEW." User "NEW" is then forced into a connection to an enrollment or registration program so he/she can provide information requested by the present invention. When enrollment is completed, the present invention allows the user to download a communications daemon (e.g., ad receiver daemon 806) to the user's Internet client node 318. The user may then install the daemon on their machine (Internet client node 318) and dial-up with their favorite TCP/IP package.*

*However, upon accessing the host 308, the user accesses basic functionality of the DISPLAY ENGINE 622 that starts up the downloaded daemon 806. The network host 308 periodically queries each active port on the terminal servers (e.g., Internet client node 318) to get the IP addresses and then send a short message to the daemon 806 which is listening in on a*

*specific port. The DISPLAY ENGINE 622 may also disable access by an end user machine 318 after a certain number of failures.*

*Note that the host 308 periodically sends an item to the downloaded daemon 806 to display. The daemon then displays the message (advertisement) in a window (of the WWW browser 640) on the user's screen.*

What is claimed is:

1. An apparatus for presenting one of products and services while providing [an] *a user* interactive informational service on a network, comprising:

an advertising selector for determining, for each of a plurality of users, a corresponding advertising presentation, from a plurality of advertising presentations, to present to the user at a corresponding node of the network, wherein each *presentation* (*P*) of at least some presentations of said corresponding advertising presentations is unrequested, and is used for presenting information about at least one of a product and a service;

*wherein the advertising selector communicates with each node for the plurality of users through the network;* a service providing computational system for providing a first of the users with a requested corresponding instance of the informational service, wherein the instance includes a plurality of user interactions *by the first user*, [via] *each user interaction providing data for a corresponding different transmission on* the network, with the service providing computational system;

*wherein a corresponding user input for activating the corresponding instance is received prior to activation of the advertising selector for determining the corresponding advertising presentation;* a combiner for obtaining combined data, wherein said combined data is a result of combining *at least one of* said corresponding advertising [presentation] *presentations* with data for displaying at least a portion of said corresponding instance, *the portion being transmitted on the network as a response to one of the user interactions,* said *at least one* corresponding advertising presentation including at least one network link for identifying another presentation related to said *at least one* corresponding advertising presentation, said network link associated with a corresponding one or more locations on a display of said *at least one* corresponding advertising presentation, wherein a *first* user input indicative of at least one of said locations activates said network link for presenting said another presentation;

wherein said service providing computational system provides [substantially] a same informational content *of the corresponding instance,* regardless of which of said advertising presentations are combined therewith;

a network interface for (a) and (b) following:

(a) transmitting, via the network, *and for each user interaction of the user interactions, a corresponding occurrence of* said combined data to the first user for display [during] *as a response to the* user [interactions] *interaction* with said corresponding instance, *wherein the at least one corresponding advertising presentation and the informational content for the occurrence, are presented concurrently at the first user's corresponding node*;

(b) receiving, from the first user, one or more user data items indicative of an action in response to *at least one of the occurrences of* said combined data being presented; *and* one or more user response processing modules for one or more of: evaluating an effectiveness of said corresponding presentation[.] and obtaining another one of said advertising presentations for providing to said combiner, said processing modules receiving said one or more user data items.

2. The [method] *apparatus* of claim 1, wherein said interactive informational service includes a playing of a game *as the corresponding instance, wherein the combined data is in response to a user game play transmitted to the service providing computational system*, wherein a portion of the network used for communications between said service providing computational system and the first user includes a portion of the Internet, and further including a means for generating a value determined using said user data *items*, wherein said value is provided to a party requesting a first of said advertising presentations be presented to the users accessing the Internet.

3. A method of playing a game, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining which of the users the advertising is to be presented thereto;*

*subsequently performing, for each user of the users, the following steps (1) through (5) following;*

(*1*) generating electronic game tokens for playing the game, said game tokens played in instances of the game to affect outcomes of the instances, *wherein the electronic game tokens are representations of game indicia*;

(*2*) receiving player identification data prior to at least a first player playing the game, wherein said identification data is used to identify information related to the first player in subsequent instances of the game;

(*3*) first playing a first instance of the game interactively with the first player and a substantially electronic game playing module, wherein said game playing module plays a first sequence of said game tokens, *wherein at least one of the tokens of the first sequence is provided upon request*;

(*4*) second playing a second instance of the game interactively with a second player and said game playing module, wherein said first and second game instances overlap in time, and wherein said game playing module plays a second sequence of game tokens when playing said second instance of the game;

wherein said first and second sequences have at least different game tokens in at least one identical game token position, in each of said first and second sequences; and (*5*) presenting to the first player, during said first instance, an advertisement capable of changing to a different advertising presentation when the first player responds to said advertisement, wherein said change to said different advertising presentation does not change an availability to subsequently perform game plays of said first instance;

*wherein for determining the advertisement, a comparison is performed between the predetermined personal information for the user in the user data repository and the predetermined user selection data for the advertiser corresponding to the advertisement;*

*wherein in playing each of the first and second instances of the game, instances of combined data are obtained using*

*a common advertising selector for determining, for each instance of the combined data, corresponding advertising for combining with a game play, the instance of combined data subsequently transmitted on a network, respectively, to one of the first and second players;*

*wherein for each player of the first and second players, each instance of the combined data therefor is (a) transmitted on the network in response to a user interaction by the player, and (b) the advertising and the game play therein are presented concurrently to the player.*

4. The method as claimed in claim 3, wherein one or more of:

(a) said token representations are useful for playing one or more of the following games: blackjack, poker, pia gow, craps, and roulette; and (b) said game tokens include token representations of one or more of: cards, and dice.

5. A method of viewing a presentation related to one of a product and a service while playing a *user interactive* game on a network, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics for the users for determining which of the users the advertising is to be presented thereto;*

*wherein at least one of the characteristics for each user is not a characteristic of the advertisers used for selecting advertising;*

*subsequently performing, for each user of the users, the following steps (1) through (6) following;*

(*1*) communicating with a server network node that provides network access to one or more games capable of being played using communications on said network;

(*2*) playing one of said games using communications between a first user node *for the user,* and said server network node;

(*3*) presenting a first presentation at said first user node, wherein said first presentation is *initially* presented between two plays of the game and wherein said first presentation is capable of being replaced by a different second presentation, *during the game,* without changing a play of the game;

*wherein for determining the first presentation, a comparison is performed between the predetermined personal information for the user in the user data repository and the predetermined user selection data for the advertiser corresponding to the first presentation;*

*wherein during the user playing the one game, instances of combined data are obtained using an advertising selector for determining, for each instance of the combined data, corresponding advertising for combining with a game play, the instance of combined data subsequently transmitted on the network to the first user node;*

*wherein each instance of the combined data is (a) transmitted on the network in response to a user interaction by the user, and (b) the advertising and the game play therein are presented concurrently to the user;*

(*4*) detecting an action in response to said first presentation;

(*5*) transmitting a data item indicative of said action to a second network node not contacted for the playing of the game with the user; *and*

(*6*) conducting a network communication between the user and the second network node, in response to said data item, for information related to the purchase of at least one of: a product and a service.

6. The method as claimed in claim 5, further including, in response to said step of detecting, a step of identifying a network address of the second network node without the user inputting the network address.

7. The method as claimed in claim 6, wherein said step of identifying includes activating a hyperlink.

8. The method as claimed in claim 5, further including a step of subsidizing the user's access to said network.

[9. A method of advertising on the Internet, comprising:

activating by an Internet accessible user node, an instance of an interactive service available at a first Internet accessible node via a first Internet connection;

first presenting a first presentation, via the Internet, to a user at said user node, during Internet interactions between the user and the service, wherein said first presentation identifies at least one of a purchasable product and a purchasable service; and wherein said first presentation is: unrequested by the user, and substantially unrelated to a performance of the service by the user;

transmitting data, via an Internet communication, indicative of an action by the user in response to said step of first presenting;

receiving, via the Internet, a second presentation for presenting to the user, wherein said second presentation is determined using said data, said second presentation also identifying one of a purchasable product and a purchasable service; and second presenting to the user said second presentation during the first Internet connection.]

[10. The method as claimed in claim 9, wherein said step of activating the service includes providing an Internet transmission to a second Internet accessible node, wherein said second Internet accessible node performs at least said first presenting step; and said second Internet accessible node includes an Internet website that at least one of:

(a) provides said first Internet connection;

(b) provides an offer to subsidize said first Internet connection;

(c) stores information on said first Internet accessible node for use in a second Internet connection different from said first Internet connection; and (d) stores information related to the user for selecting an advertising presentation for presenting to the user.]

11. The method as claimed in claim [9] *135*, wherein the service is one or more of:

(a) a game; and (b) substantially any service available on the Internet through an Internet service provider by which the user accesses the Internet, such that when the user connects to the Internet, said Internet service provider provides a communication to a predetermined website that subsequently transmits said first presentation to said user node.

12. A method for providing advertising related information while playing a *user interactive* game on a communications network, comprising:

*providing access to a persistent user data repository having predetermined personal information for each of a plurality of users;*

*providing access to a persistent advertising data repository having, for each advertiser of a plurality of advertisers, predetermined user selection data for selecting users to*

*present thereto advertising for the advertiser, said predetermined user selection data including data defining one or more characteristics of users for determining which of the users the advertising is to be presented thereof;*

*subsequently performing, for each user of the users, the following steps (1) through (5) following;* contacting a game playing network node by a user at a user network node;

initiating an instance of the game by the user at the user network node, wherein the instance includes a plurality of user plays;

first receiving one or more advertising related presentations by the user for presentation during a playing of the instance of the game, wherein for at least a duration of time between a pair of some of the user plays, a first of said one or more advertising presentations is presented at the user network node, wherein said first advertising related presentation was not presented to the user during the instance of the game between a different pair of some two of the user plays, wherein at least one of said advertising related presentations is interactive and has network node identifying information for accessing an additional network node different from said game playing network node, said additional network node having an additional presentation responsive to a user input to said at least one advertising related presentation;

*wherein for determining the first advertising presentation, a comparison is performed between the predetermined personal information for the user in the user data repository and the predetermined user selection data for the advertiser corresponding to the first presentation;*

*wherein during the user playing the instance of the game, instances of combined data are obtained using an advertising selector for determining, for each instance of the combined data, corresponding advertising that is combined with a game play for being subsequently transmitted on the network to the user network node;*

*wherein each instance of the combined data is (a) transmitted on the network in response to a user input, and (b) the advertising and the game play therein are presented concurrently to the user;*

*wherein for each instance of the combined data, the advertising therein and a play of the game therein are combined in response to a previous game play by the user;* transmitting for said at least one advertising related presentation, user response data to said additional network node, wherein said user response data is related to one or more responses by the user to said at least one advertising related presentation; *and* second receiving by the user network node another advertising related presentation providing additional information about a product or service advertised in said at least one advertising related presentation.

13. The method of claim 12, wherein one or more of:

(a) said at least one advertising related presentation includes a hyperlink for said network node identifying information; and (b) said first advertising related presentation and said at least one advertising related presentation are identical.

14. A method of advertising on the Internet, comprising:

for each of one or more users accessing the Internet, the following steps are performed:

first transmitting, from the user, an Internet request for contacting a providing node of the Internet, said providing node provides access to one or more display presentations for a *user interactive* service with which the user desires to interact, wherein said request has associated therewith an Internet address for contacting the providing node, and wherein said interactive service is interactive via the Internet with the user;

first receiving, via the providing node, said one or more display presentations for presenting on at least a portion of a display of a user node by which the user accesses the Internet;

first presenting, by the user node, overlapping with a display of at least one of the display presentations, a first one or more *interactive* advertising presentations for providing information related to one or more of a product and a service, wherein said first one or more *interactive* advertising presentations are received via the Internet in response to Internet transmissions by the providing node, and displayed on at least a portion of said display;

*wherein the first one or more interactive advertising presentations, and the at least one of the display presentations are determined in response to a user input resulting in a transmission to the providing node, the user input including a request for the at least one of the display presentations;*

*wherein the first one or more interactive advertising presentations, and the at least one of the display presentations are combined at the providing node for transmission to the user node via the Internet;* second presenting, by the user node over time, one or more additional advertising presentations, *said additional advertising presentations are sequentially presented on the user node having delay therebetween provided by the providing node,* each said additional advertising presentation for providing information related to one of a product and a service, wherein each [of at least most] of said additional advertising presentations is: (a) received via the Internet in response to Internet transmissions by the providing node, [and] (b) *not in response to any prior user input obtained in the first transmitting, first receiving, and first presenting steps, and* (c) displayed on at least a portion of said display without the user providing [an] *a user node* input *that is* (*i*) subsequent to said steps of first transmitting, first receiving and first presenting, *and* (*ii*) to which said one or more additional advertising presentations [are] *would be* responsively provided;

second transmitting, via the Internet, data indicative of an action by the user in response to one of said first and said additional advertising presentations, wherein said data is transmitted: (a) from said user node, and (b) to a destination node of the Internet, said destination node identified at said user node by destination Internet link information used for transmitting said data;

second receiving, via the Internet, another presentation for presenting to the user at said user node, wherein said another presentation is responsive to said action by the user.

15. The method of claim 14, wherein [one] *three* or more of *the following hold*:

(a) said step of second presenting includes periodically transmitting via the Internet one of said additional advertising presentations to said user node;

(b) said step of second presenting includes forcing a display of at least one of said additional advertising presentations to be exposed on said display;

(c) [said forced display is] *forcing a display of at least one of said additional advertising presentations to be exposed on said display* in exchange for subsidizing a cost related to accessing the Internet, wherein said subsidizing the cost related to accessing the Internet includes one of: a subsidy of an Internet access charge, and free access to the Internet;

(d) said first advertising presentations is one of: (i) received from the providing node as part of the at least one display presentation, and (ii) received from an Internet site providing for the forced exposure of said first advertising presentations on said display;

(e) said destination Internet link information includes a hyperlink for accessing said destination Internet node;

(f) said destination Internet node is an Internet site for a sponsor of said advertising presentation to which said action by the user is responsive; and (g) said display presentations are related to a game, and said providing node includes an Internet web site for determining at least one play of said game.

16. The method of claim 14, wherein said providing node is not said destination node, and said destination Internet link information is not indicative of said providing node being said destination node.

17. The method of claim 14, wherein one or more of:

(a) at least one of said steps of first and second presenting is in response to a communication: (i) from said providing node connecting the user to the Internet, and (ii) to some Internet node so that said some Internet node transmits one or more of: said first advertising presentations, and said additional advertising presentations to the user node;

(b) said step of second receiving includes receiving further information related to the product or service of the advertising presentation for which said action by the user is a response;

(c) further including a step of third presenting said another presentation on said Internet user node, wherein at least a portion of said display maintains a graphical format displayed prior to said step of third presenting.

18. The method of claim 14, wherein said step of second presenting includes presenting at least one of said additional advertising presentations overlapping with a display of at least one of said display presentations.

19. A method of advertising on the Internet, comprising:

for each of one or more users accessing the Internet, the following steps are performed:

receiving, at an Internet providing node and from a user node by which the user accesses the Internet, an Internet request for one or more display presentations of an interactive service, wherein said request has associated therewith an Internet address for contacting the providing node, and wherein said interactive service is interactive via the Internet between said providing node and the user;

transmitting to the user node, in response to said Internet request (a) and (b) following:

(a) said one or more display presentations of said service for presenting on at least a portion of a display for the user node, and (b) one or more advertising presentations, wherein a first of said advertising presentations is also displayed on at least a portion of said display with at least one of said display presentations;

wherein, over time, one or more additional of said advertising presentations are presented on at least a portion of said display without the user providing an input having a corresponding next response that presents said one or more additional advertising presentations;

wherein at least one of said first and said additional advertising presentations is capable of responding to an action by the user by transmitting, via the Internet, data indicative of said action to a destination Internet node, wherein said destination node is identified by destination Internet link information, provided in said step of transmitting, for contacting said destination node with said data.

20. The method of claim 19, *further including a step of second presenting, by the user node over time, one or more additional advertising presentations, each said additional advertising presentation for providing information related to one of a product and a service, wherein each of said additional advertising presentations is: (1) received via the Internet in response to Internet transmissions by the providing node, and (2) displayed on at least a portion of said display without the user providing an input subsequent to said steps of first transmitting, first receiving and first presenting to which said one or more additional advertising presentations are responsively provided;* wherein one or more of:

(a) said step of second presenting includes periodically transmitting via the Internet one of said additional advertising presentations to said user node;

(b) said step of second presenting includes forcing a display of at least one of said additional advertising presentations to be exposed on said display;

(c) said display presentations are related to a game;

(d) said first advertising presentations is one of (i) and (ii):

(i) received from the providing node as part of the at least one display presentation, and (ii) received from an Internet site providing for the forced exposure of said first advertising presentation on said display;

(e) *said first advertising presentation is received from the providing node for the forced exposure of said first advertising presentation on said display,* said forced exposure of said first advertising presentation is in exchange for subsidizing a cost related to accessing the Internet, wherein said subsidizing the cost related to accessing the Internet includes one of: a subsidy of an Internet access charge, and free access to the Internet;

(f) said providing node is an Internet website;

(g) at least one of said steps of first and second presenting are in response to a communication:

(i) from an Internet service provider connecting the user to the Internet, and (ii) to some Internet node so that said some Internet node transmits one or more of: said first advertising presentation, and said additional advertising presentations to the user node;

(h) said destination Internet link is used for providing a hyperlink for accessing said destination Internet node;

(i) further including a step of third presenting said another presentation on said Internet user node, wherein at least a portion of said display maintains a graphical format displayed prior to said step of third presenting;

(j) said destination Internet node is an Internet site for a sponsor of said at least one advertising presentation to which said action by the user is responsive; and (k) further including a step of the user registering at the providing node prior to receiving said one or more presentations.

21. A method of advertising on a network, comprising:

for each of one or more users accessing the network, the following steps are performed:

first transmitting, from the user, a corresponding request for accessing a providing node of the network, said providing node provides one or more interactive display presentations, wherein said request has associated therewith a network address for identifying the providing node;

*wherein for each presentation of said one or more display presentations, the presentation includes a content for display to the user, wherein upon display to the user, the content provides for user interaction with the providing node, the content not including data for display of interactive advertising;* first receiving, from the providing node via the network, said one or more interactive display presentations for presenting on at least a portion of a display of a user node by which the user accesses the network, and wherein said interactive display presentations are interactive, via the network, between the user and said providing node;

*wherein data for at least one of said interactive display presentations is combined with data for a first advertising presentation, prior to transmission on the network to the user node, to thereby obtain combined data, and wherein the combined data is transmitted to the user node in response to a user request;* first presenting, by the user node, concurrently with *the* at least one of the interactive display presentations, [a] *the* first advertising presentation for providing information related to one of a product and a service, wherein said first advertising presentation is received via the network from [some] *one* node of the network, and displayed on at least a portion of said display;

*subseqeuntly,* second *receiving and* presenting, by the user node over time, one or more additional advertising presentations, each said additional advertising presentation for providing information related to one of a product and a service, wherein each [of at least most] of said additional advertising presentations is:

(a) received via the network from said [some] *one* node, and (b) displayed on at least a portion of said display without the user providing an input that causes said additional advertising presentation to be displayed;

second transmitting, via the network, data indicative of an action by the user in response to one of said first and said additional advertising presentations, wherein said data *indicative of an action* is transmitted:

(i) from said user node, and (ii) to a destination node of the network, said destination node identified at said user node by a destination network address used for transmitting said data; *and* second receiving, via the network, another presentation for presenting to the user at said user node, wherein said another presentation is responsive to said step of second transmitting.

22. The method of claim [20] *21*, wherein *(f) and (k) below hold in addition to* one or more of *(a), (b), (c), (d), (e), (g), (h), (i), (j), (l), (m), (n), and (o)*:

(a) said step of second presenting includes periodically transmitting one of said additional advertising presentations to said network user node;

(b) said step of second presenting includes forcing a display of at least one of said additional advertising presentations to be exposed on said display;

(c) at least a portion of said network *is* used in one of said steps first and second receiving and first and second transmitting includes the Internet;

(d) at least a portion of said network used in one of said steps *of* first and second receiving, and first and second transmitting communicates using TCP/IP as a network protocol;

(e) said network providing node and said [some] *one* network node are at a same Internet site;

(f) said Internet site provides Internet communications via the network to said network user node so that the user can play an interactive game using the Internet communications;

(g) said step of first receiving includes interacting with an Internet informational service accessible from the network providing node when said interactive display presentations are displayed at said network user node;

(h) said step of second receiving includes receiving further information related to the product or service of the *one of said first and said additional* advertising [presentation] *presentations* for which said action by the user is a response;

(i) said network address includes Internet addressing information for use in routing the request through the Internet to said network providing node;

(j) said step of second presenting includes presenting at least one of said additional advertising presentations concurrently with at least one of said interactive display presentations;

(k) said at least one interactive display presentation includes an output from a game instance;

(l) said destination network address is used by a hyperlink for accessing said destination network node;

(m) further including a step of third presenting said another presentation on said network user node, wherein at least a portion of said display maintains a graphical format displayed prior to said step of third presenting;

(n) said destination network node is an Internet site for a sponsor of said advertising presentation to which said action by the user is responsive; *and*

(o) said destination network node is an Internet site identical to one of: said network providing node, and said some network node.

23. The method of claim 21, wherein at least one of said steps of first and second presenting is in response to a communication: (a) from an Internet service provider connecting the user to the network, and (b) to said [some] *one* network node so that said [some] *one* network node transmits one or more of: said first advertising presentation, and said additional advertising presentations to the network user node.

24. A method for providing advertising related information while playing a game on the Internet, comprising:

contacting a game playing Internet site by a user at a user Internet station *for initiating the playing an instance of a game via an Internet connection*;

transmitting user identification information prior to the user playing [an] *the* instance of the game, wherein said user identification information is used to identify additional personal information related to the user for use during at least one subsequent *play of the* instance of the game;

initiating said [at least one] instance of the game by the user at the user Internet station, wherein said [at least one] instance includes a plurality of user plays;

first receiving, by the user, one or more advertising related presentations for presentation during a playing of said [at least one] instance of the game, wherein at least one of said advertising related presentations accesses Internet site identifying information for contacting, *on the Internet connection,* an additional Internet site different from said game playing Internet site, said additional Internet site having an additional presentation responsive to input by the user to said at least one advertising related presentation;

*wherein data for the at least one advertising related presentation is combined with a response to one of the user plays of the instance of the game for obtaining combined data prior to performance of the first receiving step, the combined data transmitted on the Internet connection, wherein the at least one advertising related presentation and the response to the one user play are presented concurrently to the user;* transmitting, for said at least one advertising related presentation, user response data to said additional Internet site, wherein said user response data is indicative of one or more inputs by the user to said at least one advertising related presentation; and second receiving, by the user Internet station, another advertising related presentation providing additional information about a product or service advertised in said at least one advertising related presentation.

25. A method of advertising on the Internet, comprising:

for each of one or more users accessing the Internet, the following steps are performed:

providing, by the user, information for a subsidized Internet access from an Internet service provider;

connecting, by the user, to the Internet via said Internet service provider;

first receiving, from a first Internet site via the Internet, a first transmission of one or more advertising presentations for presenting on at least a portion of a display of a user node by which the user accesses the Internet, wherein said first transmission is in response to first said step of connecting;

*wherein said advertising presentations are unrequested by the user, and the Internet access terminates as a result of one or more of said advertising presentations not being presented on the user node;* first presenting, by the user node, concurrently with at least one of the advertising presentations, a collection of one or more Internet presentations from one or more Internet sites different from said first Internet site;

*subsequently,* second receiving, by the user node over time, one or more additional advertising transmissions, *from the first Internet site,* for presenting to the user concurrently with said collection of Internet presentations, each said additional advertising transmission for providing information related to one of a product and a service, wherein each [of at least most] of said additional advertising transmissions is: (a) received via the Internet from said first Internet site, and (b) displayed on at least a portion of said display, *wherein both (a) and (b) are performed* independently of the user providing a corresponding request to said first Internet site;

second transmitting, via the Internet, data indicative of an action by the user in response to a presentation of one of said first and said additional advertising transmissions, wherein said data is transmitted: (a) from said user node, and (b) to a destination node of the Internet, said destination node identified at said user node by destination Internet link information used for transmitting said data;

second receiving, via the Internet, another presentation for presenting to the user at said user node, wherein said another presentation is responsive to said action by the user.

26. The method as claimed in claim 25, wherein said Internet service provider and said first Internet site have a same Internet address.

27. A method for providing advertising related information while playing a game on a communications network, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining which of the users the advertising is to be presented thereto;*

*subsequently,* performing the following substeps (A1) through (A2) for each of a plurality of users:

(A1) providing, in response to a request on the communications network by the user, access to an instance of the game for playing by the user, wherein the instance includes a plurality of user plays;

(A2) transmitting one or more advertising related presentations to the user for presentation during a playing of the instance of the game, wherein for at least a duration of time between a pair of some of the user plays, a first of said one or more advertising related presentations is presented to the user, wherein said first advertising related presentation was not presented to the user during the instance of the game between a different pair of some two of the user plays, and wherein for at least one of said advertising related presentations, (a) and (b) following hold:

(a) said at least one advertising related presentation has associated therewith network linking information identifying a corresponding one of a plurality of nodes connected to the communications network, said network linking information being identical for transmissions of said at least one advertising related presentation for at least most of the users; and (b) said at least one advertising related presentation is capable of providing a responsive transmission, for transmitting on the communications network, corresponding data related to one or more responses by the user to said at least one advertising related presentation;

*wherein for determining the first advertising related presentation, a comparison is performed between the predetermined personal information for the user in the user data repository and the predetermined user selection data for the advertiser corresponding to the first advertising related presentation;*

*wherein during the user playing the instance of the game, instances of combined data are obtained using an advertising selector for determining, for each instance of the combined data, corresponding advertising for combining with a game play, the instance of combined data subsequently transmitted on the network to the user;*

*wherein each instance of the combined data is (i) transmitted on the network in response to a user input, and (ii) the advertising and the game play therein are presented concurrently to the user;* providing advertising related information to a first advertiser for said at least one advertising related presentation, wherein said advertising related information is obtained using said corresponding data for said at least one advertising presentation.

28. [A] *The* method [as claimed in] *of* claim 27, wherein said step of transmitting occurs during at least a portion of a presentation of the instance of the game, and said network linking information is used in providing a hyperlink to said corresponding node.

29. [A] *The* method [as claimed in] *of* claim 27, further including a step of determining a perceived effectiveness of said at least one advertising related presentation using said corresponding data received from said responses from at least some of the one or more users.

30. [A] *The* method [as claimed in] *of* claim 29, wherein said perceived effectiveness of said at least one advertising related presentation includes (*a*) *following, and* one or more of [the] (*b*), (*c*) *and* (*d*) following:

(a) a measurement related to a number of the users to which said at least one advertising related presentation is displayed, (b) a measurement related to a number of times said at least one advertising related presentation is displayed to some of the users, (c) a measurement related to a number of favorable responses by the users to said at least one advertising related presentation, and (d) a measurement related to a number of promotionals provided to the users, said promotionals related to at least one product or service of said at least one advertising related presentation.

31. [A] *The* method [as claimed in] *of* claim 30, further including a step of charging the first advertiser using at least one of said measurement (a) through (d) of claim 30, *wherein advertisements for the first advertiser are selected for presentation to the users according to one of: the user's gender, age, financial status, education, marital status, and size of household.*

32. [A] *The* method [as claimed in] *of* claim 27, further including a step of obtaining a first amount of information from the user prior to said step of transmitting.

33. [A] *The* method [as claimed in] *of* claim 32, wherein said step of obtaining includes one of: receiving registration information at an Internet web site, and personal information about the user.

34. [A] *The* method [as claimed in] *of* claim 27, wherein one of said advertising related presentations includes information related to one of: one or more products, one or more services, and information for influencing the user.

35. [A] *The* method [as claimed in] *of* claim 27, further including a step of determining a measurement related to a number of times to which the users provide a response to one of said advertising related presentations, wherein said response requests additional information.

36. [A] *The* method [as claimed in] *of* claim 27, further includes one or more of the following steps:

(a) comparing a first measurement indicative of an interest by the one or more users in one of said advertising related presentations with a second measurement of an interest by the one or more users in a second advertising related presentation of said advertising related presentations for determining an effectiveness of said one advertising related presentation in comparison to at least an effectiveness of said second advertising related presentation; *and*

(b) determining a characterization of the users that are responsive to said one advertising related presentation[; and (c) determining a measurement for said one advertising related presentation, wherein the measurement relates to a length of time said one advertising related presentation is displayed to the one or more users].

37. [The] *A* method [as claimed in] *of* claim 27, wherein said one or more responses by the user include an answer to at least one question presented to the user, *the answer including one of: the user's gender, age, financial status, education, marital status, and size of household;*

*wherein the answer is used to select additional advertising to present to the user.*

38. [The] *A* method [as claimed in] *of* claim 27, wherein said step of initiating includes providing the user with an option to play one of: blackjack, craps, roulette, poker, baccarat, and pai gow.

39. [The] *A* method [as claimed in] *of* claim 27, further including the steps of generating card representations for playing the game;

first requesting, by a first of the one or more users, a first collection of one or more of said card representations when playing a first instance of the game by the first user;

initializing a second instance of the game with a second of the users for playing said second instance of the game;

second requesting, by the second user, a second collection of one or more of said generated card representations, wherein said first and second steps of requesting overlap in time.

40. [The] *A* method [as claimed in] *of* claim 27, wherein said game includes at least one of the following attributes:

(a) an element of chance;

(b) a total number of possible game plays is capable of being determined before playing the game; and (c) there is an opponent to at least one of the users.

41. [An apparatus as claimed in] *The method of* claim 40, wherein said opponent deals a playing token to the one user.

42. [The] *A* method [as claimed in] *of* claim 27, wherein said network overlaps with one of an Internet network, an interactive cable television network, and a local area network.

43. A method for providing product or service information while playing a game using a communications network, comprising:

performing the following substeps (A1) through (A3) for each of a plurality of users:

(A1) receiving, at a first network site, a communications network request from the user to play a corresponding instance of the game, wherein the corresponding instance includes a plurality of user plays, wherein for each of at least some of game play network transmissions to the user for said plays, said transmission is dependent upon a most recent previous network *game play* transmission from the user, and at least some of said game play transmissions have different visual displays for different users;

(A2) providing for presentation to the user, at a second network site, one or more presentations for presentation during a playing of the corresponding instance of the game, wherein *a network source for at least one response to one of the user plays also transmits presentation data for the presentations, wherein* between some two of the user plays there is one of said one or more presentations presented to the user, wherein said presentations are for relating information about one or more purchasable products or services, or for receiving information from the user about purchasable products or services;

*wherein during the user playing the instance of the game, instances of combined data are obtained using an advertising selector for determining, for each instance of the combined data, a corresponding one of the presenta-*

*tions is combined with a game play for being subsequently transmitted on the network to the first user node;*

*wherein each instance of the combined data is (a) transmitted on the network in response to a user interaction by the user, and (b) the advertising and the game play therein are presented concurrently to the user;* wherein said step of providing includes the following substep (A3):

(A3) transmitting, to the second network site, at least one of said presentations having a capability for (i) and (ii) following: (i) receiving data, wherein said data is related to one or more responses by the user to said at least one presentation presented to the user, and (ii) transmitting, in response to an action by the user, said data on the communications network to a predetermined network site, using a network identity for the predetermined network site available at the second network site, wherein said network identity does not identify said first network site as said predetermined network site;

wherein said data is used for selecting a second presentation [for presenting] for presenting to the user during said corresponding game instance.

44. [A] *The* method [as claimed in] *of* claim 43, wherein there is a pair of user plays wherein said one or more presentations are not presented.

45. [A] *The* method [as claimed in] *of* claim 43, wherein said game includes an element of chance.

46. [A] *The* method [as claimed in] *of* claim 43, wherein said game includes a total number of possible game plays that is capable of being determined before playing the game.

47. [A] *The* method [as claimed in] *of* claim 43 wherein for said game there is at least one opponent to at least one of the users.

48. [A] *The* method [as claimed in] *of* claim 47, wherein said at least one opponent deals a playing token to the user.

49. [A] *The* method [as claimed in] *of* claim 43, wherein said communications network overlaps with one or more of an Internet network, an interactive cable television network, and a local area network.

50. [A] *The* method [as claimed in] *of* claim 43, further including a step of obtaining a first amount of information from the user prior to said step of providing, wherein said step of obtaining includes registering at an Internet web site.

51. [A] *The* method [as claimed in] *of* claim 43, said step of providing includes a step of matching the user with said at least one presentation by comparing user supplied information with information supplied by an advertiser of said at least one presentation, *wherein advertisements for the advertiser are selected for presentation to the user according to one of the following of the user supplied information: the user's gender, age, financial status, education, marital status, and size of household.*

52. [A] *The* method [as claimed in] *of* claim 51, wherein said step of matching includes comparing information obtained from the user with a demographic profile for determining said second presentation to be provided to the user, *wherein the second presentation is transmitted from a network site that does not provide a connection to the network for performing the steps (A1) through (A3), wherein the network is not controlled from any predetermined network site, and wherein the at least one presentation is combined with a game play prior to being transmitted on the network from the first network node to the second network node.*

53. [A] *The* method [as claimed in] *of* claim 43, further including a step of ceasing to transmit a first of said presentations to the user, and ceasing to transmit a particular category of presentations of said presentations to the user.

54. The method of claim 43, further including for each of users, the steps of:

receiving at said first network site transmitted plays of said corresponding game instance played by the user; and transmitting responses to said received plays, wherein for each of at least most of the users having overlapping corresponding game instances, said responses of each are transmitted free of any game synchronization constrains with at least most of the other users.

55. A method for providing information regarding products or services while playing a game using a network, comprising:

(A1) providing, at a network site on said network, access to a plurality of presentations for presenting to a plurality of users, wherein at least some of said presentations have corresponding network linking information for identifying a corresponding site on the network, and each of said at least some presentations provide: (a) information about one or more purchasable products or services, and (b) a capability for receiving a corresponding response from the user related to the one or more purchasable products or services;

performing the following substeps (A2) and (A3) for each of some of the users:

(A2) receiving a request for playing [an] *a corresponding* instance of the game by the user using the network;

(A3) transmitting, via the network, a particular one of said at least some presentations to the user for presentation between some two user plays of the game instance, wherein said particular presentation also has a capability to transmit data indicative of a said corresponding response by the user to said corresponding site on the network identified by said corresponding network linking information;

wherein said data, once received at said corresponding site, is used for one of: evaluating an effectiveness of at least one of said presentations, determining another presentation for transmitting to the user, providing a product, and providing a service;

*wherein for each user of at least a first and second of the users, (i) and (ii) following hold:*

*(A-2-1) concurrently presenting to the user: (i-a) information for playing the corresponding instance of the game, and (i-b) the particular presentation for an advertiser, wherein the information for playing and the particular presentation are combined for transmission to a device operated by the user for playing the instance of the game and concurrently presenting the particular presentation; and*

*(A-2-2) at least a portion of data obtained from interactions by the user with the instance of the game is used for providing the advertiser with one of: (ii-a) information for an advertising related purpose different from playing the corresponding instance of the game, and (ii-b) information for determining an effectiveness of a presentation for the corresponding advertiser related data.*

56. [A] *The* method [as claimed in] *of* claim 55, further including a step of receiving said data at said corresponding site during the instance of the game, *and between two plays thereof.*

57. [A] *The* method [as claimed in] *of* claim 55, further including a step of providing, to a first of said users, supplemental information related to a compensation to the first user for providing one or more of said responses.

58. [A] *The* method [as claimed in] *of* claim 55, wherein said network [overlaps with one of an] *is the* Internet [network, an interactive cable television network, and a local area network].

59. [A] *The* method [as claimed in] *of* claim 55, wherein at least one of said responses includes obtaining [some] *two or more* of the following information related to the user: a name, an address, an e-mail address, an age, a financial status, an educational level, a marital status, a size of household, a number of children, an amount of recreational time, personal tastes, and a sex.

60. [A] *The* method [as claimed in] *of* claim 55, further including a step of storing information related to one of: whether one of said plurality of presentations has been presented to a first of the one or more users, and a time when said one presentation was presented to the first user.

61. An apparatus for playing a game using the Internet, and providing a presentation related to at least one of a product and a service during the game, comprising:

a game playing engine, accessible via a first Internet site, said engine capable of playing a game with each of a plurality of users, each of said plurality of users at a corresponding Internet accessible station, wherein communications on the Internet are used;

a controller for controlling network game play transmissions to the Internet accessible stations, wherein between some two plays at a first of the Internet stations during a playing of the game with a first of the users, at least one presentation of a plurality of presentations is presented using presentation information transmitted by said controller via the Internet, and wherein said presentation information includes: (a) advertising information concerning at least one of: a corresponding product and a corresponding service, (b) Internet linking information identifying an additional presentation to be obtained from a second Internet site, (c) a capability for allowing said at least one presentation to receive one or more data items related to one or more actions by the first user directed to said at least one presentation, and (d) a capability to transmit, upon activation of said Internet linking information by the first user, said one or more data items to said second Internet site;

*for each user, P, of the users communicating with the first Internet site for playing the game, the controller performs (i) and (ii) following:*

*(i) combining advertising related data and game related information for the game, thereby resulting in combined data;*

*wherein the advertising related data is for at least one advertiser;*

*(ii) transmitting on the network, according to programmatic instructions performed at the first Internet site, the combined data to the corresponding Internet accessible station for the user P for concurrently presenting the advertising related data and game related information;* wherein one or more user response processing modules at the second Internet site uses data obtained from said one or more data items for at least one of: evaluating an effectiveness of said at least one presentation, determining another of the presentations for transmitting to the first user, providing a product to the first user, providing a service to the first user, purchasing the corresponding product by the first user, and purchasing the corresponding service by the first user.

62. [An] *The* apparatus [as claimed to] *of* claim 61, wherein said game is a game of chance.

63. [An] *The* apparatus [as claimed in] *of* claim 61, wherein a total number of possible game plays of said game is capable of being determined before playing the game.

64. [An] *The* apparatus [as claimed in] *of* claim 61, wherein said game is a game having an opponent.

65. [An] *The* apparatus [as claimed in] *of* claim 64, wherein said opponent plays the game interactively with the user.

66. [An] *The* apparatus [as claimed in] *of* claim 64, wherein said opponent is another player.

67. [An] *The* apparatus [as claimed in] *of* claim 64, wherein said opponent deals a game playing token to the user.

68. [An] *The* apparatus [as claimed in] *of* claim 64, wherein said game is interactive between the user and said game playing engine.

69. [An] *The* apparatus [as claimed in] *of* claim 61, further including:

a profile repository for storing one or more demographic profiles, each said demographic profile describing a corresponding group of one or more game playing users, including the first user, for presenting, via the network, one or more presentations used for identifying products or services.

70. [An] *The* apparatus [as claimed in] *of* claim [61] *69*, wherein at least one of said demographic profiles includes data for identifying said corresponding group according to one or more of:

an age, sex, financial status, location of residence, education, marital status, estimated amount of recreation time, personal tastes and habits, size of household, number of children, and user network interaction categorizations.

71. [An] *The* apparatus [as claimed in] *of* claim 61, further including one or more modules for categorizing the first user according to data indicative of network interactions by the first user, wherein said indicative data includes one of: a characterization of network sites accessed by the first user, one or more types of advertising for which the first user requests additional information and a risk tolerance of the first user.

72. [An] *The* apparatus [as claimed in] *of* claim 61, wherein, for the first user, said one or more user data items are used to enhance a user profile for the user within a user data repository.

73. [An] *The* apparatus [as claimed in] *of* claim 61, wherein said network uses one of an Internet connection, an interactive cable television connection, and an intranet connection.

74. [An] *The* apparatus [as claimed in] *of* claim 61, wherein said at least one presentation includes one or more questions for the first user.

75. [An] *The* apparatus [as claimed in] *of* claim 61, wherein some of said one or more data items are determined using one of:

(a) a detection of an activation of a hyperlink by the first user; and (b) a determination of a length of time that one of the presentations is visible to the user.

[76. An apparatus as claimed in claim 61, further including:

a means for combining said at least one presentation with a game play by the game playing engine into a combined output; and a means for transmitting through the Internet, said combined output to the first Internet station.]

77. [An] *The* apparatus [as claimed in] *of* claim [76] *61*, wherein said means for combining includes a means for specifying said combined [response] *data output* in a hypertext markup language.

78. [An] *The* apparatus [as claimed in] *of* claim [76] *61*, wherein [said means for transmitting includes] *the controller includes* a World Wide Web server for accessing the Internet.

79. [An] *The* apparatus [as claimed in] *of* claim 61, wherein one or more said data items for the first user includes user information related to one or more of:

an age, sex, financial status, location of residence, education, marital status, estimated amount of recreational time, [personal tastes] and habits, size of household, *and* number of children[, and user network interaction categorizations].

80. [An] *The* apparatus [as claimed in] *of* claim 61, wherein said controller includes a selector engine for comparing a desired user profile with data provided by the users via the Internet.

81. [An] *The* apparatus [as claimed in] *of* claim 61, wherein said game playing engine includes a game controller for playing one or more of blackjack, poker, craps, roulette, baccarat and pai gow.

82. [An] *The* apparatus [as claimed in] *of* claim 61, wherein said game playing engine includes a wager accounting module for determining an acceptability of a user requested wager *for increasing amount bet between plays of the game*.

83. [An] *The* apparatus [as claimed in] *of* claim 61, wherein said first Internet station includes a network browser for communicating with the Internet site for playing the game.

84. [An] *The* apparatus [as claimed in] *of* claim 83, further including:

a presentation receiving module operatively connected to said network browser at the first Internet station, said presentation receiving module for receiving an unrequested presentation not combined with any game playing response by the game playing engine.

85. [An] *The* apparatus [as claimed in] *of* claim 84, wherein said presentation receiving module includes a daemon for detecting said unrequested presentation.

86. [An] *The* apparatus [as claimed in] *of* claim 85, further including:

an advertiser repository including data related to a measurement of a preference of the first user for one of said presentations, and an advertised item;

wherein said advertiser repository is accessible for transmitting said at least one presentation to the first Internet station.

87. [An] *The* apparatus [as claimed in] *of* claim 61, wherein:

said at least one presentation provides for conducting a transaction for a purchase of an advertised item presented at the first Internet station.

88. [An] *The* apparatus [as claimed in] *of* claim 61, wherein:

said first Internet station accesses the Internet via an Internet service provider;

wherein said service provider is a casino.

[89. A method of presenting at least one of a product and a service while playing one or more games on a network, comprising:

for each of a plurality of users the following steps (A1) through (A3) are performed:

(A1) first determining, in response to a network request by the user, a particular presentation, from a plurality of presentations, to present to the user at a corresponding user node of the network, wherein said presentations are used for presenting information about at least one of a product and a service, and said particular presentation includes addressing information for a destination site of the network for receiving user responses to said particular presentation;

(A2) playing, with the user, a corresponding instance of one of the games, wherein the instance includes one or more user plays and wherein for each of at least most of the users playing the game concurrently, a different display of tokens for the game is presented from that displayed to most other users;

(A3) first presenting to the user during the playing of a portion of the corresponding instance, said particular presentation via the network;

wherein a data item indicative of an action in response to said particular presentation is transmitted to said destination site wherein said data item is used for one of:

evaluating an effectiveness of said particular presentation, selecting another presentation for presenting to the user, providing a product, providing a service to the user, purchasing a product, purchasing a service, and providing information for influencing the user on a predetermined issue.]

[90. A method as claimed in claim 89, further including:

second determining for the user a different presentation, from the plurality of presentations, to present to the user at the corresponding user node of the network;

second presenting to the user during a different portion of the corresponding instance, said different presentation.]

[91. A method as claimed in claim 89, wherein the corresponding instance played by the user is played according to a predetermined set of rules indicating how an instance of the game is to be played.]

[92. A method as claimed in claim 89, wherein the corresponding instance played by the user is an instance of a game of chance.]

[93. A method as claimed in claim 89, wherein a total number of possible distinct game plays of the corresponding instance played by the user is capable of being determined before playing the game instance.]

[94. A method as claimed in claim 89, wherein said instance is an instance of a game having an opponent.]

[95. A method as claimed in claim 94, wherein said opponent plays the instance of the game interactively with the user.]

[96. A method as claimed in claim 94, wherein said opponent is another user.]

[97. A method as claimed in claim 94, wherein said opponent deals a playing token to the user.]

98. A method of viewing a presentation related to one of a product and a service while playing a game on a network, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining which of the users the advertising is to be presented thereto;* accessing the network by a first [user] *of the users* via a first network service provider, and by a second [user] *of the users* via a different second network service provider;

communicating by each of the first and second users with a network site that provides network access to one or more games capable of being played using communications on said network, wherein each of said first and second users use a common network address for communicating with said network site;

*wherein the first user has registered with the network site;* playing a first instance of one of said games using communications between said first user and said network site;

*wherein after each input, of a plurality of inputs by the first user, resulting in a corresponding transmission on the network for playing the first instance, the network site then (1) determines, upon receiving the corresponding transmission, a responsive game play content for the first instance, and (2) the responsive game play content has data for the advertising of one of the advertisers associated therewith for transmission to the first user;* presenting a first presentation to the first user, wherein *the network site transmits at least one response to one of the user plays to the first user, and the network site also transmits the first presentation, wherein* said first presentation is displayed between some two plays of the *first* instance and wherein said first presentation provides information about a product or service;

*wherein for determining the first presentation, a comparison is performed between the predetermined personal information for the user in the user data repository and the predetermined user selection data for the advertiser corresponding to the first presentation;* replacing said first presentation by a second presentation for display to the first user between a different two plays of the first instance of the game, wherein said second presentation provides information about a product or service;

detecting an action by the first user in response to one of said first presentation and said second presentation;

transmitting one or more data items indicative of said action to a particular network site corresponding *to* said one presentation;

receiving another presentation for presenting to the first user during a playing of the [game] *first* instance, said another presentation responsive to said step of transmitting*;*

*wherein for the first user, (i) and (ii) following hold:*

*(i) concurrently presenting to the first user: (i-a) information for playing the first instance of the game, and (i-b) the first presentation for an advertiser; and*

*(ii) at least a portion of data obtained from interactions by the first user with the first instance of the game is used for providing the advertiser with one of: (ii-a) information for an advertising related purpose different from playing the first instance of the game, and (ii-b) information for determining an effectiveness of a presentation for the corresponding advertiser related data.*

99. [A] *The* method [as claimed in] *of* claim 98, wherein said network site is said particular network site.

100. [A] *The* method [as claimed in] *of* claim 98, wherein a reversing of an ordering of display of said first and second presentations does not affect a playing of said first game instance.

101. A method of viewing a presentation related to one of a product and a service while playing a game on a network, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining which of the users the advertising is to be presented thereto;* providing access to the network via a first user node;

communicating with a second network node that provides network access to one or more games capable of being played using communications on said network;

transmitting game plays, via the network, between said first user node and said second network node for one of said games;

presenting a first advertising presentation to said first user node, wherein said first advertising presentation is presented during a first instance of the game and wherein said first advertising presentation is capable of being replaced by a different second advertising presentation, *and wherein the first advertising presentation is provided by the second network node;*

*wherein for determining the first advertising related presentation, a comparison is performed between the predetermined personal information for the user in the user data repository and the predetermined user selection data for the advertiser corresponding to the first advertising related presentation;*

*wherein in playing the first instance of the game, instances of combined data are obtained using an advertising selector for determining, for each instance of the combined data, corresponding advertising for combining with a game play, the instance of combined data subsequently transmitted on a network to the first user node;*

*wherein each instance of the combined data is (a) transmitted on the network in response to a user interaction at the first user node, and (b) the advertising and the game play therein are presented concurrently at the first user node*;

detecting an action in response to said first advertising presentation by said first user node during the first instance of the game;

first transmitting a data item indicative of said action on said network; *and* second transmitting to said first user node, another advertising presentation, wherein said another advertising presentation is determined using said data item.

102. [A] *The* method [as claimed in] *of* claim 101, wherein said first presentation is capable of being replaced by said second presentation in the game instance and the game instance is capable of being played in an identical manner regardless of which of said first and second presentations is presented.

103. The method [as claimed in] *of* claim 101, wherein one or more of (a), (b) and (c) following:

(a) said step of presenting includes presenting said second advertising presentation in a different game instance from said first instance, wherein an outcome of said first instance of the game is substantially unrelated to which advertising presentation of a plurality of advertising presentations is presented as said first advertising presentation in said step of presenting;

(b) said step of second transmitting includes selecting said another advertising presentation by at least one of (i) and (ii) following:

(i) accessing stored data indicative of network communications by the first user prior to said step of first transmitting; and (ii) determining whether the first user qualifies to receive a particular advertising presentation as said another advertising presentation;

(c) said step of first transmitting includes transmitting said data items to one of: said second network node, and another network node for determining said another advertising presentation.

104. A method of viewing a presentation related to one of a product and a service while playing a game on a network *with a server network node*, comprising:

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining whether the advertising is to be presented to the users;*

*subsequently performing, for each user of the users, the following steps (1) through (6) following;*

(*1*) communicating with [a] *the* server network node that provides network access to one or more games capable of being played using communications on said network *with the user via a first user node*;

(*2*) playing one of said games using communications between [a] *the* first user node and said server network node;

(*3*) presenting a first presentation at said first user node, wherein said first presentation is presented between two plays of the game *in response to a transmission from the server network node,* and wherein said first presentation is [capable of being] replaced*, without being in response to an immediately previous user input,* by a different second presentation without changing a play of the game;

*wherein for determining the first presentation, a comparison is performed between the predetermined personal information for the user in the user data repository and the predetermined user selection data for the advertiser corresponding to the first presentation;*

(*4*) detecting an action in response to said first presentation;

(*5*) transmitting a data item indicative of said action to a second network node;

(*6*) providing, in response to said data item, information related to the purchase of at least one of a product and a service*;*

*wherein for the user at the first user node, (i) and (ii) following hold:*

*(i) concurrently presenting to the user: (i-a) information for playing the game, and (i-b) the first presentation for an advertiser; and*

*(ii) at least a portion of data obtained from interactions by the user with the game is used for providing the advertiser with one of: (ii-a) information for an advertising related purpose different from playing the game, and (ii-b) information for determining an effectiveness of a presentation for the corresponding advertiser related data.*

105. A method of presenting an Internet presentation, comprising:

providing a first presentation, via the Internet, to a user Internet accessible node;

activating, in response to an Internet request by the user via an Internet connection to the user Internet accessible node, an instance of a first Internet service, wherein said first presentation is presented at least during an interval between Internet transmissions for two user inputs to the instance of the first *Internet* service, and said first presentation is not *initially* presented in response to an *immediately previous* Internet input by the user, during said Internet connection, and wherein said first presentation provides information relating to at least one of a purchasable product and a purchasable service;

*wherein the instance of the first Internet service presents on the user Internet accessible node a same informational content regardless of, but concurrently with, a first instance of the first presentation and a subsequent instance of the first presentation presented at the user Internet accessible node;*

*wherein a same Internet node provides the user Internet accessible node with at least a portion of the instance of the first Internet service, and information related to both the first instance and the subsequent instance of the first presentation;* receiving data, via a communication on the Internet, indicative of an action by the user in response to said first presentation being presented to the user, wherein said communication uses an Internet address, available at the user Internet accessible node, for determining a destination of said data;

determining a second presentation for presenting to the user, wherein said second presentation is determined using said data, said second presentation also providing information relating to one of a purchasable product and a purchasable service;

transmitting to the user, via the Internet, said second presentation for presenting to the user during said Internet connection.

106. [A] *The* method [as claimed in] *of* claim 105, wherein said first *Internet* service includes the capability of playing one or more games on the Internet, and said activation is an instance of playing one of the games interactively with the [first] *user* Internet accessible node*, wherein a step of combining said first presentation with data for displaying a play of said one game is performed prior to transmitting a result of the combining step to the user Internet accessible node, the play being responsive to a user game play for the one game*.

107. [A] *The* method [as claimed in] *of* claim 106, wherein said game has predetermined rules of how the game is played and at least one of the following attributes:

(a) an element of chance;

(b) a total number of game plays is capable of being determined before playing the game; and (c) there is an opponent to at least one player of said game.

108. [A] *The* method [as claimed in] *of* claim 105, further including a step of determining one of: a number of times the first presentation is presented, a number of positive responses to the first presentation, and a number of purchasable products or purchasable services sold using the first presentation.

109. [A] *The* method [as claimed in] *of* claim 105, wherein the communication between the first Internet accessible node and the second Internet accessible node uses a TCP/IP protocol.

110. [A] *The* method [as claimed in] *of* claim 105, further including a step of generating a value from said data, wherein said value is provided to a party requesting said first presentation be presented to users accessing the Internet.

111. [A] *The* method [as claimed in] *of* claim 110, wherein said step of generating includes determining one of: a number of times the first presentation is presented, a number of positive responses to the first presentation, and a number of purchasable products or purchasable services sold via the first presentation.

112. A method of providing a presentation to each of one or more users of a communications network, comprising:

performing for each of the one or more users, steps (A1) through (A3) following:

(A1) providing access to a network server node for allowing network access to a network service, wherein said network server node presents one or more interactive service presentations to each user: (a) during an activation of the network service from a network client node via the network, and (b) substantially asynchronously from most other users, said interactive service presentations providing interactive communications between the user and said network server node via the network;

(A2) presenting concurrently with the interactive service presentations at the network client node, a first advertising presentation for providing information related to one of a purchasable product and a purchasable service, wherein said first advertising presentation is transmitted during the activation of the network service, and said first advertising presentation is capable of being replaced by a different, second advertising presentation for presenting during the activation of the network service, and wherein at least one of said service presentations for presenting on the network client node is determined without regard to which one of said first and second advertising presentations are also transmitted to the user for concurrent presentation *with the at least one service presentation*;

(A3) receiving data, via a communication on the network, indicative of an action by the user in response to said step of presenting; and evaluating, using said data, an effectiveness of at least one of said first and second advertising presentations*;*

*wherein the step of evaluating includes one or more: measurement related to negative responses to said first advertising presentation, a comparison of a measurement of an effectiveness of said first advertising presentation with measurement of an effectiveness of another advertising presentation, a measurement related to a number of a saleable product of saleable service sold to the users interacting with the network service*.

113. [A] *The* method [as claimed in] *of* claim 112, wherein the activation includes playing an instance of a game*, wherein a step of combining said first advertising presentation with data for displaying a play of said game is performed prior to transmitting a result of the combining step to the network client node, the play being responsive to a user game play for the game*.

114. [A] *The* method [as claimed in] *of* claim 113, wherein at least some of said service presentations concurrently presented with said first advertising presentation include data indicative of a game play for said instance of the game.

[115. A method as claimed in claim 112, wherein said step of evaluating includes determining one of: a measurement related to positive responses to said first advertising presentation by the one or more users, a measurement related to negative responses to said first advertising presentation, a comparison of a measurement of an effectiveness of said first advertising presentation with measurement of an effectiveness of another advertising presentation, a measurement related to a number of a saleable product or saleable service sold to the users interacting with the network service, and a measurement related to a number of promotionals of a saleable product or saleable service requested by the users interacting with the network service.]

116. A method of providing [a presentation] *one or more service presentations with advertising presentations* on a network, comprising:

activating, in response to a request by a user, a service accessible from a first node of the network, wherein one or more interactive service presentations are presented to the user during an activation of the service by a network user node from which the user accesses the network, at least some of said interactive service presentations transmits communications on the network between said first node and said user node;

presenting concurrently with the service presentations at the user node, a first advertising presentation for providing information related to one of a product and a service, wherein said first advertising presentation is transmitted on the network for display during the activation of the service, and a display of said first advertising presentation is capable of being replaced by a display of a different, second advertising presentation during the activation of said service, wherein at least one of said service presentations, for presenting on the user node, is determined without regard to which one of said first and second advertising presentations is presented concurrently to the user with the at least one service presentation;

*wherein a determination of said at least one service presentation does not select the first advertising presentation;* wherein said first advertising presentation includes network link data that includes a network identifier identifying another presentation at a second node of the network different from said first node, and wherein said first advertising presentation is activated for requesting said another presentation by the user providing an input related to a position of a display of said first advertising presentation.

117. [A] *The* method [as claimed in] *of* claim 116, wherein said second network node is said network server node.

118. [A] *The* method [as claimed in] *of* claim 116, wherein said step of presenting includes transmitting on one of: the Internet, a cable network and a local area network.

[119. A method as claimed in claim 115, wherein said step of activating includes providing access to a game playing engine during the activation of the network service.]

120. A method of providing [a presentation] *one or more service presentations with presentations for a product or service* on a network, comprising:

activating a network service accessible from a first network node via the network, wherein one or more interactive service presentations are presented to a user during an activation of the network service by a network user node from which the user accesses the network;

inputting, by the user, service related information during a presentation of the service presentations for transmitting said information, via the network, to said first network node during the activation of the network service;

presenting concurrently with the service presentations at the network user node, a first presentation for providing information related to one of a product and a service, wherein said first presentation is transmitted for display during the activation of the network service, and a display of said first presentation is replaced by a different, second presentation during the activation of said network service [substantially] independently of any user input, wherein at least one of said service presentations for presenting on the network user node is determined without regard to which one of said first and second presentations is presented concurrently with the at least one service presentation to the user;

wherein said first [advertising] presentation includes network link data that includes a network identifier identifying another presentation;

activating, by the user, said first presentation for requesting said another presentation, wherein the user provides an input related to a position of a display of said first [advertising] presentation;

presenting said another presentation at the network user node;

providing product or service purchasing data to said another presentation; and receiving the product or service in response to said step of providing.

121. A method of providing information regarding products or services on the Internet, comprising:

*obtaining, at a first Internet accessible node, an Internet transmission from a second Internet accessible node having an Internet browser operably installed thereon from which a user thereof provides input resulting in the Internet transmission;*

*subsequently,* transmitting, via the Internet, from [a] *the* first Internet accessible node, first information for storing at [a] *the* second Internet accessible node, wherein said first information is capable of being utilized in subsequent Internet communications between the first Internet accessible node and the second Internet accessible node;

wherein for each of a plurality of subsequent different Internet connections by the second Internet accessible node, the following steps (a) and (b) are performed during the subsequent different Internet connection:

(a) receiving, via the Internet, at the first Internet accessible node, second information from said second Internet accessible node, said second information indicative of at least a presence of said first information;

(b) causing, via one or more Internet transmissions from said first Internet accessible node, one or more of a plurality of presentations to be transmitted to said second Internet accessible node when a presence of said first information is detected on said second Internet accessible node, *wherein said presentations are transmitted to the second Internet accessible node unrequestedly*;

wherein the following (i) through (iii) occur during at least one of said subsequent different Internet connections:

(i) an instance of *each of* said [one or more of the] presentations [are] *is* transmitted during an activation of a desired Internet service accessible via said first Internet accessible node, wherein said activation is activated by a user *providing input to the browser* at the second Internet accessible node for substantially immediate interaction *with the activation for communicating* therewith *via a plurality of user inputs to the browser*, (ii) a display of at least [a] *an unrequested* first of said instance presentations is replaced by a display of a different *unrequested* second of said instance presentations *during the activation*, and (iii) substantially all outputs from the activation of the desired Internet service, in response to Internet transmissions from the second Internet accessible node related to the activation, are determined without regard to which of said instance presentations is displayed at the second Internet accessible node;

*wherein a selector for determining the instances of the presentations determines the instances of the presentations after the desired Internet service is activated, wherein the selector is remote from the second Internet accessible node;*

*wherein during the activation, instances of combined data are obtained wherein for each instance of the combined data, corresponding advertising for combining with content for the desired Internet service, the instance of combined data subsequently transmitted on the network to the second Internet accessible node;*

*wherein each instance of the combined data is (a) transmitted on the network in response to a user interaction by the user with the activation, and (b) the advertising and the content therein are presented concurrently at the second Internet accessible node.*

122. [A] *The* method [as claimed in] *of* claim 121, wherein the activation includes a playing of a game *at the second Internet accessible node*, wherein said game is played according to a predetermined set of rules, and said game is at least one of: a game of chance, a game having an opponent, and a game having a total number of possible distinct game plays that is capable of being determined before playing the game, *wherein a step of combining said first instance presentation with data for displaying a play of said game is performed prior to transmitting a result of the combining step to the second Internet accessible node, the play being responsive to a user game play for the game.*

123. [A] *The* method [as claimed in] *of* claim 121, wherein:

(a) the first Internet accessible node is one of (i) and (ii) following: (i) an Internet service provider for the user, and (ii) a website contacted by an Internet service provider for the user when the Internet service provider is used by the user for connecting to the Internet, (b) the second Internet accessible node is used by a user in accessing the Internet, and (c) said presentations include advertisements of products and services.

124. [A] *The* method [as claimed in] *of* claim 123, further including a step of registering, via the Internet, the user at the first Internet accessible node, wherein user identification data for identifying the user is stored in a data storage that is accessible, on demand, by a process that services Internet requests via the first Internet accessible node.

125. [A] *The* method [as claimed in] *of* claim 124, wherein when the user accesses the desired Internet service via the first Internet accessible node, said step of causing includes presenting at least a first of said presentations concurrently with [a] *an interactive* display for the desired Internet service, wherein said first presentation advertises a product or service, *wherein determination of a contents defining the display for the desired Internet service is independent of selecting the first presentation.*

126. [A] *The* method [as claimed in] *of* claim 121, wherein said first information includes an encoding of a program for receiving unrequested transmissions of said one or more presentations at the second Internet accessible node.

127. [A] *The* method [as claimed in] *of* claim 126, wherein said second information includes a status indicative of an activation of said program *for presenting the one or more presentations at the second Internet accessible node.*

128. [A] *The* method [as claimed in] *of* claim 121, wherein said step of receiving includes verifying, using said second information at the first Internet accessible node, that said first information has a predetermined configuration.

129. A method for providing product or service information while playing a game, comprising:

performing the following substeps (A1) through (A4) for each of one or more users:

(A1) initiating an instance of the game for playing by the user, wherein the instance includes a plurality of user plays, wherein said instance uses transmissions on a communications network *from a network site identified by the user wherein the user is registered with the network site*;

(A2) presenting*, one after another* over time, a plurality of presentations to the user during a playing of the instance of the game, wherein *each of* said presentations [are] *is* presented [independently of] *without being in response to an immediately previous* user input, and wherein said presentations are for relating information about one or more purchasable products or services, or for receiving information from the user about purchasable products or services;

*wherein the step (A2) includes transmitting data for the plurality of presentations from the network site;*

(A3) transmitting data [by the communications network] from the user to [a] *the network* site on the communications network, wherein said data is related to one or more responses by the user to at least one of said presentations presented to the user; and (A4) receiving from said network site, a second of said presentations for presenting to the user, wherein said second presentation is determined using said data*;*

*wherein a selector determines the presentations after the instance of the game is activated, wherein the selector is remote from an Internet accessible node from which the user plays the instance of the game;*

*wherein during the instance of the game, instances of combined data are obtained wherein for each instance of the combined data, corresponding advertising for combining with content for the instance of the game, the instance of combined data subsequently transmitted on the communications network to the Internet accessible node;*

*wherein each instance of the combined data is (a) transmitted on the communications network in response to a user interaction by the user with the instance of the game, and (b) the advertising and the content therein are presented concurrently at the Internet accessible node*.

[130. A method for providing information regarding products or services while playing a game using a network, comprising:

performing the following substeps (A1) through (A3) for each of one or more users:

(A1) providing, at a network site on said network, access to a plurality of presentations for presenting to the user, wherein said presentations provide at least one of: (a) information about one or more purchasable products or services and (b) a capability for receiving a response from the user related to one or more purchasable products or services;

(A2) initiating an instance of the game for playing by the user using the network;

(A3) causing a display, using transmissions via the network, of one or more of said presentations to the user during a playing of the game instance, wherein there is at least one corresponding presentation of said presentations displayed to the user to which the user is able to enter a response, said response including an input by the user for activating a hyperlink on a display of said corresponding presentation, wherein said hyperlink, when identified by user input, activates a display of an additional presentation;

receiving, via said network, data related to one or more of the responses by the users to said hyperlinked additional presentations; and using said data from said one or more users for one of: evaluating an effectiveness of at least one of said presentations, determining another of said presentations for transmitting to the user, providing a product to the user, providing a service to the user, and charging an advertiser of one of said presentations.]

[131. A method of providing a presentation on a network, comprising:

activating a network service accessible at a first network node, via the network, wherein one or more interactive service presentations are presented to a user during an activation of the network service by a network user node from which the user accesses the network, and an interactive content is provided by at least one of said service presentations, said content concerning the service;

receiving, at the first network node and during the activation of the network service, network transmissions from the user node for one or more interactions between the user and said interactive service presentations concerning said interactive content; responding, by the first network node, to at least one of said network transmissions prior to receiving some next one of said network transmissions from the user;

determining a particular one of a plurality of advertising presentations wherein said advertising presentations are used for presenting to the user information about at least one of a product and a service, and wherein said particular presentation includes network link data for identifying another presentation related to said particular presentation, said network link data associated with a corresponding one or more positions on a display of said particular presentation;

providing, for display concurrently with a display of at least some said interactive content of the service presentations at the network user node, said particular advertising presentation, wherein a display of said particular advertising presentation is activated for providing said another presentation to the user when the user provides an input identifying one of said one or more positions on a display of said particular presentation, and wherein said interactive content is substantially unaffected by which of said advertising presentations is identified in said step of determining as said particular presentation.]

132. [A] *The* method [as claimed in] *of* claim [131] *140*, wherein said step of activating includes one of:

(a) activating an instance of a game as at least a portion of the network service, and (b) accessing a first Internet site as said first network node, wherein a second Internet site different from said first Internet site performs said step of providing.

133. An apparatus for providing product or service information to one or more users while each user is playing a game on a communications network, comprising:

*a persistent user data repository having predetermined personal information for each of a plurality of users;*

*a persistent advertising data repository having, for each advertiser of a plurality of advertisers, predetermined user selection data for selecting users to present thereto advertising for the advertiser, said predetermined user selection data including data defining one or more characteristics of users for determining which of the users the advertising is to be presented thereto;* means for playing, with each user, a corresponding instance of the game, wherein the corresponding instance includes a plurality of user plays transmitted on the communications network;

means for determining one or more presentations to present to each user during a playing of the corresponding instance of the game, wherein between some two of the user plays by the user there is one of said one or more presentations presented to the user, wherein said presentations are transmitted to the user via the communications network, and wherein said presentations are for relating information about one or more purchasable products or services, or for receiving information from the user about purchasable products or services;

*a combiner for obtaining combined data, wherein said combined data is a result of combining at least one of the presentations with data for displaying at least a portion of one of said corresponding instances, the at least one presentation including at least one network link for identifying another presentation related to said at least one presentation, said network link associated with a corresponding one or more locations on a display of the at least one presentation, wherein a user input indicative of at least one of said locations activates said network link for presenting said another presentation;*

*wherein for at least one of the users, for determining the at least one presentation, a comparison is performed, after the instance of the game is activated, between the predetermined personal information for the at least one user in the user data repository and the predetermined user selection data for the advertiser corresponding to the at least one presentation;*

*wherein the combined data is (a) transmitted on the communications network in response to a user interaction by the at least one user with the instance of the game, and (b) the advertising and the at least one portion therein are presented concurrently at an Internet accessible node from which the at least one user plays the instance of the game;* means for receiving data transmitted by the communications network by at least one of the users, wherein said data transmitted by the at least one user is related to one or more responses by the user to at least one of said presentations presented to the user; and means for selecting a second of said presentations for transmitting to the at least one user, wherein said means for selecting uses said data for determining said second presentation.

*134. The apparatus of claim 1, wherein the selection engine uses a representation of a geographical location of the user for determining the corresponding advertising presentation.*

*135. A method of advertising on the Internet, comprising:*

*communicating with an Internet accessible user node by a first Internet accessible node having computational equipment operably connected to the Internet to communicate data for advertising to the Internet accessible user node;*

*wherein for the step of communicating the following are performed:*

*(a) an activation of an interactive service available at the first Internet accessible node via a first Internet connection for communication with the Internet accessible user node;*

*(b) a presentation of a first presentation, via the Internet, at said Internet accessible user node for displaying to a user during Internet interactions between the user and the service, wherein said first presentation corresponds to a portion of the data for advertising, and said first presentation identifies at least one of a purchasable product and a purchasable service; and wherein there is no user input for purposefully displaying the first presentation to the user;*

*wherein the first presentation is substantially unrelated to a performance of the service by the user;*

*wherein there are periodic changes of advertising displayed on the user node, the periodic changes are not in response to a user purposefully requesting the periodic changes, and wherein the advertising displayed corresponds to the data for advertising, and wherein for each user input, UI, for communicating with the service such that the UI is provided prior to at least one of the periodic changes, the at least one periodic change is provided at a different time from a display change at the user node resulting from the user input UI;*

*wherein each change of the periodic changes is displayed independently of a state of the user's interactions with the interactive service;*

*(c) a transmission of data, via an Internet communication, indicative of an action by the user in response to said first presentation;*

*(d) a receipt of, via the Internet, a second presentation for presenting to the user, wherein said second presentation is determined using said data from the transmission, said second presentation also identifying one of a purchasable product and a purchasable service; and*

*(e) a presentation to the user of said second presentation during the first Internet connection.*

*136. The method of claim 135, wherein the activation of the service includes providing an Internet transmission to a second Internet accessible node, wherein said second Internet accessible node performs at least said first presentation; and said second Internet accessible node includes an Internet website that at least one of:*

*(a) provides said first Internet connection;*

*(b) provides an offer to subsidize said first Internet connection;*

*(c) stores information on said first Internet accessible node for use in a second Internet connection different from said first Internet connection; and*

*(d) stores information related to the user for selecting an advertising presentation for presenting to the user.*

*137. The method of claim 135 further including steps of:*

*downloading, on the first Internet connection, data to the user node for use in a second Internet connection different from said first Internet connection, wherein an Internet transmission, obtained from the first Internet accessible user node, results from the downloaded data being effective for providing access to the interactive service;*

*transmitting advertising to the first Internet accessible user node, the advertising selected according to user input transmitted, via the Internet, to the interactive service.*

*138. The method of claim 135, wherein the presentation of the first presentation includes providing a change to a display for the user node, the change occurring without there being a user input to the user node for communicating with the first Internet accessible node.*

*139. The method of claim 137, wherein during the Internet interactions between the user and the instance of the interactive service, further performing a step of:*

*providing, via the Internet, the user node with the data for presenting a first display to the user at the user node, wherein said first display identifies at least one of a*

*purchasable product and a purchasable service; and wherein the data for presenting the first display is combined with data for displaying at least a portion of the instance of the interactive service for presenting at a same time;*

*wherein the data for presenting the first display includes link data associated with the first display, wherein upon user activation of the link data by user input to the user node, additional information is presented to the user on a display for the user node.*

*140. A method of providing a presentation on a network, comprising:*

*providing access to a persistent user data repository having predetermined personal information for each of a plurality of users;*

*providing access to a persistent advertising data repository having, for each advertiser of a plurality of advertisers, predetermined user selection data for selecting users to present thereto advertising for the advertiser, said predetermined user selection data including data defining one or more characteristics of users for determining whether the advertising is to be presented to the users;*

*subsequently performing, for each user of the users, the following steps (1) through (6) following;*

*(1) providing, via a first network node, a user node with a connection to the network;*

*wherein the network is accessible via the connection for allowing the user to navigate to a plurality of nodes of the network using the user node;*

*(2) activating a network service accessible at the first network node, via the network, wherein one or more interactive service presentations are presented to the user during an activation of the network service by the user node from which the user accesses the network, and an interactive content is provided by at least one of said service presentations, said content provided by the service;*

*(3) receiving, at the first network node and during the activation of the network service, network transmissions from the user node for one or more interactions between the user and said interactive service presentations in response to said interactive content;*

*(4) responding, by the first network node, with a response to at least one of said network transmissions prior to receiving at least one subsequent one of said network transmissions from the user, wherein the response includes combined data, the combined data is a result of combining data for the interactive content, and data for an advertising content of at least one advertising presentation;*

*(5) determining, prior to the step of responding, the at least one advertising presentation from a plurality of advertising presentations wherein said advertising presentations are used for presenting to the user information about at least one of a product and a service, and wherein said at least one advertising presentation includes network link data for identifying another presentation related to said at least one advertising presentation, said network link data associated with a corresponding one or more positions on a display of said at least one advertising presentation;*

*wherein for determining the at least one advertising presentation, a comparison is performed between the predetermined personal information for the user in the user data repository and the predetermined user selection data for the advertiser corresponding to the at least one advertising presentation;*

*wherein the at least one advertising presentation is determined by determining a correspondence between user input transmitted, via the network, to the first network node, and advertiser associated information for identifying users to which advertising is to be presented;*

*(6) providing, for display concurrently with a display of at least some said interactive content of the service presentations at the user node, said at least one advertising presentation, wherein a display of said at least one advertising presentation is activated for providing said another presentation to the user when the user provides an input identifying one of said one or more positions on a display of said at least one advertising presentation, and wherein said interactive content is unaffected by which of said advertising presentations is identified in said step of determining as said at least one advertising presentation;*

*wherein one or more of the advertising presentations are at least intermittently displayed on the user node.*

*141. The apparatus of claim 1, further including, for the first user, user profile data accessed by the advertising selector for determining the corresponding advertising presentation, the user profile data including user specific information obtained from user input to the corresponding user network node, the user specific information including identification of a physical characteristic of the first user which is not a physical characteristic of advertisers used for determining the advertising presentations;*

*wherein the user profile data is stored in a persistent user data repository for accessing by a plurality of activations of the advertising selector.*

*142. The apparatus of claim 141, further including a data repository for advertiser information for selecting the user based on a correspondence between the advertiser information for at least one advertiser, and the user profile data, the data repository including data for selecting users based on geographical locations of the users.*

*143. The apparatus of claim 1, wherein for one or more presentations of the at least some presentations, the one or more presentations are presented to at least some of the plurality of users, and wherein data indicative of a number of advertised items sold to said at least some of the plurality of users via the one or more presentations is retained by the apparatus, such that said advertised items are available for purchase by the at least some of the users accessing corresponding network link for the one or more presentations.*

*144. The apparatus of claim 1, further including user related data accessed by the advertising selector for determining the corresponding advertising presentation, the user related data including user information obtained from user input to the network.*

*145. The apparatus of claim 1, further including a data repository for advertiser information for a plurality of advertisers, wherein for at least one of the advertisers, the advertiser information therefor is used for determining the corresponding advertising presentation based, at least in part, upon a correspondence between a representation of a geographical location of the user and geographical location data in the data repository.*

*146. The method of claim 135 further including steps of:*

*transmitting Internet communication information, from the first Internet accessible node, for storing on the Internet accessible user node;*

*wherein the Internet communication information is provided on the Internet accessible user node in a manner so that the Internet communication information can be used in a second Internet connection different from said*

*first Internet connection, wherein the Internet communication information is transmitted in the step of transmitting subsequently to the user registering with the interactive service, and wherein an Internet transmission indicative of the Internet communication information being provided on the Internet accessible user node is transmitted back to the first Internet accessible node for use by the first Internet accessible node in providing access to the interactive service;*

*transmitting advertising to the Internet accessible user node, the advertising selected according to user input transmitted, via the Internet, to the interactive service.*

*147. The apparatus of claim 1, further including, for the first user, user profile data accessed by the advertising selector for determining the corresponding advertising presentation, the user profile data including user specific information obtained from user input to the corresponding user network node, the user specific information including identification of a physical characteristic of the first user which is not a physical characteristic of advertisers used for determining the advertising presentations.*

*148. The apparatus of claim 1, wherein the advertising selector determines the corresponding advertising presentation based on a comparison between information for the advertiser, and information related to a geographical location for the first user.*

*149. The apparatus of claim 1, wherein for one or more presentations of the at least some presentations, the one or more presentations are presented to at least some of the plurality of users, wherein data indicative of advertised items sold thereto is transmitted to an Internet website providing the informational service.*

*150. The apparatus of claim 1, further including a data storage for storing persistent user related data, the data storage accessed by the advertising selector for determining the corresponding advertising presentation, the user related data including user information obtained from user input to the network, the user related data, including user identification information provided in an another instance of the informational service occurring prior to the corresponding instance, including data related to a result obtained from both the corresponding instance and the another instance is associated with the user.*

* * * * *